US005585861A

United States Patent [19]

Taniguchi et al.

[11] Patent Number: 5,585,861

[45] Date of Patent: Dec. 17, 1996

[54] LUMINANCE AND CHROMINANCE SIGNALS SEPARATING FILTER ADAPTIVE TO MOVEMENT OF IMAGE

[75] Inventors: Junko Taniguchi; Noriyuki Yamaguchi; Takuji Kurashita; Mitsuru Ishizuka; Masaharu Yao, all of Nagaokakyo, Japan

[73] Assignee: Mitsubishi Denki Kabushiki Kaisha, Tokyo, Japan

[21] Appl. No.: 344,640

[22] Filed: Nov. 9, 1994

Related U.S. Application Data

[62] Division of Ser. No. 850,488, Mar. 12, 1992, Pat. No. 5,412,434.

[30] Foreign Application Priority Data

| | | | |
|---|---|---|---|
| Mar. 14, 1991 | [JP] | Japan | 3-49548 |
| Mar. 14, 1991 | [JP] | Japan | 3-49549 |
| Mar. 18, 1991 | [JP] | Japan | 3-51974 |
| Mar. 18, 1991 | [JP] | Japan | 3-52285 |
| Apr. 12, 1991 | [JP] | Japan | 3-79603 |
| Apr. 12, 1991 | [JP] | Japan | 3-79604 |
| Feb. 7, 1992 | [JP] | Japan | 4-56746 |

[51] Int. Cl.[6] .......... H04N 9/78

[52] U.S. Cl. .......... 348/669; 348/663

[58] Field of Search .......... 348/663–666.7; H04N 9/78

[56] References Cited

U.S. PATENT DOCUMENTS

| | | | |
|---|---|---|---|
| 4,994,906 | 2/1991 | Moriwake | 348/668 |
| 5,146,318 | 9/1992 | Ishizuka et al. . | |
| 5,249,040 | 9/1993 | Sugiyama | 348/603 |

*Primary Examiner*—Victor R. Kostak
*Assistant Examiner*—Nathan J. Flynn

[57] ABSTRACT

A luminance (Y) and chrominance (C) signals separating filter includes a motion detecting circuit which partially detects a movement of an image utilizing a correlation between frames; an inter-frame YC separating circuit which performs a separation utilizing the inter-frame correlation when the motion detecting circuit detects a still image, and outputs intra-frame YC separated C signals and intra-frame YC separated Y signals; an intra-frame YC separating circuit which partially detects a correlation between fields or between frames and a correlation in a field when the motion detecting circuit detects a moving image, performs a separation utilizing the correlations, and outputs intra-frame YC separated C signals and intra-frame YC separated Y signals; a C signal mixing circuit which mixes the inter-frame YC separated C signals and the intra-frame YC separated C signals in accordance with an output of the motion detecting circuit and outputs motion adaptive YC separated C signals; and a Y signal mixing circuit which mixes the inter-frame YC separated Y signals and the intra-frame YC separated Y signals in accordance with the output of the motion detecting circuit and outputs motion adaptive YC separated Y signals.

26 Claims, 101 Drawing Sheets

F I G. 18
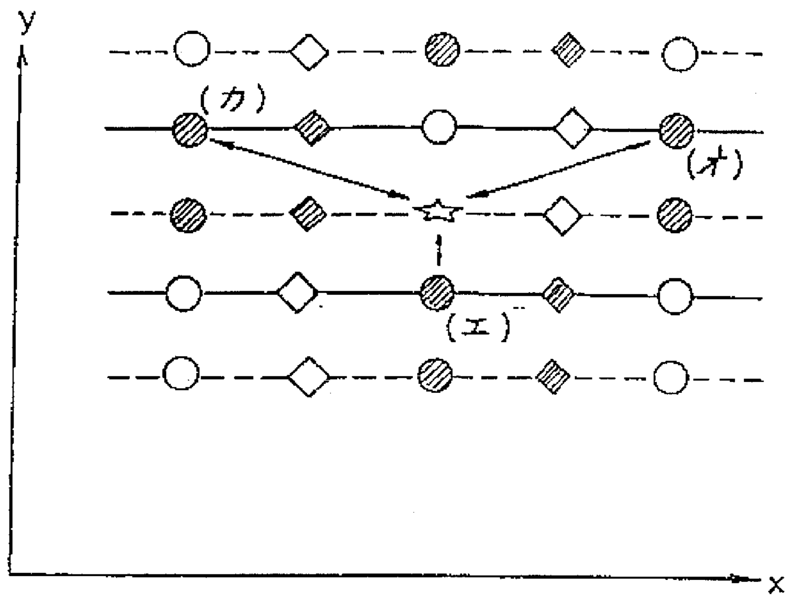
F I G. 19
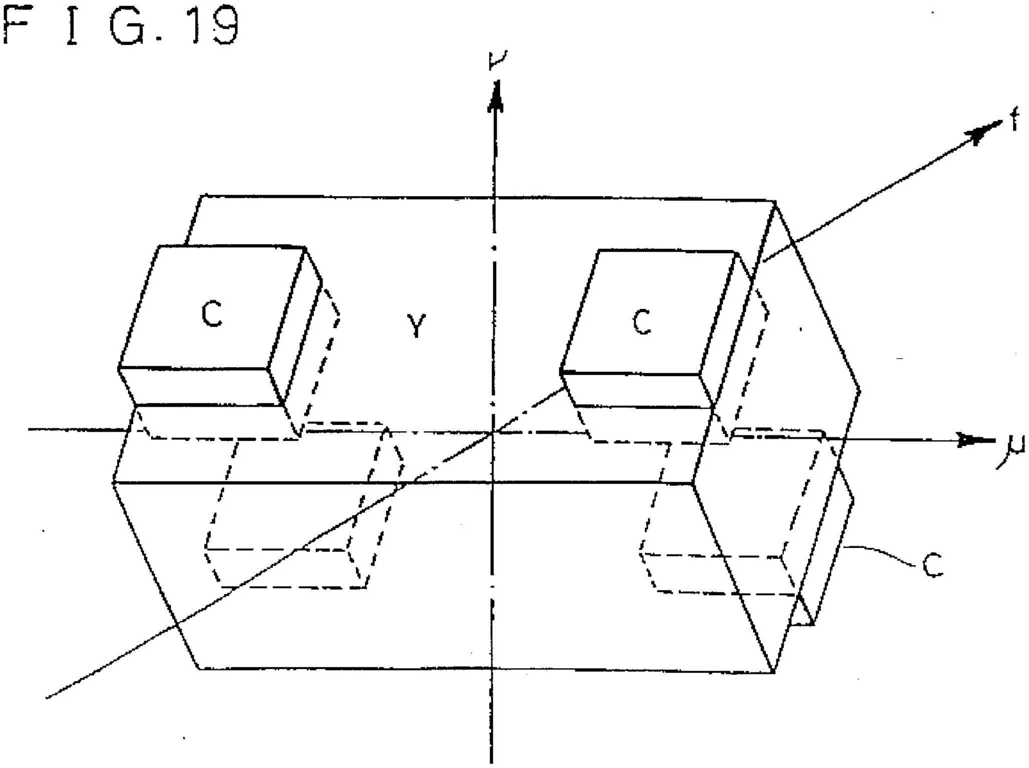

F I G. 23
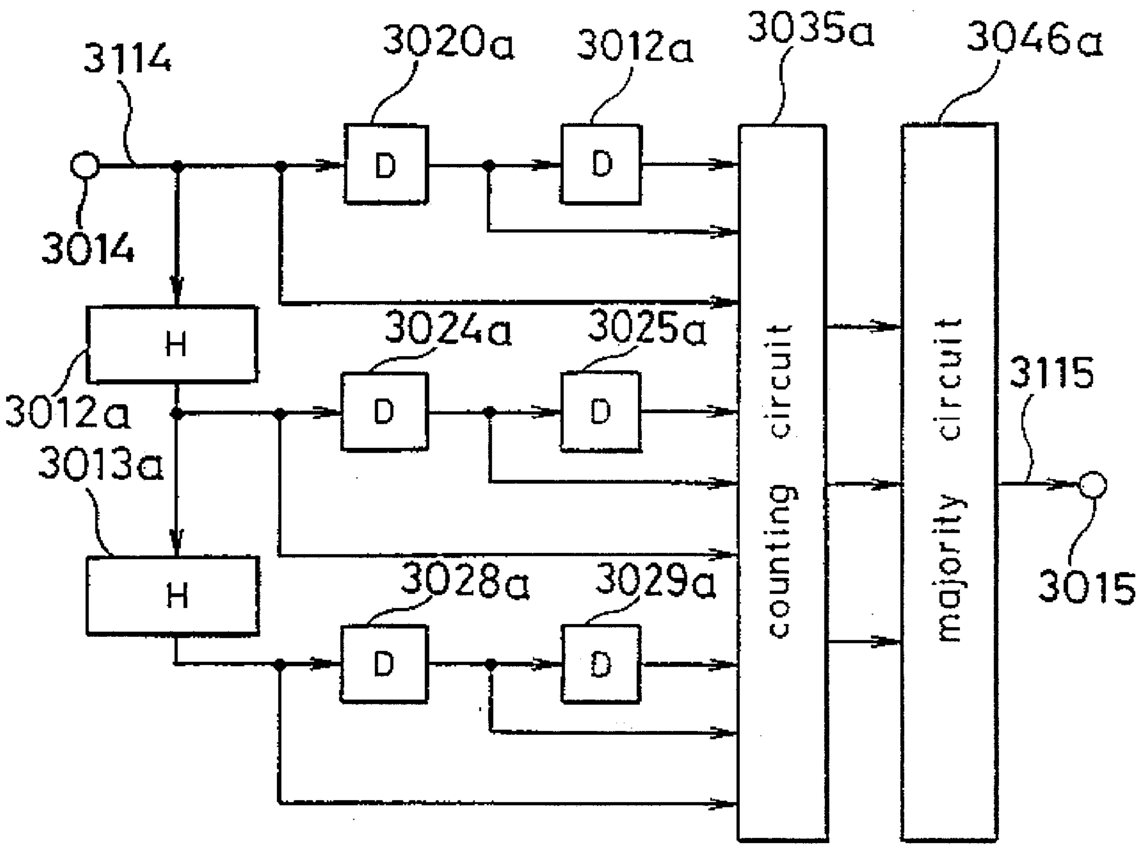

F I G. 25
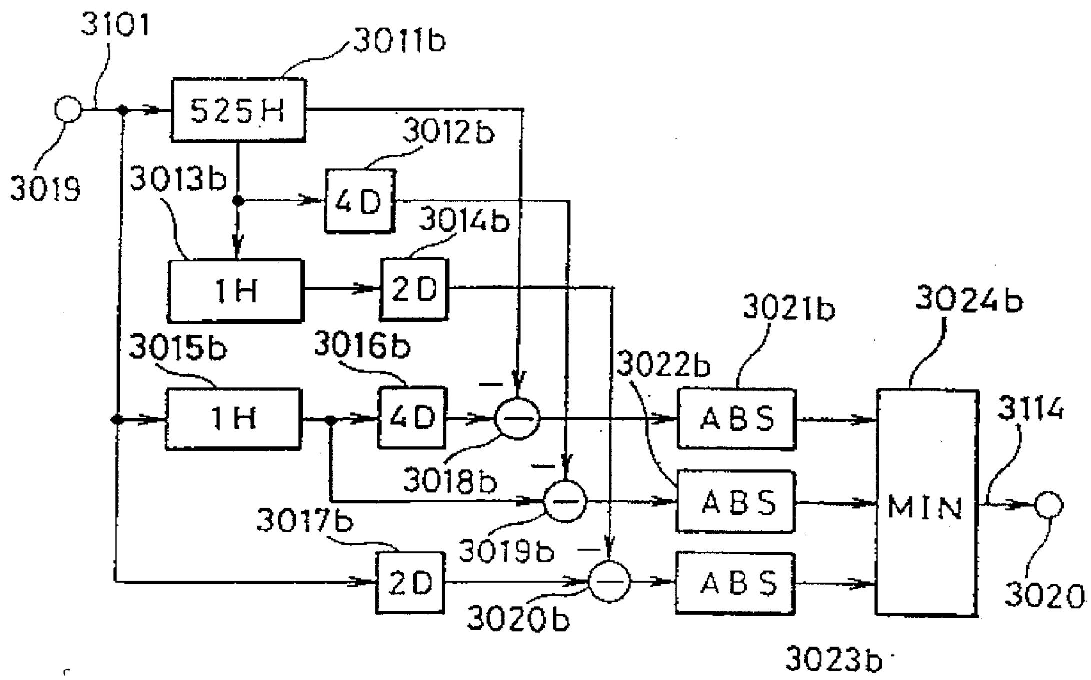
F I G. 26
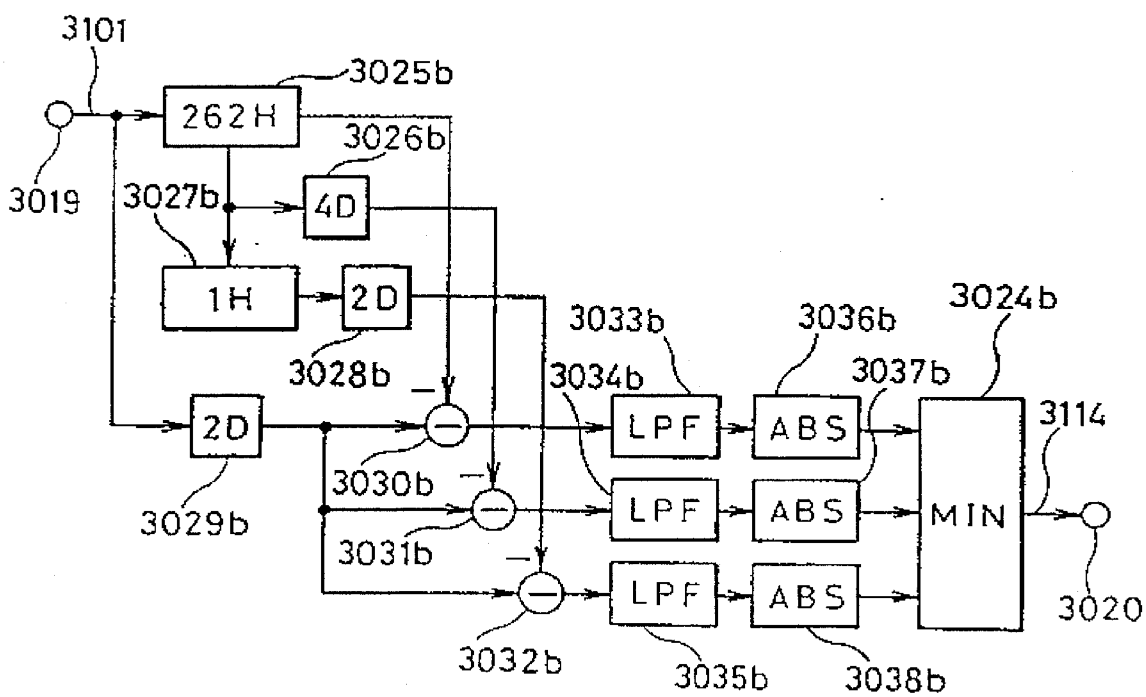

F I G. 46
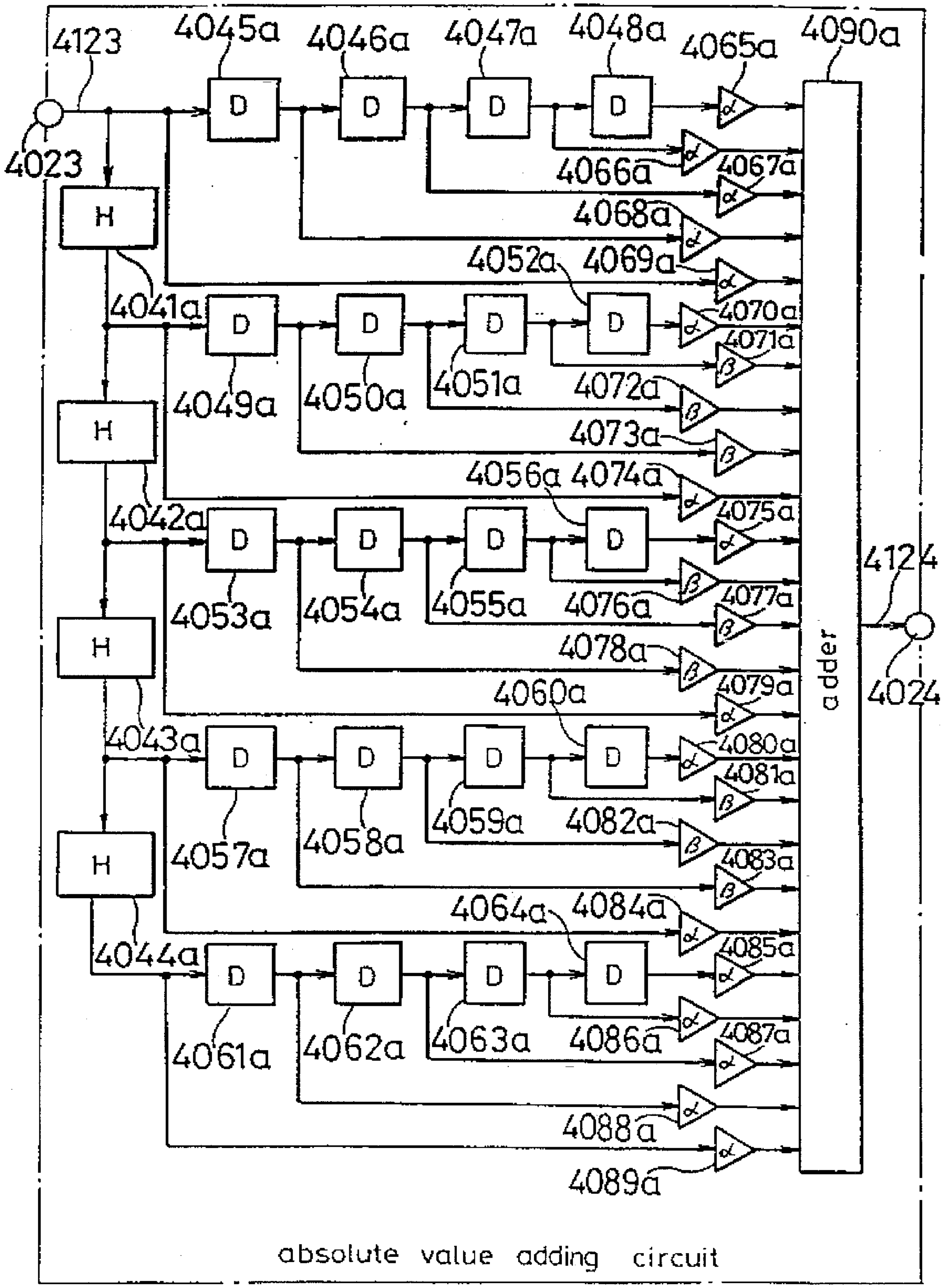

F I G. 61 (a)
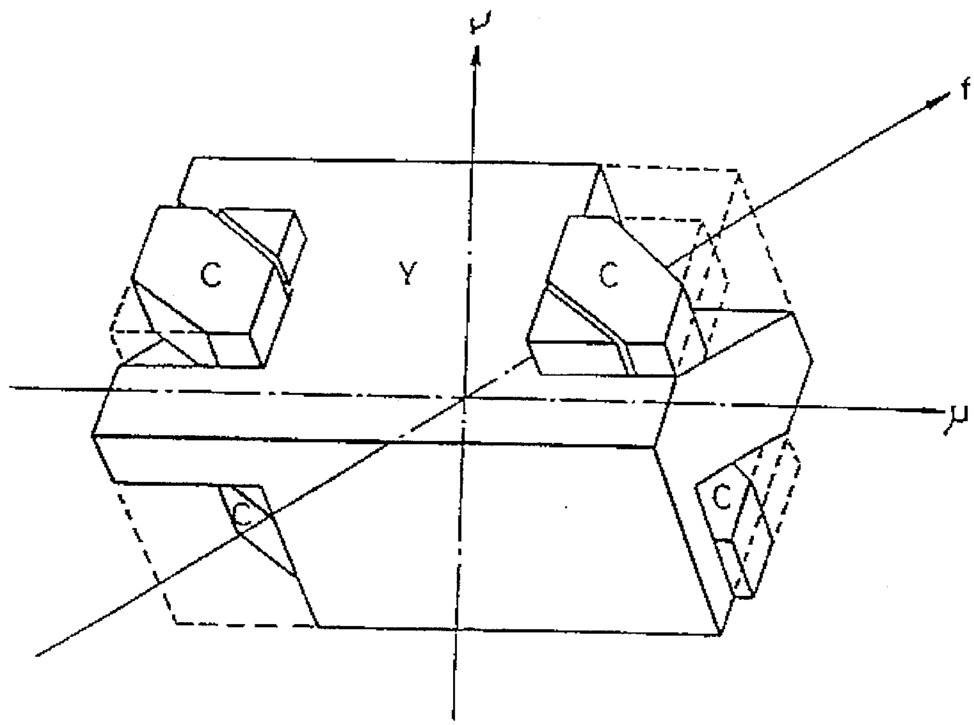
F I G. 61 (b)
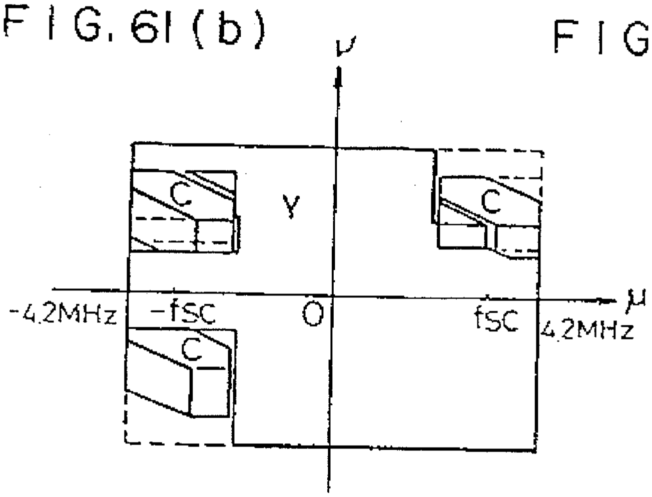
F I G. 61 (c)
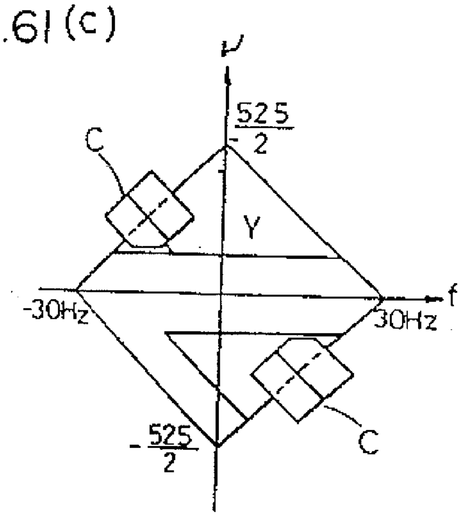

F I G. 64 (a)
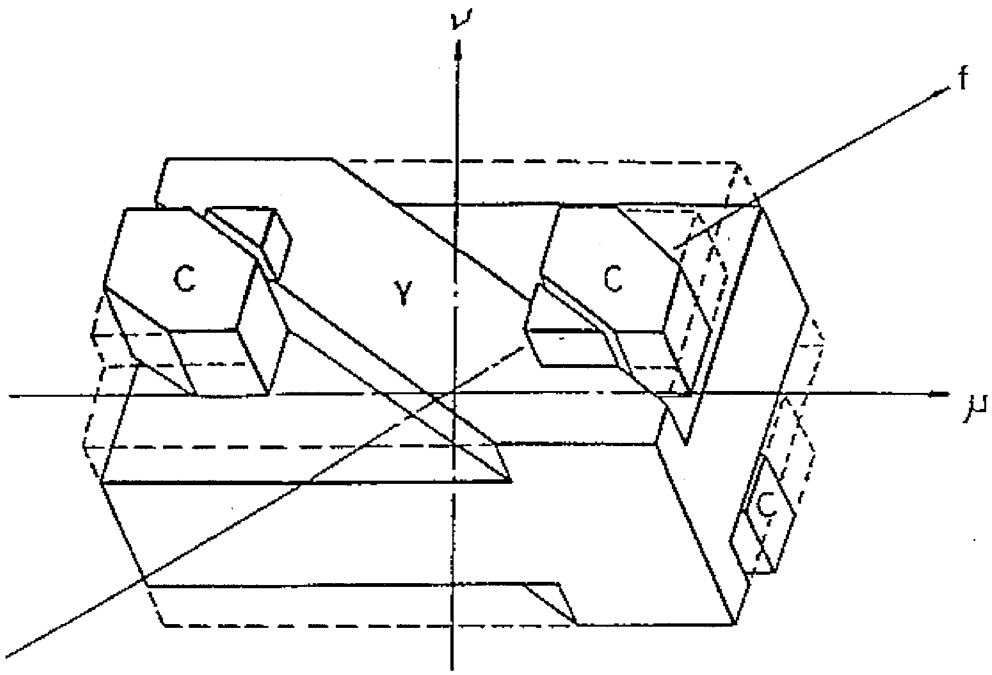
F I G. 64 (b)
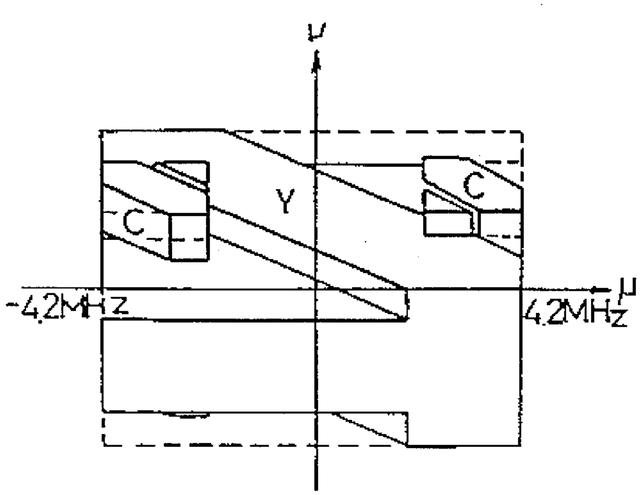
F I G. 64 (c)
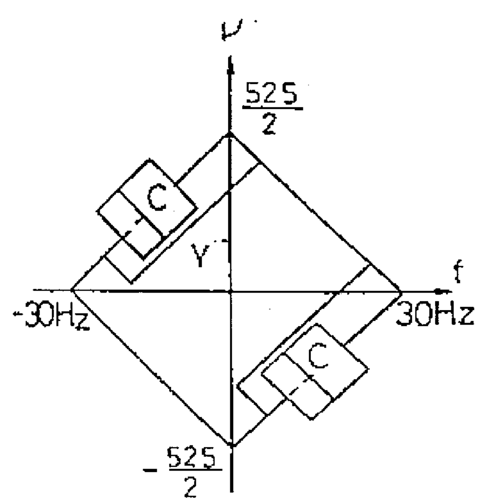

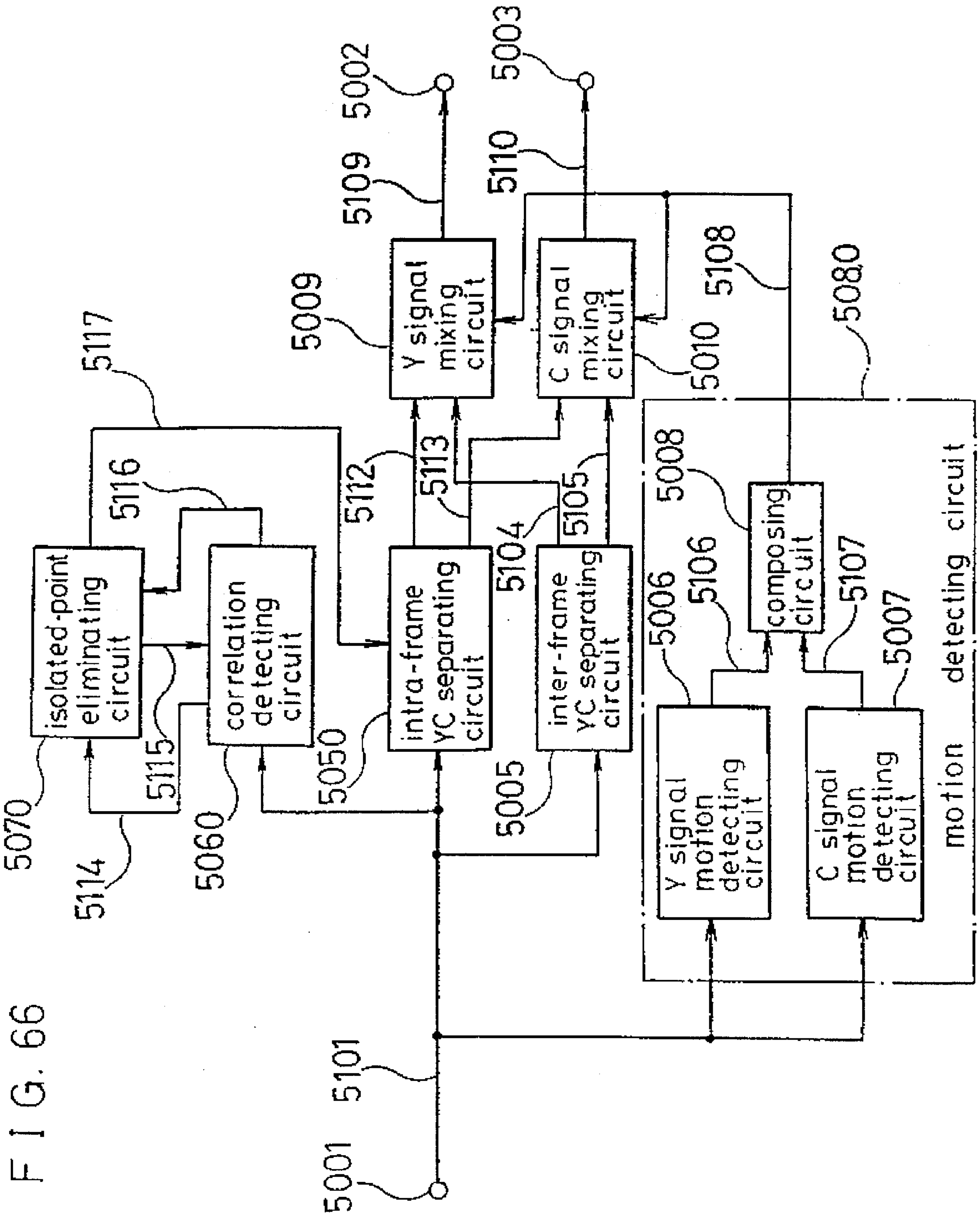
F I G. 66

F I G. 67
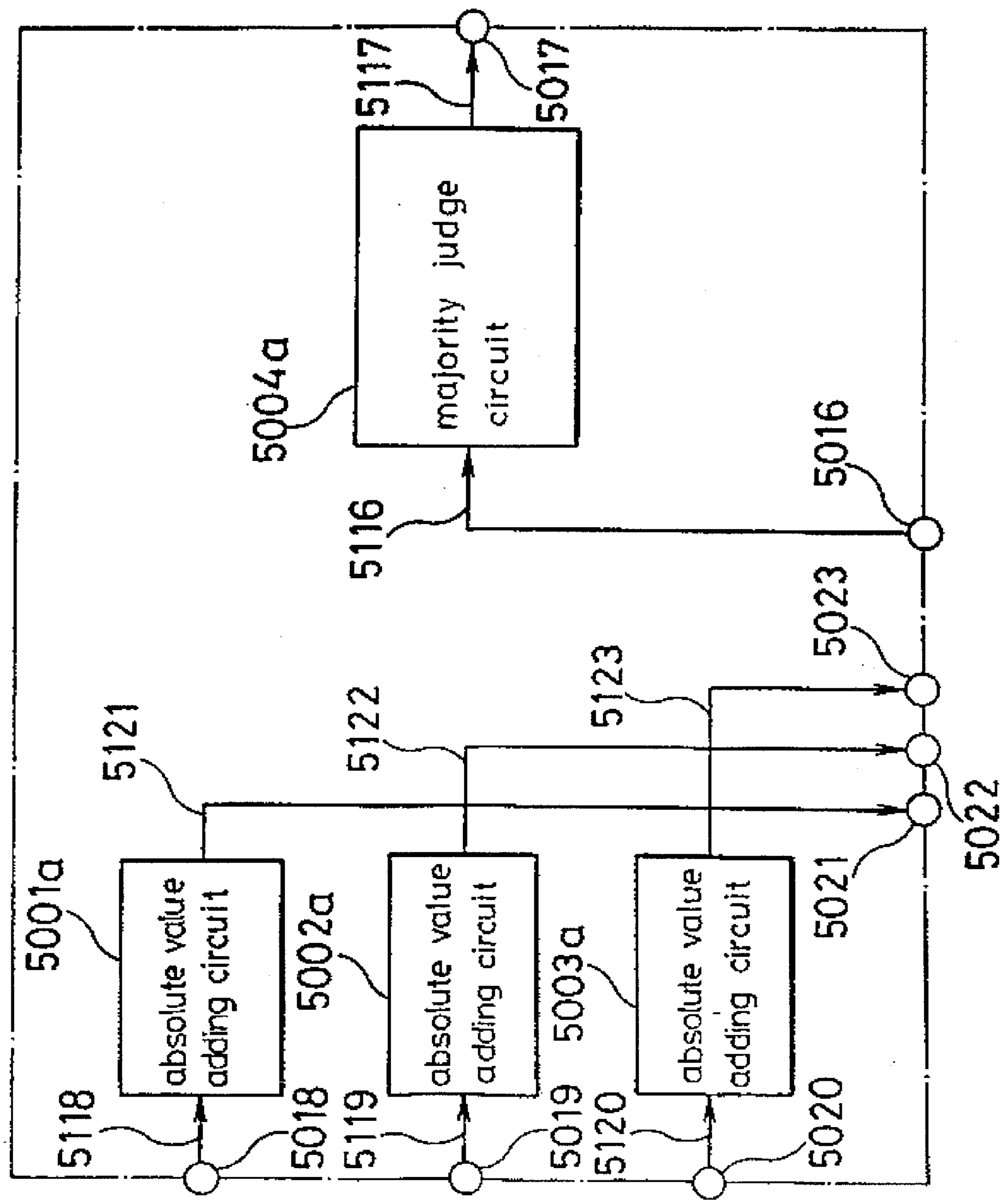

F I G. 85 (a)
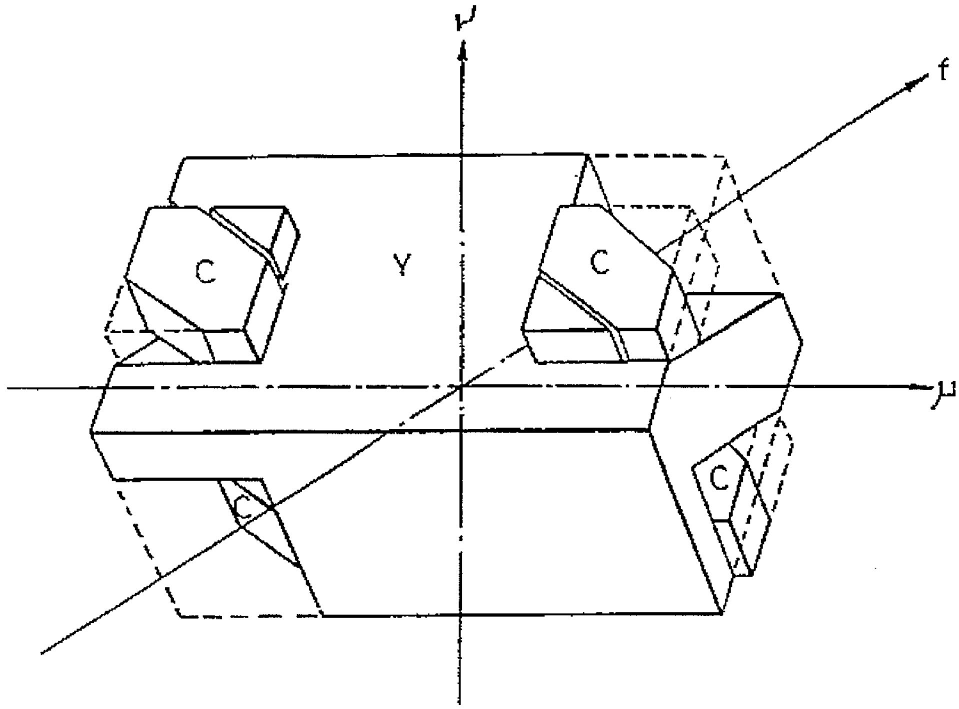
F I G. 85 (b)
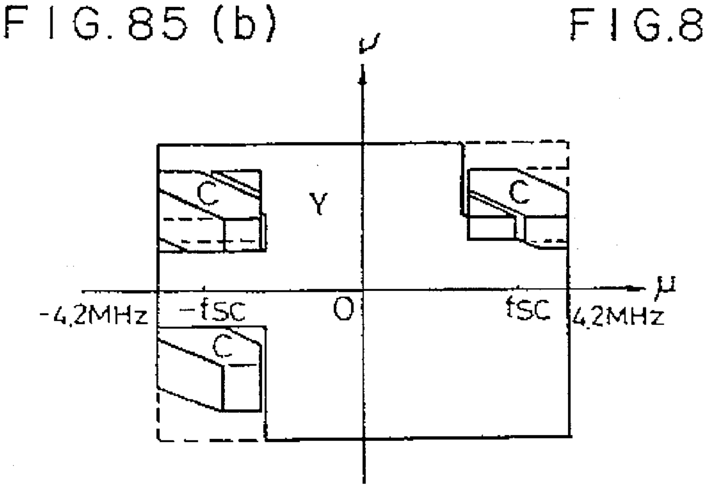
F I G. 85 (c)
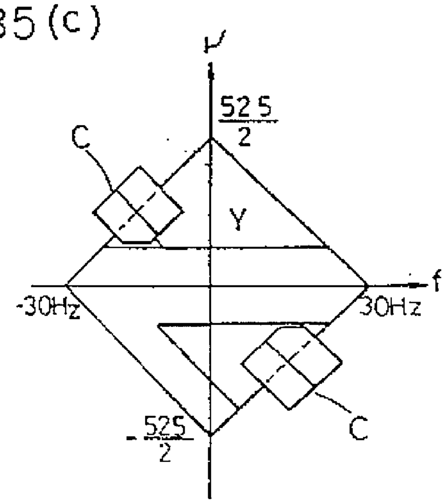

LUMINANCE AND CHROMINANCE SIGNALS SEPARATING FILTER ADAPTIVE TO MOVEMENT OF IMAGE

This application is a divisional of application Ser. No. 07/850,488, filed on Mar. 12, 1992 now U.S. Pat. No. 5,412,434, the entire contents of which are hereby incorporated by reference.

FIELD OF THE INVENTION

The present invention relates to a filter for separating luminance signals (hereinafter referred to as Y signals or Y) and chrominance signals (hereinafter referred to as C signals or C) from composite color television signals (hereinafter referred to as V signals) in the C signals are frequency-multiplexed within a high frequency region of the Y signals and, more particularly, to a luminance and chrominance signal separating filter (hereinafter referred to as a YC separating filter) adaptive to a movement of an image.

BACKGROUND OF THE INVENTION

A YC separating filter adaptive to a movement of an image judges whether an image is a still image or a moving image and performs a YC separation suitable for an image signal of the type judged. According to the current NTSC, composite signals in which C signals are frequency-multiplexed to a high frequency region of Y signals are employed. Therefore, YC separation is required in a receiver and an imperfect separation causes a deterioration in the quality of the image, such as cross color or dot crawl. Recently, with development of large capacity digital memory, various kinds of signal processing circuits for improving the quality of image, such as a YC separating filter adaptive to a movement of an image utilizing a delay circuit having a delay time equal to a vertical scanning frequency of a television signal or more, have been proposed.

FIG. 110 is a block diagram showing an example of a conventional YC separating filter adaptive to a movement of an image. In FIG. 110, video (V) signals 1101 of the NTSC type are input to an input terminal 1001 and applied to input terminals of an intra-field YC separating circuit 1004, an inter-frame YC separating circuit 1005, a Y signal motion detecting circuit 1006 and a C signal motion detecting circuit 1007.

In the intra-field YC separating circuit 1004, by an intra-field filter (not shown), intra-field YC separated Y signals 1102 and intra-field YC separated C signals 1103 which are divided into Y signals and C signals by an intra-field filter (not shown) are applied to a first input terminal of a Y signal mixing circuit 1009 and a first input terminal of a C signal mixing circuit 1010, respectively.

In addition, in the inter-frame YC separating circuit 1005, by an inter-frame filter (not shown), inter-frame YC separated Y signals 1104 and inter-frame YC separated signals 1105 which are divided into Y signals and C signals by an inter-frame filter (not shown), are applied to a second input terminal of the Y signal mixing circuit 1009 and a second terminal of the C signal mixing circuit 1010, respectively.

On the other hand, signals 1106 showing the amount of movement of Y signals detected by the Y signal movement detecting circuit 1006 are applied to an input terminal of a composing circuit 1008 while signals 1107 showing the amount of movement of C signals detected by the C signal movement detecting circuit 1007 are applied to the other input terminal of the composing circuit 1008.

Motion detecting signals 1108 composed by the composing circuit 1008 are applied to a third input terminal of the Y signal mixing circuit 1009 and a third terminal of the C signal mixing circuit 1010. A motion detecting circuit 1080 comprises the Y signal motion detecting circuit 1006, the C signal motion detecting circuit 1007 and the composing circuit 1008.

Motion adaptive YC separated Y signals 1109, which are output from the Y signal mixing circuit 1009, are transferred to the output terminal 1002 and motion adaptive YC separated C signals 1110, which are output from the C signal mixing circuit 1010, are transferred to the output terminal 1003.

The operation of FIG. 10 will now be described. In the motion detecting circuit 1080, when the V signals are divided into Y signals and C signals, the composing circuit 1008 composes the output of the Y signal motion detecting circuit 1006 and the output of the C signal motion detecting circuit 1007 to judge that the V signals 1101 are either signals showing a still image or signals showing a moving image.

FIG. 111 shows the Y signal motion detecting circuit 1006 in detail. In FIG. 111, V signals 1101 are input to the input terminal 1011 and then signals obtained by delaying the V signals by one-frame in a one-frame delay circuit 1075 are subtracted from the V signals directly input by a subtracter 1076 to find a one-frame difference of the V signals 1101. Then, the one-frame difference is transferred to an absolute value circuit 1078 through a low-pass filter (LPF) 1077 and an absolute value thereof is found. The absolute value is converted to signals 1106, which show the amount of movement of low-frequency component of Y signals, in a non-linear converting circuit 1079 and then output to the output terminal 1081.

In addition, FIG. 112 shows the C signal motion detecting circuit 1007 in detail. In FIG. 112, V signals 1101 are input to the input terminal 1011 and then signals obtained by delaying the V signals by two frames in a two-frame delay circuit 1082 are subtracted from the V signals directly input by a subtracter 1083 to find a two-frame difference of the V signals 1101. Then, the two-frame difference is transferred to an absolute value circuit 1085 through a band-pass filter (BPF) 1084 and an absolute value thereof is found. The absolute value is converted to signals 1107, which show the amount of movement of C signals, in a non-linear converting circuit 1086 and then output from the output terminal 1087.

The composing circuit 1008 selects a larger value between the amount of movement of Y signals 1106 and the amount of movement of C signals 1107 and outputs it. The result of the judgment is represented in the form of a movement factor k ($0 \leq k \leq 1$) and, for example, when the image is judged to be a perfect still image, k is equal to 0 and when the image is judged to be a perfect moving image, k is equal to 1. Then, it is transferred to the Y signal mixing circuit 1009 and the C signal mixing circuit 1010 as a control signal 1108.

Generally, when the image is a still image, the Y signals and the C signals are separated by performing inter-frame YC separation utilizing an inter-frame correlation.

FIG. 113 shows the inter-frame YC separating circuit 1005 in detail. In FIG. 113, V signals 1101 are input to the input terminal 1011 and signals obtained by delaying the V signals by one-frame in the one-frame delay circuit 1088 and the V signals directly input are added by an adder 1089 to find a one-frame sum. Thus obtained Yf signals 1104 are output from the output terminal 1091 while the Yf signals 1104 are subtracted from the V signals 1101 input from the input terminal 1011 by a subtracter 1090, whereby CF signals 1105 are obtained and output from the output terminal 1092.

When the image is a moving image, the Y signals and the C signals are separated by performing intra-field YC separation utilizing an intra-field correlation.

FIG. 114 shows the intra-field YC separating circuit 1004 in detail. In FIG. 114, V signals 1101 are input to the input terminal 1011 and signals obtained by delaying the V signals by one-line in the one-line delay circuit 1093 and the V signals directly input are added by an adder 1094 to find a one-line sum. Thus obtained YF signals 1102 are output from the output terminal 1096 while the YF signals 1102 are subtracted from the V signals 1101 input from the input terminal 1011 by a subtracter 1095, whereby Cf signals 1103 are obtained and output from the output terminal 1097.

In the motion adaptive YC separating filter, the intra-field YC separating circuit 1004 and the inter-frame YC separating circuit 1005 are arranged in parallel and the Y signal mixing circuit 1009 performs the following operation in accordance with the motion factor k composed by the composing circuit 1008, whereby the motion adaptive YC separated Y signals 1109 are output from the output terminal 1002.

$$Y=kYf+(1-k)YF$$

wherein Yf is the intra-field YC separated Y signal output 1102 and YF is the inter-frame YC separated Y signal output 1104.

Similarly, the C signal mixing circuit 1010 performs the following operation in accordance with the control signal 1108, whereby the motion adaptive YC separated C signals 1110 are output from the output terminal 1003.

$$C=kCf+(1-k)CF$$

wherein Cf is the intra-field YC separated C signal output 1103 and CF is the inter-frame YC separated C signal output 1105.

In the motion adaptive YC separating filter, the C signal motion detecting circuit 1007 may be constructed as shown in FIG. 115. In FIG. 115, V signals 1101 are input from the input terminal 1011 and demodulated to two kinds of color difference signals R-Y and B-Y by a color demodulator 1098. These color difference signals R-Y and B-Y are time-shared and multiplexed at a prescribed frequency in the time-division multiplex circuit 1099 and delayed by two frames in the two-frame delay circuit 1082. Thereafter, the output of the two-frame delay circuit 1082 is subtracted from the output of the time division multiplex circuit 1099 by the subtracter 1083 to obtain a two-frame difference. Then, Y signal component is removed by passing the two-frame difference through the low-pass filter 1084 and an absolute value is obtained by the absolute value circuit 1085. Then, the absolute value is converted to signals 1107 showing the detected amount of movement of the C signals by the non-linear conversion circuit 1086 and then output from the output terminal 1087.

FIG. 116 is a block diagram showing another motion adaptive YC separating filter. In FIG. 116, V signals 6201 of NTSC are input to an input terminal 6001 and applied to input terminals of an intra-field Y signal extracting circuit 6004, an inter-frame Y signal extracting circuit 6005, a color demodulation circuit 6006 and a Y signal motion detecting circuit 6011. In the intra-field Y signal extracting filter 6004, the intra-field separated Y signals 6202 are applied to a first input terminal of a Y signal mixing circuit 6014. In addition, in the inter-frame Y signal extracting filter 6005, the inter-frame YC separated Y signals 6203 are applied to a second input terminal of a Y signal mixing circuit 6014.

In the color demodulation circuit 6006, the V signals are demodulated to two kinds of color-difference signals, i.e., R-Y signals and B-Y signals. These color-difference signals are time-shared and multiplexed at a prescribed frequency in the time-division multiplex circuit 6007. The output signals from the time-division multiplex circuit 6007 are band restricted by a low-pass filter (LPF) 6008 whose band pass is 1.5 MHz and below. The band-restricted color-difference signals 6204 is applied to the intra-field C signal extracting filter 6009, the inter-frame C signal extracting filter 6010 and the C signal motion detecting circuit 6012.

In the intra-field C signal extracting filter 6009, the intra-field YC separated C signals 6205 are applied to a first input terminal of a C signal mixing circuit 6015. In addition, in the inter-frame C signal extracting filter 6010, the inter-frame YC separated C signals 6206 are applied to a second input terminal of a C signal mixing circuit 6015. On the other hand, signals 6207 showing the amount of movement of Y signals detected by the Y signal motion detecting circuit 6011 are applied to an input terminal of a composing circuit 6013 while signals 6208 showing the amount of movement of C signals detected by the C signal motion detecting circuit 6012 are applied to the other input terminal of the composing circuit 6013.

Motion detecting signals 6209 composed by the composing circuit 6013 are applied to a third input terminal of the Y signal mixing circuit 6014 and a third input terminal of the C signal mixing circuit 6015. A motion detecting circuit 6080 comprises the Y signal motion detecting circuit 6011, the C signal motion detecting circuit 6012 and the composing circuit 6013. Motion adaptive YC separated Y signals 6210, which are output from the Y signal mixing circuit 6014, are transferred to the output terminal 6002 and motion adaptive YC separated C signals 6211, which are output from the C signal mixing circuit 6015, are transferred to the output terminal 6003.

The operation of the FIG. 16 circuit will be described. In the motion detecting circuit 6080, when the V signals are divided into Y signals and C signals, the composing circuit 6013 composes the output of the Y signal motion detecting circuit 6011 and the output of the C signal motion detecting circuit 6012 to judge that the V signals 6201 are either signals showing a still image or signals showing a moving image.

FIG. 117 shows the Y signal motion detecting circuit 6011 in detail. In FIG. 117, V signals 6201 are input to the input terminal 6021 and then signals obtained by delaying the V signals by one-frame in a one-frame delay circuit 6151 are subtracted from the V signals directly input by a subtracter 6152 to find a one-frame difference of the V signals 6201. Then, the one-frame difference is transferred to an absolute value circuit 6154 through a LPF 6153 whose band pass is 2.1 MHz and below and an absolute value thereof is found. The absolute value is converted to signals 6207, which show the movement of low-frequency component of Y signals, in a non-linear converting circuit 6155 and output to the output terminal 6156.

In addition, FIG. 118 shows the C signal motion detecting circuit 6012 in detail. In FIG. 118, the band restricted color-difference signals 6204 are input to the input terminal 6023 and then signals obtained by delaying the color-difference signals by two frames in a two-frame delay circuit 6157 are subtracted from the color-difference signals 6204 directly input by a subtracter 6158 to find a two-frame difference of the color-difference signals 6204. Then, an absolute value of the two-frame difference is found in an absolute circuit 6159, and the absolute value is converted to signals 6208, which show the amount of movement of C signals, in a non-linear converting circuit 6160 and then output from the output terminal 6161.

The composing circuit 6013 selects a larger value between the amount of movement of Y signals 6207 and the amount of movement of C signals 6208 and outputs it. The result of the judgment is represented in the form of a motion factor k ($0 \leqq k \leqq 1$) and, for example, when the image is judged to be a perfect still image, k is equal to 0 and when it is judged to be a perfect moving image, k is equal to 1. Then, it is transferred to the Y signal mixing circuit 6014 and the C signal mixing circuit 6015 as control signals 6209.

Generally, when the image is a still image, the Y signals and the C signals are separated by performing YC separation using an the inter-frame Y signal extracting filter 6005 and the inter-frame C signal extracting filter 6010 utilizing an inter-frame correlation.

FIG. 119 shows the inter-frame Y signal extracting filter 6005 in detail. In FIG. 119, V signals 6201 are input to the input terminal 6021 and signals obtained by delaying the V signals by one frame in the one-frame delay circuit 6162 and the V signals directly input are added by an adder 6163 to find a one-frame sum. Thus obtained YF signals 6203 are output to the output terminal 6164.

FIG. 121 shows the inter-frame C signal extracting filter 6010 in detail. In FIG. 121, color-difference signals 6204 are input to the input terminal 6023 and signals obtained by delaying the color-difference signals 6204 by one frame in the one-frame delay circuit 6168 and the color-difference signals 6204 directly input are added by an adder 6169 to find a one-frame sum. Thus obtained Cf signals 6206 are output to the output terminal 6170.

Generally, when the image is a moving image, the Y signals and the C signals are separated by performing YC separation using the intra-field Y signal extracting filter 6004 and the intra-field C signal extracting filter 6009 utilizing an intra-field correlation.

FIG. 120 shows the intra-field Y signal extracting filter 6004 in detail. In FIG. 120, V signals 6201 are input to the input terminal 6021 and signals obtained by delaying the V signals by one-line and the V signals directly input are added by an adder 6166 to find a one-line sum. Thus obtained Yf signals 6202 are output from the output terminal 6167.

FIG. 122 shows the intra-field C signal extracting filter 6009 in detail. In FIG. 122, color-difference signals are input to the input terminal 6023 and signals obtained by delaying the color-difference signals by one line in the one-line delay circuit 6171 and the color-difference signals 6204 directly input are added by an adder 6172 to find a one-line sum. Thus obtained Cf signals 6205 are output from the output terminal 6173.

In the motion adaptive YC separating filter, the intra-field Y signal extracting filter 6004 and the inter-frame Y signal extracting filter 6005 are arranged in parallel and the Y signal mixing circuit 6014 performs the following operation in accordance with the control signal 6209, i.e., the motion factor k composed by the composing circuit 6013, whereby the motion adaptive YC separated Y signals 6210 are output from the output terminal 6002.

$$Y=kYf+(1-k)YF$$

wherein Yf is the intra-field YC separated Y signal output 6202 and YF is the inter-frame YC separated Y signal output 6203.

Similarly, the intra-field C signal extracting filter 6009 and the inter-frame C signal extracting filter 6010 are arranged in parallel and the C signal mixing circuit 6015 performs the following operation in accordance with the control signal 6209, whereby the motion adaptive YC separated C signals 6211 are output from the output terminal 6003.

$$C=kCf+(1-k)CF$$

wherein Cf is the intra-field YC separated C signal output 6205 and CF is the inter-frame YC separated C signal output 6206.

In the conventional YC separating filter adaptive to the movement of image shown in FIG. 110, the Yf signals obtained by the intra-field YC separating circuit 1004 and the YF signals obtained by the inter-frame YC separating circuit 1005 are mixed on the basis of the amount obtained by composing the amount of movement detected by the Y signal motion detecting circuit 1006 and the amount of movement detected by the C signal movement detecting circuit 1007. Similarly, the Cf signals obtained by the intra-field YC separating circuit 1004 and the CF signals obtained by the inter-frame YC separating circuit 1005 are mixed on the basis of the composed amount of movement.

In the YC separating filter adaptive to the movement of image shown in FIG. 116, the Yf signals obtained by the intra-field Y signal extracting filter 6004 and the YF signals obtained by the inter-frame Y signal extracting filter 6005 are mixed on the basis of the amount obtained by composing the amount of movement detected by the Y signal movement detecting circuit 6011 and the amount of movement detected by the C signal motion detecting circuit 6012. Similarly, the Cf signals obtained by the intra-field C signal extracting filter 6009 and the CF signals obtained by the inter-frame C signal extracting filter 6010 are mixed on the basis of the composed amount of movement.

In the above-described conventional examples, the filter characteristic in the still image is completely different from that in the moving image, so that the resolution changes when the image changes from the still image to the moving image or from the moving image to the still image, with the result that the quality of the image deteriorates while processing the moving image.

SUMMARY OF THE INVENTION

It is an object of the present invention to provide a YC separating filter adaptive to a movement of an image that ensures a high resolution and that reproduces an image having less deterioration in quality.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to a first aspect of the present invention, a YC separating filter adaptive to a movement of an image partially detects a correlation between fields or between frames and a correlation in a field when a motion detecting circuit detects a moving image, performs a separation utilizing the correlations to output an intra-frame YC separated Y signal and an intra-frame YC separated C signal, mixes an inter-frame YC separated C signal and the intra-frame YC separated C signal on the basis of the output of the motion detecting circuit to output a motion adaptive YC separated C signal, and mixes an inter-frame YC separated Y signal and the intra-frame YC separated Y signal on the basis of the output of the motion detecting circuit to output a motion adaptive YC separated Y signal. Therefore, the filter process can be changed according as the image is a moving image or a still image, whereby a difference in the qualities between the moving image and the still image caused by the filter process can be reduced.

According to a second aspect of the present invention, in a YC separating filter adaptive to a movement of an image, when a motion detecting circuit detects a moving image, an intra-field correlation judge circuit includes vertical direction non-correlation energy detecting means for excluding a d.c. component in the vertical direction and a frequency component corresponding to a color sub-carrier wave component from a frequency component of a particular sampling point and finding an absolute value of the remaining frequency component to detect a vertical direction non-correlation energy; horizontal direction high-frequency Y signal energy detecting means for extracting a frequency component, which is a low-frequency component in the vertical direction and corresponds to a half of a color sub-carrier frequency in the horizontal direction, from the frequency component of the particular sampling point and finding an absolute value of the extracted component to detect a horizontal direction high-frequency Y signal energy; vertical correlation detecting means for comparing the vertical direction non-correlation energy with a first set value and comparing the horizontal direction high-frequency Y signal energy with a second set value, and deciding that a correlation is present in the vertical direction when the vertical direction non-correlation energy is smaller than the first set value and the horizontal direction high-frequency Y signal energy is larger than the second set value; horizontal direction non-correlation energy detecting means for excluding a d.c. component in the horizontal direction and a frequency component corresponding to a color sub-carrier component from a frequency component of the particular sampling point and finding an absolute value of the remaining frequency component to detect horizontal direction non-correlation energy; vertical direction high-frequency Y signal energy detecting means for extracting a frequency component, which is a low-frequency component in the horizontal direction and corresponds to a half of a color sub-carrier frequency in the vertical direction, from the frequency component of the particular sampling point and fining an absolute value of the extracted components to detect a vertical direction high-frequency Y signal energy; horizontal correlation detecting means for comparing the horizontal direction non-correlation energy with a third set value and comparing the vertical direction high-frequency Y signal energy with a fourth set value, and deciding that a correlation is present in the horizontal direction when the horizontal direction non-correlation energy is smaller than the third set value and the vertical direction high-frequency Y signal energy is larger than the fourth set value; and means for sending a control signal for selecting an output from outputs of a plurality of filters, which perform inter-field processes, in accordance with the result of the detections. Therefore, a filter according to the image is selected also in the field using the correlation of the image when a motion detecting circuit detects a moving image.

According to a third aspect of the present invention, a YC separating filter adaptive to a movement of an image includes an intra-frame YC separating circuit. The intra-frame YC separating circuit partially detects correlations in plural directions between fields by a horizontal low-frequency component of a difference between sampling points having opposite phases of color sub-carrier between fields when the motion detecting circuit detects a moving image and selects an optimum one from a plurality of inter-field operations in accordance with the result of the detection. Further, it partially detects correlations in a field and selects an optimum one from a plurality of intra-field processes in accordance with the result of the detection. In this way, the intra-frame YC separating circuit outputs intra-frame YC separated Y signals and intra-frame YC separated C signals. Therefore, a direction in which the image moves is detected, whereby an inter-field operation appropriate for the movement of the image is performed.

According to a fourth aspect of the present invention, a YC separating filter adaptive to a movement of an image includes an intra-frame YC separating circuit. The intra-frame YC separating circuit partially detects correlations in plural directions between fields by a horizontal low-frequency component of a difference between sampling points having the same phases of color sub-carrier between fields and a horizontal high-frequency component of a sum of sampling points having opposite phases of color sub-carrier between fields when the motion detecting circuit detects a moving image, and selects an optimum one from a plurality of inter-field operations in accordance with the result of the detection. Further, it partially detects correlations in a field and selects an optimum one from three kinds of intra-field processes in response to the result of the detection. Thus, intra-frame YC separated Y signals and intra-frame YC separated C signals are output. Therefore, a direction in which the image moves is detected, whereby an inter-field operation appropriate for the movement of the image is performed.

According to a fifth aspect of the present invention, a YC separating filter adaptive to a movement of an image includes an intra-frame YC separating circuit. The intra-frame YC separating circuit partially detects correlations in plural directions between frames by a difference between sampling points having the same phases of color sub-carrier between frames when the motion detecting circuit detects a moving image, and selects an optimum one from a plurality of inter-field operations in accordance with the result of the detection. Further, it partially detects correlations in a field and selects an optimum one from a plurality of intra-field processes in accordance with the result of the detection. Thereby, the band of the C signal is restricted. In this way, the intra-frame YC separating circuit outputs intra-frame YC separated Y signal and intra-frame YC separated C signals. Therefore, a direction in which the image moves is detected, whereby an inter-field operation appropriate for the movement of the image is performed.

According to a sixth aspect of the present invention, a YC separating filter adaptive to a movement of an image includes an intra-frame YC separating circuit. The intra-frame YC separating circuit partially detects correlations in plural directions between frames or between fields when the motion detecting circuit detects a moving image, and selects an optimum one from a plurality of inter-field operations when it is judged that a correlation is present in some direction while it performs no inter-field operation when it is judged that no correlation is present. Further, it partially detects correlations in a field and selects an optimum one from a plurality of intra-field processes in accordance with the result of the detection. Thereby, the band of the C signal is restricted. In this way, the intra-frame YC separating circuit outputs intra-frame YC separated Y signals and intra-frame YC separated C signals. Therefore, a deterioration of the quality of the image caused by the inter-field operation is prevented.

According to a seventh aspect of the present invention, a YC separating filter adaptive to a movement of an image includes an isolated point eliminating circuit. When the motion detecting circuit detects a moving image, the isolated point eliminating circuit partially detects a correlation between fields and corrects the result of the detection when the result is an isolated point. An optimum one is selected from a plurality of intra-frame processes including inter-field operations in accordance with the result of the isolated point eliminating circuit, whereby intra-frame YC separated Y signals and intra-frame YC separated C signals are output. Therefore, the detection of the correlation is possible after removing the isolated point, whereby the quality of the image is improved.

According to an eighth aspect of the present invention, a YC separating filter adaptive to a movement of an image includes an isolated point eliminating circuit which detects directions, in which inter-field correlations are present, in the particular sampling point and the neighboring sampling points from the output of said correlation detecting circuit and selects the most numerous direction to decide the inter-field correlation of the particular sampling point. Therefore, the detection of the correlation is possible after removing the isolated point, whereby the quality of the image is improved.

According to a ninth aspect of the present invention, a YC separating filter adaptive to a movement of an image includes an isolated point eliminating circuit which detects directions, in which inter-field correlations are present, in the particular sampling point and the neighboring sampling points from the output of the correlation detecting circuit, and selects the most numerous direction from the detected results to which weights are applied, thereby to decide the inter-field correlation at the particular sampling point. Therefore, the detection of the correlation is possible after removing the isolated point, whereby the quality of the image is improved.

According to a tenth aspect of the present invention, a YC separating filter adaptive to a movement of an image includes an isolated point eliminating circuit which adds and compares inter-field correlation values in plural directions in the particular sampling point and the neighboring sampling points, whereby the inter-field correlation at the particular sampling point is decided. Therefore, the detection of the correlation is possible after removing the isolated point, whereby the quality of the image is improved.

According to an eleventh aspect of the present invention, a YC separating filter adaptive to a movement of an image includes an isolated point eliminating circuit which adds and compares inter-field correlation values in plural directions, to which weights are applied, in the particular sampling point and the neighboring sampling points, whereby the inter-field correlation at the particular sampling point is decided. Therefore, the detection of the correlation is possible after removing the isolated point, whereby the quality of the image is improved.

According to a twelfth aspect of the present invention, a YC separating filter adaptive to a movement of an image includes an isolated point eliminating circuit which adds and compares inter-field correlation values in plural directions in the particular sampling point and the neighboring sampling points and selects the most numerous direction to decide the inter-field correlation at the particular sampling point. Therefore, the detection of the correlation is possible after removing the isolated point, whereby the quality of the image is improved.

According to a thirteenth aspect of the present invention, a YC separating filter adaptive to a movement of an image includes an isolated point eliminating circuit which adds and compares inter-field correlation values, to which weights are applied, in plural directions in the particular sampling point and the neighboring sampling points, and detects the most numerous direction from the obtained results to which weights are applied, to decide the inter-field correlation at the particular sampling point. Therefore, the detection of the correlation is possible after removing the isolated point, whereby the quality of the image is improved.

According to a fourteenth aspect of the present invention, a YC separating filter adaptive to a movement of an image includes a motion detecting circuit partially detecting a movement of an image utilizing a correlation between frames; an inter-frame Y signal extracting filter which performs a separation utilizing the inter-frame correlation when the motion detecting circuit detects a still image, and outputs intra-frame YC separated Y signals; an intra-frame Y signal extracting filter which detects a correlation between fields or between frames and a correlation in a field when the motion detecting circuit detects a moving image, performs a separation utilizing the correlations, and outputs intra-frame YC separated Y signals; a Y signal mixing circuit which mixes the inter-frame YC separated Y signals and the intra-frame YC separated Y signals in accordance with an output of the motion detecting circuit and outputs motion adaptive YC separated Y signals; a color demodulation circuit which demodulates composite color television signals to color difference signals; an inter-frame C signal extracting filter which performs a separation utilizing the inter-frame correlation when the motion detecting circuit detects a still image and outputs inter-frame YC separated C signals; an intra-frame C signal extracting filter which detects a correlation between fields or between frames when the motion detecting circuit detects a moving image, performs a separation utilizing the correlations, and outputs intra-frame YC separated C signals; and a C signal mixing circuit which mixes the inter-frame YC separated C signals and the intra-frame YC separated C signals in accordance with the output of the motion detecting circuit and outputs motion adaptive YC separated C signals. The Y signals and the C signals are separately processed. Therefore, when there is a difference in directions of the correlation of the image between the Y signal and the C signal, the Y signal and the C signal are processed separately from each other.

According to a fifteenth aspect of the present invention, a YC separating filter adaptive to a movement of an image includes an intra-field correlation judge circuit comprising vertical direction non-correlation energy detecting means for excluding a d.c. component in the vertical direction and a frequency component corresponding to a color sub-carrier component from a frequency component of a particular sampling point and finding an absolute value of the remaining frequency component to detect a vertical direction non-correlation energy; horizontal direction high-frequency Y signal energy detecting means for extracting a frequency component, which is a low-frequency component in the vertical direction and corresponds to a half of a color sub-carrier frequency in the horizontal direction, from the frequency component of the particular sampling point and finding an absolute value of the extracted component to detect a horizontal direction high-frequency Y signal energy; vertical correlation detecting means for comparing the vertical direction non-correlation energy with a first set value and comparing the horizontal direction high-frequency Y signal energy with a second set value, and deciding that a correlation is present in the vertical direction when the vertical direction non-correlation energy is smaller than the first set value and the horizontal direction high-frequency Y signal energy is larger than the second set value; horizontal direction non-correlation energy detecting means for excluding a d.c. component in the horizontal direction and a frequency component corresponding to a color sub-carrier component from a frequency component of the particular sampling point and finding an absolute value of the remaining frequency component to detect a horizontal direction non-correlation energy; vertical direction high-frequency Y signal energy detecting means for extracting a frequency component, which is a low-frequency component in the horizontal direction and corresponds to a half of a color sub-carrier frequency in the vertical direction, from the frequency component of the particular sampling point and fining an absolute value of the extracted components to detect a vertical direction high-frequency Y signal energy; horizontal correlation detecting means for comparing the horizontal direction non-correlation energy with a third set value and comparing the vertical direction high-frequency Y signal energy with a fourth set value, and deciding that a correlation is present in the horizontal direction when the horizontal direction non-correlation energy is smaller than the third set value and the vertical direction high-frequency Y signal energy is larger than the fourth set value; and means for sending a control signal for selecting an output from outputs of a plurality of filters, which perform inter-field processes, in accordance with the result of the detections. Therefore, a filter according to the image is selected also in the field using the correlation of the image when a motion detecting circuit detects a moving image.

According to a sixteenth aspect of the present invention, a YC separating filter adaptive to a movement of an image, in which Y signals and C signals are separately processed, includes an intra-frame Y signal extracting filter. When the motion detecting circuit detects a moving image, the intra-frame Y signal extracting filter partially detects correlations in plural directions between fields by a horizontal low-frequency component of a difference between sampling points having opposite phases of the color sub-carrier between fields, and selects an optimum one from a plurality of inter-field operations in accordance with the result of the detection. Further, it partially detects a correlation in a field and selects an optimum one from a plurality of intra-field processes in accordance with the result of the detection. Thereby the band of the C signals is restricted. In this way, the intra-frame Y signal extracting filter outputs intra-frame YC separated Y signals. Therefore, a direction in which the image moves is detected, whereby an inter-field operation appropriate for the movement of the image is performed.

According to a seventeenth aspect of the present invention, a YC separating filter adaptive to a movement of an image, in which Y signals and C signals are separately processed, includes an intra-frame Y signal extracting filter. When the motion detecting circuit detects a moving image, the intra-frame Y signal extracting filter partially detects correlations in plural directions between fields by a horizontal low-pass frequency component of a difference between sampling points having the same phases of color sub-carrier of the composite color television signal between fields and a horizontal high-frequency component of a sum of sampling points having opposite phases of color sub-carrier of the composite color television signal between fields, and selects an optimum one from a plurality of inter-field operations in accordance with the result of the detection. Further, it partially detects a correlation in a field and selects an optimum one from a plurality of intra-field processes in accordance with the result of the detection. In this way, the intra-frame Y signal extracting filter outputs intra-frame YC separated Y signals. Therefore, a direction in which the image moves is detected, whereby an inter-field operation appropriate for the movement of the image is performed.

According to an eighteenth aspect of the present invention, a YC separating filter adaptive to a movement of an image, in which Y signals and C signals are separately processed, includes an intra-frame Y signal extracting filter. When the motion detecting circuit detects a moving image, the intra-frame Y signal extracting filter partially detects correlations in plural directions between frames by a difference between sampling points having the same phases of color sub-carrier between frames, and selects an optimum one from a plurality of inter-field operations in accordance with the result of the detection. Further, it partially detects a correlation in a field and selects an optimum one from a plurality of intra-field processes in accordance with the result of the detection. In this way, the intra-frame Y signal extracting filter outputs intra-frame YC separated Y signals. Therefore, a direction in which the image moves is detected, whereby an inter-field operation appropriate for the movement of the image is performed.

According to a nineteenth aspect of the present invention, a YC separating filter adaptive to a movement of an image, in which Y signals and C signals are separately processed, includes an intra-frame C signal extracting filter. When the motion detecting circuit detects a moving image, the intra-frame C signal extracting filter partially detects correlations in plural directions between fields by a horizontal low-frequency component of a difference between sampling points having opposite phases of color sub-carrier between fields, and selects an optimum one from a plurality of inter-field operations in accordance with the result of the detection to restrict the band of the color difference signals. Thus, the intra-frame C signal extracting filter outputs intra-frame YC separated C signals. Therefore, a direction in which the image moves is detected, whereby an inter-field operation appropriate for the movement of the image is performed.

According to a twentieth aspect of the present invention, a YC separating filter adaptive to a movement of an image, in which Y signals and C signals are separately processed, includes an intra-frame C signal extracting filter. When the motion detecting circuit detects a moving image, the intra-frame C signal extracting filter partially detects correlations in plural directions between fields by a difference between sampling points having the same phases of color sub-carrier between frames, and selects an optimum one from a plurality of inter-field processes in accordance with the result of the detection to restrict the band of the color difference signals. Thus, the intra-frame C signal extracting filter outputs intra-frame YC separated C signals. Therefore, a direction in which the image moves is detected, whereby an inter-field operation appropriate for the movement of the image is performed.

According to a twenty-first aspect of the present invention, a YC separating filter adaptive to a movement of an image, in which Y signals and C signals are separately processed, includes an intra-frame C signal extracting filter.

When the motion detecting circuit detects a moving image, the intra-frame C signal extracting filter partially detects correlations in plural directions between fields by a horizontal low-frequency component of a difference between sampling points having opposite phases of color sub-carrier of the composite color television signal between fields. When it is judged that a correlation is present in some direction, the band of the color difference signals is restricted by selecting an optimum one from a plurality of inter-field operations in accordance with the result of the detection. When it is judged that no correlation is present, the band of the color difference signals is restricted by the intra-field process. Thus, the intra-frame C signal extracting filter outputs intra-frame YC separated C signals. Therefore, a deterioration of the quality of the image caused by the inter-field operation is prevented.

According to a twenty-second aspect of the present invention, a YC separating filter adaptive to a movement of an image, in which Y signals and C signals are separately processed, includes an intra-frame C signal extracting filter. When the motion detecting circuit detects a moving image, the intra-frame C signal extracting filter partially detects correlation in plural directions between fields by a difference between sampling points having the same phases of color sub-carrier between frames. When it is judged that a correlation is present in some direction, the band of the color difference signals is restricted by selecting an optimum one from a plurality of inter-field operations in accordance with the result of the detection. When it is judged that no correlation is present, the band of the color difference signals is restricted by the intra-field process. Thus, the intra-frame C signal extracting filter outputs intra-frame YC separated C signals. Therefore, a deterioration of the quality of the image caused by the inter-field operation is prevented.

BRIEF DESCRIPTION OF THE DRAWINGS

FIG. 18 is a plan view showing an arrangement of the same V signal by the x-axis and the y-axis;

FIG. 19 is a perspective view showing a spectral dispersion of V signals in the three-dimensional frequency space;

FIG. 23 is a block diagram showing a first example of an isolated point eliminating circuit shown in FIG. 22;

FIG. 25 is a block diagram showing a first example of a correlation detecting circuit shown in FIG. 22;

FIG. 26 is a block diagram showing a second example of the correlation detecting circuit shown in FIG. 22;

FIG. 46 is a block diagram showing an absolute value circuit in the isolated point eliminating circuit shown in FIG. 45;

FIGS. 61(*a*) to 61(*c*) are a perspective view, a view from the minus side of the f-axis, and a view from the plus side of the y-axis, of a spectral dispersion of Y signals and C signals obtained by an inter-field YC separation B1, in the three-dimensional frequency space;

FIGS. 64(*a*) to 64(*c*) are a perspective view, a view from the minus side of the f-axis, and a view from the plus side of the μ-axis, of a spectral dispersion of Y signals and C signals obtained by an inter-field YC separation B2, in the three-dimensional frequency space;

FIG. 66 is a block diagram showing a YC separating filter adaptive to a movement of an image in accordance with an embodiment of the present invention;

FIG. 67 is a block diagram showing an isolated point eliminating circuit shown in FIG. 66;

FIGS. 85(*a*) to 85(*c*) are a perspective view, a view from the minus side of the f-axis, and a view from the plus side of the μ-axis, of a spectral dispersion of Y signals and C signals obtained by an inter-field YC separation B1, in the three-dimensional frequency space;

FIG. 120 is a block diagram showing an intra-field Y signal extracting filter in the YC separating filter shown in FIG. 116;

FIG. 121 is a block diagram showing an inter-frame C signal extracting filter in the YC separating filter shown in FIG. 116; and FIG. 122 is a block diagram showing an intra-field signal extracting filter in the YC separating filter shown in FIG. 116.

DETAILED DESCRIPTION OF THE PREFERRED EMBODIMENTS

[Embodiment 1]

Figure 1:
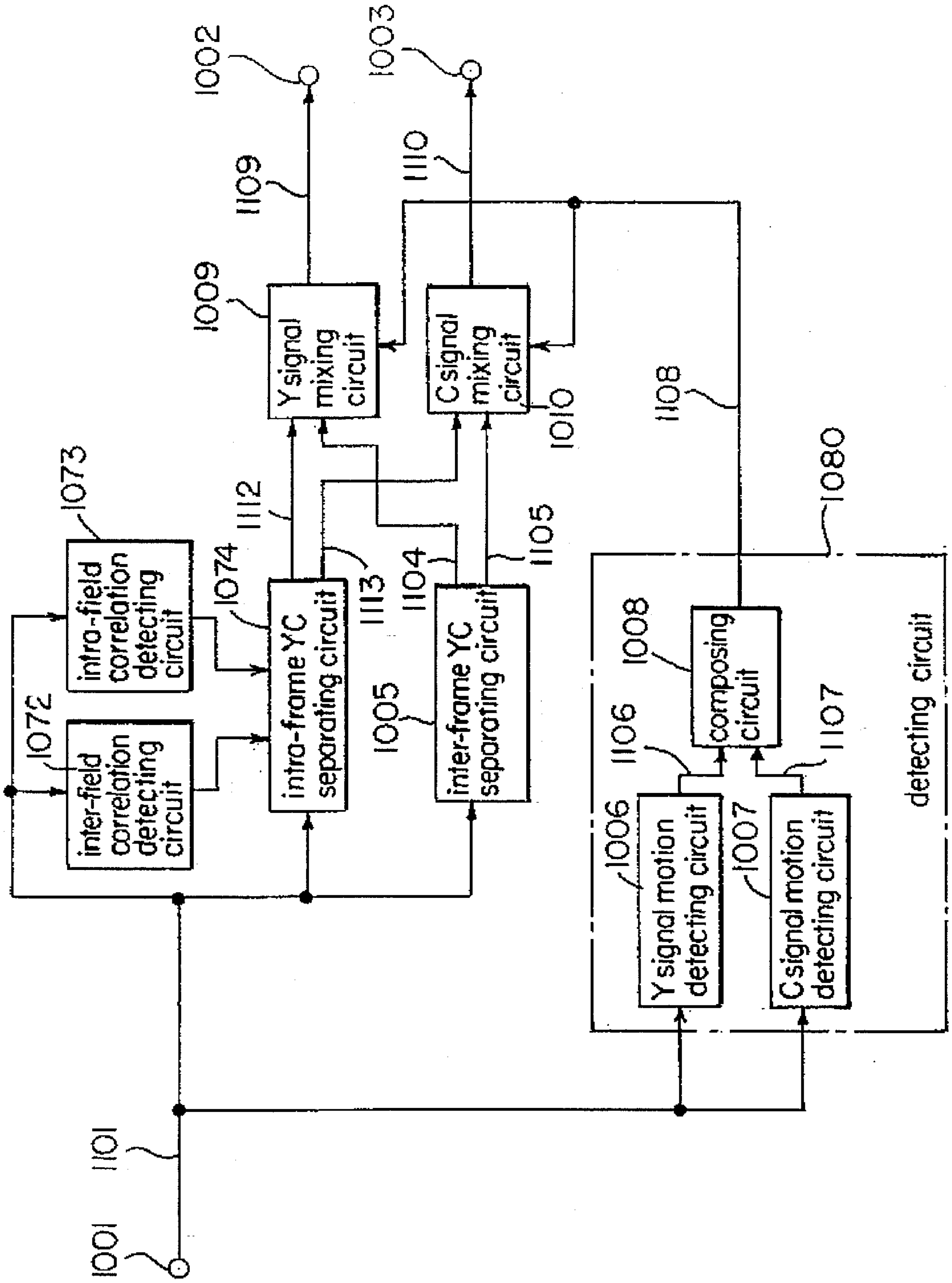
FIG. 1 is a block diagram in accordance with an embodiment of the present invention.
Figure 2:
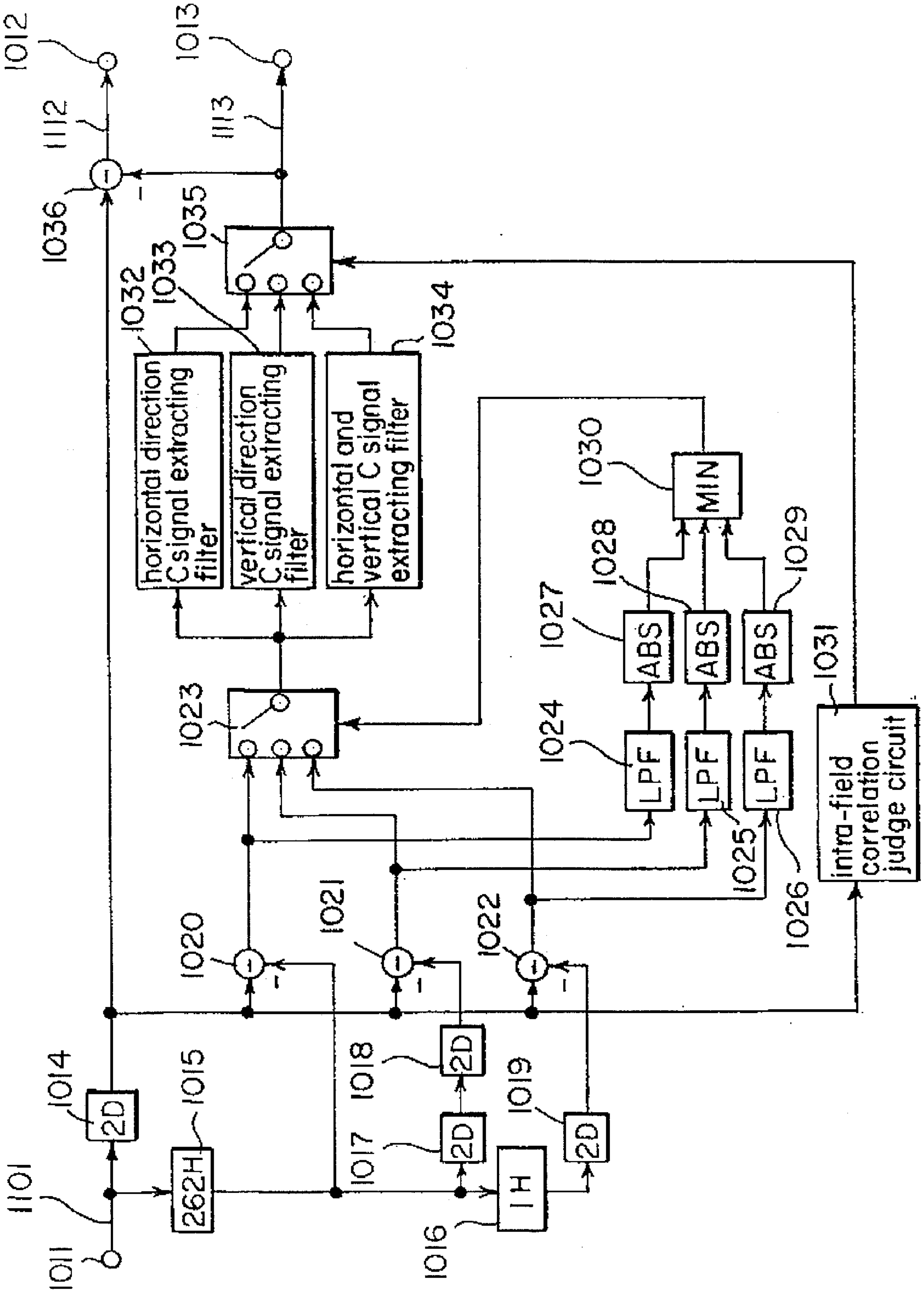
FIG. 2 is a block diagram showing first examples of an inter-field correlation detecting circuit, an intra-field correlation detecting circuit, and an intra-frame YC separating circuit according to the first embodiment of FIG. 1.
Figure 110:
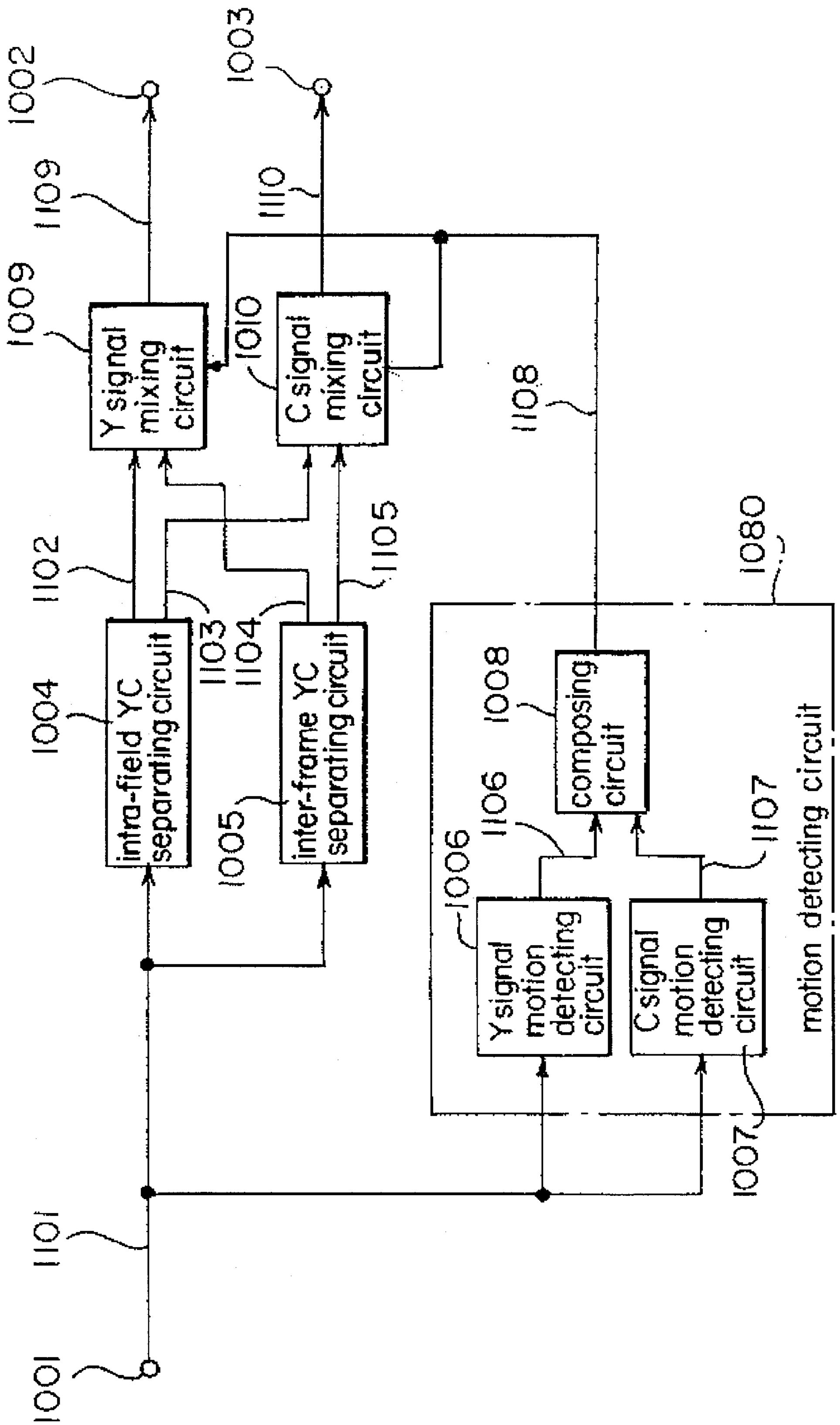
FIG. 110 is a block diagram showing a YC separating filter adaptive to a movement of an image according to a prior art.
Figure 111:
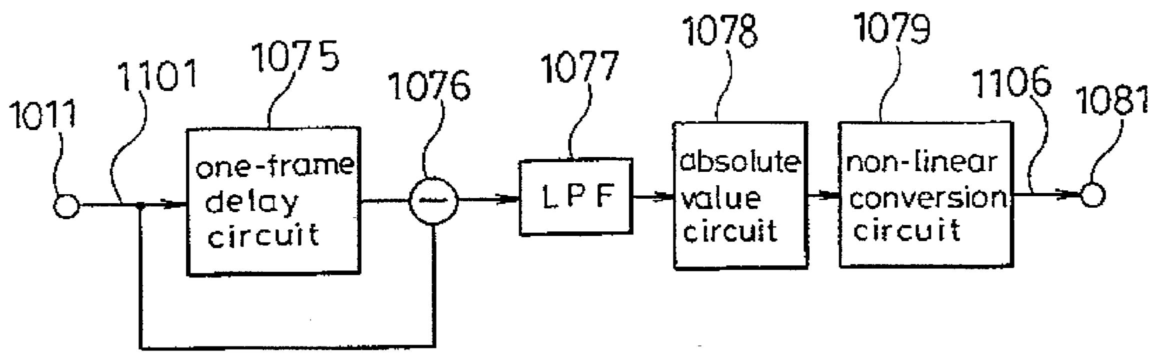
FIG. 111 is a block diagram showing a Y signal motion detecting circuit in the YC separating filter shown in FIG. 110.
Figure 112:
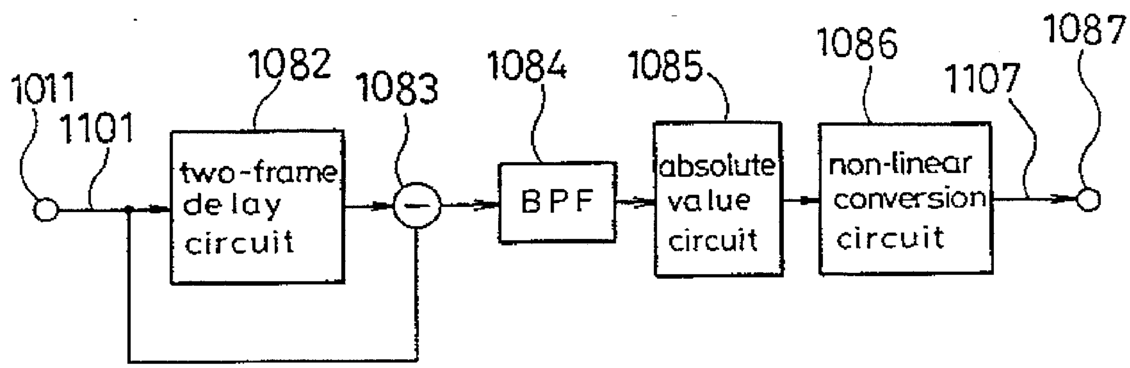
FIG. 112 is a block diagram showing a C signal motion detecting circuit in the YC separating filter shown in FIG. 110.
Figure 113:
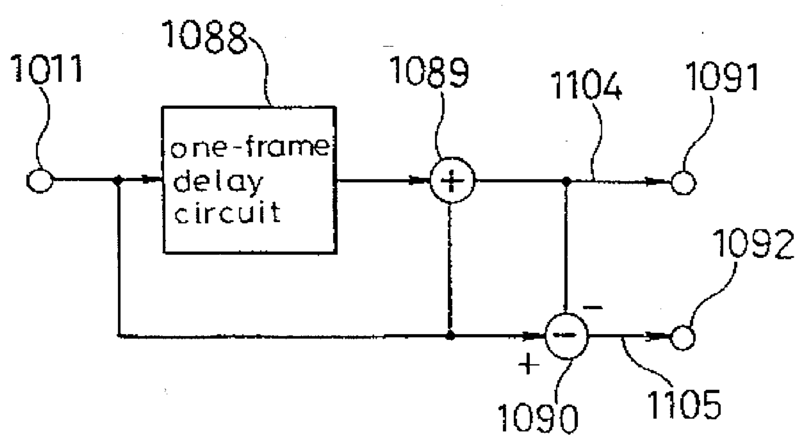
FIG. 113 is a block diagram showing an inter-frame YC separating filter in the YC separating filter shown in FIG. 110.
Figure 114:
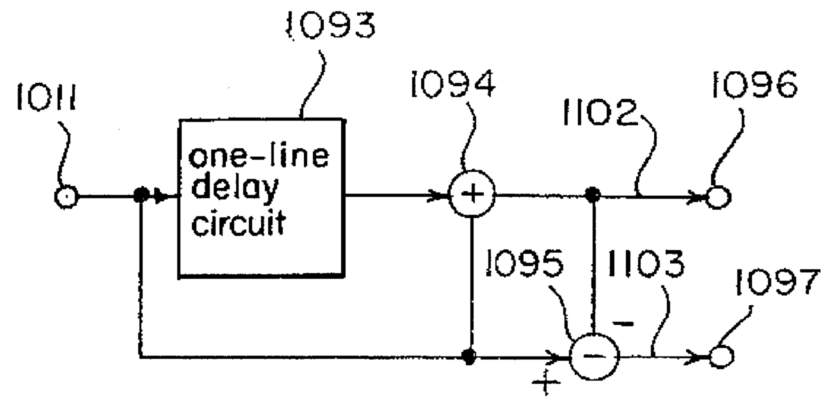
FIG. 114 is a block diagram showing an intra-field YC separating filter in the YC separating filter shown in FIG. 110.
Figure 115:
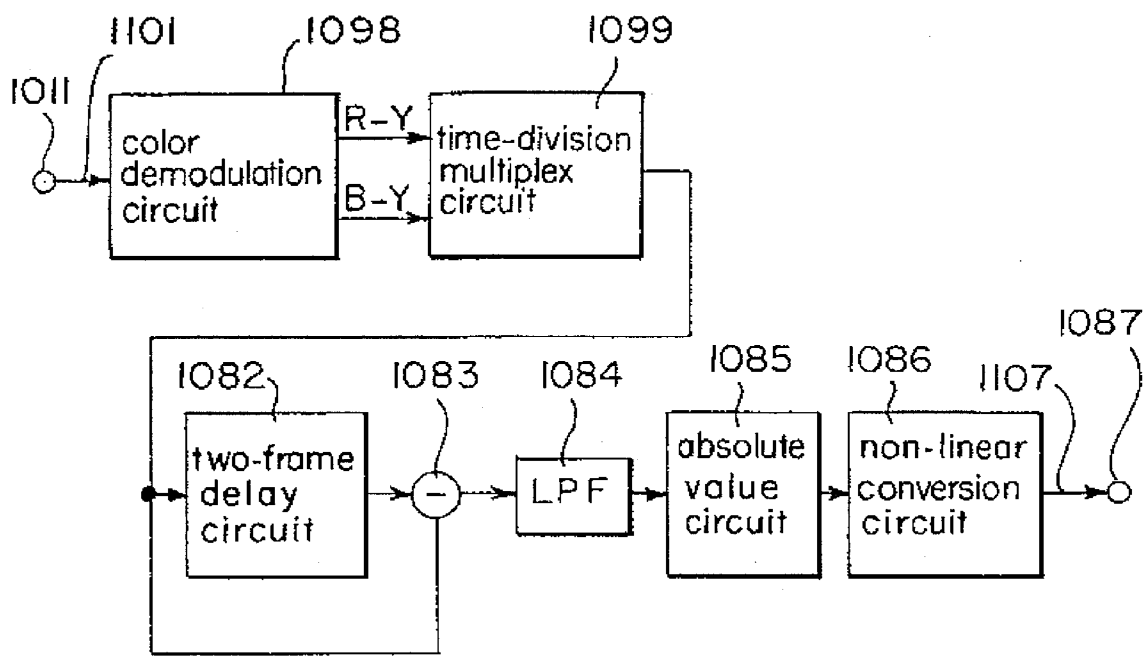
FIG. 115 is a block diagram showing another example of the C signal motion detecting circuit in the YC separating filter shown in FIG. 110.
Figure 116:
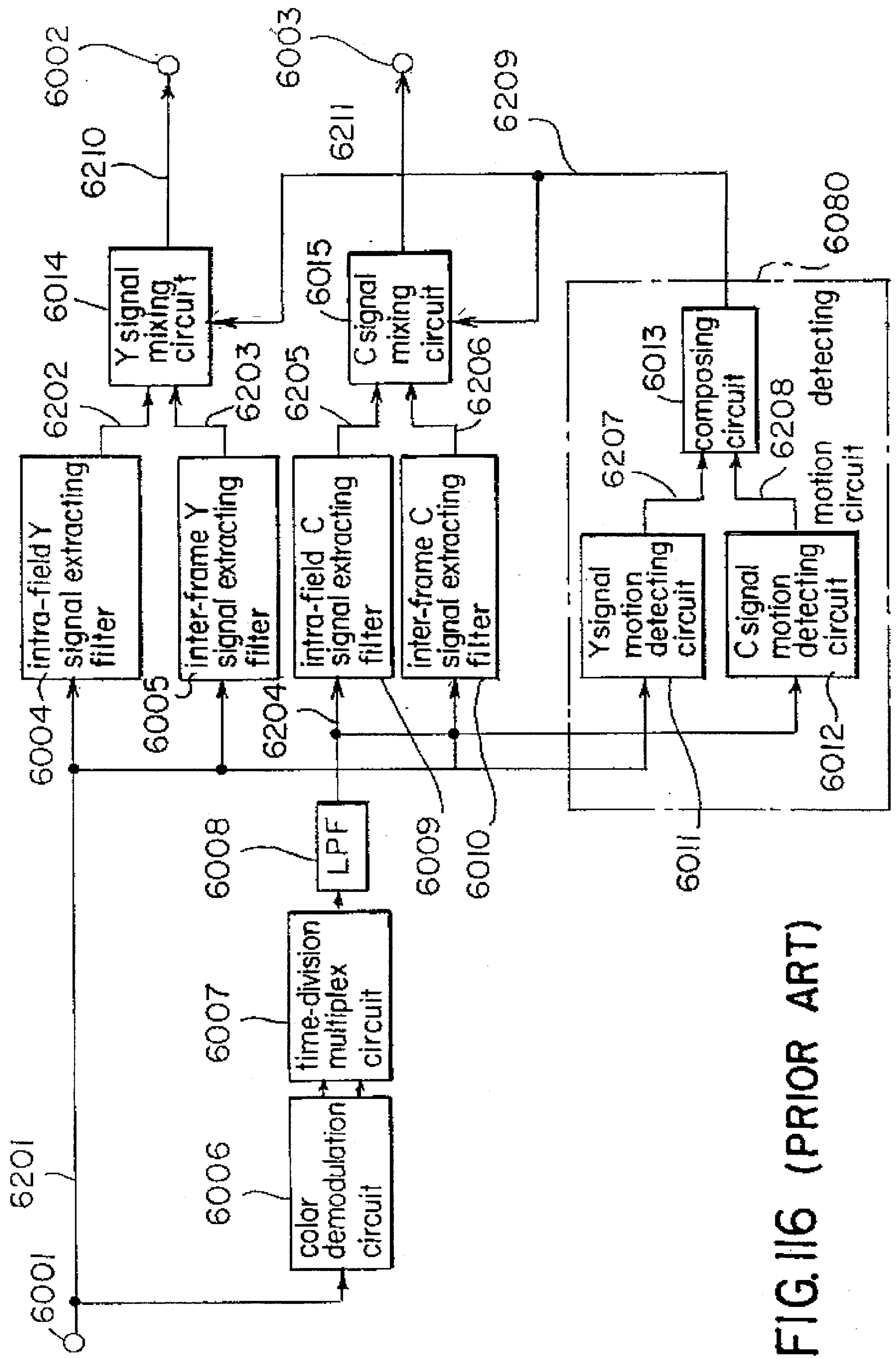
FIG. 116 is a block diagram showing a YC separating filter adaptive to a movement of an image according to another prior art.
Figure 117:
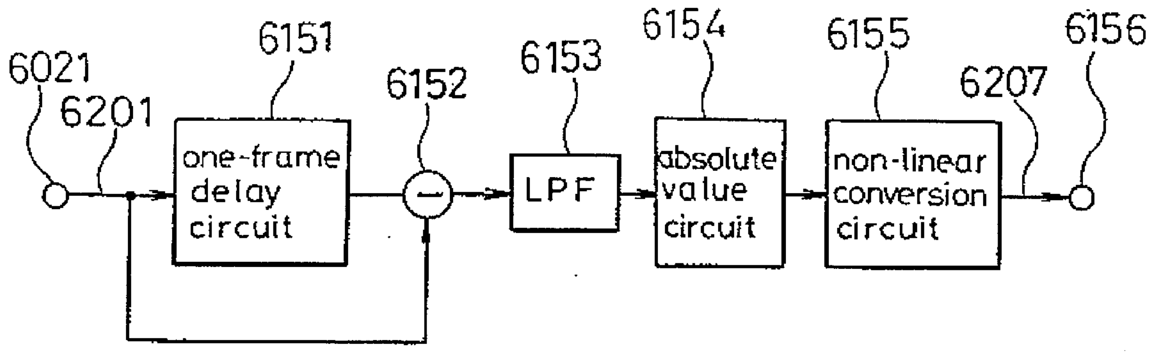
FIG. 117 is a block diagram showing a Y signal motion detecting circuit in the YC separating filter shown in FIG. 116.
Figure 118:
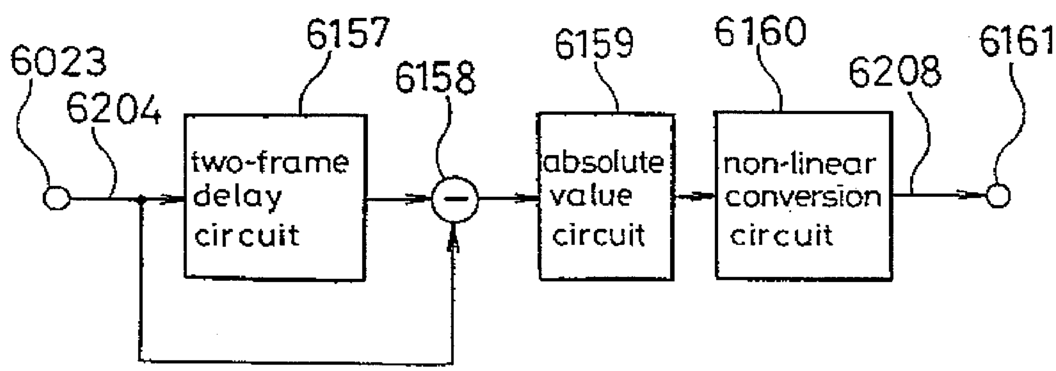
FIG. 118 is a block diagram showing a C signal motion detecting circuit in the YC separating filter shown in FIG. 116.
Figure 119:
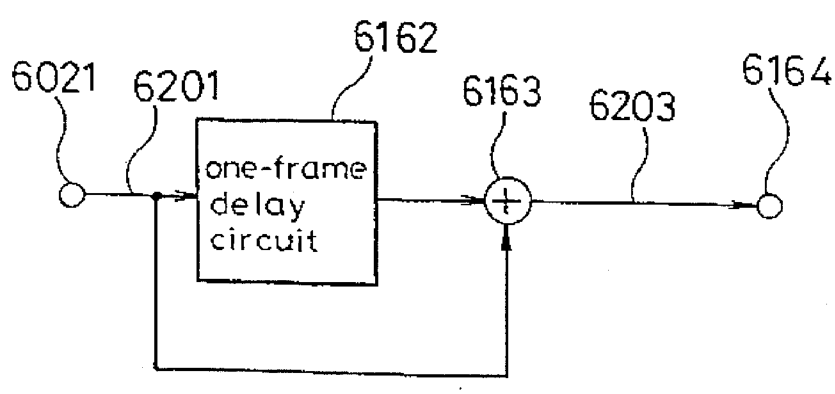
FIG. 119 is a block diagram showing an inter-frame Y signal extracting filter in the YC separating filter shown in FIG. 116.
Figure 120:
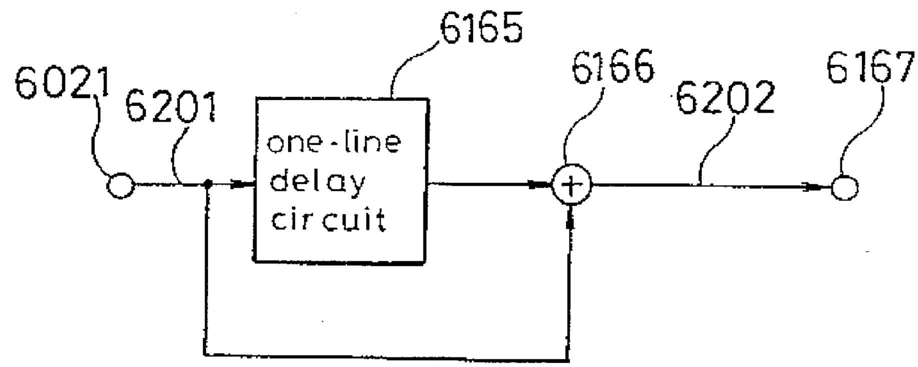
Figure 121:
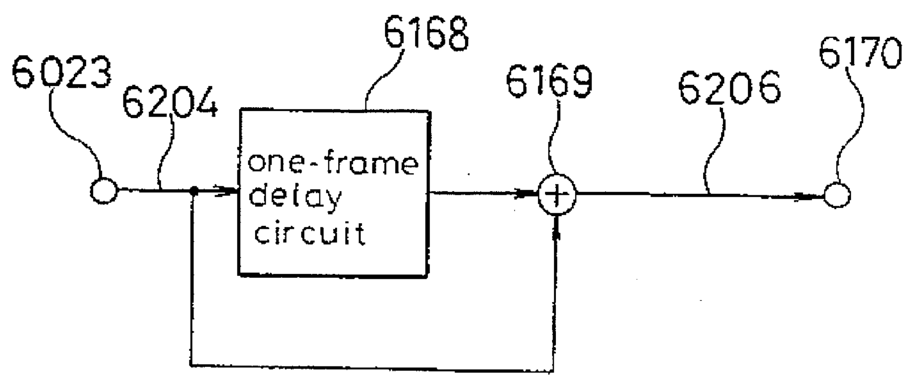
Figure 122:
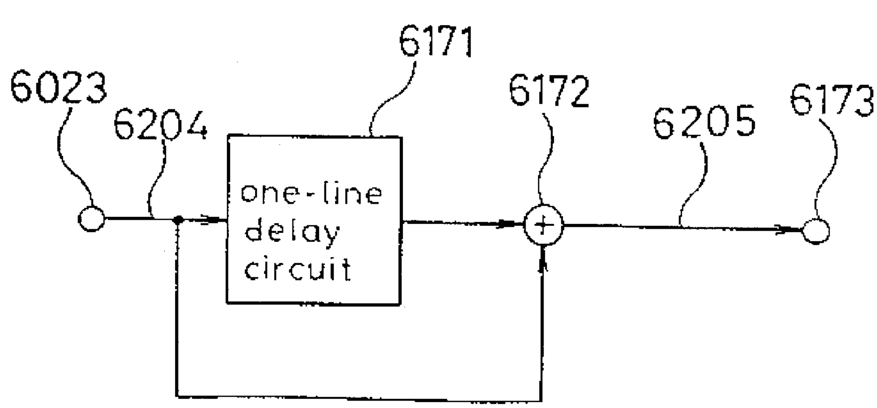

FIG. 1 is a block diagram showing a YC separating filter adaptive to a movement of an image in accordance with a first embodiment of the present invention. In FIG. 1, the intra-field YC separating circuit 1004 shown in FIG. 110 is replaced by an inter-field correlation detecting circuit 1072, an intra-field correlation detecting circuit 1073, and intra-frame YC separating circuit 1074, and other structures are the same as those shown in FIG. 100, so that only these circuits 1072, 1073, and 1074 will be described. FIG. 2 is a block diagram showing first examples of an inter-field correlation detecting circuit 1072, intra-field correlation detecting circuit 1073 and an intra-frame YC separating circuit 1074 in FIG. 1 in detail. In FIG. 2, V signals 1101 are input to an input terminal 1011. Two-pixel delay circuits 1014, 1017, 1018 and 1019 delay the input signal by a time corresponding to two pixels. A two hundreds and sixty two-line (hereinafter referred to as 262-line) delay circuit 1015 delays the input signal by a time corresponding to 262 lines. A one-line delay circuit 1016 delays the input signal by a time corresponding to one line. Subtracters 1020, 1021, 1022 and 1036 perform subtraction between two input signals. Signal selecting circuits 1023 and 1035 select one of three input signals. Reference numerals 1024, 1025 and 1026 designate low pass filters whose pass band is 2.1 MHz and below. Absolute circuits 1027, 1028 and 1029 output an absolute value of an input signal. A minimum value selecting circuit 1030 detects a minimum value of three input signals and outputs a control signal. An intra-field correlation judge circuit 1031 partially detects a correlation in a field and outputs a control signal. A horizontal direction C signal extracting filter performs an operation in the horizontal direction and extracts C signals. Its characteristic is represented by the following formula, using a transfer function, that is;

$$Ch(z)=(-1/4)(1-z^{-2})^2$$

In addition, a vertical direction C signal extracting filter 1033 performs an operation in the vertical direction and extracts C signals. Its characteristic is represented by the following formula, using a transfer function, that is;

$$Cv(z)=(-1/4)(1-z^{-1})^2$$

In addition, a horizontal and vertical direction C signal extracting filter 1034 performs operations in the horizontal and vertical direction and extracts C signals. Its characteristic is represented by the following formula, using a transfer function, that is;

$$Chv(z)=(-1/4)(1-z^{-2})^2(-1/4)(1-z^{-1})^2$$

In the above formulae, $z^{-1}$ represents a delay of one sample (one pixel) and $z^{-1}$ represents a delay of one line. Since the V signal is sampled synchronously with a color sub-carrier wave by a sampling frequency (=4 $f_{sc}$: $f_{sc}$ is a color sub-carrier wave frequency), $$z^{-1}=\exp(-j2\pi f/4f_{sc}).$$

An output of the subtracter 1036 is output from the output terminal 1012 as an intra-frame YC separated Y signal 1112 and an output of the signal selecting circuit 1035 is output from the output terminal 1013 as an intra-frame YC separated C signal 1113.

When an x-axis is taken along the horizontal direction of a screen, a y-axis is taken along the vertical direction of the screen, and a t-axis (time axis) is taken along the direction perpendicular to a plane produced by the x-axis and the y-axis, a three-dimensional time space is constituted by the x, y, and t axes.

Figure 7:
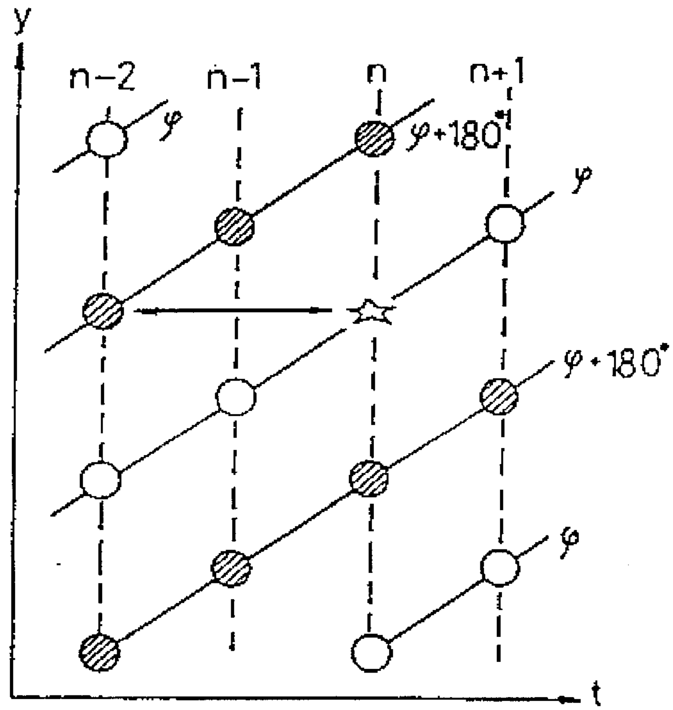
FIG. 7 is a plan view showing an arrangement of the V signal, which is digitized by a frequency four times the color sub-carrier frequency, in the three-dimensional time space by the t-axis and the y-axis.
Figure 8:
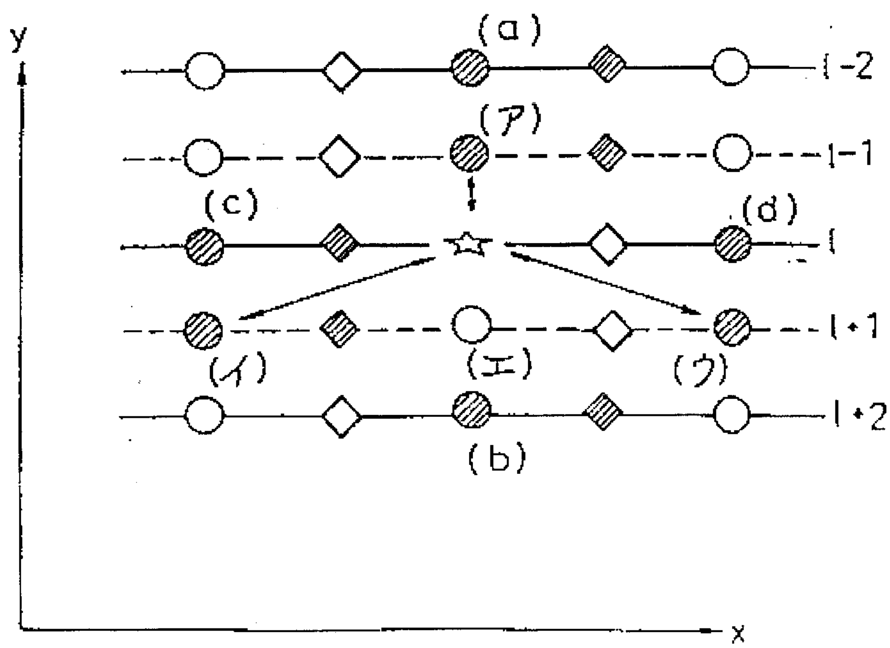
FIG. 8 is a plan view showing an arrangement of the same V signal by the x-axis and the y axis.

FIGS. 7 and 8 are diagrams showing the three-dimensional time space. FIG. 7 shows a plane constituted by the t axis and the y axis. FIG. 8 shows a plane constituted by the x axis and the y axis. Interlace scanning lines are shown in FIG. 7, each broken line shows one field and the full line shows that the color sub-carrier has the same phase. In FIG. 8, the full line and the broken line show scanning lines of n field and n−1 field, respectively, and marks (○), (●), (◇), and (♦) on the scanning lines are sampling points having the same phase of color sub-carrier in a case where the V signal is digitized by the frequency of four times the color sub-carrier wave frequency $f_{sc}$(=3.58 MHz).

In FIG. 8, when a particular sampling point is represented by (★), sampling points (c) and (d) next but one to the particular sampling point in the same n field and sampling points (a) and (b) in the upper and lower n fields have color sub-carrier phases opposite the phase of the particular sampling point. Therefore, a line comb type filter utilizing a digital circuit or a YC separating filter adaptive to a movement of an image disclosed in Japanese Patent Published Application No. 58-242367 can be constituted. In addition, as shown in FIG. 7, the same sampling points apart by one frame from each other have opposite color sub-carrier phases, so that an inter-frame YC separation filter can also be constituted.

Furthermore, as shown in FIG. 8, in the n−1 fields by one field before the particular sampling point, sampling point above the particular sampling point and sampling points and diagonally below the particular sampling point have phases opposite the phase of the particular sampling point, so that an inter-field YC separation is possible by operating one of these sampling points , , and with the particular sampling point.

If a μ-axis as a horizontal frequency axis, a ν-axis as a vertical frequency axis, and a f-axis as a time frequency axis, which correspond to the x, y and t axes, are considered, a three-dimensional frequency space is constituted by the orthogonal μ, ν and f axes.

Figure 9:
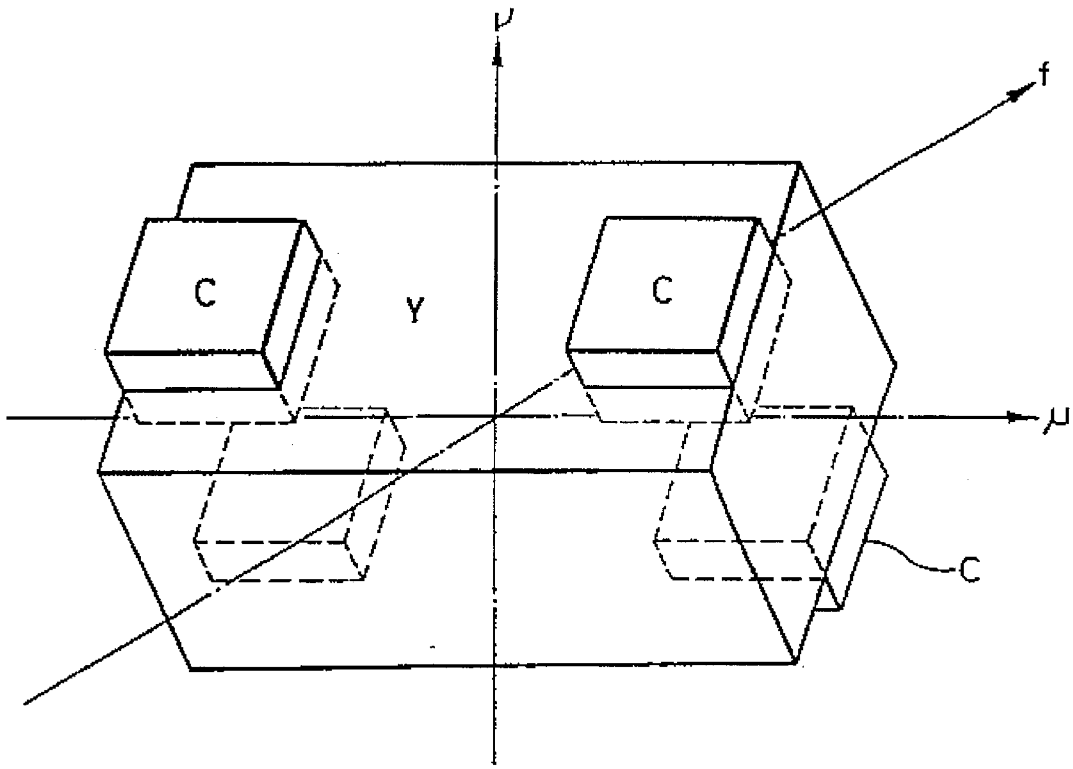
FIG. 9 is a perspective view showing a spectral dispersion of V signals in the three-dimensional frequency space.
Figure 10:
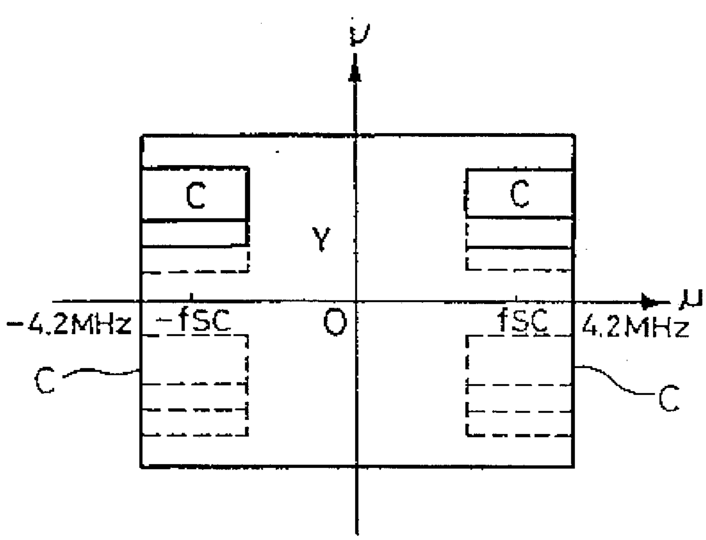
FIG. 10 is a diagram showing the spectral dispersion of FIG. 9 viewed from the minus side of the f-axis.
Figure 11:
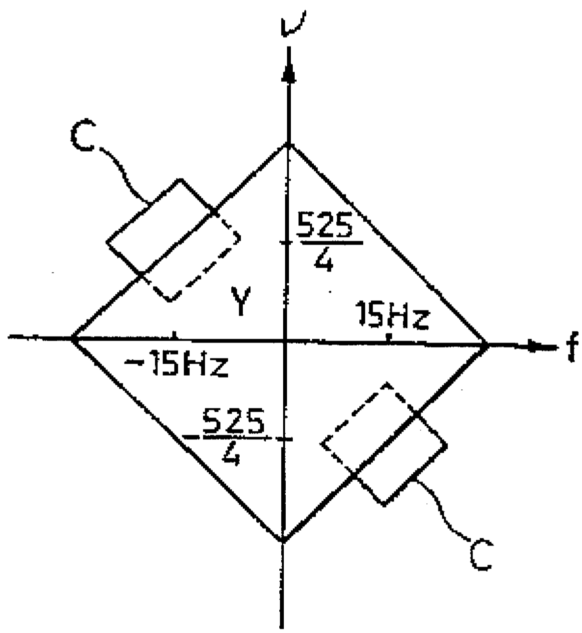
FIG. 11 is a diagram showing the spectral dispersion of FIG. 9 viewed from the plus side of the μ-axis.

FIGS. 9, 10 and 11 show projections of the three-dimensional frequency space. More specifically, FIG. 9 is a perspective view of the three-dimensional frequency space, FIG. 10 is a view from minus side of the f-axis, and FIG. 11 is a view from plus side of the μ-axis. In these figures, spectrum dispersion of V signals on the three-dimensional frequency space is shown. The spectrum of Y signals broadens with the O point of the three-dimensional frequency space as a center. C signals are only present on the second quadrant and the fourth quadrant when the V signals are viewed on the μ-axis because the spectrum of the C signals has I signals and Q signals which are subjected to quadrarure two-phase demodulation by the color sub-carrier $f_{sc}$.

This fact corresponds to that the full line showing the same phase of the color sub-carrier rises with time in FIG. 8. In the aforementioned conventional example, when the movement of image is detected, since the YC separation utilizing the intra-field correlation is performed, band restriction in the f-axis direction is not possible although band restrictions in the μ-axis and ν-axis directions are possible. Therefore, the band of the Y signal in the moving image is narrow.

When the YC separation is performed by the inter-field process as described above, the band of the Y signal in the moving image can be broadened.

In FIG. 8, sampling points (●) , , and in the n–1 field and in the vicinity of the particular sampling point (★) have color sub-carrier phases opposite the phase of the particular sampling point. The inter-field YC separation is possible by operating one of these sampling points with the particular sampling point.

First of all, a high-frequency component on the three-dimensional frequency space including C signals can be taken out by the difference between the particular sampling point (★) and the sampling point (●) shown in FIG. 8. This is defined as an inter-field YC separation A. When the high-frequency component passes through one of the horizontal direction C signal extracting filter 1032, the vertical direction C signal extracting filter 1033, and the horizontal and vertical direction C signal extracting filter 1034, C signals are obtained.

Second, a high frequency component on the three-dimensional frequency space including C signals can be taken out by the difference between the particular sampling point (★) and the sampling point (●) shown in FIG. 8. This is defined as an inter-field YC separation B. When thus obtained high-frequency component passes through one of the horizontal direction C signal extracting filter 1032, the vertical direction C signal extracting filter 1033, and the horizontal and vertical direction C signal extracting filter 1034, C signals are obtained.

Third, a high frequency component on the three-dimensional frequency space including C signals can be taken out by the difference between the particular sampling point (★) and the sampling point (●) shown in FIG. 8. This is defined as an inter-field YC separation C. When thus obtained high-frequency component passes through one of the horizontal direction C signal extracting filter 1032, the vertical direction C signal extracting filter 1033, and the horizontal and vertical direction C signal extracting filter 1034, C signals are obtained.

In order to adaptively control the switching of these inter-field YC separations A, B, and C, it is necessary to detect correlations between the particular sampling point (★) and the sampling points (●), and . Since V signals are input to the input terminal 1011, a horizontal low-pass frequency component of the difference between two sampling points having opposite phases in the n field and in the n–1 field is used to detect the correlation.

The inter-field correlation detecting circuit, the intra-field correlation detecting circuit and the intra-frame YC separating circuit shown in FIG. 2 operate as follows. In this embodiment, when the image is judged to be a moving image by the motion detecting circuit 1080, an optimum filter among the intra-frame YC separating filters including three kinds of inter-field operations and three kinds of intra-field operations is used instead of the intra-field YC separating filter.

In FIG. 2, V signals 1101 input to the input terminal 1011 are delayed by two pixels in the two-pixel delay circuit 1014 and delayed by 262 lines in the 262-line delay circuit 1015.

The V signals delayed by two pixels in the two-pixel delay circuit 1014 and the output of the 262-line delay circuit 1015 are subtracted by the subtracter 1020, resulting in an inter-field difference for the inter-field YC separation C.

The V signals delayed by two pixels in the two-pixel delay circuit 1014 and the output of the two-pixel delay circuit 1018 are subtracted by the subtracter 1021, resulting in an inter-field difference for the inter-field YC separation B.

The V signals delayed by two pixels in the two-pixel delay circuit 1014 and the output of the two-pixel delay circuit 1019 are subtracted by the subtracter 1022, resulting in an inter-field difference for the inter-field YC separation A.

These three kinds of inter-field differences are input to the signal selecting circuit 1023 and then selected by an output of a minimum value selecting circuit 1030 which will be described later.

The inter-field difference as an output of the subtracter 1020 pass through the LPF 1024, whose pass band is 2.1 MHz and below, and then an absolute value thereof obtained in the absolute value circuit 1027. The absolute value is input to the minimum value selecting circuit 1030, thereby detecting a correlation between the particular sampling point and the sampling point shown in FIG. 8. The inter-field difference as an output of the substrate 1021 pass through the LPF 1025, whose pass band is 2.1 MHz and below, and then an absolute value thereof is obtained in the absolute value circuit 1028. The absolute value is input to the minimum value selecting circuit 1030, thereby detecting a correlation between the particular sampling point and the sampling point shown in FIG. 8.

The inter-field difference as an output of the subtracter 1022 pass through the LPF 1026, whose pass band is 2.1 MHz and below, and then an absolute value thereof is obtained in the absolute value circuit 1029. The absolute value is input to the minimum value selecting circuit 1030, thereby detecting a correlation between the particular sampling point and the sampling point shown in FIG. 8.

The minimum value selecting circuit 1030 selects the minimum value from the above-described three absolute values (the correlation detecting amount is the maximum) and controls the signal selecting circuit 1023. More specifically, the signal selecting circuit 1023 selects the output of the subtracter 1020 when the output of the absolute value circuit 1027 is the minimum, the output of the subtracter 1021 when the output of the absolute value circuit 1028 is the minimum, and the output of the subtracter 1022 when the output of the absolute value circuit 1029 is the minimum.

Furthermore, C signals are extracted from the output of the signal selecting circuit 1023 in any of the horizontal direction C signal extracting filter 1032, the vertical direction C signal extracting filter 1033 and the horizontal and vertical direction C signal extracting filter 1034, by the filter process having the following transfer function.

horizontal direction C signal extracting filter $$Ch(z)=(-1/4)(1-z^{-2})^2$$

vertical direction C signal extracting filter $$Cv(z)=(-1/4)(1-z^{-1})^2$$

horizontal and vertical direction C signal extracting filter $$Chv(z)=(-1/4)(1-z^{-2})^2(-1/4)(1-z^{-1})^2$$

Here, correlations in the horizontal direction and the vertical direction of the image is detected with respect to the particular sampling point, and when the correlation is especially remarkable in the horizontal direction, the output of the horizontal direction C signal extracting filter 1032 is selected. When the correlation is especially remarkable in the vertical direction, vertical direction C signal extracting filter 1033 is selected. The output of the horizontal and vertical direction C signal extracting filter 1034 is selected in other cases.

Correlations in the horizontal direction and the vertical direction are detected in the intra-field correlation judge circuit 1031. The intra-field correlation judge circuit 1031 detects existences of correlations in the horizontal direction and the vertical direction of the image by the intra-field process and controls the signal selecting circuit 1035 by the result of the detection.

The output from the signal selecting circuit 1035 is output from the output terminal 1013 as intra-frame YC separated C signals 1113. On the other hand, the intra-frame YC separated C signals 1113 are subtracted from the V signals output from the two-pixel delay circuit 1014 by the subtracter 1036, leaving intra-frame YC separated Y signals.

Figure 108A:
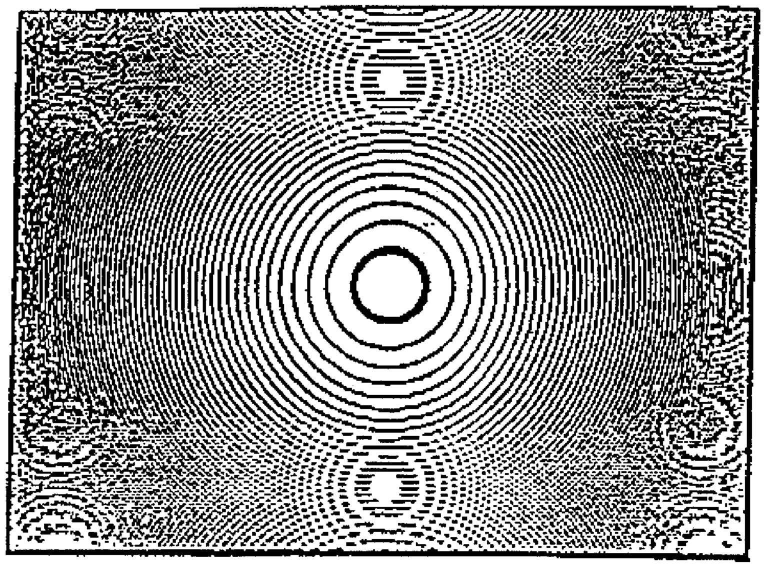
FIG. 108 is a diagram showing a Y signal output when a circular zone plate chart moves in a prescribed direction at a prescribed speed.
Figure 108B:
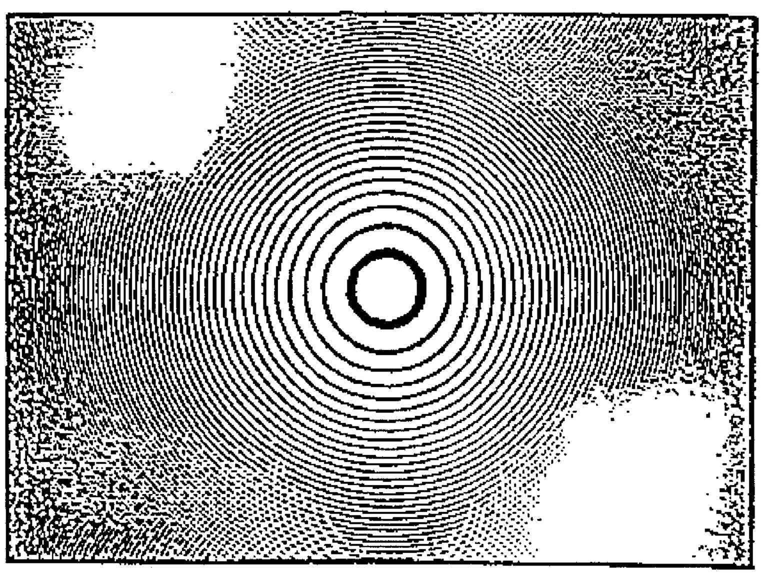
Figure 109A:
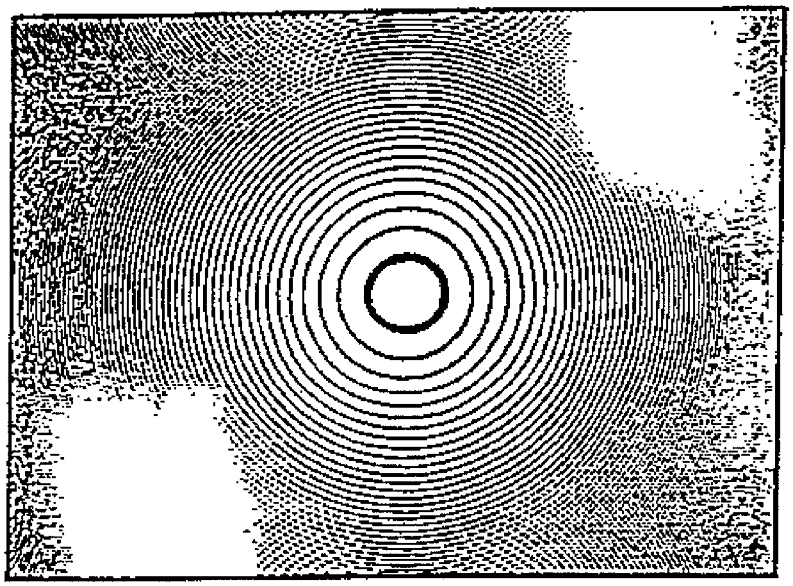
FIG. 109 is a diagram showing a Y signal output when a circular zone plate chart moves in a prescribed direction at a prescribed speed.
Figure 109B:
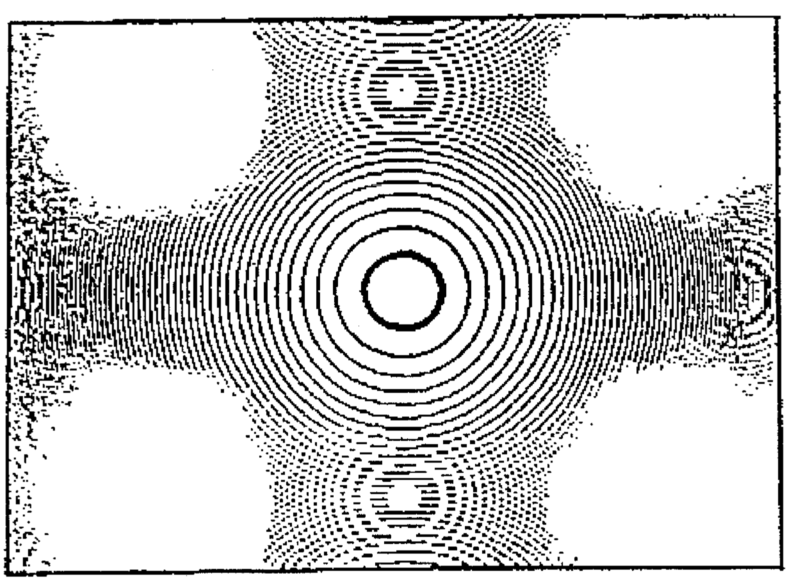

In the first embodiment shown in FIG. 2, in a case where the signal selecting circuit 1035 is fixed to select only the output from the horizontal and vertical direction C signal extracting filter 1034, Y signals output from the output terminal 1012, when the inter-field process is adaptively switched, are shown in FIGS. 108 and 109. FIGS. 108 and 109 show circular zone plate charts moving in prescribed directions at a prescribed speed. More specifically, FIG. 108(*a*) shows a circular zone plate chart moving downward at a speed of one pixel per one field, FIG. 108(*b*) shows a circular zone plate chart moving leftward at a speed of one pixel per one field, FIG. 109(*a*) shows a circular zone plate chart moving rightward at a speed of one pixel per one field, and FIG. 109(*b*) shows a circular zone plate chart moving upward at a speed of one pixel per one field. In the FIGS. 108(*b*), 109(*a*), and 109(*b*), the white regions show absence of Y signals.

In the conventional device shown in FIG. 110, when the motion detecting circuit 1080 judges that the image is a moving image, the Y signal mixing circuit 1009 and the C signal mixing circuit 1010 select the output of the intra-field YC separating circuit 1004. Therefore, when the circular zone plate chart moves in any direction, the Y signals output from the output terminal 1002 have a deterioration in resolution in the diagonal direction as shown in FIG. 109(*b*).

On the other hand, in this embodiment of the present invention, by adaptively switching the inter-field processes, no deterioration in resolution occurs as shown in FIG. 108(*a*) when the image moves in some direction, so that crosstalks of the Y signals and the C signals are reduced.

As described above, when the motion detecting circuit detects a moving image, in the intra-frame YC separating filter, correlations between fields are partially detected and a plurality of inter-field processes are adaptively switched in accordance with the result of the detection while correlations in fields are partially detected and a plurality of intra-field processes are switched in accordance with the result of the detection. Therefore, when the moving image is processed by the YC separating filter adaptive to the movement, an optimum YC separation is possible using the correlation of the image, resulting in a YC separating filter adaptive to a movement of an image, which performs YC separation with less deterioration in resolution.

In addition, according to the first embodiment of the present invention, inter-field correlations in plural directions are partially detected by the horizontal low-frequency component of the difference between two sampling points whose color sub-carrier phases are opposite from each other between fields. Therefore, the direction to which the image moves is detected, so that an operation between fields appropriate for the direction is possible.

A description will now be given of a circuit that judges which C signal output is to be selected from the C signal outputs extracted by the horizontal direction C signal extracting filter 1032, the vertical direction C signal extracting filter 1033 and the horizontal and vertical C signal extracting filter 1034.

Figure 6:
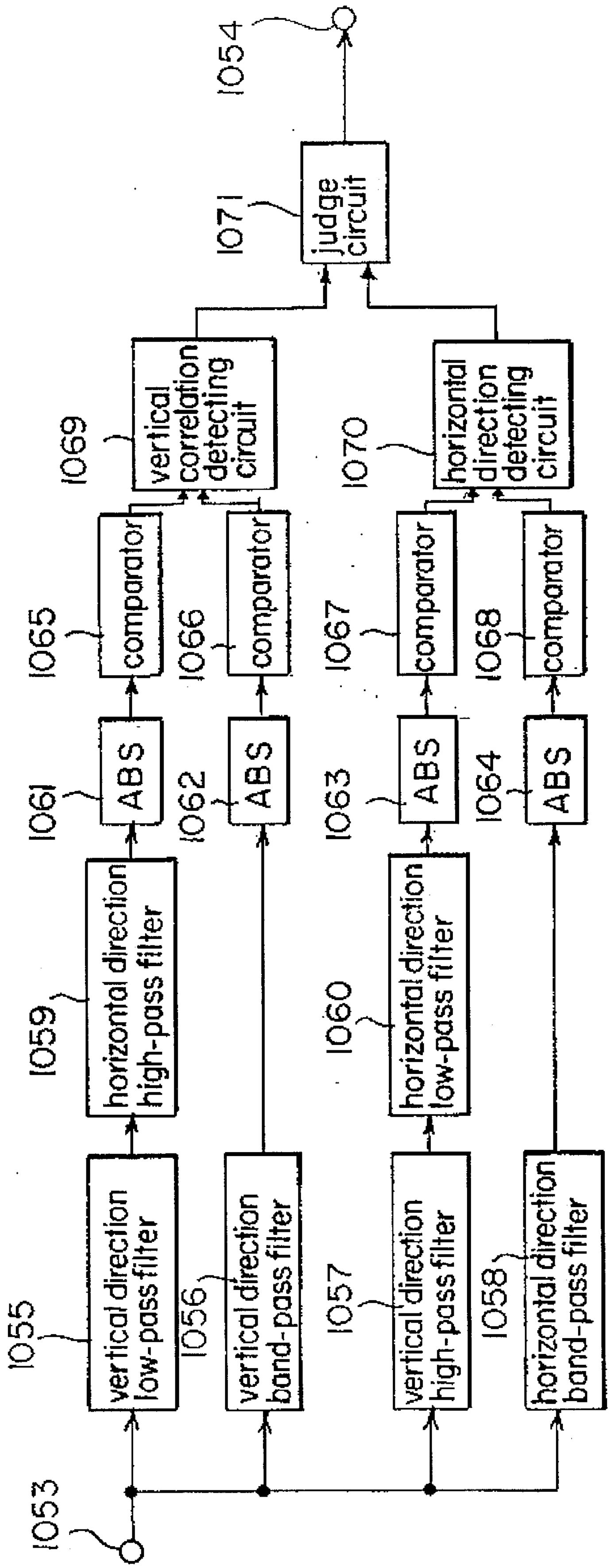
FIG. 6 is a block diagram showing an example of an intra-field correlation judge circuit shown in FIGS. 2 to 5.

FIG. 6 is a block diagram showing the intra-field correlation judge circuit 1031 of FIG. 2 in detail. In FIG. 6, V signals are applied to the input terminal 1053. Reference numeral 1055 designates a vertical direction low-pass filter through which low-frequency components in the vertical direction pass. Reference numeral 1056 designates a vertical direction band-pass filter, 1057 a vertical direction low-pass filter, 1058 a horizontal direction band-pass filter, 1059 a horizontal direction high-pass filter, and 1060 a horizontal direction low-pass filter. Reference numerals 1061, 1062, 1063, and 1064 designate absolute value circuits. Reference numerals 1065, 1066, 1067, and 1068 designate comparators which compare an input signal with a constant and output a control signal. Reference numerals 1069 and 1070 designate a vertical correlation detecting circuit and a horizontal correlation detecting circuit, respectively, and a judge circuit 1071 sends a control signal to the signal selecting circuit 1035 in accordance with the result of the detection. A control signal in accordance with the detected correlation is output from an output terminal 1054.

The operation of FIG. 6 will now be described. In FIG. 6, a frequency component, which is a low-frequency component in the vertical direction at a particular sampling point and corresponds to a half of color sub-carrier frequency in the horizontal direction, is extracted by the vertical direction low-pass filter 1055 and the horizontal direction high-pass filter 1059 and then its absolute value is obtained by the absolute value circuit 1061, whereby a horizontal direction high-frequency Y signal energy is obtained. In addition, a d.c. component in the vertical direction at the particular sampling point and a frequency component corresponding to the color sub-carrier component are removed by the vertical direction band-pass filter 1056 and then its absolute value is obtained by the absolute value circuit 1062, whereby a vertical direction non-correlation energy is obtained.

Furthermore, a frequency component, which is a low-frequency component in the horizontal direction at the particular sampling point and corresponds to a half of color sub-carrier frequency in the vertical direction, is extracted by the vertical direction high-pass filter 1057 and the horizontal direction low-pass filter 1060 and then its absolute value is obtained by the absolute value circuit 1063, whereby a vertical direction high-frequency Y signal energy is detected. In addition, a d.c. component in the horizontal direction at the particular sampling point and a frequency component corresponding to the color sub-carrier component are removed by the horizontal direction band-pass filter 1058 and then the remaining signals absolute value is obtained by the absolute value circuit 1064, whereby a horizontal direction non-correlation energy is detected.

The vertical direction low-pass filter 1055 is represented by the following formula, that is;

$$Fvl(z)=(1/4)(1+z^{-1})^2,$$

and the horizontal direction high-pass filter 1059 is represented by the following formula, that is;

$$Fhh(z)=1-z^{-4}.$$

That is, the frequency component corresponding to a half of the color sub-carrier is extracted in the horizontal direction. The horizontal direction band-pass filter 1058 is represented by the following formula, that is;

$$Fdh(z)=1-z^{-4},$$

and the vertical direction high-pass filter 1057 is represented by the following formula, that is;

$$Fvh(z)=1-z^{-2l}.$$

That is, the frequency component corresponding to a half of the color sub-carrier is extracted in the vertical direction. The horizontal direction low-pass filter 1060 is represented by the following formula, that is;

$$Fhl(z)=(1/4)(1+z^{-2})^2.$$

and the vertical direction band-pass filter 1056 is a digital filter represented by the following formula, that is;

$$Fdv(z)=1-z^{-2}.$$

The vertical direction non-correlation energy Dv(z) and the horizontal direction non-correlation energy Dh(z) are represented by the following formulae by introducing absolute value approximation and using transfer function, that is;

$$Dv(z)=|1-z^{-2l}|$$

$$Dh(z)=|1-z^{-4}|$$

The Dv(z) and Dh(z) show filter characteristics that prevent the passage of the d.c. component and the color sub-carrier frequency component with respect to the vertical direction and the horizontal direction. The Dv(z) is obtained by the vertical direction band-pass filter 1056 and the absolute value circuit 1062 and the Dh(z) is obtained by the horizontal direction band-pass filter 1058 and the absolute value circuit 1064.

In addition, the horizontal direction high-frequency Y energy DYh(z) and the vertical direction high-frequency Y energy DYv(z) are represented by the following formulae by introducing absolute value approximation and using a transfer function, that is;

$$DYh(z)=|(1/4)(1+z^{-l})^2(1-z^{-4})|$$

$$DYv(z)=|(1/4)(1+z^{-2})^2(1-z^{-2l})|$$

The DYh(z) is obtained by the vertical direction low-pass filter 1055, the horizontal direction high-pass filter 1059, and the absolute value circuit 1061 and the DYv(z) is obtained by the vertical direction high-pass filter 1057 and the horizontal direction low-pass filter 1060 and the absolute value circuit 1063.

An output of the absolute value 1061 is input to the comparator 1065, an output of the absolute value circuit 1062 is input to the comparator 1066, an output of the absolute value circuit 1063 is input to the comparator 1067, and an output of the absolute value circuit 1064 is input to the comparator 1068.

The comparator 1065 compares the input signal with a constant ($Kdy_1$ described later) and sends a control signal to the vertical correlation detecting circuit 1069 in accordance with the result of the comparison. The comparator 1066 compares the input signal with a constant ($Kd_1$ described later) and sends a control signal to the vertical correlation detecting circuit 1069 in accordance with the result of the comparison. The comparator 1067 compares the input signal with a constant ($Kdy_2$ described later) and sends a control signal to the horizontal correlation detecting circuit 1070 in accordance with the result of the comparison. The comparator 1068 compares the input signal with a constant ($Kd_2$ described later) and sends a control signal to the horizontal correlation detecting circuit 1070 in accordance with the result of the comparison.

Then, the vertical correlation detecting circuit 1069 detects a correlation in the vertical direction when $Dv(z) \leqq Kd_1$ ($Kd_1$ . . . correlation threshold coefficient) and $DYh(z) \geqq Kdy_1$ ($Kdy_1$ . . . high-frequency signal energy threshold constant) and sends a control signal to the judge circuit 1071 in accordance with the result of the detection. In addition, it detects no correlation in the vertical direction when $Dr(z)>Kd_1$ or $DYh(z)<Kdy_1$ and sends a control signal to the judge circuit 1071 in accordance with the result of the detection.

On the other hand, the horizontal correlation detecting circuit 1070 detects a correlation in the horizontal direction when $Dh(z) \leqq Kd_2$ ($Kd_2$ . . . correlation threshold coefficient) and $DYv(z) \geqq Kdy_2$ ($Kdy_2$ . . . high-frequency signal energy threshold constant) and sends a control signal to the judge circuit 1071 in accordance with the result of the detection. In addition, it detects no correlation in the horizontal direction when $Dh(z)>Kd_2$ or $DYh(z)<Kdy_2$ and sends a control signal to the judge circuit 1071 in accordance with the result of the detection.

When the result of the vertical correlation detecting circuit 1069 is "correlation is present" and the result of the horizontal correlation detecting circuit 1070 is "correlation is absent", the judge circuit 1071 outputs a control signal so that the signal selecting circuit 1035 shown in FIG. 2 may select the output of the vertical direction C signal extracting filter 1033.

When the result of the vertical correlation detecting circuit 1069 is "no correlation is present" and the result of the horizontal correlation detecting circuit 1070 is "correlation is present", the judge circuit 1071 outputs a control signal so that the signal selecting circuit 1035 may select the output of the horizontal direction C signal extracting filter 1032.

When the result of the vertical correlation detecting circuit 1069 is "correlation is absent" and the result of the horizontal correlation detecting circuit 1070 is "correlation is absent" or when the result of the vertical correlation detecting circuit 1069 is "correlation is present" and the result of the horizontal correlation detecting circuit 1070 is "correlation is present", the judge circuit 1071 outputs a control signal so that the signal selecting circuit 1035 may select the output of the horizontal and vertical direction C signal extracting filter 1034.

The output of the judge circuit 1071 is output from the output terminal 1045, whereby the correlation detection results in the horizontal direction and the vertical direction are output.

According to the above-described first embodiment, since the detection of correlation is performed also in the field, a filter according to the image is selected in the field utilizing the correlation of the image.

[Embodiment 2]

Figure 3:
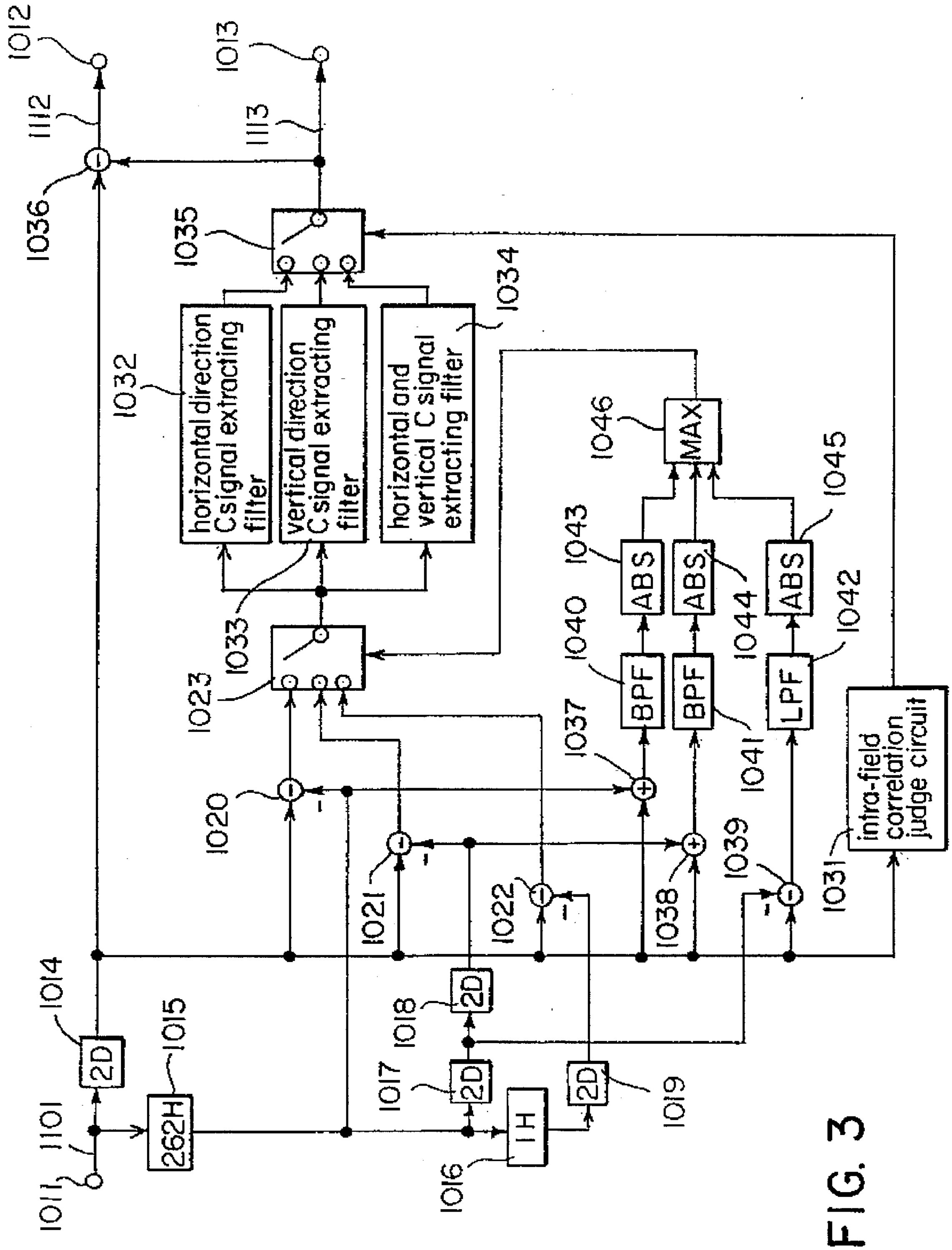
FIG. 3 is a block diagram showing second examples of the inter-field correlation detecting circuit, the intra-field correlation detecting circuit, and the intra-frame YC separating circuit according to the first embodiment of FIG. 1.

FIG. 3 is a block diagram showing a second embodiment of the inter-field correlation detecting circuit 1072, the intra-field correlation detecting circuit 1073, and the intra-frame YC separating circuit 1074 shown in FIG. 1. In FIG. 3, the same reference numerals as those in FIG. 2 designate the same or corresponding parts. Reference numerals 1037 and 1038 designate adders and reference numeral 1039 designates a subtracter. Reference numerals 1040 and 1041 designate band-pass filters whose pass band is 2.1 MHz and above. Reference numerals 1042 designates a low-pass filter whose pass band is 2.1 MHz and below. Reference numerals 1043, 1044, and 1045 designate absolute value circuits. Reference numeral 1046 designates a maximum value selecting circuit which selects the maximum value of three input signals and outputs a control signal.

This second embodiment is different from the first embodiment of FIG. 2 only in the method for detecting a correlation between field. In this second embodiment, in order to detect the correlation of V signals, a method of detecting a direction in which spectrum of Y signals broadens in the three-dimensional frequency space. Here, inter-field correlation is detected utilizing horizontal low-frequency component of a difference between two sampling points having the same phases of the color sub-carrier between the n field and the n−1 field and horizontal high-frequency component of a sum of two sampling points having opposite phases of the color sub-carrier wave between the n field and the n−1 field. A description is given of the inter-field correlation detecting circuit of FIG. 3, which is different from that of FIG. 2.

In FIG. 3, in order to select the inter-field YC separation A, a difference between the particular sampling point (★) shown in FIG. 8 and the sampling point (○) I, beneath the sampling point (●) by one line passes through the LPF, thereby detecting the correlation.

In order to select the inter-field YC separation B, a sum of the particular sampling point (★) and the sampling point (●) passes through the BPF, thereby detecting the correlation.

In order to select the inter-field YC separation C, a sum of the particular sampling point (star) and the sampling point (●) passes through the BPF, thereby detecting the correlation.

The operation will be described hereinafter. An output of the 262-line delay circuit 1015 and an output of the two-pixel delay circuit 1014 are added by the adder 1037, the result passes through the BPF 1040 whose pass band is 2.1 MHz and above, its absolute value is obtained in the absolute value circuit 1043, the absolute value is input to the maximum value selecting circuit 1046, and the correlation between the particular sampling point and the sampling point shown in FIG. 8 is detected.

The output of the 262-line delay circuit 1015 is delayed by four pixels by the two-pixel delay circuits 1017 and 1018. The output of the two-pixel delay circuit 1018 and the output of the two-pixel delay circuit 1014 are added by the adder 1038, the result passes through the BPF 1041 whose pass band is 2.1 MHz and above, its absolute value is obtained in the absolute value circuit 1044, the absolute value is input to the maximum value selecting circuit 1046 and the correlation between the particular sampling point and the sampling point shown in FIG. 8 is detected.

The output of the two-pixel delay circuit 1017 and the output of the two-pixel delay circuit 1014 are subtracted by the subtracter 1039, the result passes through the LPF 1042 whose pass band is 2.1 MHz and below, its absolute value is obtained in the absolute value circuit 1045, the absolute value is input to the maximum value selecting circuit 1046, and the correlation between the particular sampling point and the sampling point shown in FIG. 8 is detected.

The maximum value selecting circuit 1046 selects the maximum value (the correlation detecting amount is the maximum) from the above-described three absolute values and controls the signal selecting circuit 1023. More particularly, the signal selecting circuit 1023 selects the output of the subtracter 1020 when the output of the absolute value circuit 1043 is the maximum, the output of the subtracter 1021 when the output of the absolute value circuit 1044 is the maximum, and the output of the subtracter 1022 when the output of the absolute value circuit 1045 is the maximum. The operations hereinafter are the same as the circuit shown in FIG. 2.

According to the second embodiment of the present invention, the correlations in a plurality of directions between fields are detected by the horizontal low-frequency component of the difference between sampling points which have the same phases of color sub-carrier between fields and the horizontal high-frequency component of the sum between sampling points having the opposite phases of color sub-carrier between fields, whereby the correlation between fields is detected. Therefore, a direction to which the image moves is found and an inter-field operation adaptive to the direction is possible.

In addition, by adaptively switching the inter-field processes, no deterioration in resolution occurs as shown in FIG. 108(*a*) when the image moves in some direction, so that crosstalks of the Y signals and the C signals are reduced.

[Embodiment 3]

While in the above-described first embodiment three kinds of inter-field YC separating filters are adaptively switched, in this third embodiment an intra-field YC separating filter is added to the inter-field YC separating filter and an optimum one is selected from the four kinds of filters.

Figure 4:
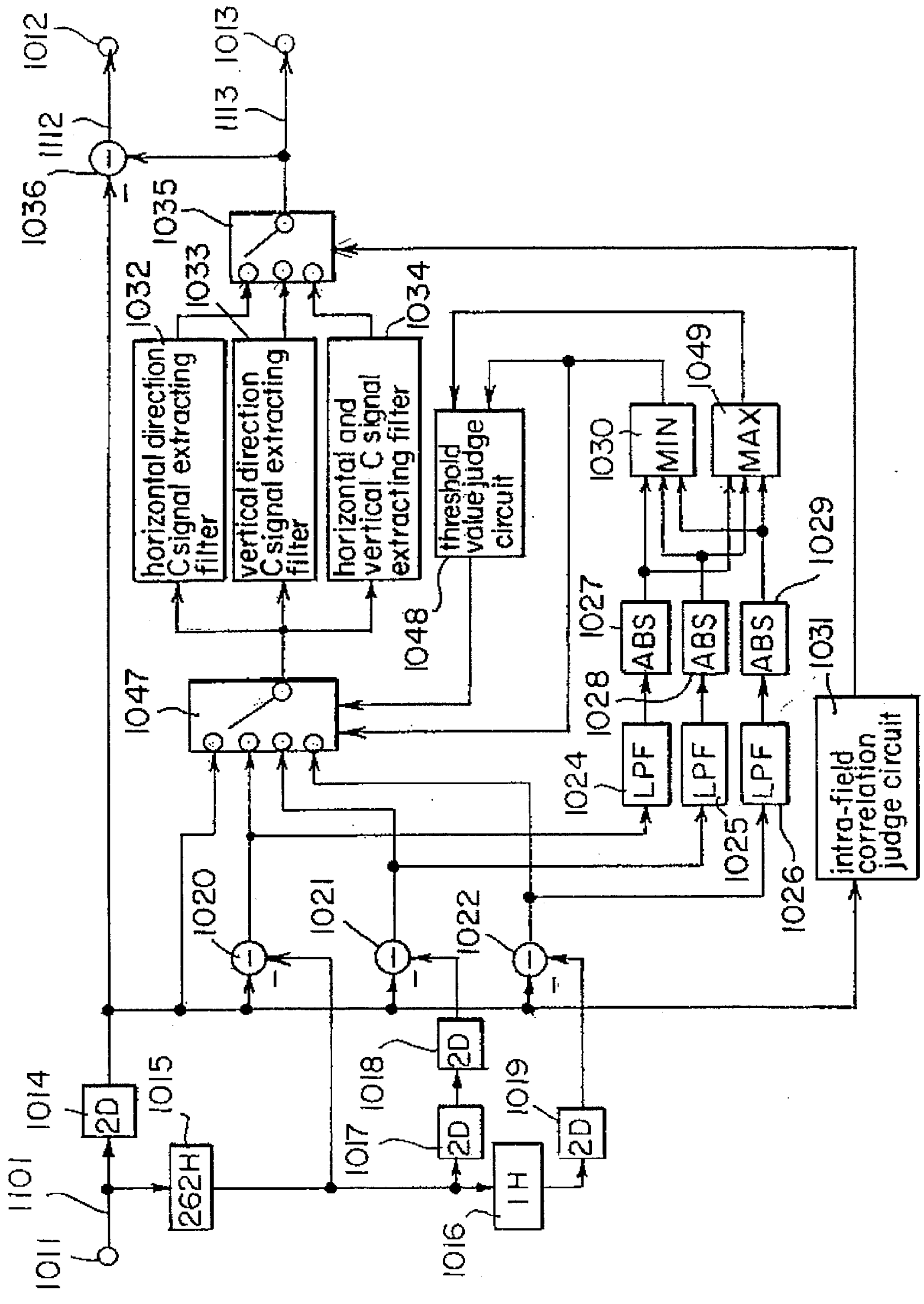
FIG. 4 is a block diagram showing third examples of the inter-field correlation detecting circuit, the intra-field correlation detecting circuit, and the intra-frame YC separating circuit according to the first embodiment of FIG. 1.

FIG. 4 is a block diagram showing a third embodiment of the inter-field correlation detecting circuit 1072, the intra-field correlation detecting circuit 1073, and the intra-frame YC separating circuit 1074 shown in FIG. 1. In FIG. 4, the same reference numerals as those in FIG. 2 designate the same or corresponding parts. A signal selecting circuit 1047 selects and outputs one of four inputs thereof. A threshold value judge circuit 1048 judges whether two inputs thereof exceed a threshold value or not and outputs a control signal. A maximum value selecting circuit 1049 selects the maximum value from the three inputs and outputs a control signal.

In FIG. 4, the only difference from the circuit shown in FIG. 2 resides in the inter-field correlation detecting circuit which adaptively controls the signal selecting circuit 1047, so that only the inter-field correlation detecting circuit will be described hereinafter.

An output of the two-pixel delay circuit 1014 is input to first input terminals of the subtracters 1020, 1021 and 1022 while it is input to the signal selecting circuit 1047. This input does not perform an inter-field operation and when this input is selected in the signal selecting circuit 1047, an intra-field YC separation is carried out.

An output of the absolute value circuit 1027 is input to the minimum value selecting circuit 1030 and the maximum value selecting circuit 1049. An output of the absolute value circuit 1028 is input to the minimum value selecting circuit 1030 and the maximum value selecting circuit 1049. An output of the absolute value circuit 1029 is input to the minimum value selecting circuit 1030 and the maximum value selecting circuit 1049.

An output of the maximum value selecting circuit 1049 is input to the first input terminal of the threshold value judge circuit 1048. An output of the minimum value selecting circuit 1030 is input to the second input terminal of the threshold value judge circuit 1048 and the fifth input terminal of the signal selecting circuit 1047. An output of the threshold value judge circuit 1048 is input to the sixth input terminal of the signal selecting circuit 1047. The threshold value judge circuit 1048 controls the signal selecting circuit 1047 so that it may select the output of the two-pixel delay circuit 1014 when the maximum value of the three kinds of inter-field correlations is smaller than the first threshold value α or when the minimum value of the three kinds of inter-field correlations is larger than the second threshold value β. On the other hand, when the threshold value judge circuit 1048 judges the maximum value of the three kinds of inter-field correlations to be larger than the first threshold value α or when it judges the minimum value of the three kinds of inter-field correlations to be smaller than the second threshold value β, the signal-selecting circuit 1047 is controlled by the output of the minimum value selecting circuit 1030 so that it may select the output of the subtracter 1020 when the output of the absolute value circuit 1027 is the minimum, the output of the subtracter 1021 when the output of the absolute value circuit 1028 is the minimum, and the output of the subtracter 1022 when the output of the absolute value circuit 1029 is the minimum. Here, α and β have a relation of $\alpha<\beta$. The operation hereinafter is the same as that of the circuit shown in FIG. 2.

Also in this third embodiment of the present invention, by switching the inter-field processes adaptively, no deterioration in resolution occurs as shown in FIG. 108(*a*) when the image moves in some direction, so that crosstalks of the Y signals and the C signals are reduced.

[Embodiment 4]

While in the above-described second embodiment three kinds of inter-field YC separating filter are adaptively switched in the intra-frame YC separating circuit 1074, in this fourth embodiment an intra-field YC separating filter is added to the inter-field YC separating filters and an optimum one is selected from the four filters.

Figure 5:
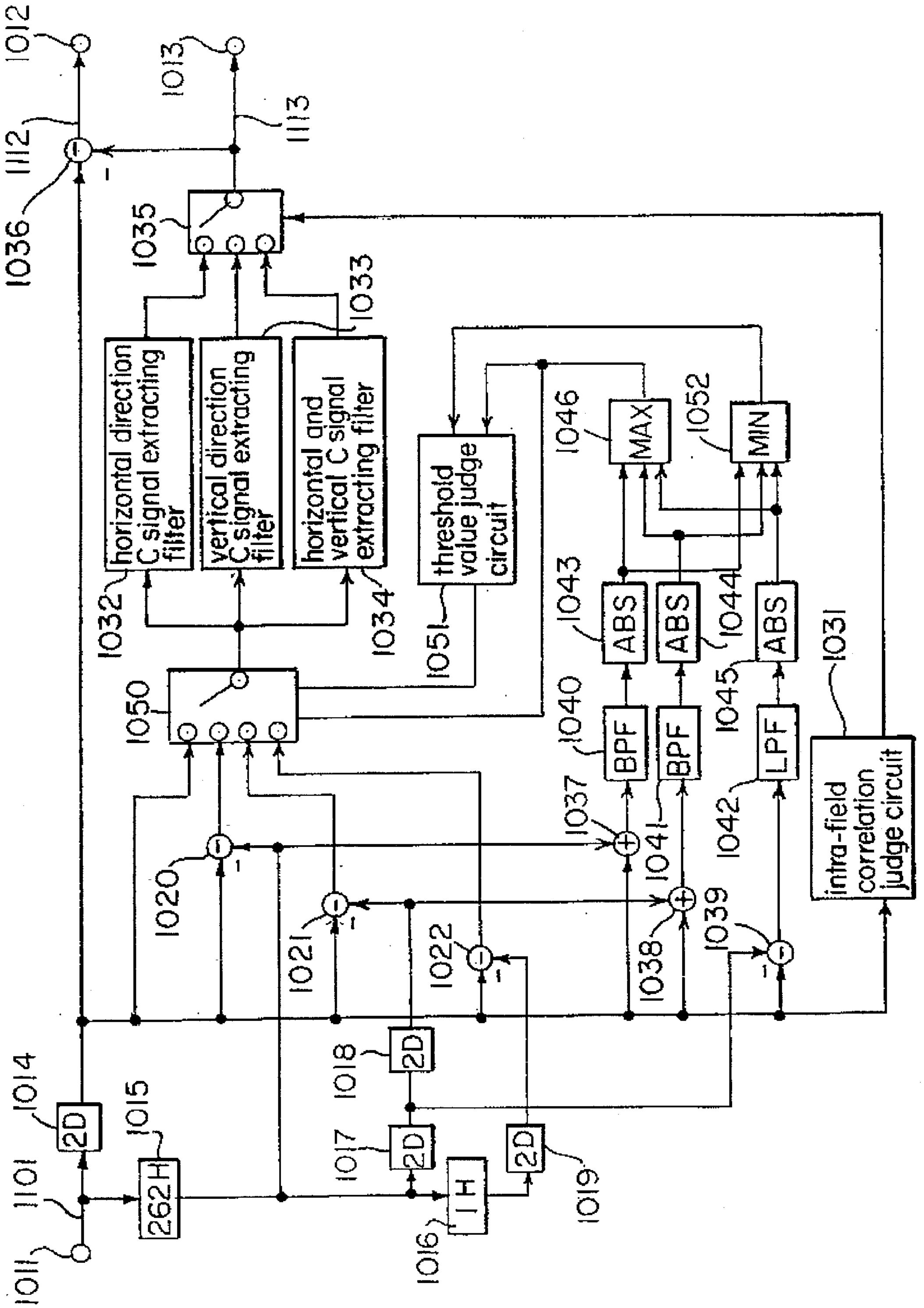
FIG. 5 is a block diagram showing fourth examples of the inter-field correlation detecting circuit, the intra-field correlation detecting circuit, and the intra-frame YC separating circuit according to the first embodiment of FIG. 1.

FIG. 5 is a block diagram showing a fourth embodiment of the inter-field correlation detecting circuit 1072, the intra-field correlation detecting circuit 1073, and the intra-frame YC separating circuit 1074 shown in FIG. 1. In FIG. 5, the same reference numerals as those in FIGS. 2 and 3 designate the same or corresponding parts. A signal selecting circuit 1050 selects and outputs one of four inputs thereof. A threshold value judge circuit 1051 judges whether two inputs thereof exceed a threshold value or not and outputs a control signal. A minimum value selecting circuit 1052 selects the minimum value from three inputs thereof and outputs a control signal.

In FIG. 5, the only difference from the circuit shown in FIG. 3 resides in the inter-field correlation detecting circuit which adaptively controls the signal selecting circuit 1050, so that only the inter-field correlation detecting circuit will be described hereinafter.

An output of the two-pixel delay circuit 1014 is input to first input terminals of the subtracters 1020, 1021 and 1022 while it is input to the signal selecting circuit 1050, This input does not perform an inter-field operation and when this input is selected in the signal selecting circuit 1050, an intra-field YC separation is carried out.

An output of the absolute value circuit 1043 is input to the minimum value selecting circuit 1052 and the maximum value selecting circuit 1046. An output of the absolute value circuit 1044 is input to the minimum value selecting circuit 1052 and the maximum value selecting circuit 1046. An output of the absolute value circuit 1045 is input to the minimum value selecting circuit 1052 and the maximum value selecting circuit 1046.

An output of the minimum value selecting circuit 1052 is input to the first input terminal of the threshold value judge circuit 1051. An output of the maximum value selecting circuit 1046 is input to the second input terminal of the threshold value judge circuit 1051 and the fifth input terminal of the signal selecting circuit 1050. An output of the threshold value judge circuit 1051 is input to the sixth input terminal of the signal selecting circuit 1050. The threshold value judge circuit 1051 controls the signal selecting circuit 1050 so that it may select the output of the two-pixel delay circuit 1014 when the maximum value of the three kinds of inter-field correlations is smaller than the first threshold value α or when the minimum value of the three kinds of inter-field correlations is larger than the second threshold value β. On the other hand, when the threshold value judge circuit 1051 judges the maximum value of the three kinds of inter-field correlations to be larger than the first threshold value α or when it judges the minimum value of the three kinds of inter-field correlations to be smaller than the second threshold value β, the signal selecting circuit 1050 is controlled by the output of the maximum value selecting circuit 1046 so that it may select the output of the subtracter 1020 when the output of the absolute value circuit 1043 is the maximum, the output of the subtracter 1021 when the output of the absolute value circuit 1044 is the maximum, and the output of the subtracter 1022 when the output of the absolute value circuit 1045 is the maximum. Here, α and β have a relation of $\alpha<\beta$. The operation hereinafter is the same as that of the circuit shown in FIG. 2.

Also in this fourth embodiment of the present invention, by switching the inter-field processes adaptively, no deterioration in resolution occurs as shown in FIG. 108(*a*) when the image moves in some direction, so that crosstalks of the Y signals and the C signals are reduced.

According to the above-described first to fourth embodiments of the present invention, when a moving image is detected by the motion detecting circuit, in the intra-frame YC separating filter, correlations between fields are partially detected and a plurality of inter-field processes are adaptively switched in accordance with the result of the detection. Further, correlations in the field is partially detected and a plurality of intra-field processes are adaptively switched in accordance with the result of the detection. Therefore, when the moving image is processed in the motion adaptive YC separating filter, an optimum YC separation is possible utilizing the correlation of the image, resulting in a motion adaptive YC separating filter performing a YC separation with less deterioration in resolution.

[Embodiment 5]

Figure 12:
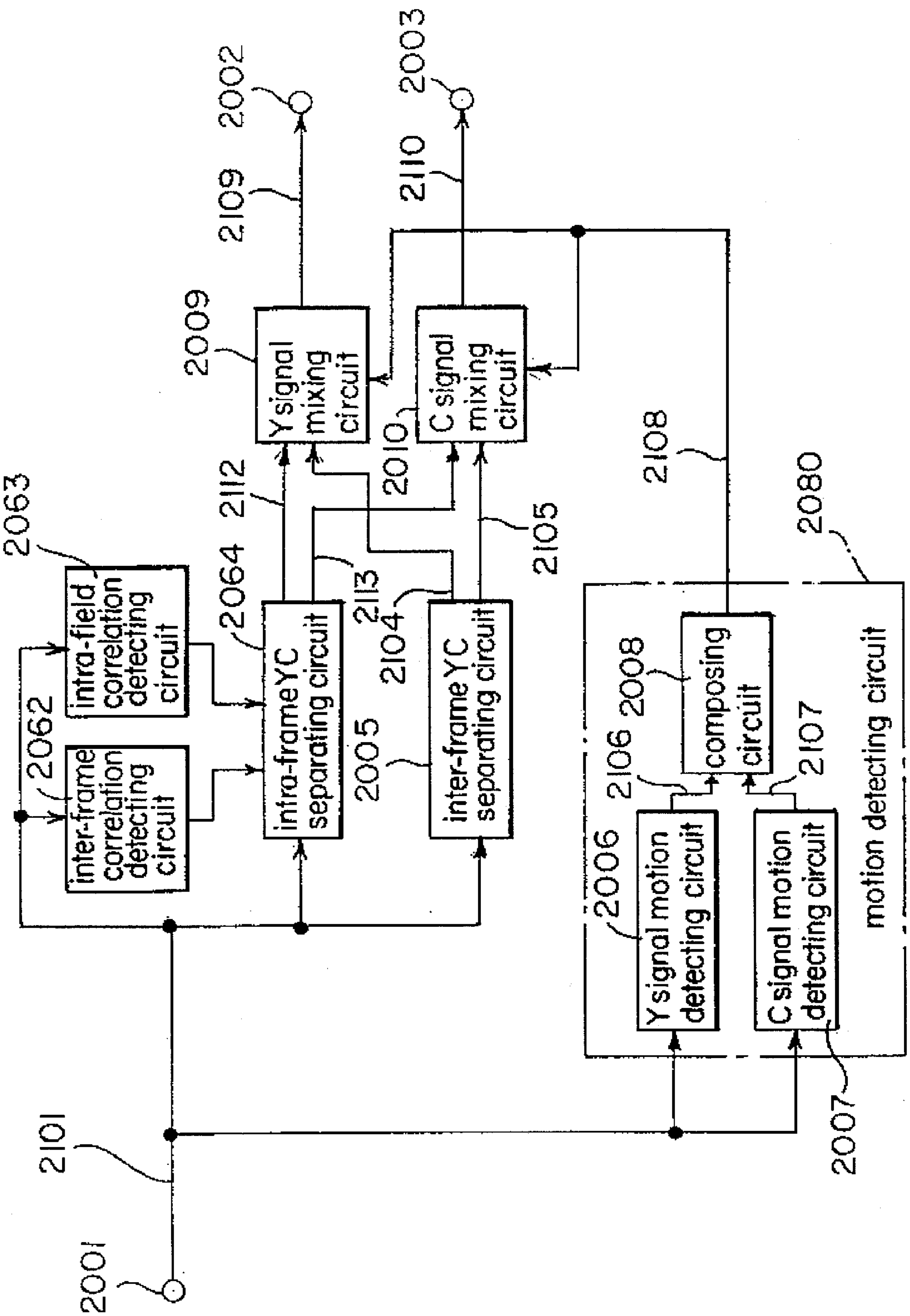
FIG. 12 is a block diagram in accordance with an embodiment of the present invention.

FIG. 12 is a block diagram showing a YC separating filter adaptive to a movement of an image in accordance with a fifth embodiment of the present invention. In FIG. 12, the intra-field YC separating circuit 1004 shown in FIG. 110 is replaced by an inter-frame correlation detecting circuit 2062, an intra-field correlation detecting circuit 2063, and an intra-frame YC separating circuit 2064, and other structures are the same as those of FIG. 110.

Figure 13:
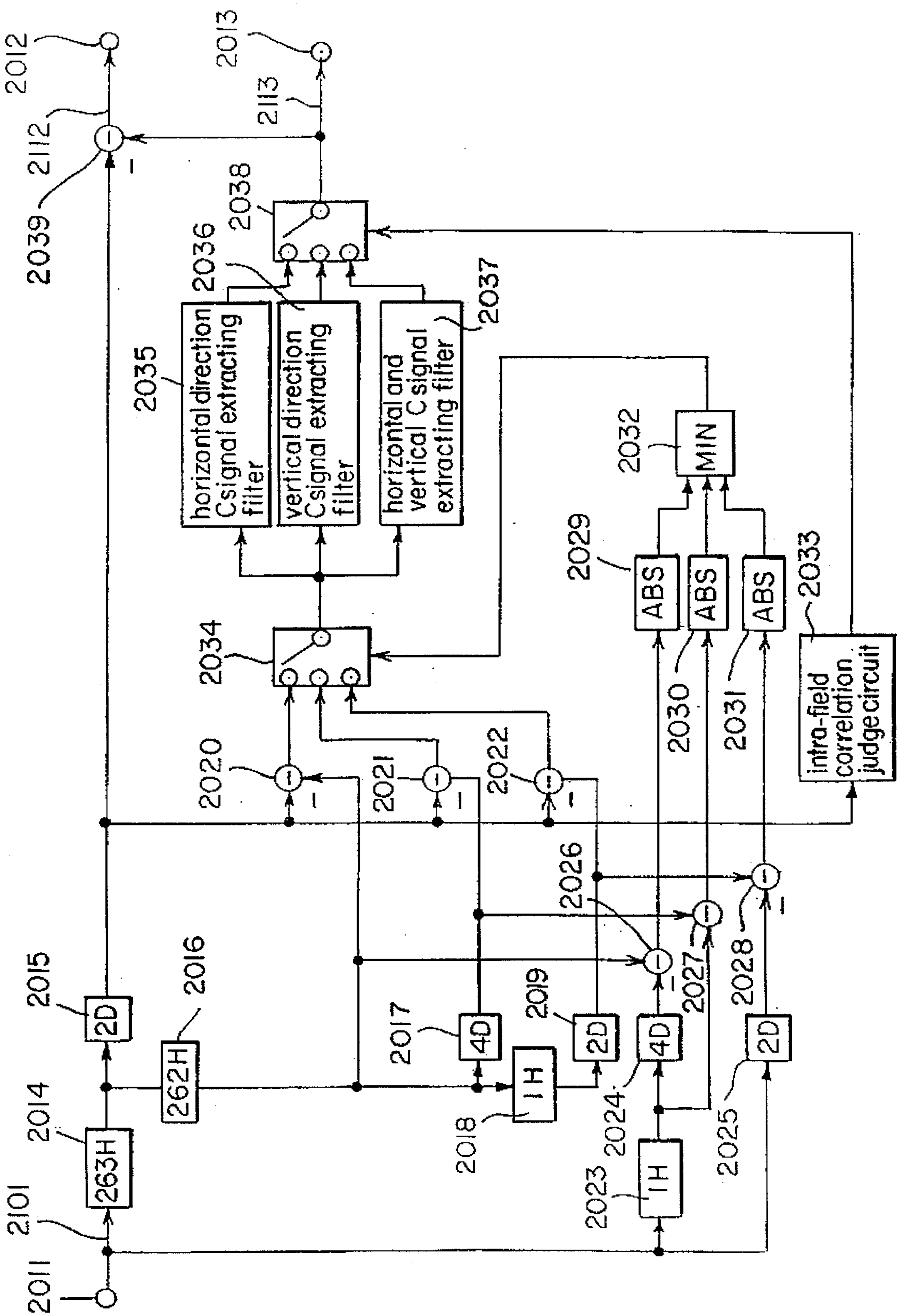
FIG. 13 is a block diagram showing first examples of an inter-frame correlation detecting circuit, an intra-field correlation detecting circuit, and an intra-frame YC separating circuit shown in FIG. 12.

FIG. 13 is a block diagram showing a first example of an inter-frame correlation detecting circuit 2062, an intra-field correlation detecting circuit 2063 and an intra-frame YC separating circuit 2064 in detail. In FIG. 13, V signals 2101 are input to an input terminal 2011. A two hundreds and sixty three-line delay circuit (hereinafter referred to as 263-line delay circuit) 2014 delays the input signal by a time corresponding to 263 lines. Two-pixel delay circuits 2015, 2019, 2025 delay the input signal by a time corresponding to two pixels. A 262-line delay circuit 2016 delays the input signal by a time corresponding to 262 lines. Four-pixel delay circuits 2017 and 2024 delay the input signal by a time corresponding to four pixels. One-line delay circuits 2018 and 2023 delay the input signal by a time corresponding to one line. Subtracters 2020, 2021, 2022, 2026, 2027, 2028, and 2039 perform subtraction between two input signals. Absolute value circuits 2029, 2030, and 2031 output absolute values of input signals thereof. A minimum value selecting circuit 2032 detects a minimum value from three input signals and outputs a control signal. An intra-field correlation judge circuit 2033 partially detects a correlation in a field and outputs a control signal. Signal selecting circuits 2034 and 2038 select one of three input signals, respectively. A horizontal direction C signal extracting filter 2035 performs an operation in the horizontal direction and extracts C signals. Its characteristic is represented by the following formula, using a transfer function, that is;

$$Ch(z)=(-1/4)(1-z^{-2})^2$$

In addition, a vertical direction C signal extracting filter 2036 performs an operation in the vertical direction and extracts C signals. Its characteristic is represented by the following formula, using a transfer function, that is;

$$Cv(z)=(-1/4)(1-z^{-1})^2$$

In addition, a horizontal and vertical direction C signal extracting filter 2037 performs operations in the horizontal and vertical directions and extracts C signals. Its characteristic is represented by the following formula, using a transfer, that is;

$$Chv(z)=(-1/4)(1-z^{-2})^2(-1/4)(1-z^{-1})^2$$

In the above formulae, $z^{-1}$ represents a delay of one sample and $z^{-1}$ represents delay of one line. The V signal is sampled synchronously with a color sub-carrier by a sampling frequency $f_s$ (=4.$f_{sc}$: $f_{sc}$ is a color sub-carrier frequency 200°), so that $$z^{-1}=\exp(-j2\pi f/4f_{sc}).$$

An output of the subtracter 2039 is output from the output terminal 2012 as an intra-frame YC separated Y signal 2112 and an output of the signal selecting circuit 2038 is output from the output terminal 2013 as an intra-frame YC separated C signal 2113.

Also in this fifth embodiment, when an x-axis is taken along the horizontal direction of a screen, a y-axis is taken along the vertical direction of the screen, and a t-axis (time axis) is taken along the direction perpendicular to a plane produced by the x-axis and the y-axis, a three-dimensional time space is constituted by the x, y, and t axes.

Figure 16:
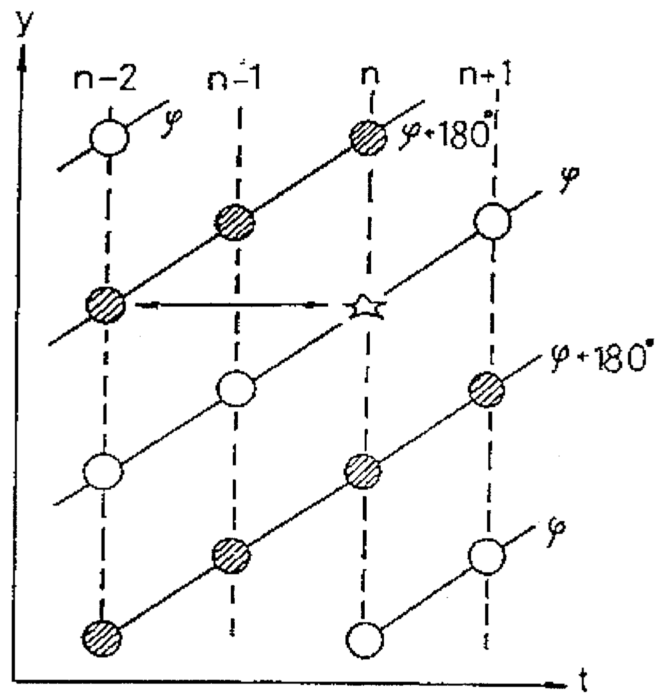
FIG. 16 is a plan view showing an arrangement of the V signal, which is digitized by a frequency four times the color sub-carrier frequency, in the three-dimensional time space by the t-axis and the y-axis.
Figure 17:
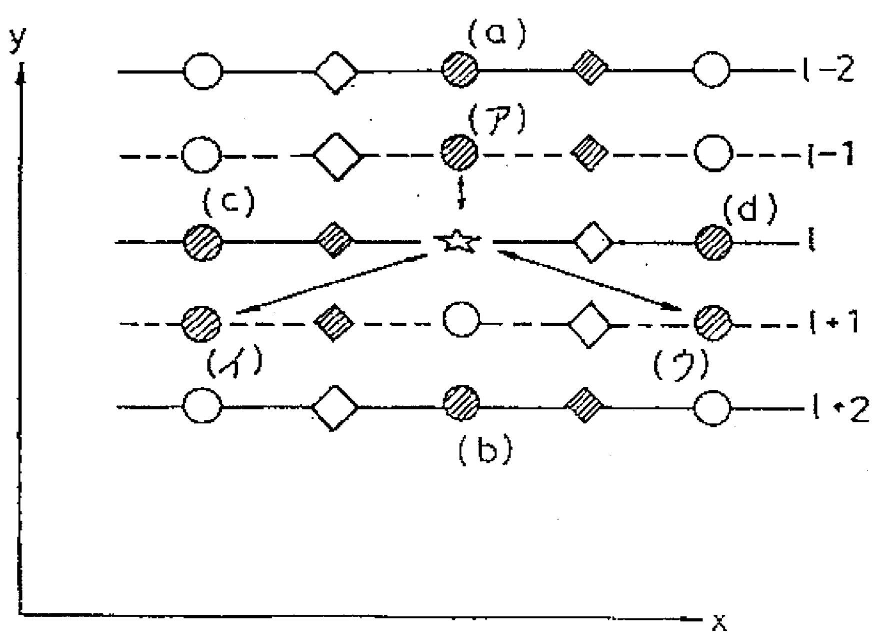
FIG. 17 is a plan view showing an arrangement of the same V signal by the x-axis and the y-axis.

FIGS. 16, 17 and 18 are diagrams showing the three-dimensional time space. FIG. 16 shows a plane constituted by the t axis and the y axis. FIGS. 17 and 18 show planes both constituted by the x axis and the y axis. Interlace scanning lines are also shown in FIG. 16 and the broken line shows one field while the full line shows that the color sub-carrier has the same phase. The full line and the broken line in FIG. 17 show scanning lines of n field and n−1 field, respectively, and the full line and the broken line in FIG. 18 show scanning lines of n+1 field and n field, respectively. Marks (○), (●), (◇) and (♦), on the scanning lines show sampling points having the same phases of color sub-carrier in a case where the V signal is digitized by a frequency of four times the color sub-carrier frequency $f_{sc}$ (=3.58 MHz).

When a particular sampling point is represented by (★), sampling points (c) and (d) next but one to the particular sampling point in the same n field and sampling points (a) and (b) in the upper and lower n fields have color sub-carrier phases opposite to the phase of the particular sampling point. Therefore, a line comb type filter utilizing a digital circuit or a YC separating filter adaptive to a movement of an image disclosed in Japanese Patent Published Application No. 58-242367 can be constituted. In addition, as shown in FIG. 16, the same sampling points apart by one frame from each other have the opposite color sub-carrier phases, so that an inter-frame YC separation filter can also be constituted.

Furthermore, as shown in FIG. 17, in the n−1 fields by one field before the particular sampling point, sampling point by one line above the particular sampling point and sampling points and diagonally below the particular sampling point have phases opposite the phase of the particular sampling point, so that an inter-field YC separation is possible by operating one of the three sampling points , , and with the particular sampling point.

When a μ-axis as a horizontal frequency axis, a ν-axis as a vertical frequency axis, and a f-axis as a time frequency axis, which correspond to the x, y and t axes, are considered, a three-dimensional frequency space is constituted by the orthogonal μ, ν and f axes.

Figure 20:
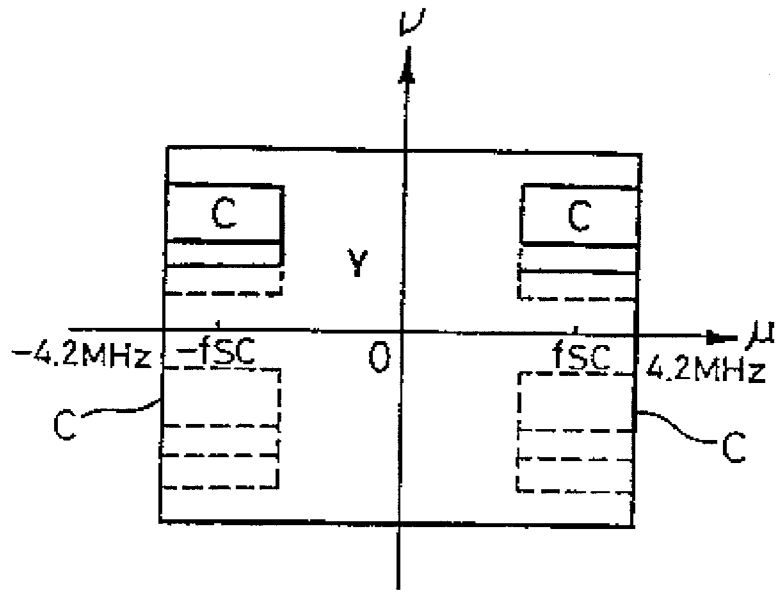
FIG. 20 is a diagram showing the spectral dispersion of FIG. 19 viewed from the minus side of the f-axis.
Figure 21:
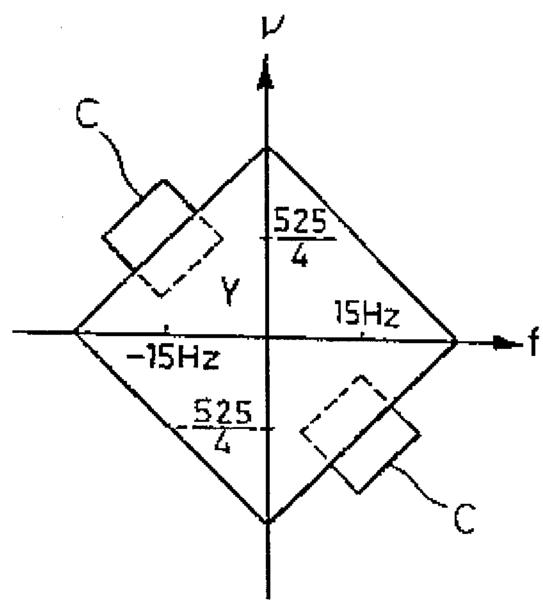
FIG. 21 is a diagram showing the spectral dispersion of FIG. 19 viewed from the plus side of the μ-axis.

FIGS. 19, 20 and 21 show projections of the three-dimensional frequency space.

As described in the first embodiment of the present invention, the pass band of Y signals in a moving image can be broadened by conducting YC separation by inter-field process.

In FIG. 17, sampling points (●), and in the n−1 field and in the vicinity of the particular sampling point (★) have color sub-carrier phases opposite the phase of the particular point. The inter-field YC separation is possible by operating one of these sampling points with the particular sampling point.

First, a high-frequency component on the three-dimensional frequency space including C signals can be taken out by a difference between the particular sampling point (★) and the sampling point (●) shown in FIG. 17. This is defined as an inter-field YC separation A. When the high-frequency component passes through one of the horizontal direction C signal extracting filter 2035, the vertical direction C signal extracting filter 2036, and the horizontal and vertical direction C signal extracting filter 2037, C signals are obtained.

Second, a high frequency component on the three-dimensional frequency space including C signals can be taken out by a difference between the particular sampling point (★) and the sampling point (●) shown in FIG. 17. This is defined as an inter-field YC separation B. When thus obtained high-frequency component passes through one of the horizontal direction C signal extracting filter 2035, the vertical direction C signal extracting filter 2036, and the horizontal and vertical direction C signal extracting filter 2037, C signals are obtained.

Third, a high frequency component on the three-dimensional frequency space including C signals can be taken out by a difference between the particular sampling point (★) and the sampling point (●) shown in FIG. 17. This is defined as an inter-field YC separation C. When thus obtained high-frequency component passes through one of the horizontal direction C signal extracting filter 2035, the vertical direction C signal extracting filter 2036, and the horizontal and vertical direction C signal extracting filter 2037, C signals are obtained.

In order to adaptively control the switching of these inter-field YC separations A, B, and C, it is necessary to detect correlations between the particular sampling point (★) and the sampling points (●), and . Since V signals are input to the input terminal 2011, horizontal low-pass frequency component of a difference between two sampling points having opposite phases in the n−1 field and in the n+1 field is used to detect the correlation.

A description is given of operations of the inter-frame correlation detecting circuit 2062, the intra-field correlation detecting circuit 2063, and the intra-frame YC separating circuit 2064 shown in FIG. 12. In this fifth embodiment, when the motion detecting circuit 2080 judges an image to be a moving image, in place of the intra-field YC separating filter, an optimum filter is selected from Intra-frame YC separating filters including a plurality of inter-field operations and three kinds of intra-field operations.

In FIG. 13, the V signal 2101 input to the input terminal 2011 is delayed by 263 lines in the 263-line delay circuit 2014, and delayed by two pixels in the two-pixel delay circuit 2015, and further delayed by 262 lines in the 262-line delay circuit 2016.

The V signal delayed by two pixels in the two-pixel delay circuit 2015 and the output of the 262-line delay circuit 2016 are subtracted by the subtracter 2020, whereby an inter-field difference for the inter-field YC separation C is obtained.

The V signal delayed by two pixels in the two-pixel delay circuit 2015 and the output of the four-pixel delay circuit 2017 are subtracted by the subtracter 2021, whereby an inter-field difference for the inter-field YC separation B is obtained.

The V signal delayed by two pixels in the two-pixel delay circuit 2015 and the output of the two-pixel delay circuit 2019 are subtracted by the subtracter 2022, whereby an inter-field difference for the inter-field YC separation A is obtained.

These three kinds of inter-field differences are input to the signal selecting circuit 2034 and then selected by an output of the minimum value selecting circuit 2032 which is described later.

First, in order to select the inter-field YC separation A, it is necessary to find a difference absolute value between the sampling point in the n−1 field shown in FIG. 17 and the sampling point in the n+1 field shown in FIG. 18.

Then, in order to select the inter-field YC separation B, it is necessary to find a difference absolute value between the sampling point in the n−1 field shown in FIG. 17 and the sampling point in the n+1 field shown in FIG. 18.

Further, in order to select the inter-field YC separation C, a difference absolute value between the sampling point in the n−1 field shown in FIG. 17 and the sampling point in the n+1 filed shown in FIG. 18.

As the result, thus detected three kinds of inter-frame correlations are compared with each other to select and control the three kinds of inter-field YC separating filters.

In FIG. 13, the V signal 2101 input to the input terminal 2011 is applied to the 263-line delay circuit 2014 while it is applied to the input terminals of the one-line delay circuit 2023 and the two-pixel delay circuit 2025. The output of the 263-line delay circuit 2014 is used to constitute the three kinds of inter-field YC separating filters.

An output of the 262-line delay circuit 2016 and an output of the four-pixel delay circuit 2024 are subtracted by the subtracter 2026. An absolute value of the result is found in the absolute value circuit 2029 and input to the minimum value selecting circuit 2032, wherein a correlation between the sampling points and shown in FIGS. 17 and 18, respectively, is detected.

An output of the four-pixel delay circuit 2017 and an output of the one-line delay circuit 2023 are subtracted by the subtracter 2027. An absolute value of the result is found in the absolute value circuit 2030 and input to the minimum value selecting circuit 2032, wherein a correlation between the sampling points and shown in FIGS. 17 and 18, respectively, is detected.

An output of the two-pixel delay circuit 2019 and an output of the two-pixel delay circuit 2025 are subtracted by the subtracter 2028. An absolute value of the result is found in the absolute value circuit 2031 and input to the minimum value selecting circuit 2032, wherein a correlation between the sampling points and shown in FIGS. 17 and 18, respectively, is detected.

The minimum value selecting circuit 2032 selects the minimum value from the three absolute values, i.e., the maximum correlation between sampling points in three directions apart by one frame with the particular sampling point as a center, and then controls the signal selecting circuit 2034. The signal selecting circuit 2034 selects the output of the subtracter 2020 when the output of the absolute value circuit 2029 is the minimum, the output of the subtracter 2021 when the output of the absolute value circuit 2030 is the minimum, and the output of the subtracter 2022 when the output of the absolute value circuit 2031 is the minimum. The operation hereinafter is the same as the circuit shown in FIG. 2.

In this way, according to the fifth embodiment of the present invention, correlations in a plurality of directions between frames are partially detected by the difference between sampling points having the same phases of color sub-carrier between frames, thereby to detect the correlation between frames. Therefore, a direction to which the image moves is detected and an inter-field operation adaptive to that direction is possible.

Also in this fifth embodiment, by adaptively switching the inter-field processes, no deterioration in resolution occurs as shown in FIG. 108(*a*) when the image moves in some direction, so that crosstalks of the Y signals and the C signals are reduced.

A description is given of a circuit deciding which one is to be selected from the horizontal direction C signal extracting filter 2035, the vertical direction C signal extracting filter 2036, and the horizontal and vertical direction C signal extracting filter 2037.

Figure 15:
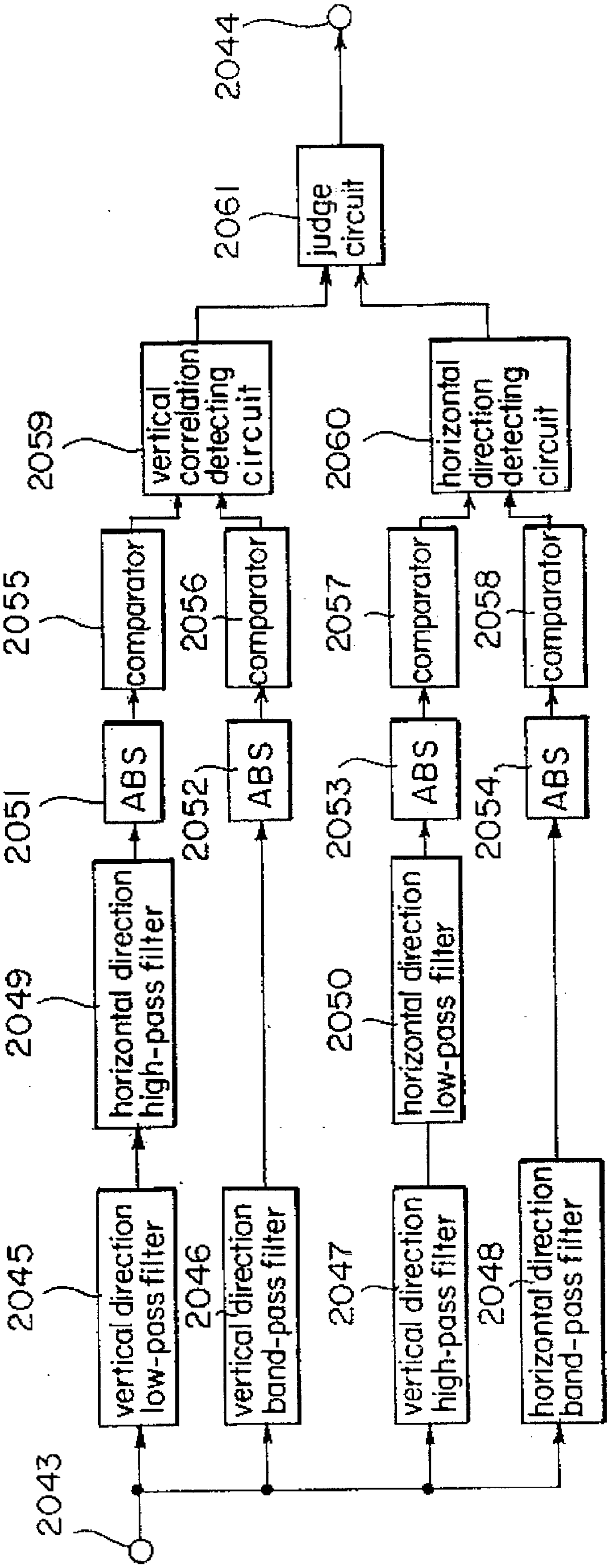
FIG. 15 is a block diagram showing a first example of an inter-field correlation detecting circuits shown in FIGS. 13 and 14.

FIG. 15 is a block diagram showing an embodiment of the intra-field correlation judge circuit 2033. The structure and operation of this circuit are identical to those of the intra-field correlation judge circuit 1031 shown in FIG. 6.

[Embodiment 6]

While in the above-described fifth embodiment three kinds of inter-field YC separating filters are adaptively switched in the intra-frame YC separating circuit 2064, this sixth embodiment an intra-field YC separating filter is added to the inter-field YC separating filters and an optimum one is selected from the four filters.

Figure 14:
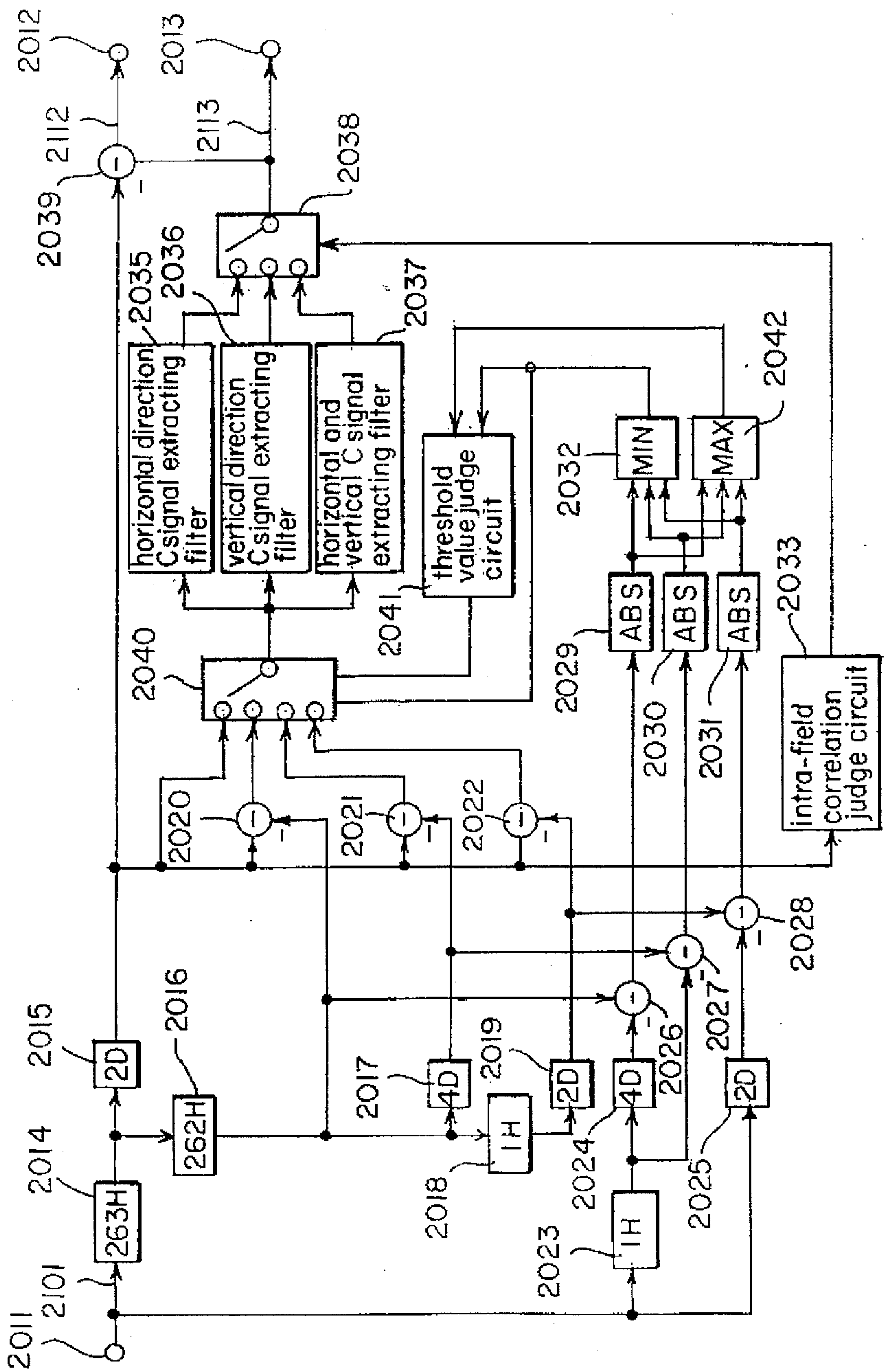
FIG. 14 is a block diagram showing second examples of the inter-frame correlation detecting circuit, the intra-field correlation detecting circuit, and the intra-frame YC separating circuit shown in FIG. 12.

FIG. 14 is a block diagram showing another embodiment of the inter-frame correlation detecting circuit 2062, the intra-field correlation detecting circuit 2063, and the intra-frame YC separating circuit 2064 shown in FIG. 12. In FIG. 14, the same reference numerals as those in FIG. 13 designate the same or corresponding parts. A signal selecting circuit 2040 selects and outputs one of four inputs thereof. A threshold value judge circuit 2041 judges whether two inputs thereof exceed a threshold value or not and outputs a control signal. A maximum value selecting circuit 2042 decides the maximum value from three inputs thereof and outputs a control signal.

In FIG. 14, the only difference from the circuit shown in FIG. 13 resides in the inter-frame correlation detecting circuit which adaptively controls the signal selecting circuit 2040, so that only the inter-frame correlation detecting circuit will be described hereinafter.

An output of the two-pixel delay circuit 2015 is input to first input terminals of the subtracters 2020, 2021 and 2022 while it is input to the signal selecting circuit 2040. This input does not perform an inter-field operation and when this input is selected in the signal selecting circuit 2040, only the intra-field YC separation is carried out.

An output of the absolute value circuit 2029 is input to the minimum value selecting circuit 2032 and the maximum value selecting circuit 2042. An output of the absolute value circuit 2030 is input to the minimum value selecting circuit 2032 and the maximum value selecting circuit 2042. An output of the absolute value circuit 2031 is input to the minimum value selecting circuit 2032 and the maximum value selecting circuit 2042.

An output of the maximum value selecting circuit 2042 is input to the first input terminal of the threshold value judge circuit 2041. An output of the minimum value selecting circuit 2032 is input to the second input terminal of the threshold value judge circuit 2041 and the fifth input terminal of the signal selecting circuit 2040. An output of the threshold value judge circuit 2041 is input to the sixth input terminal of the signal selecting circuit 2040. The threshold value judge circuit 2041 controls the signal selecting circuit 2040 so that it may select the output of the two-pixel delay circuit 2015 when the maximum value of the three kinds of inter-frame correlations is smaller than the first threshold value α or when the minimum value of the three kinds of inter-frame correlations is larger than the second threshold value β. On the other hand, when the threshold value judge circuit 2041 judges the maximum value of the three kinds of inter-frame correlations to be larger than the first threshold value α or when it judges the minimum value of the three kinds of inter-frame correlations to be smaller than the second threshold value β, the signal selecting circuit 2040 is controlled by the output of the minimum value selecting circuit 2032 to select the output of the subtracter 2020 when the output of the absolute value circuit 2029 is the minimum, the output of the subtracter 2021 when the output of the absolute value circuit 2030 is the minimum, and the output of the subtracter 2022 when the output of the absolute value circuit 2031 is the minimum. Here, α and β have a relation of $\alpha<\beta$.

An output from the signal selecting circuit 2040 passes through one of the horizontal direction C signal extracting filter 2035, the vertical direction C signal extracting filter 2036, and the horizontal and vertical direction C signal extracting filter 2037, whereby C signals are extracted. These filters 2035, 2036 and 2037 are the same as those shown in FIG. 13 and outputs thereof are input to the signal processing circuit 2038. The intra-field correlation judge circuit 2033 operates in the same way as that of FIG. 13 and controls the signal selecting circuit 2038.

An output of the signal selecting circuit 2038 is output from the output terminal 2013 as an intra-frame YC separated C signal 2113. On the other hand, the intra-frame YC separated C signal 2113 is subtracted from the V signal which is output from the two-pixel delay circuit 2015 by a subtracter 2039, whereby an intra-frame YC separated Y signal 2112 is obtained.

According to the sixth embodiment of the present invention, correlations in a plurality of directions between frames are partially detected and when a correlation is present in some direction, the inter-field operations are adaptively switched in accordance with the result of the detection. When no correlation is present, no inter-field operation is performed. Therefore, a deterioration in quality of image caused by the inter-field operation performed when the image is at a standstill is avoided.

Also in this sixth embodiment of the present invention, by switching the inter-field processes adaptively, no deterioration in resolution occurs as shown in FIG. 108(*a*) when the image moves in some direction, so that crosstalks of the Y signals and the C signals are reduced.

In accordance with the above-described fifth and sixth embodiments of the present invention, when an moving image is detected by the motion detecting circuit, in the intra-frame YC separating filter, correlations between frames are partially detected and a plurality of inter-field processes are adaptively switched in accordance with the result of the detection. Further, correlations in the field are partially detected and a plurality of intra-field processes are adaptively switched in accordance with the result of the detection. Therefore, while processing the moving image by the motion adaptive YC separating filter, an optimum YC separation is possible utilizing the correlation of the image, resulting in a motion adaptive YC separating filter which performs a YC separation with less deterioration in resolution.

[Embodiment 7]

Figure 22:
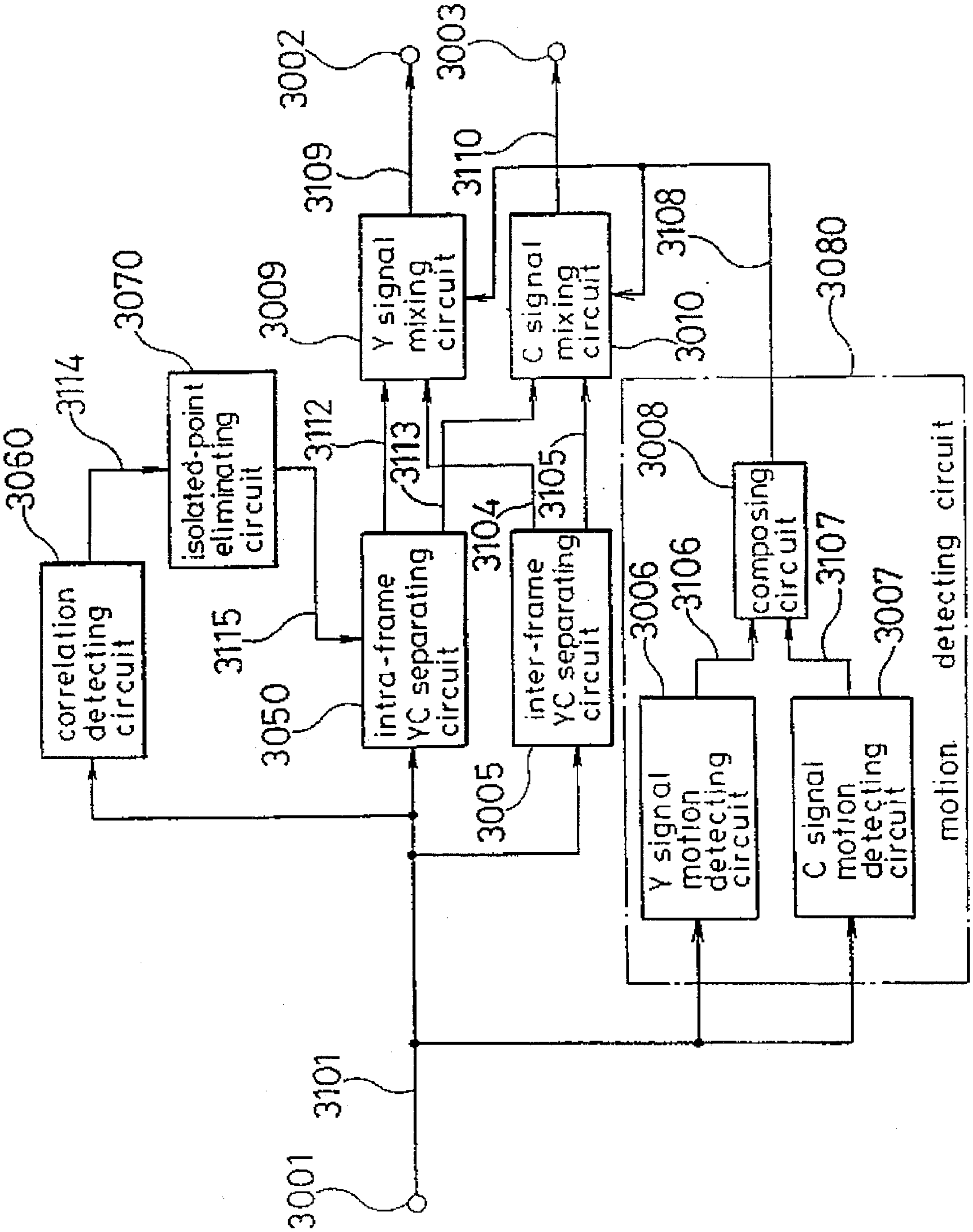
FIG. 22 is a block diagram showing a YC separating filter adaptive to a movement of an image in accordance with an embodiment of the present invention.
Figure 100:
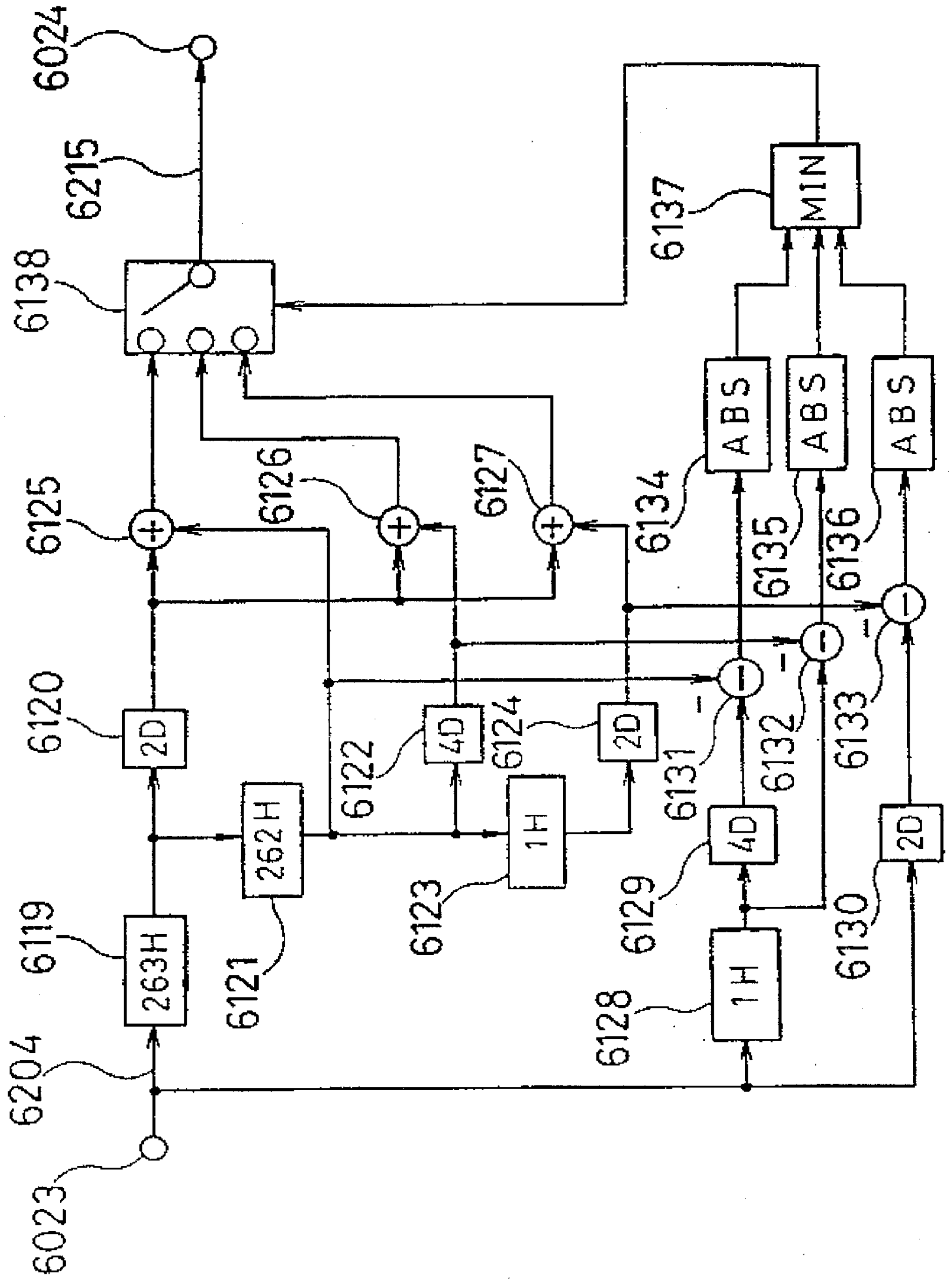
FIG. 100 is a block diagram showing third examples of the intra-frame correlation detecting circuit and the intra-frame C signal extracting filter shown in FIG. 90.

FIG. 22 is a block diagram showing a motion adaptive YC separating filter in accordance with a seventh embodiment of the present invention. In FIG. 22, the intra-field YC separating circuit 1004 shown in FIG. 100 is replaced by an intra-frame YC separating circuit 3050, a correlation detecting circuit 3060, and an isolated point eliminating circuit 3070, and other structures are the same as those shown in FIG. 110. Therefore, only the circuits 3050, 3060, and 3070 will be described.

In FIG. 22, V signals 3101 are input to a first input terminal of an intra-frame YC separating circuit 3050 and an input terminal of a correlation detecting circuit 3060. An output 3114 of the correlation detecting circuit 3060 is input to an input terminal of an isolated point eliminating circuit 3070. An output 3115 of the isolated point eliminating circuit 3070 is input to a second input terminal of the intra-frame YC separating circuit 3050. An output of the intra-frame YC separating circuit 3050 is output as an intra-frame YC separated Y signal 3112 and as an intra-frame YC separated C signal 3113.

According to this seventh embodiment of the present invention, correlation in a plurality of directions between frames or between fields are partially detected and when the result of the detection at a particular sampling point is judged to be an isolated point, the isolated point is eliminated and a plurality of intra-frame processes are adaptively switched in accordance with the result.

FIG. 23 is a block diagram showing a first example of the isolated point eliminating circuit 3070 of FIG. 22. In FIG. 23, signal 3114 is input to the input terminal 3014. The signal 3114 is input to input terminals of a one-line delay circuit 3012*a* and a one-pixel delay circuit 3020*a* and a third input terminal of a counting circuit. An output of the one-pixel delay circuit 3020*a* is input to the input terminal of the one-pixel delay circuit 3021*a* and the second input terminal of the counting circuit 3035*a*. An output of the one-pixel delay circuit 3021*a* is input to the first input terminal of the counting circuit 3035*a*.

An output of the one-line delay circuit 3012*a* is input to input terminals of a one-line delay circuit 3013*a* and a one pixel delay circuit 3024*a* and a sixth input terminal of the counting circuit 3035*a*. An output of the one-pixel delay circuit 3024*a* is input to the input terminal of the one-pixel delay circuit 3025*a* and a fifth input terminal of the counting circuit 3035*a*. An output of the one-pixel delay circuit 3025*a* is input to a fourth input terminal of the counting circuit 3035*a*.

An output of the one-line delay circuit 3013*a* is applied to an input terminal of a one-pixel delay circuit 3028*a* and a ninth input terminal of the counting circuit 3035*a*. An output of the one-pixel delay circuit 3028*a* is input to an input terminal of the one-pixel delay circuit 3029*a* and an eighth input terminal of the counting circuit 3035*a*. An output of the one-pixel delay circuit 3029*a* is input to a seventh input terminal of the counting circuit 3035*a*.

A first output of the counting circuit 3035*a* is input to a first input terminal of a majority circuit 3046*a*, a second output thereof is input to a second input terminal of the majority circuit 3046*a*, and a third output thereof is input to a third input terminal of the majority circuit 3046*a*. An output of the majority circuit 3046*a* is output from the output terminal 3015 as a selecting signal 3115.

FIG. 25 is a block diagram showing a first example of the correlation detecting circuit 3060 of FIG. 22. In FIG. 25, V signal 3101 is input to an input terminal 3019 and then applied to input terminals of a five hundreds and twenty five-line delay circuit (hereinafter referred to as 525-line delay circuit) 3011*b*, a one-line delay circuit 3015*b* and a two-pixel delay circuit 3017*b*.

An output of the one-line delay circuit 3015*b* is input to an input terminal of a four-pixel delay circuit 3016*b* and an input terminal of a subtracter 3019*b*. An output of the four-pixel delay circuit 3016*b* is input to a first input terminal of a subtracter 3018*b*. An output of the two-pixel delay circuit 3017*b* is input to a first input terminal of a subtracter 3020*b*.

An output of the 525-line delay circuit 3011*b* is input to a second input terminal of the subtracter 3018*b* and input terminals of a four-pixel delay circuit 3012*b* and a one-line delay circuit 3013*b*. An output of the one-line delay circuit 3013*b* is input to an input terminal of a two-pixel delay circuit 3014*b*. An output of the four-pixel delay circuit 3012*b* is input to the second input terminal of the subtracter 3019*b* and an output of the two-pixel delay circuit 3014*b* is input to the second input terminal of the subtracter 3020*b*.

An output of the subtracter 3018*b* is input to an input terminal of an absolute value circuit 3021*b*, an output of the subtracter 3019*b* is input to an input terminal of an absolute value circuit 3022*b*, and an output of the subtracter 3020*b* is input to an input terminal of an absolute value circuit 3023*b*. An output of the absolute value circuit 3021*b* is input to a first input terminal of a minimum value selecting circuit 3024*b*, an output of the absolute value circuit 3022*b* is input to a second input terminal of a minimum value selecting circuit 3024*b*, and an output of the absolute value circuit 3023*b* is input to a third input terminal of a minimum value selecting circuit 3024*b*. An output of the minimum value selecting circuit 3024*b* is output from the output terminal 3020 as a correlation signal 3114.

Figure 28:
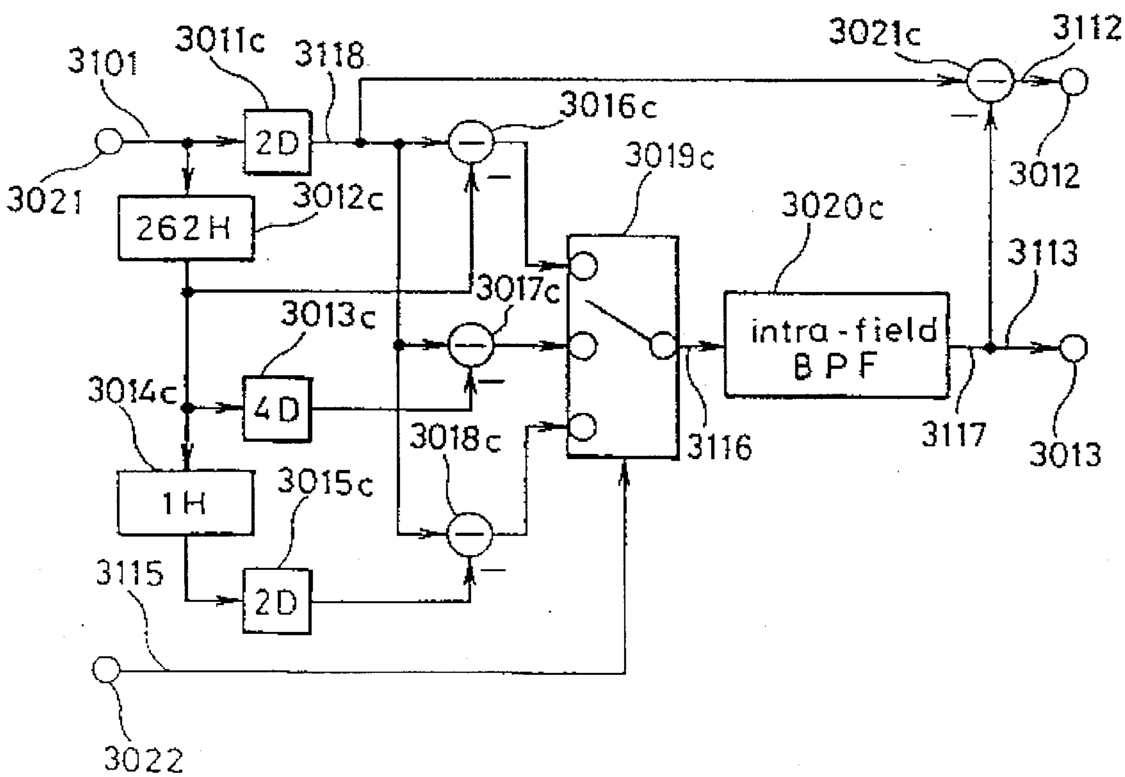
FIG. 28 is a block diagram showing a first example of an intra-frame YC separating circuit shown in FIG. 22.

FIG. 28 is a block diagram showing a first example of the intra-frame YC separating circuit 3050 shown in FIG. 22. In FIG. 28, V signal 3101, input to the input terminal 3021, is applied to input terminals of a two-pixel delay circuit 3011*c* and a 262-line delay circuit 3012*c*.

An output of the two-pixel delay circuit 3011*c* is input to first input terminals of subtracters 3021*c*, 3016*c*, 3017*c*, and 3018*c*. An output of the 262-line delay circuit 3012*c* is input to a second input terminal of the subtracter 3016*c* and input terminals of a four-pixel delay circuit 3013*c* and a one-line delay circuit 3014*c*.

An output of the four-pixel delay circuit 3013*c* is input to a second input terminal of the subtracter 3017*c*. An output of the one-line delay circuit 3014*c* is input to an input terminal of the two-pixel delay circuit 3015*c*. An output of the two-pixel delay circuit 3015*c* is input to an input terminal of the subtracter 3018*c*.

An output of the subtracter 3016*c* is input to a first input terminal of a signal selecting circuit 3019*c*, an output of the subtracter 3017*c* is input to a second input terminal of a signal selecting circuit 3019*c*, and an output of the subtracter 3018*c* is input to a third input terminal of a signal selecting circuit 3019*c*. The selecting signal 3115 input to the input terminal 3022 is applied to a fourth input terminal of the signal selecting circuit 3019*c*, whereby first to third inputs of the signal selecting circuit 3019*c* are selected and controlled.

An output 3116 of the signal selecting circuit 3019*c* is input to an intra-field BPF 3020*c*. An output 3117 of the intra-field BPF 3020*e* is input to a second input terminal of a subtracter 3021*e* while it is output from the output terminal 3013 as an intra-frame YC separated C signal 3113. An output of the subtracter 3021*c* is output from the output terminal 3012 as an intra-frame YC separated Y signal 3112.

Figure 32:
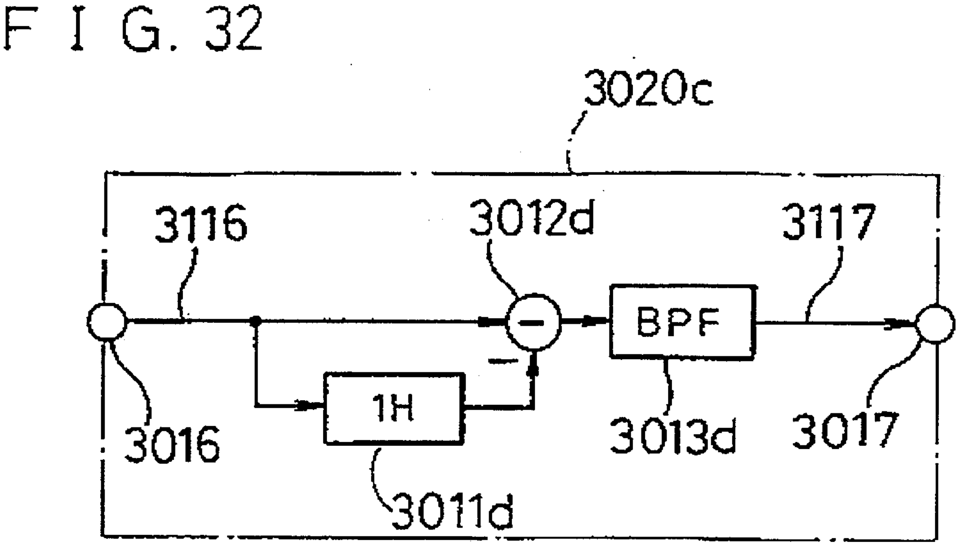
FIG. 32 is a block diagram showing an intra-field BPF in the intra-frame YC separating circuits shown in FIGS. 28 and 29.

FIG. 32 is a block diagram showing the intra-field BPF 3020*c* shown in FIG. 28. In FIG. 32, signal 3116 input to the input terminal 3016 is applied to a first input terminal of a subtracter 3012*d* and an input terminal of a one-line delay circuit 3011*d*.

An output of the one-line delay circuit 3011*d* is input to a second input terminal of a subtracter 3012*d*. An output of the subtracter 3012*d* is input to an input terminal of a BPF 3013*d* and an output 3117 of the BPF 3013*d* is output from the output terminal 3017.

A description is given of the operation.

Figure 34:
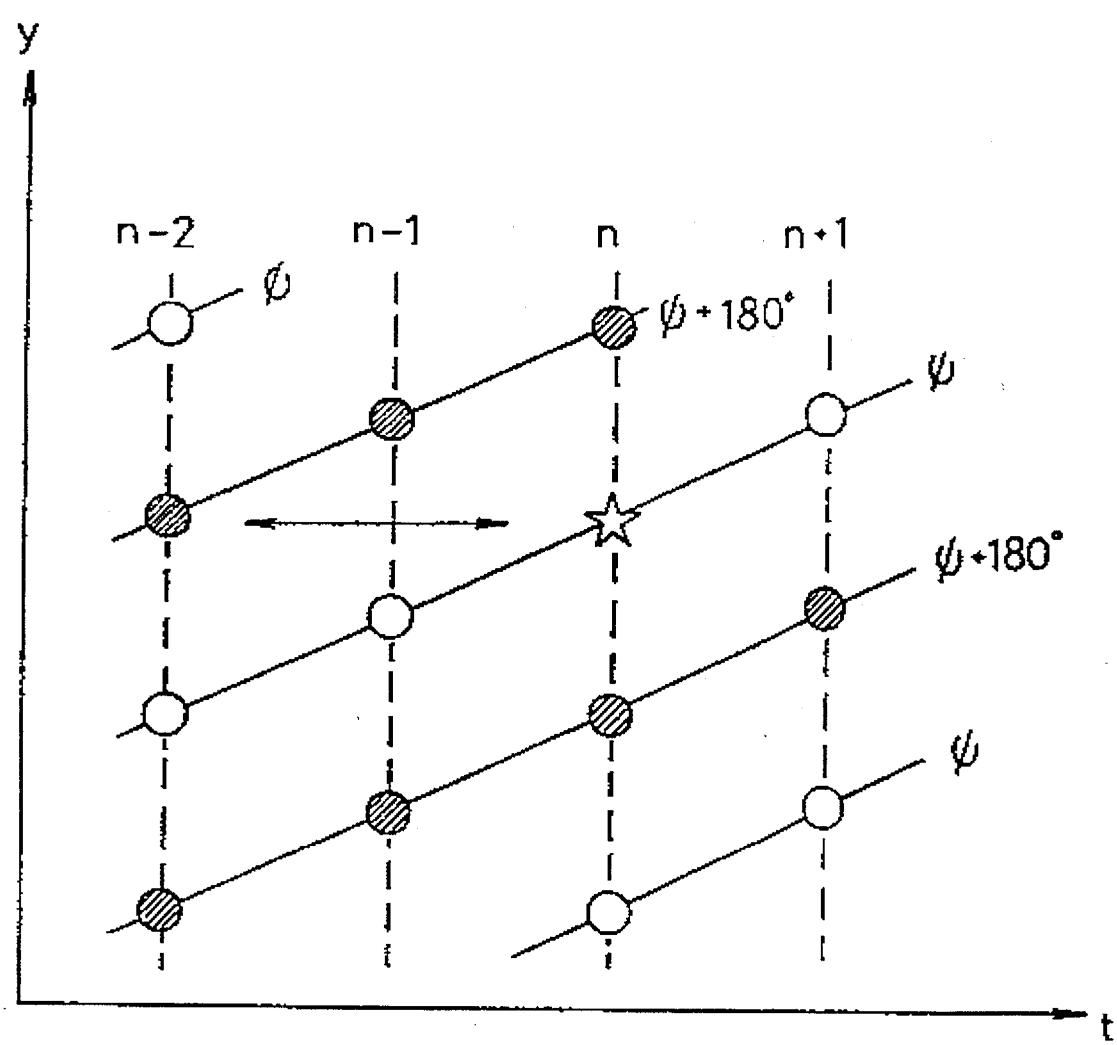
FIG. 34 is a plan view showing an arrangement of the same V signal, by the t-axis and the y-axis.
Figure 35:
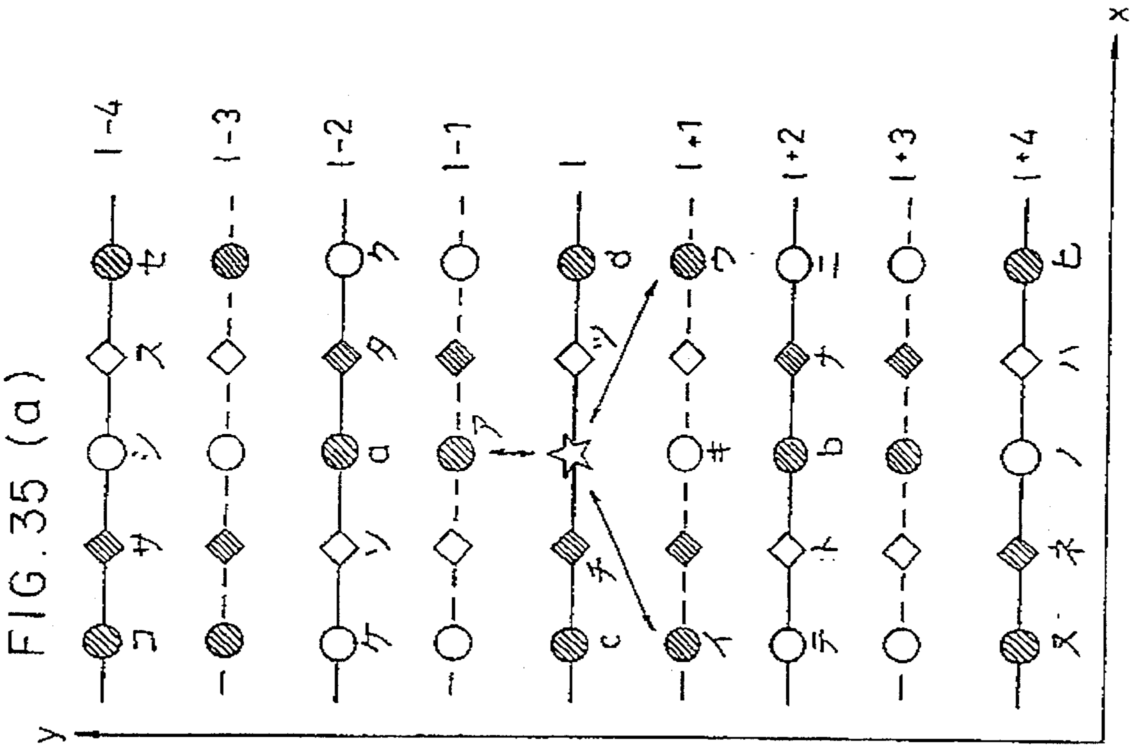
FIG. 35 is a plan view showing an arrangement of the same V signal by the x-axis and the y-axis.
Figure 35B:
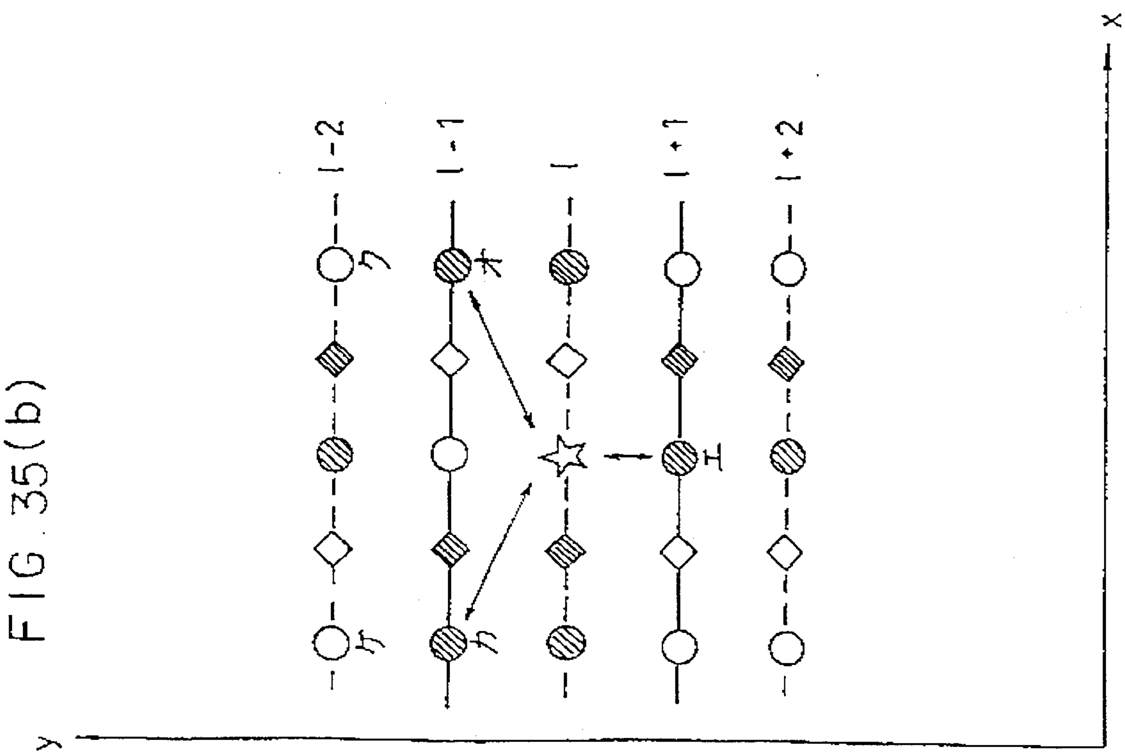
Figure 36:
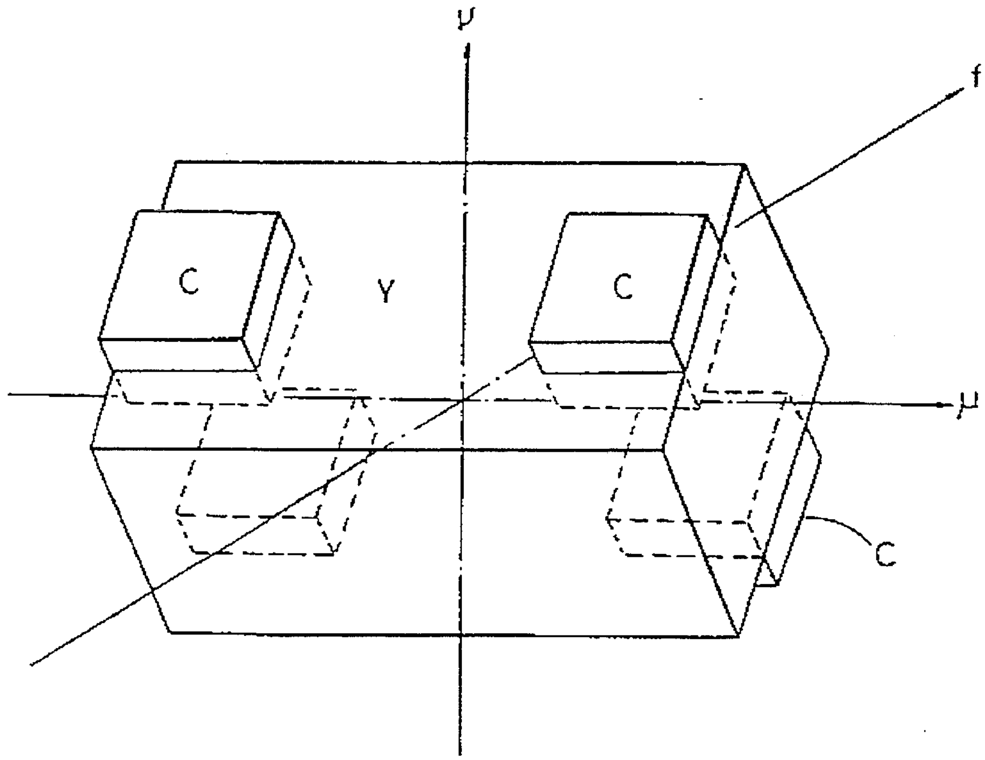
FIGS. 36(*a*) to 36(*c*) are a perspective view, a view from the minus side of the f-axis, and a view from the plus side of the μ-axis, of a spectral dispersion of V signals in the three-dimensional frequency space.
Figure 36:
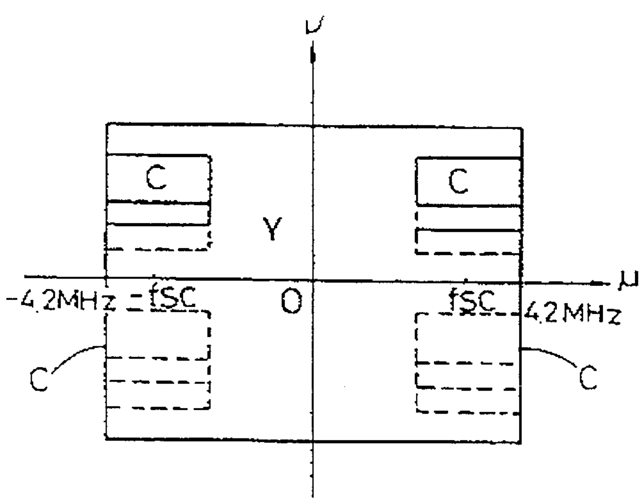
Figure 36:
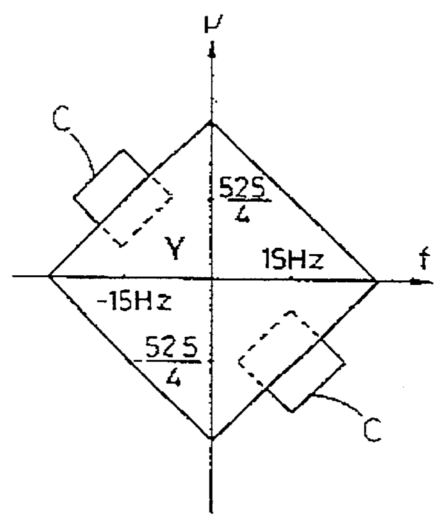
Figure 37:
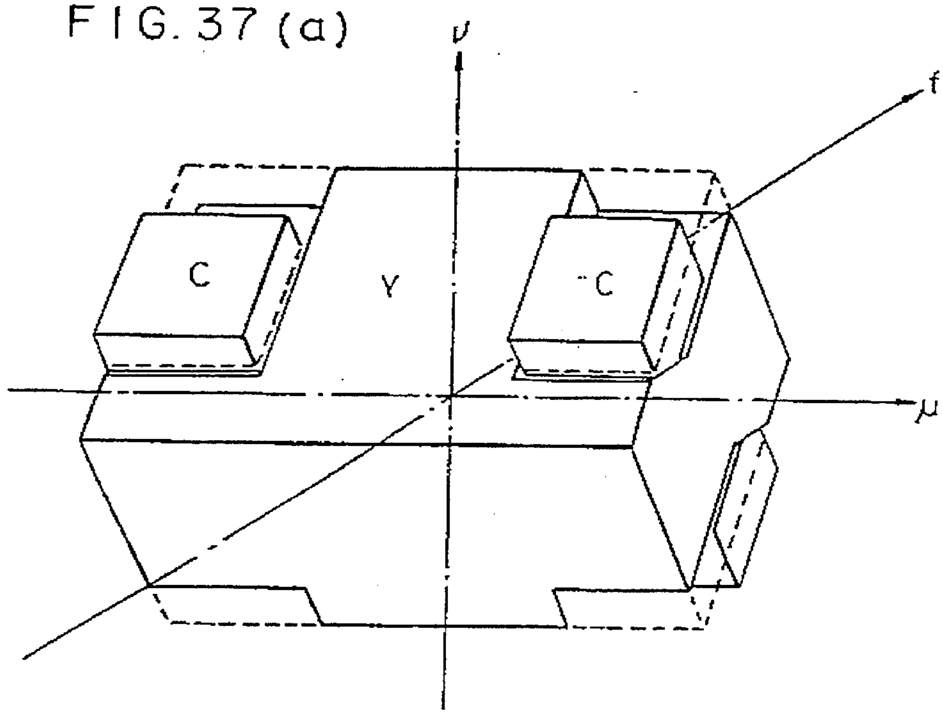
FIGS. 37(*a*) to 37(*c*) are a perspective view, a view from the minus side of the f-axis, and a view from the plus side of the μ-axis, of a spectral dispersion of Y signals and C signals obtained by an inter-field YC separation A1, in the three-dimensional frequency space.
Figure 37:
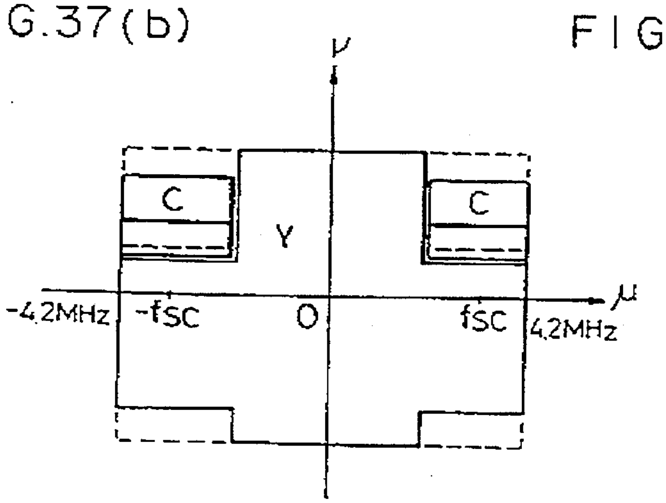
Figure 37:
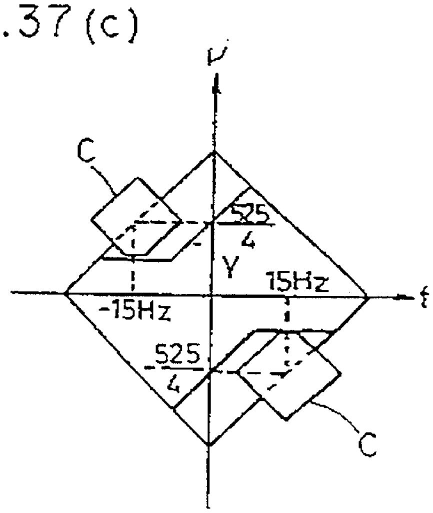

FIGS. 34 and 35 show three-dimensional time spaces similar to those shown in FIGS. 7 and 8. FIGS. 36(*a*) to 36(*c*) show projections of the three-dimensional frequency spaces similar to those shown in FIGS. 9, 10, and 11. In FIG. 35(*a*), a hand band component on the three-dimensional frequency space including C signals is taken out by a difference between a particular sampling point (★) and a sampling point (●). When the high-band component passes through the intra-field BPF, C signals are obtained. In addition, Y signals are obtained by subtracting the C signals form the V signals. This is defined as an inter-field YC separation A1. FIGS. 37(*a*) to 37(*c*) also show three-dimensional frequency spaces, in which Y signals and C signals obtained by the inter-field YC separation A1 are present.

In FIG. 35(*a*), a high-frequency component including C signals on the three-dimensional frequency space is taken out by a difference between a particular sampling point (★) and a sampling point (●). When the high-frequency component passes through the intra-field BPF, C signals are obtained. In addition, Y signals are obtained by subtracting the C signals from the V signals. This is defined as an inter-field YC separation B1.

Figure 38:
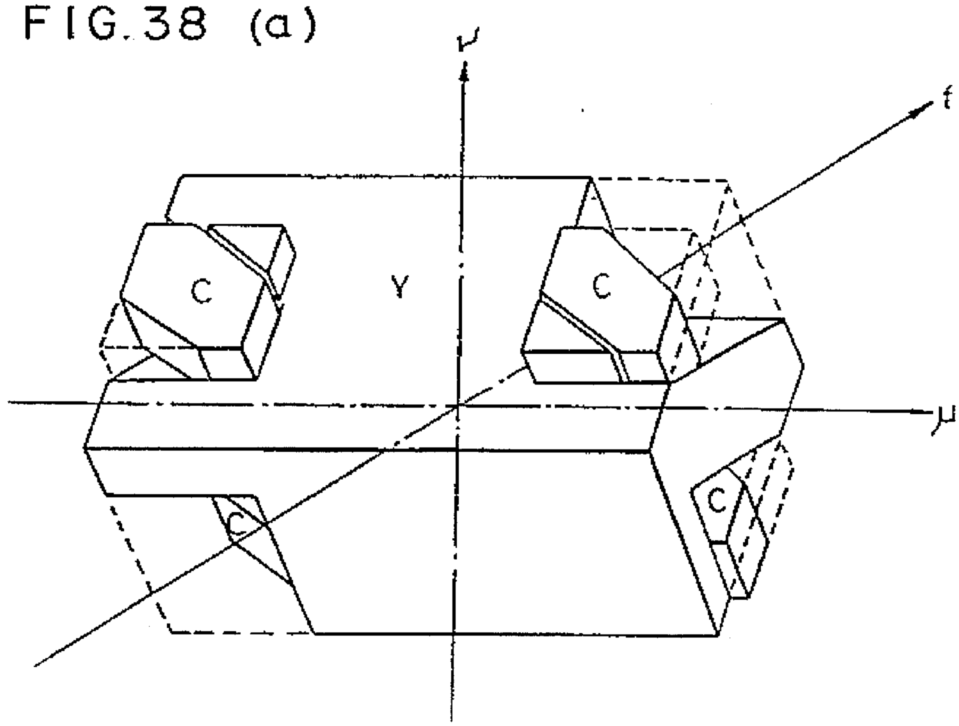
FIGS. 38(*a*) to 38(*c*) are a perspective view, a view from the minus side of the f-axis, and a view from the plus side of the μ-axis, of a spectral dispersion of Y signals and C signals obtained by an inter-field YC separation B1, in the three-dimensional frequency space.
Figure 38:
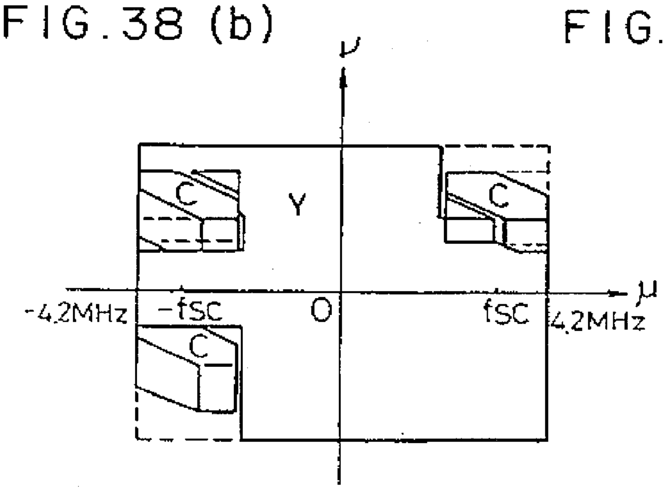
Figure 38C:
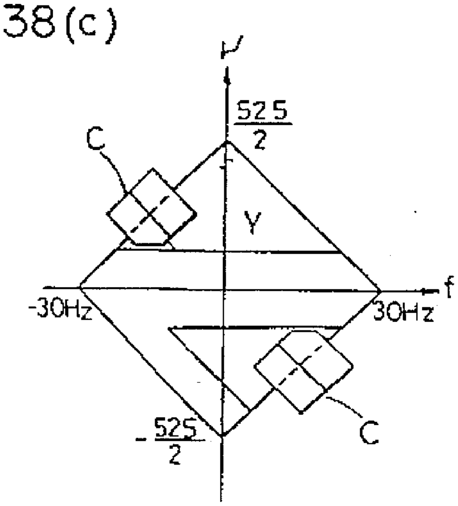

FIGS. 38(*a*) to 38(*c*) also show frequency spaces in which Y signals and C signals obtained by the inter-field YC separation B1 are present. Although it seems that a part of the C signals is included in the Y signals in FIGS. 38(*a*) to 38(*c*), the C signals are hardly included in the Y signals because the correlation between the Y signals and C signals is strong.

In FIG. 35(*a*), a high-frequency component including C signals on the three-dimensional frequency space is taken out by a difference between a particular sampling point (★) and a sampling point (●). When the high-frequency component passes through the intra-field BPF, C signals are obtained. In addition, Y signals are obtained by subtracting the C signals from the V signals. This is defined as an inter-field YC separation C1.

Figure 39:
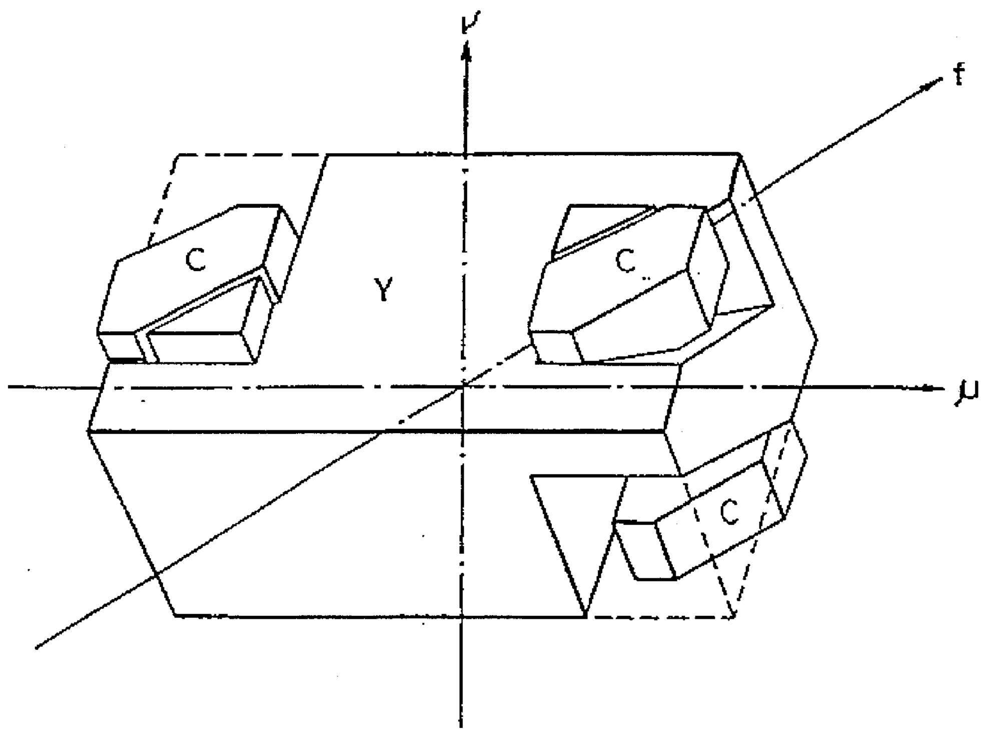
FIGS. 39(*a*) to 39(*c*) are a perspective view, a view from the minus side of the f-axis, and a view from the plus side of the μ-axis, of a spectral dispersion of Y signals and C signals obtained by an inter-field YC separation C1, in the three-dimensional frequency space.
Figure 39:
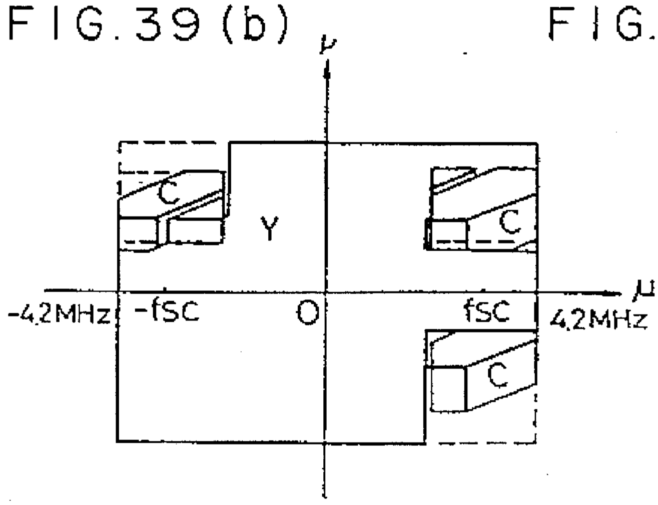
Figure 39:
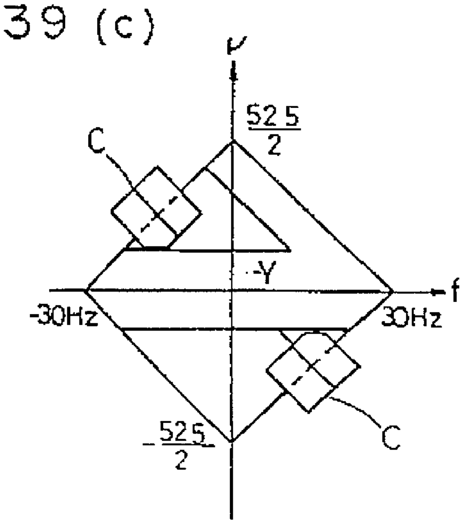

FIGS. 39(*a*) to 39(*c*) also show frequency spaces in which Y signals and C signals obtained by the inter-field YC separation C1 are present. Although it seems that a part of the C signals is included in the Y signals in FIGS. 39(*a*) to 39(*c*), the C signals are hardly included in the Y signals because the correlation between the Y signals and C signals is strong.

In order to adaptively control the switching of these inter-field YC separations A1, B1, and C1, a correlation of the image is found by operating sampling points in the directions connecting the particular sampling point (★) to the sampling points (●), , and , and then an isolated point is eliminated from the correlation of the particular sampling point and the correlations of the neighboring sampling points, whereby a control signal is obtained.

The intra-frame YC separating circuit 3050 and the correlation detecting circuit 3060 and the isolated point eliminating circuit 3070 shown in FIG. 22 operate as follows. In this seventh embodiment of the present invention, when the motion detecting circuit 3080 judges that the image is a moving image, an optimum one is selected from intra-frame YC separations including three kinds of inter-field operations by the most numerous correlation among correlations of the particular sampling point and the neighboring sampling points and then the selected YC separation is used in place of the intra-field YC separation.

In FIG. 22, the V signal 3101 is input to the correlation detecting circuit 3060 and a correlation of image is detected. Then, the detected result is input to the isolated point eliminating circuit 3070 and when it is an isolated point, the most numerous result among the detected correlations of the particular sampling point and the neighboring sampling points is determined as the correlation of the particular sampling point. On the other hand, when the V signal is input to the intra-frame YC separating circuit 3050, one of the three kinds of intra-frame YC separation including the inter-field operations is selected by the result of the correlation determined by the isolated point eliminating circuit 3070, and the intra-frame YC separated Y signal 3112 and the intra-frame YC separated C signal 3113 are output.

The intra-frame YC separating circuit 3050 shown in FIG. 22 operates as follows. In FIG. 28, the V signal 3101 input to the input terminal 3021 is delayed by two pixels in the two-pixel delay circuit 3011*c* and delayed by 262 lines in the 262-line delay circuit 3012*c*.

An output of the two-pixel delay circuit 3011*c* and an output of the 262-line delay circuit 3012*c* are subtracted by the subtracter 3016*c*, resulting in an inter-field difference for the inter-field YC separation C1.

The output of the two-pixel delay circuit 3011*c* and the output delayed by four pixels in the four-pixel delay circuit 3013*c* are subtracted by the subtracter 3017*c*, resulting in an inter-field difference for the inter-field YC separation B1.

The output of the two-pixel delay circuit 3011*c* and the output delayed by one line and by two pixels in the one-line delay circuit 3014*c* and in the two-pixel delay circuit 3015*c*, respectively, are subtracted by the subtracter 3018*c*, resulting in an inter-field difference for the inter-field YC separation A1.

These three kinds of inter-field differences are selected in the signal selecting circuit 3019*c* by the selecting signal 3115 output from the isolated point eliminating circuit 3070.

Furthermore, the output 3116 of the signal selecting circuit 3019*c* passes through the intra-field BPF 3020*c* to be subjected to a two-dimensional band restriction, resulting in an intra-frame YC separated C signal 3113.

The intra-frame YC separated C signal 3113 is subtracted from the output 3118 of the two-pixel delay circuit 3011*c* by the subtracter 3021*c*, leaving an intra-frame YC separated Y signal 3112.

According to the seventh embodiment of the present invention, the isolated point eliminating circuit detects directions in which inter-field correlations are present with respect to the particular sampling point and the neighboring sampling points from the output of the correlation detecting circuit and selects the most numerous direction to decide the inter-field correlation at the particular-sampling point. When the particular sampling point is judged to be an isolated point, the isolated point is eliminated and then a plurality of intra-frame processes including the inter-field operations are adaptively switched by the result. As a result, the detection of correlation is possible after eliminating the isolated point.

Also in this seventh embodiment of the present invention, by switching the inter-field processes adaptively, no deterioration in resolution occurs as shown in FIG. 108(*a*) when the image moves in some direction, so that crosstalks of the Y signals and the C signals are reduced.

Figure 29:
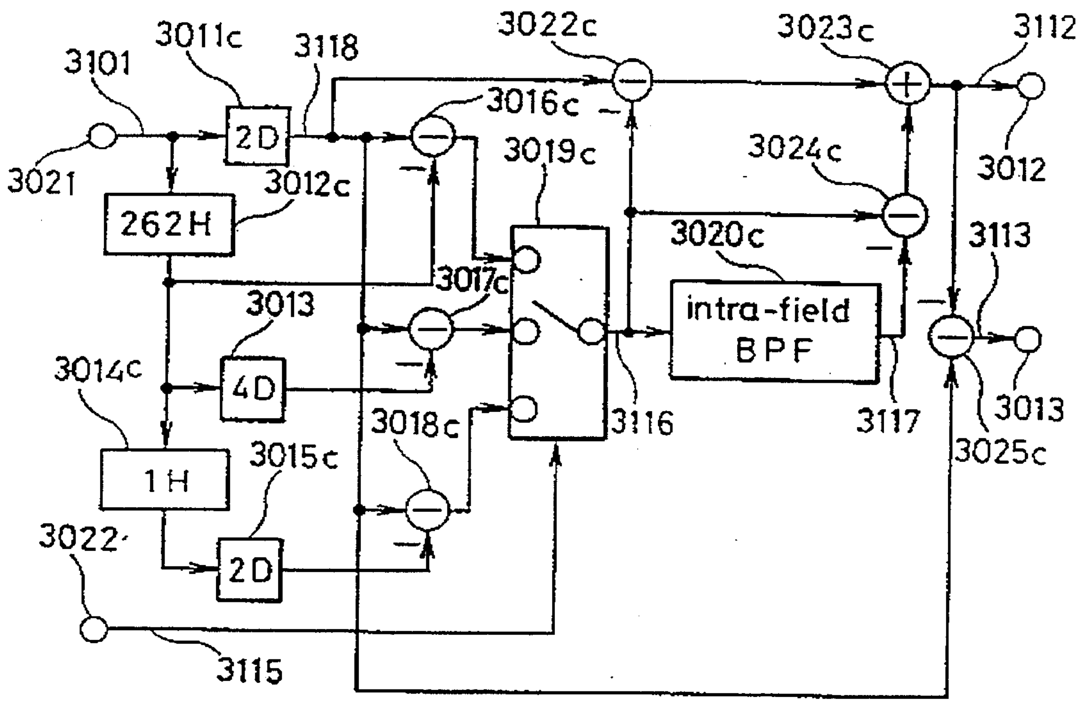
FIG. 29 is a block diagram showing a second example of the intra-frame YC separating circuit shown in FIG. 22.

FIG. 29 is a block diagram showing a second example of the intra-frame YC separating circuit 3050 shown in FIG. 22. In FIG. 29, the only difference from the circuit of FIG. 28 resides in the method for restricting the intra-field band, so that only the intra-field band restriction will be described hereinafter. In FIG. 29, the same reference numerals as those in FIG. 28 designate the same or corresponding parts.

An output of the signal selecting circuit 3019*c* is a high-frequency component on the three-dimensional frequency space found by any of the three kinds of inter-field operations. Therefore, when the output of the signal selecting circuit 3019*c* is subtracted from the output 3118 of the two-pixel delay circuit 3011*c* by the subtracter 3022*c*, a low-pass component on the three-dimensional frequency space in the direction in which the correlation is detected is obtained. Thus obtained low component on the three-dimensional frequency space is input to the first input terminal of an adder 3023*c*.

On the other hand, the output of the signal selecting circuit 3019*c* is subjected to a two-dimensional band restriction in the intra-field BPF 3020*c* and an output of the intra-field BPF 3020*c* is subtracted from the output of the signal selecting circuit 3019*c* by the subtracter 3024*c*, An output of the subtracter 3024*c* becomes a signal eliminated C signal from the three-dimensional frequency space high-frequency component on the three-dimensional frequency space high-frequency component on the three-dimensional frequency space. Then, the signal and the three-dimensional frequency space low-frequency component on the three-dimensional frequency space are added in the adder 3023*c*, resulting in an intra-frame YC separated Y signal 3112.

Then, the intra-frame YC separated Y signal 3112 is subtracted from the output 3118 of the two-pixel delay circuit 3011*c* by the subtracter 3025*c*, leaving an intra-frame YC separated C signal 3113.

Also in this embodiment, by switching the inter-field processes adaptively, no deterioration in resolution occurs as shown in FIG. 108(*a*) when the image moves in some direction, so that crosstalks of the Y signals and the C signals are reduced.

The operation of the intra-field BPF 3020*c* shown in FIGS. 28 and 29 will be described with reference to FIG. 32. In FIG. 32, only a vertical high-frequency component of the output 3116 from the signal selecting circuit 3019*c* (not shown) is extracted while the output 3116 passes through the one-line delay circuit 3011*d* and the subtracter 3012*d*, and only a horizontal high-frequency component thereof is extracted by the BPF 3013*d*. Thus, the two-dimensional band restriction is carried out.

Figure 33:
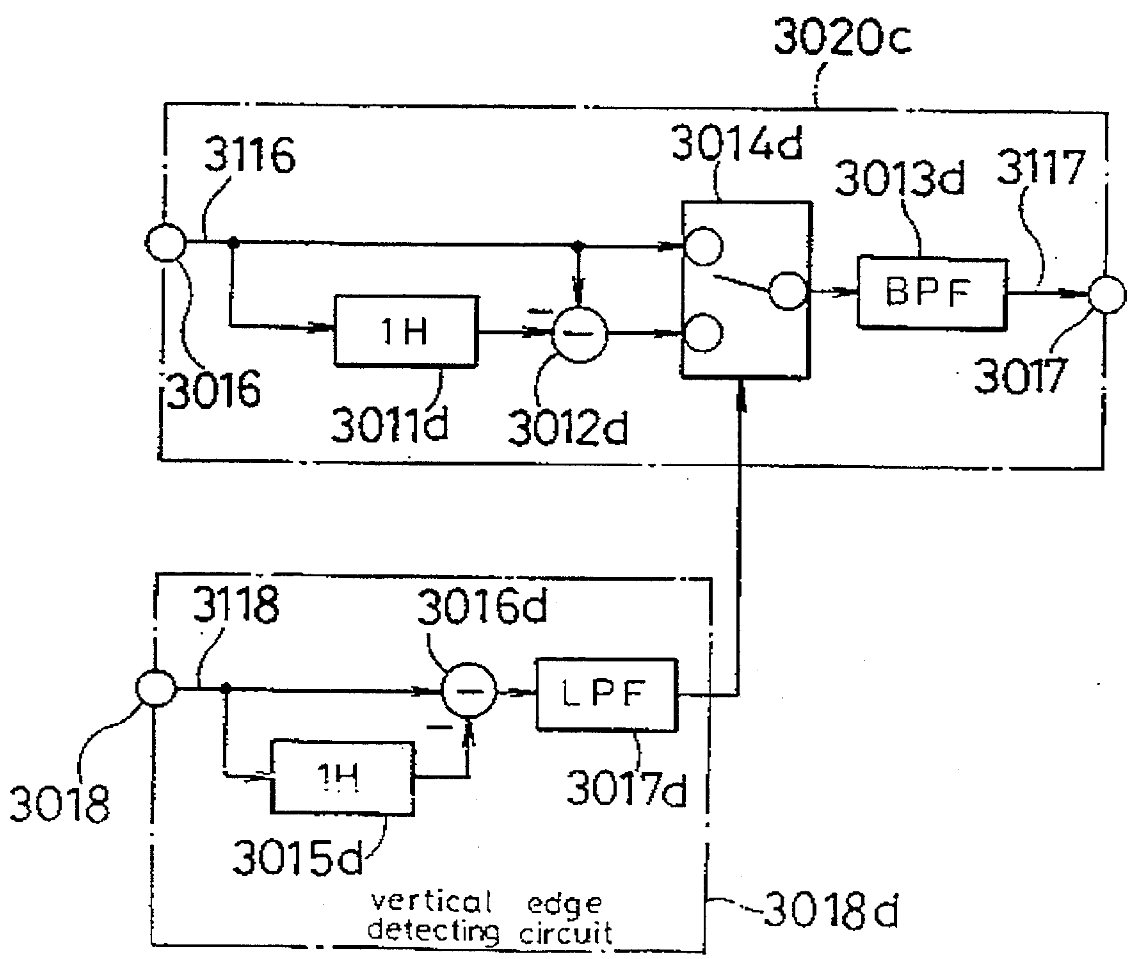
FIG. 33 is a block diagram showing another example of the intra-field BPF in the intra-frame YC separating circuits shown in FIGS. 28 and 29.

Alternatively, the intra-field BPF 3020*c* may be constituted like shown in FIG. 33. In FIG. 33, the output 3116 from the signal selecting circuit 3019*c* (not shown) is directly input to the first input terminal of the signal selecting circuit 3014*d*. On the other hand, the output 3116 passes through the one-line delay circuit 3011*d* and the subtracter 3012*d*, leaving only the vertical high-frequency component thereof, and then it is input to the second input terminal of the signal selecting circuit 3014*d*. The signal selecting circuit 3014*d* selects one of the two input signals in accordance with an output of a vertical edge detecting circuit 3018*d* which will be described later. An output of the signal selecting circuit 3014*d* passes through the BPF 3013*d*, leaving only the horizontal high-frequency component thereof. Thus, the two-dimensional band restriction is carried out.

A description is now given of the vertical edge detecting circuit 3018*d* shown in FIG. 33. The output 3118 of the two-pixel delay circuit 3011*c* shown in FIGS. 28 and 29 is input to the input terminal 3018 and a vertical high-frequency component thereof is extracted while passing through the one-line delay circuit 3015*d* and the subtracter 3016*d*. Further, C signal is eliminated while passing through the LPF 3017*d* whose pass band is 2.1 MHz and below, whereby a vertical edge of Y signal is detected to control the signal selecting circuit 3014*d*.

Since the V signal has a strong correlation between Y signal and C signal, when the vertical edge of the Y signal is detected, the C signal changes in the vertical direction in may cases. Accordingly, in the intra-field BPF 3020*c* shown in FIG. 33, when the vertical edge of the Y signal is detected, the signal selecting circuit 3014*d* selects the input terminal 3116 and the band restriction is carried out by the one-dimensional BPF including no band restriction in the vertical direction. When the vertical edge of the Y signal is not detected, the signal selecting circuit 3014*d* selects the output of the subtracter 3012*d* and the band restriction is carried out by the two-dimensional BPF including band restriction in the vertical direction.

In FIG. 33, the signal selecting circuit 3014*d* is replaced with a signal mixing circuit (not shown) and an output of the one-dimensional BPF is mixed with an output of the two-dimensional BPF in accordance with an output of the vertical edge detecting circuit 3018*d*, whereby the band restriction is carried out. More specifically, the signal mixing circuit mixes signals so that plenty of input signals 3116 may be mixed when the vertical edge detection amount of the Y signal is large and plenty of outputs from the subtracter 3012*d* may be mixed when the vertical edge detection amount of the Y signal is small.

While in FIGS. 32 and 33 the one-line delay circuit 3011*d* and the subtracter 3012*d* are used to extract the vertical high-frequency component, the vertical high-frequency component can be obtained by an operation utilizing a plurality of one-line delay circuits.

A description is now given of third and fourth examples of the intra-frame YC separating circuit 3050 shown in FIG. 22.

First, in FIG. 35(*a*), a high-frequency component on the three-dimensional frequency space including C signals is taken out by a difference between the particular sampling point (★) and the sampling point (●). When the high-frequency component passes through the BPF, C signals are obtained, In addition, Y signals are obtained by subtracting the C signals from the V signals. This is defined as an inter-field YC separation A2.

Figure 40A:
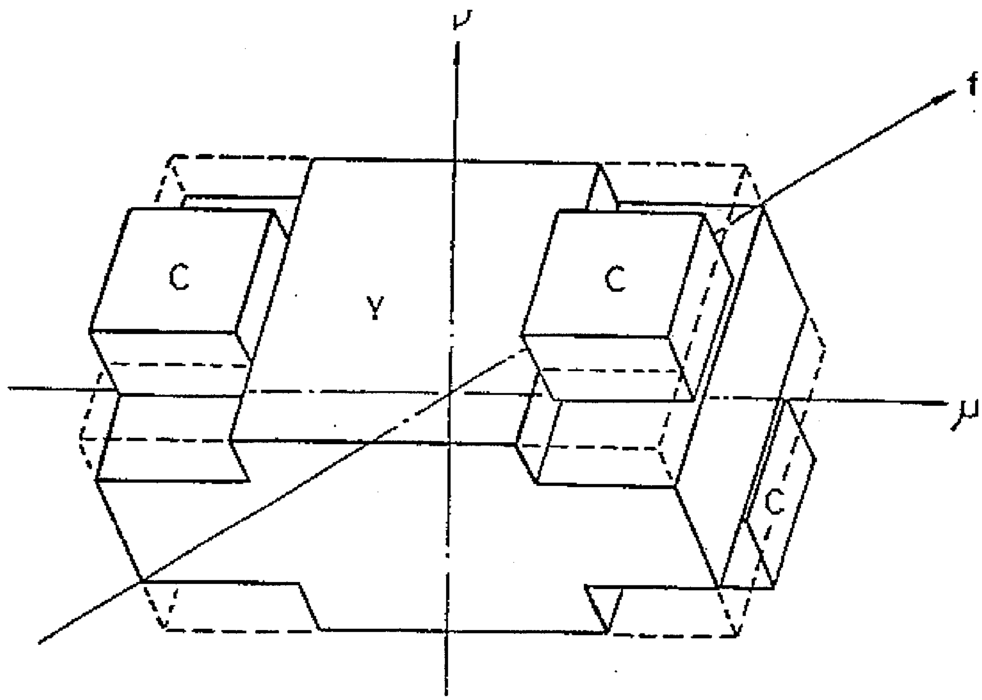
FIGS. 40(*a*) to 40(*c*) are a perspective view, a view from the minus side of the f-axis, and a view from the plus side of the μ-axis, of a spectral dispersion of Y signals and C signals obtained by an inter-field YC separation A2, in the three-dimensional frequency space.
Figure 40:
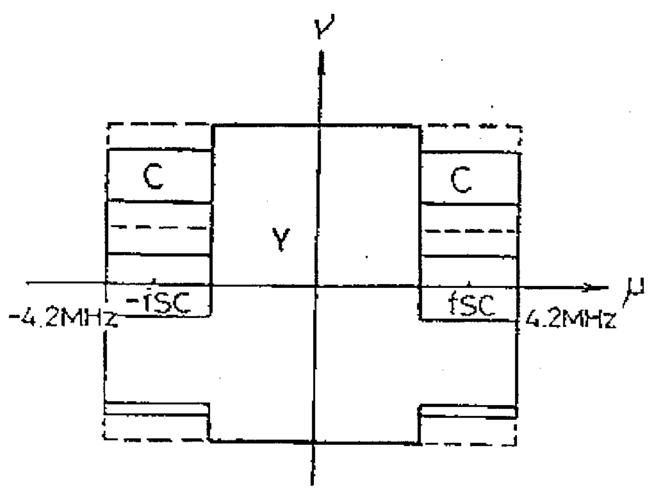
Figure 40:
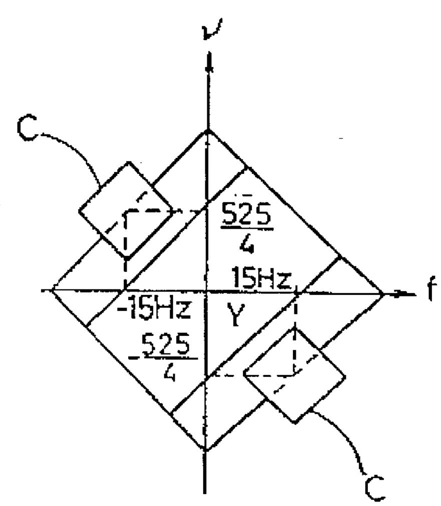

FIGS. 40(*a*) to 40(*c*) show the three-dimensional frequency space like FIGS. 36(*a*) to 36(*c*), in which Y signals and C signals, obtained by the inter-field YC separation A2, are present.

Second, in FIGS. 35(*a*) and 35(*b*), sampling points (●) and (○) , having the same positional relation as that of the particular sampling point (★) and the sampling point (●), are considered. When a difference between the particular sampling point (★) and the sampling point (●) and a difference between the sampling point (●) and the sampling point (○) are subtracted, C signals are obtained. In addition, Y signals are obtained by subtracting the C signals from the V signals. This is defined as an inter-field YC separation B2.

Figure 41A:
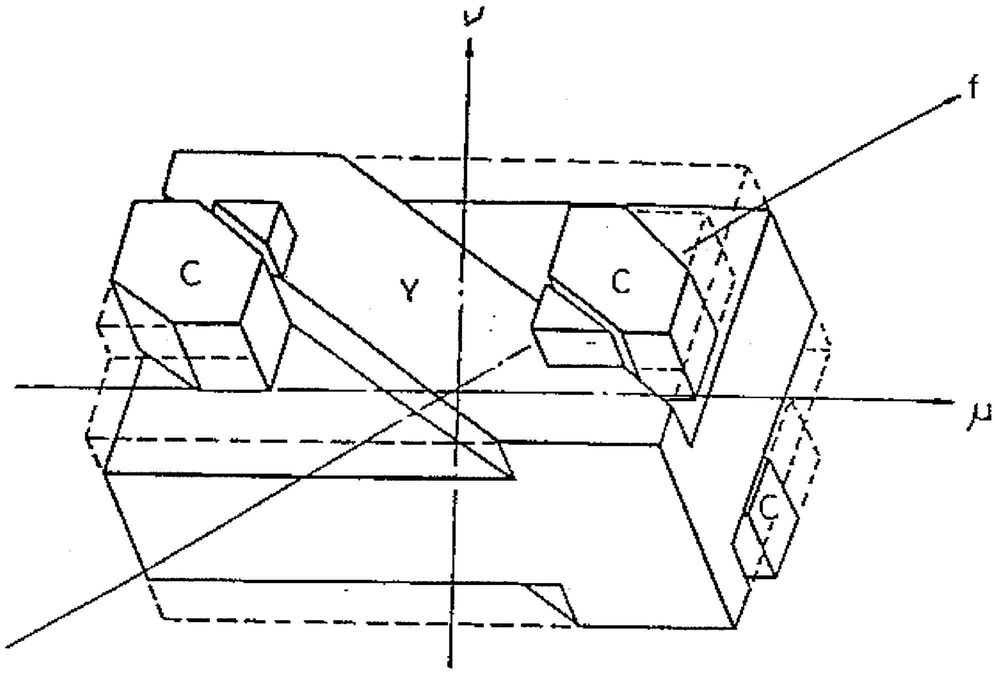
FIGS. 41(*a*) to 41(*c*) are a perspective view, a view from the minus side of the f-axis, and a view from the plus side of the μ-axis, of a spectral dispersion of Y signals and C signals obtained by an inter-field YC separation B2, in the three-dimensional frequency space.
Figure 41:
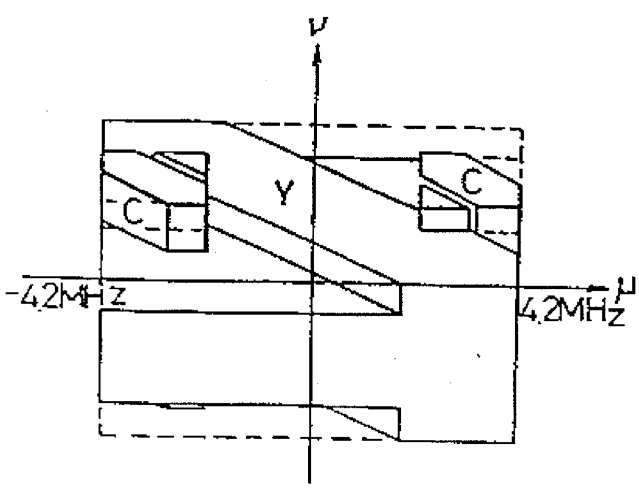
Figure 41:
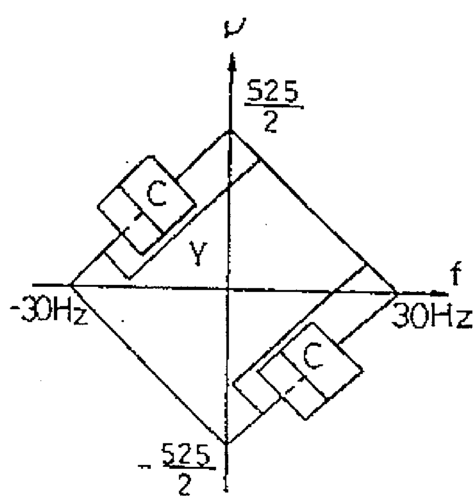

FIGS. 41(*a*) to 41(*c*) also show the frequency space in which Y signals and C signals obtained by the inter-field YC separation B2 are present. In these figures, although it seems that a part of C signals is included in the Y signals, the C signals are hardly included in the Y signals because the correlation between the Y signals and C signals is strong.

Third, in FIGS. 35(*a*) and 35(*b*), sampling points (●) and (○), having the same positional relation as that of the particular sampling point (★) and the sampling point (●), are considered. When a difference between the particular sampling point (★) and the sampling point (●) and a difference between the sampling point (●) and the sampling point (○) are subtracted, C signals are obtained. In addition, Y signals are obtained by subtracting the C signals from the V signals. This is defined as an inter-field YC separation C2.

Figure 42A:
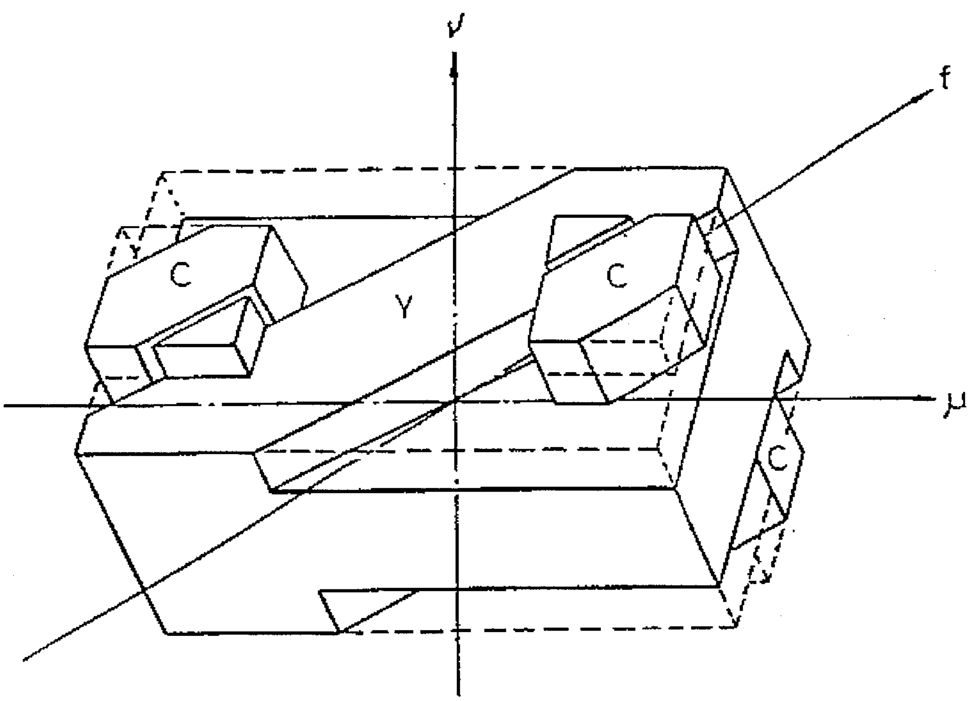
FIGS. 42(*a*) to 42(*c*) are a perspective view, a view from the minus side of the f-axis, and a view from the plus side of the μ-axis, of a spectral dispersion of Y signals and C signals obtained by an inter-field YC separation C2, in the three-dimensional frequency space.
Figure 42:
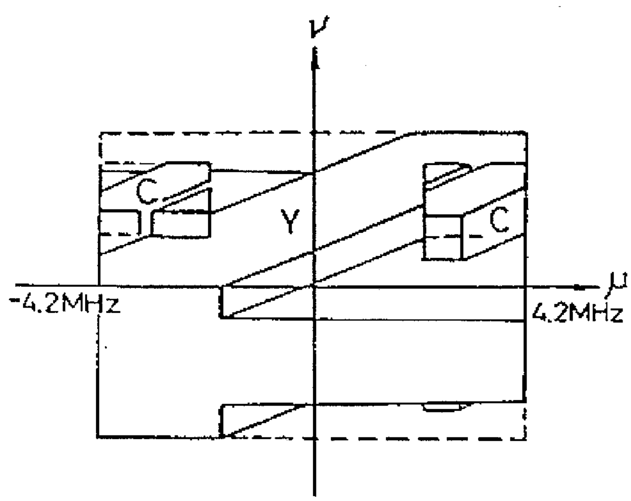
Figure 42:
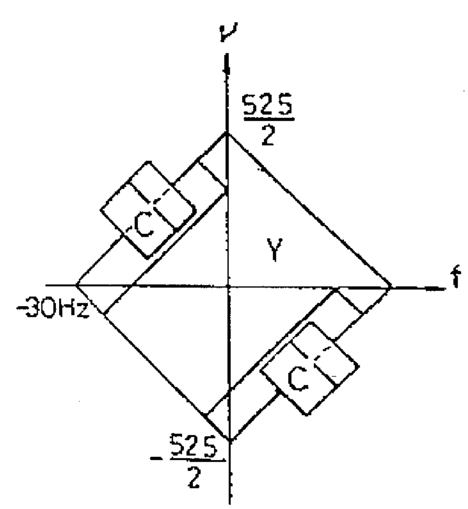

FIGS. 42(*a*) to 42(*c*) also show the frequency space in which Y signals and C signals obtained by the inter-field YC separation C2 are present. In these figures, although it seems that a part of C signals is included in the Y signals, the C signals are hardly included in the Y signals because the correlation between the Y signals and C signals is strong.

Figure 30:
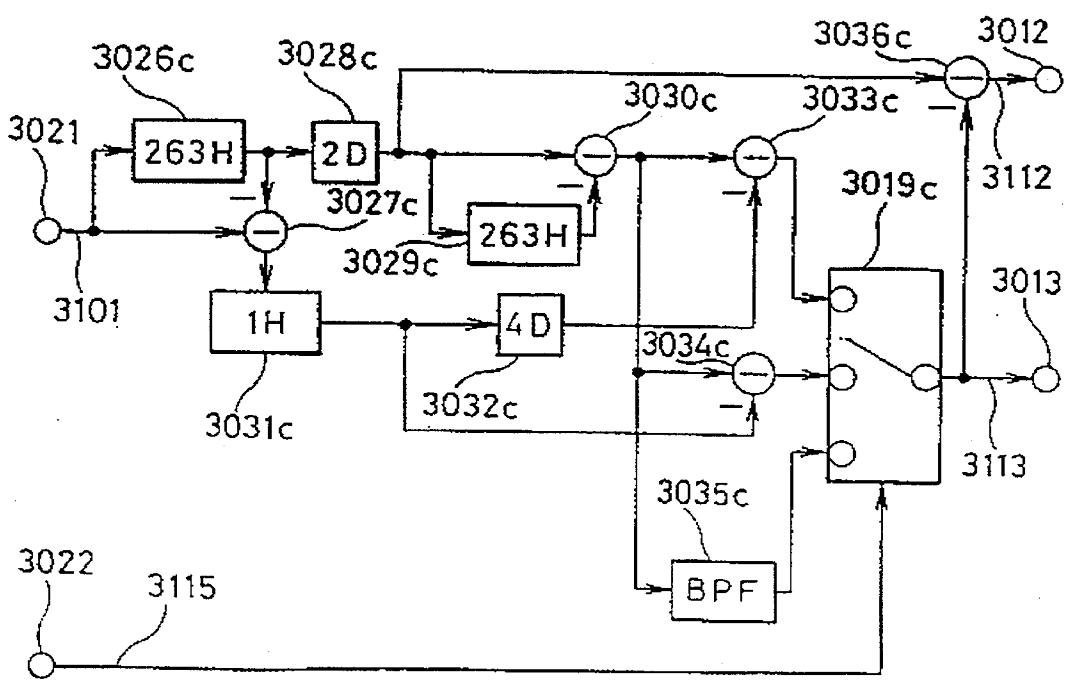
FIG. 30 is a block diagram showing a third example of the intra-frame YC separating circuit shown in FIG. 22.

FIG. 30 is a block diagram showing a third example of the intra-frame YC separating circuit 3050 shown in FIG. 22. In this third example, above-described inter-field YC separations A2, B2 and C2 are used in place of the inter-field YC separations A1, B1 and C1. In FIG. 30, the same reference numerals as those in FIG. 28 designate the same or corresponding parts.

V signal 3101 is input to the input terminal 3021. The V signal delayed by 263 lines in the 263-line delay circuit 3026*c* is input to the subtracter 3027*c* and subtracted from the V signal directly input to the subtracter 3026*c*. Then, an output of the subtracter 3027*c* is delayed by one line and by four pixels in the one-line delay circuit 3031*c* and the four-pixel delay circuit 3032*c*, respectively. On the other hand, the output of the 263-line delay circuit 3026*c* is delayed by two pixels in the two-pixel delay circuit 3028*c* and subtracted from the V signal, delayed by 263 lines in the 263-line delay circuit 3029*c*, by the subtracter 3030*c*.

The output of the subtracter 3030*c* and the output of the four-pixel delay circuit 3032*c* are subtracted by the subtracter 3033*c*, resulting in a C signal component for the inter-field YC separation C2.

The output of the subtracter 3030*c* and the output of the one-line delay circuit 3031*c* are subtracted by the subtracter 3034*c*, resulting in a C signal component for the inter-field YC separation B2.

The output of the subtracter 3030*c* passes through the BPF 3035*c*, resulting in a signal component for the inter-field YC separation A2.

The signal selecting circuit 3019*c* selects one from the three kinds of inter-field YC separated C signals in accordance with an output 3115 of an isolated point eliminating circuit 3007 which will be described later, resulting in an intra-frame YC separated C signal 3113.

When the intra-frame YC separated C signal 3013 is subtracted from the V signal output from the two-pixel delay circuit 3028*c* by the subtracter 3036*c*, an intra-frame YC separated Y signal 3112 is obtained.

Figure 31:
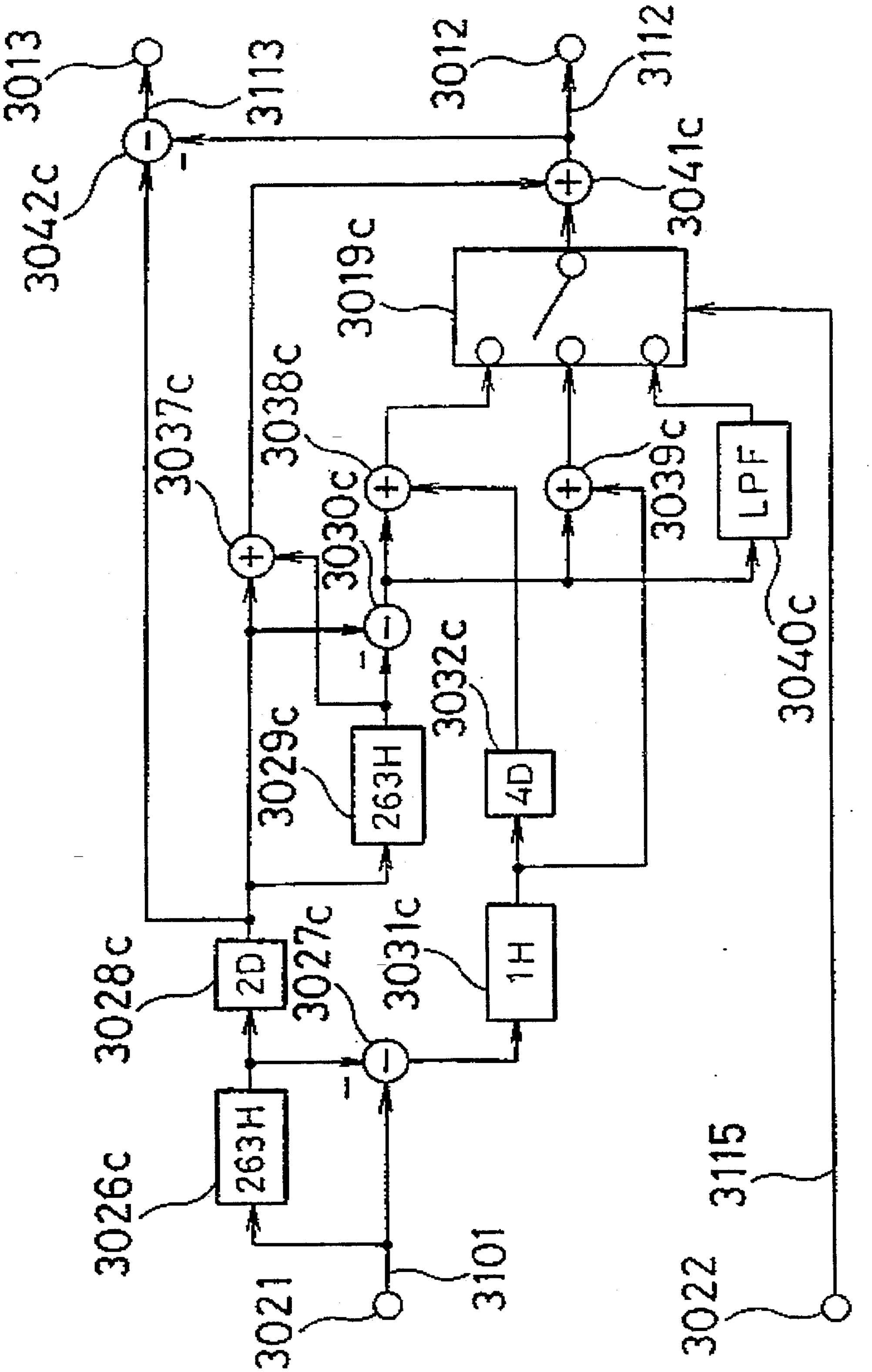
FIG. 31 is a block diagram showing a fourth example of the intra-frame YC separating circuit shown in FIG. 22.

FIG. 31 is a block diagram showing a fourth example of the intra-frame YC separating circuit 3035 shown in FIG. 22. In FIG. 31, the only difference from FIG. 28 resides in that the above-described inter-field YC separations A2, B2 and C2 are used in place of the inter-field YC separations A1, B1, and C1. In addition, the only difference from FIG. 30 resides in that the band restriction is applied not to the C signal but to the Y signal. In the intra-frame YC separating circuit shown in FIG. 31, only different parts from FIG. 30 will be described.

An output of the subtracter 3030*c* and an output of the four-pixel delay circuit 3032*c* are added by the adder 3038*c*, resulting in a high-frequency component on the three-dimensional frequency space excluding the C signal for the inter-field YC separation C2.

In addition, the output of the subtracter 3030*c* and an output of the one-line delay circuit 3031*c* are added by the adder 3039*c*, resulting in a high-frequency component on the three-dimensional frequency space excluding the C signal for the inter-field YC separation B2.

In addition, the output of the subtracter 3030*c* passes through the LPF 3040*c*, resulting in a high-frequency component on the three-dimensional frequency space excluding the C signal for the inter-field YC separation A2.

The signal selecting circuit 3019*c* selects one from the three-kinds of high-frequency components on the three-dimensional frequency space excluding the C signals for the inter-field YC separations A2, B2 and C2 in accordance with the output 3115 of the isolated point eliminating circuit 3070 which will be described later.

In addition, the output of the two-pixel delay circuit 3028*c* and the output of the 263-line delay circuit 3029*c* are added by the adder 3037*c*, resulting in a low-frequency component on the three-dimensional frequency space. The output of the adder 3037*c* and the output of the signal selecting circuit 3019*c* are added by the adder 3041*c*, resulting in an intra-frame YC separated Y signal 3112.

The intra-frame YC separated Y signal 3112 is subtracted from the V signal output from the two-pixel delay circuit 3028*c* by the subtracter 3042*c*, leaving an intra-frame YC separated C signal 3113.

The operation of the correlation detecting circuit 3060 shown in FIG. 22 will be described in detail with reference to FIG. 25. In FIG. 25, V signal 3101 input from the input terminal 3019 is delayed by 525 lines in the 525-line delay circuit 3011*b*, by four pixels in the four-pixel delay circuit 3012*b*, and by one line in the one-line delay circuit 3013*b*. An output of the one-line delay circuit 3013*b* is delayed by two pixels in the two-pixel delay circuit 3014*b*.

An output of the 525-line delay circuit 3011*b* and an output delayed by one line and four pixels in the one-line delay circuit 3015*b* and the four-pixel delay circuit 3016*b* are subtracted by the subtracter 3018*b*, and an absolute value of the result is found in the absolute value circuit 3021*b*, whereby a correlation between the sampling points (●) and shown in FIGS. 35(*a*) and 35(*b*) is detected.

An output of the four-pixel delay circuit 3012*b* and an output of the one-line delay circuit 3015*b* are subtracted by the subtracter 3019*b*, and an absolute value of the result is found in the absolute value circuit 3022*b*, whereby a correlation between the sampling points (●) and shown in FIGS. 35(*a*) and 35(*b*) is detected.

An output of the two-pixel delay circuit 3014*b* and an output of the two-pixel delay circuit 3017*b* are subtracted by the subtracter 3020*b*, and an absolute value of the result is found in the absolute value circuit 3023*b*, whereby a correlation between the sampling points (●) and shown in FIGS. 35(*a*) and 35(*b*) is detected.

The minimum value selecting circuit 3024*b* selects the minimum one from the three kinds of absolute value outputs (the correlation detecting amount is the maximum) and outputs a correlation signal 3114 from the output terminal 3020.

FIG. 26 is a block diagram showing a second example of the correlation detecting circuit 3060 shown in FIG. 22. In FIG. 26, the only difference from FIG. 25 resides in that the correlation is partially detected by an operation between a particular sampling point and a sampling point one field before.

The correlation detecting circuit shown in FIG. 26 partially detects the correlation by a horizontal low-frequency component of a difference between the particular sampling point and a sampling point one field before the particular sampling point, which has an opposite phase of color sub-carrier from that of the particular sampling point.

The operation of the correlation detecting circuit shown in FIG. 26 will be described. This correlation detecting circuit is different from the circuit shown in FIG. 25 only in the following points. That is, outputs of the subtracters 3030*b*, 3031*b*, and 3032*b* pass through the LPFs 3033*b*, 3034*b*, and 3035*b*, whose pass bands are 2.1 MHz and below, respectively, and absolute values of the results are found in the absolute value circuits 3036*b*, 3037*b*, and 3038*b*.

Figure 27:
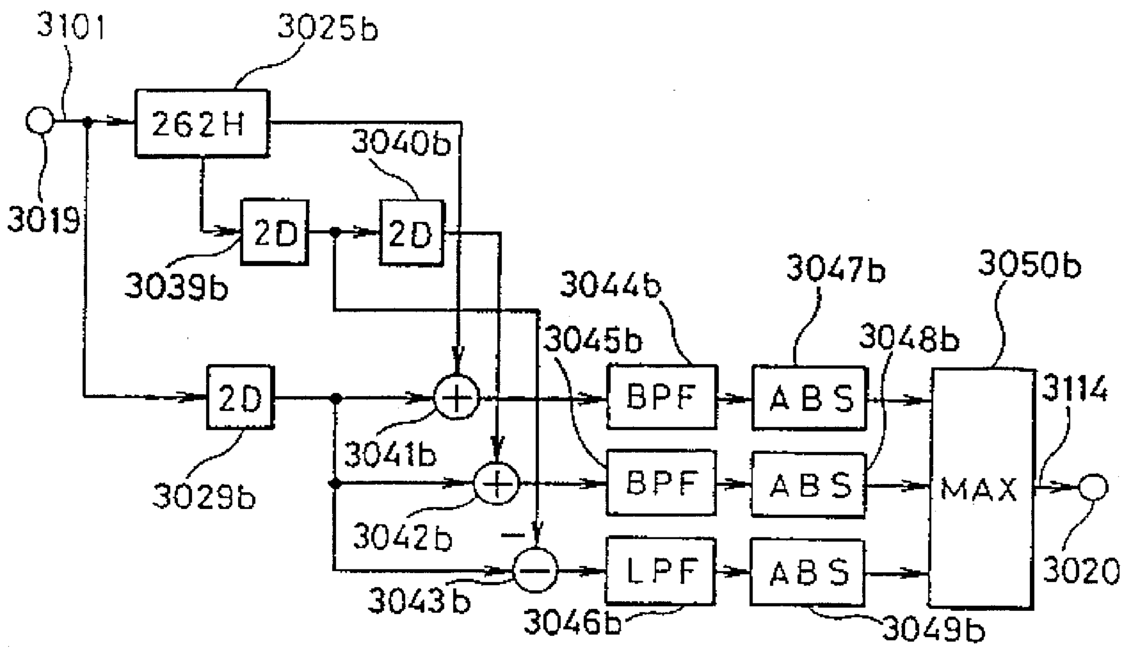
FIG. 27 is a block diagram showing a third example of the correlation detecting circuit shown in FIG. 22.

FIG. 27 is a block diagram showing a third example of the correlation detecting circuit 3060 shown in FIG. 22. In FIG. 27, the only difference from FIG. 25 resides in that the correlation is partially detected by an operation between a particular sampling point and a sampling point one field before. In addition, the only difference from FIG. 26 resides in that a direction in which the spectrum of Y signal broadens on the three-dimensional frequency space is detected thereby to detect a correlation of signal.

An output of the 262-line delay circuit 3025*b* and an output of the two-pixel delay circuit 3029*b* are added by the adder 3041*b* and the result passes through the BPF 3044*b* whose pass band is 2.1 MHz and above. Then, an absolute value is found in the absolute value circuit 3047*b*, whereby a correlation between the particular sampling point (★) and the sampling point (●) shown in FIG. 35(*a*) is detected.

On the other hand, the output of the 262-line delay circuit 3025*b* is delayed by four pixels in the two-pixel delay circuits 3039*b* and 3040*b*. An output of the two-pixel delay circuit 3040*b* is added to an output of the two-pixel delay circuit 3029*b* by the adder 3042*b*, and the result passes through the BPF 3045*b* whose pass band is 2.1 MHz and above. Further, an absolute value is found in the absolute value circuit 3048*b*, whereby a correlation between the particular sampling point (★) and the sampling point (●) shown in FIG. 35(*a*) is detected.

The output of the two-pixel delay circuit 3039*b* is subtracted from the output of the two-pixel delay circuit 3029*b* by the subtracter 3043*b*, and the result passes through the LPF 3046*b* whose pass band is 2.1 MHz and below. Further, an absolute value is found in the absolute value circuit 3049*b*, whereby a correlation between the particular sampling point (★) and the sampling point (○) shown in FIG. 35(*a*) is detected.

The maximum value selecting circuit 3050*b* selects the maximum one from the three kinds of absolute value outputs (the correlation detecting amount is the maximum) and outputs a correlation signal 3114.

A description is given of the isolated point eliminating circuit 3070 shown in FIG. 22 with reference to FIG. 23. In FIG. 23, the correlation signal 3114 input to the input terminal 3014 is delayed by one pixel in the one-pixel delay circuit 3020*a* and further by one pixel in the one-pixel delay circuit 3021*a*. The correlation signal 3114, an output of the one-pixel delay circuit 3020*a*, and an output of the one-pixel delay circuit 3021*a* are input to the counting circuit 3035*a*, as correlations of the sampling points (♦), (●), and (◇) shown in FIG. 35(*a*), respectively.

On the other hand, the correlation signal 3114 is delayed by one line in the one-line delay circuit 3012*a*, by one pixel in the one-pixel delay circuit 3024*a*, and by one pixel by the one-pixel delay circuit 3025*a*. Outputs of the one-line delay circuit 3012*a*, the one-pixel delay circuit 3024*a*, and the one-pixel delay circuit 3025*a* are input to the counting circuit 3035*a* as correlations of the sampling point (◇), the particular sampling point (★), and the sampling point (♦) shown in FIG. 35(*a*), respectively.

The output of the one-line delay circuit 3012*a* is delayed by one line in the one-line delay circuit 3013*a*, by one pixel in the one-pixel delay circuit 3028*a*, and by one pixel in the one-pixel delay circuit 3029*a*. Outputs of the one-line delay circuit 3013*a*, the one-pixel delay circuit 3028*a*, and the one-pixel delay circuit 3029*a* are input to the counting circuit 3035*a* as correlations of the sampling points (♦), (●)a, and (◇) shown in FIG. 35(*a*), respectively.

The counting circuit 3035*a* discriminates the input nine correlations from each other and counts the number of input signals having strong correlations in the direction connecting the particular sampling point (★) and the sampling point (●), the number of input signals having strong correlations in the direction connecting the particular sampling point (★) and the sampling point (●), and the number of input signals having strong correlations in the direction connecting the particular sampling point (★) and the sampling point (●). These numbers are output from the first to third output terminals, respectively, and input to the majority circuit 3046*a*.

The majority circuit 3046*a* selects the largest number and decides the correlation of the particular sampling point (★).

More specifically, referring to FIG. 35(*a*), when the number of sampling points, which have strong correlations in the direction connecting the particular sampling point (★) and the sampling point (●), is the largest among the particular sampling point (★) and the neighboring sampling points (566 ), (●)a, (♦), (♦), (◇), (◇), (●), and (♦), the majority circuit 3046*a* outputs a selecting signal 3115 for selecting the inter-field YC separation A1 or A2 in the intra-frame YC separating circuit 3050. When the number of sampling points, which have strong correlations in the direction connecting the particular sampling point (★) and the sampling point (●), is the largest, the majority circuit 3046*a* outputs a selecting signals 3115 for selecting the inter-field YC separation B1 or B2 in the intra-frame YC separating circuit 3050. When the number of sampling points, which have strong correlations in the direction connecting the particular sampling point (★) and the sampling point (●), is the largest, the majority circuit 3046*a* outputs a selecting signal 3115 for selecting the inter-field YC separation C1 or C2 in the intra-frame YC separating circuit 3050.

In FIG. 23, the correlation is decided by nine sampling points, i.e., three pixels in the horizontal direction and three lines in the vertical direction, in the same field with the particular sampling point as a center. However, the number of the sampling points may be increased in the horizontal and vertical directions.

Figure 24:
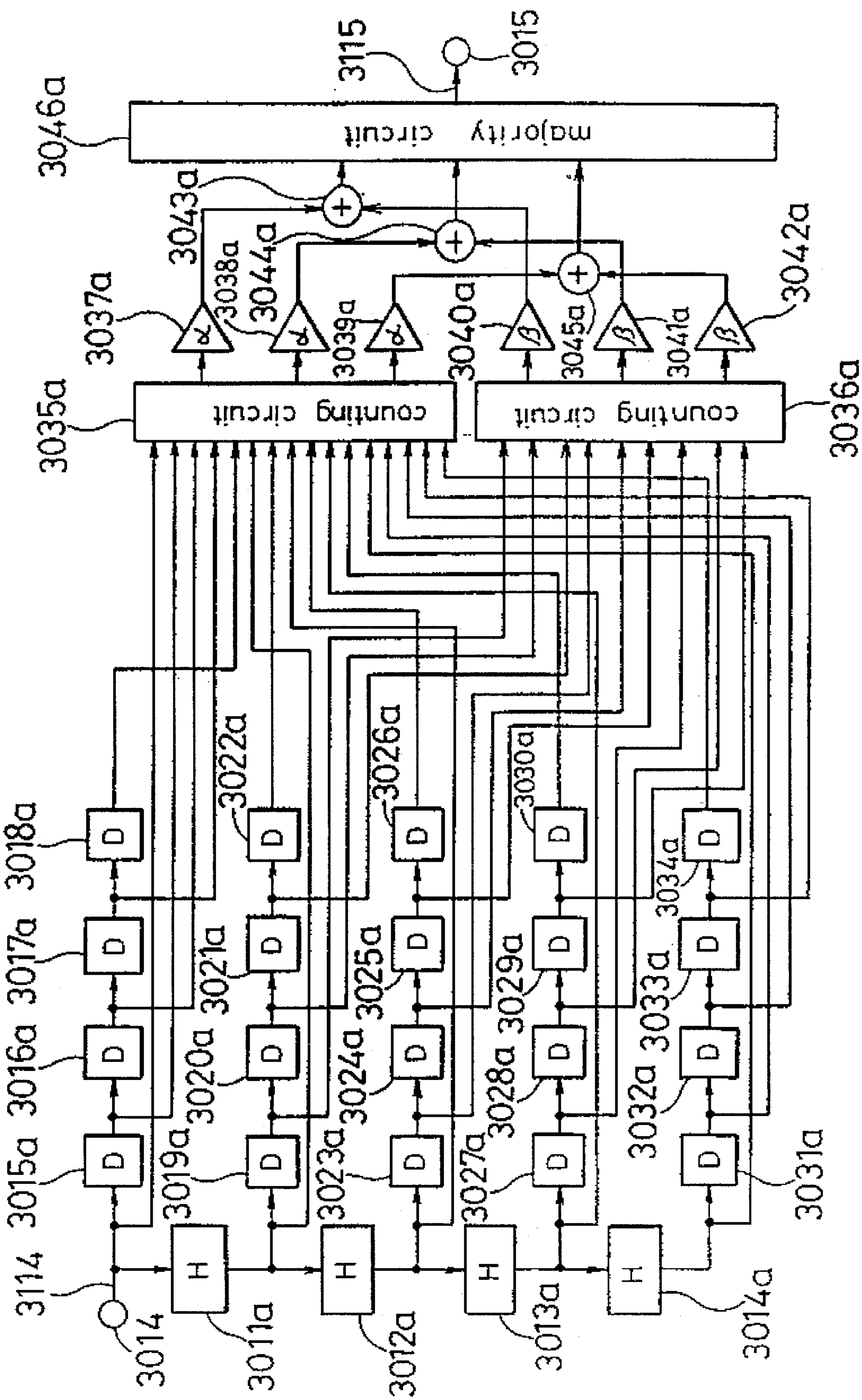
FIG. 24 is a block diagram showing a second example of the isolated point eliminating circuit shown in FIG. 22.

FIG. 24 is a block diagram showing a second example of the isolated point eliminating circuit 3070 shown in FIG. 22. In FIG. 24, the only difference from FIG. 23 resides in that weights are applied to the signals of the neighboring sampling points in accordance with a distance between each neighboring point and the particular sampling point.

In FIG. 24, the correlation signal 3114 is delayed by one pixel in the one-pixel delay circuit 3015*a* and further delayed each by one pixel in the one-pixel delay circuits 3016*a*, 3017*a*, and 3018*a*. The correlation signal 3111 and output signals of the one-pixel delay circuits 3015*a*, 3016*a*, 3017*a*, and 3018*a* are input to the counting circuit 3035*a*, as correlations of the sampling points (●), (◇), (○), (♦), and (●) shown in FIG. 35(*a*), respectively.

On the other hand, the correlation signal 3114 is delayed by one line in the one-line delay circuit 3011*a* and further delayed each by one pixel in the one-pixel delay circuits 3019*a*, 3020*a*, 3021*a*, and 3022*a*. An output of the one-line delay circuit 3011*a* and an output of the one-pixel delay circuit 3022*a* are input to the counting circuit 3035*a* as correlation of the sampling points (○) and (○) shown in FIG. 35(*a*). Outputs of the one-pixel delay circuits 3019*a*, 3020*a*, and 3021*a* are input to the counting circuit 3036*a* as correlations of the sampling points (♦), (●)b, and (◇) shown in FIG. 35(*a*), respectively.

An output of the one-line delay circuit 3011*a* is delayed by one line in the one-line delay circuit 3012*a* and delayed each by one pixel in the one-pixel delay circuits 3023*a*, 3024*a*, 3025*a*, and 3026*a*. An output of the one-line delay circuit 3012*a* and an output of the one-pixel delay circuit 3026*a* are input to the counting circuit 3035*a* as correlations of the sampling points (●)d and (●)c shown in FIG. 35(*a*), respectively. Outputs of the one-pixel delay circuits 3023*a*, 3024*a*, and 3025*a* are input to the counting circuit 3036*a* as correlations of the sampling points (◇), (★), and (♦) shown in FIG. 35(*a*), respectively.

In addition, an output of the one-line delay circuit 3012*a* is delayed by one line in the one-line delay circuit 3013*a* and delayed each by one pixel in the one-pixel delay circuits 3027*a*, 3028*a*, 3029*a*, and 3030*a*. An output of the one-line delay circuit 3013*a* and an output of the one-pixel delay circuit 3030*a* are input to the counting circuit 3035*a* as correlations of the sampling points (○) and (○) shown in FIG. 35(*a*), respectively. Outputs of the one-pixel delay circuits 3027*a*, 3028*a*, and 3029*a* are input to the counting circuit 3036*a* as correlations of the sampling points (♦), (●)a, and (◇) shown in FIG. 35(*a*), respectively.

In addition, an output of the one-line delay circuit 3013*a* is delayed by one line in the one-line delay circuit 3014*a* and delayed each by one pixel in the one-pixel delay circuits 3031*a*, 3032*a*, 3033*a*, and 3034*a*. An output of the one-line delay circuit 3014*a* and outputs of the one-pixel delay circuits 3031*a*, 3032*a*, 3033*a*, and 3034*a* are to the counting circuit 3035*a* as correlations of the sampling points (●), (◇), (○), (♦), and (●) shown in FIG. 35(*a*), respectively.

The counting circuits 3035*a* and 3036*a* discriminate the input correlations from each other and counts the number of input signals having strong correlations in the direction connecting the particular sampling point (★) and the sampling point (●), the number of input signals having strong correlations in the direction connecting the particular sampling point (★) and the sampling point (574 ), and the number of input signals having strong correlations in the direction connecting the particular sampling point (★) and the sampling point (●). These numbers are output from the first to third output terminals, respectively.

The results obtained in the counting circuit 3035*a* are input to coefficient multipliers 3037*a*, 3038*a*, and 3039*a* and multiplied by a coefficient α. In addition, the results obtained in the counting circuit 3036*a* are input to coefficient multipliers 3040*a*, 3041*a*, and 3042*a* and multiplied by a coefficient β. Thus, weights are applied to the results.

An output of the coefficient multiplier 3037*a* and an output of the coefficient multiplier 3040*a* are added by the adder 3043*a* and the number of input signals having strong correlations in the direction connecting the particular sampling point (★) and the sampling point (●) is output. The coefficients α and β in the coefficient multipliers 3037*a* and 3040*a* have a relation of $\alpha<\beta$. More specifically, correlations of the particular sampling point and the sampling points (◇), (●)a, (♦), (♦), (◇), (◇), (●)b and (♦) which are close to the particular sampling point (★) are counted with greater weights than the correlations of sampling points (●), (♦), (○), (◇), (●), (○), (○), (●)c, (●)d, (○), (○), (●), (♦), (○), (◇), and (●) which are far from the particular sampling point. Similarly, an output of the coefficient multiplier 3038*a* and an output of the coefficient multiplier 3041*a* are added by the adder 3044*a* and the number of input signals having strong correlations in the direction connecting the particular sampling point (★) and the sampling point (●) is output. Similarly, an output of the coefficient multiplier 3039*a* and an output of the coefficient multiplier 3042*a* are added by the adder 3045*a* and the number of input signals having strong correlations in the direction connecting the particular sampling point (★) and the sampling point (●) is output.

The majority circuit 3046*a* selects the largest number and decides the correlation of the particular sampling point (★).

In this embodiment of the present invention, the isolated point eliminating circuit detects directions, in which inter-field correlations are present, in the particular sampling point and the neighboring sampling points from the output of the correlation detecting circuit, and selects the most numerous direction from the results of the detection to which weights are applied, whereby an inter-field correlation of the particular sampling point is detected. When it is judged that the result of the detection of the particular sampling point is an isolated point, the isolated point is eliminated and a plurality of intra-frame processes including inter-field operations are adaptively switched by that result. Therefore, the detection of the correlation is possible after eliminating the isolated point.

In FIG. 24, the correlation is decided by twenty five sampling points, i.e., five pixels in the horizontal direction and five lines in the vertical direction, in the same field with the particular sampling point as a center. However, the number of the sampling points may be increased in the horizontal and vertical directions.

As described above, according to the seventh embodiment of the present invention, when the motion detecting circuit detects a moving image, in the intra-frame YC separating circuit, the correlation between frames or between fields is partially detected and when the result of the detection is judged to be an isolated point, the isolated point is eliminated from the detected results of the particular sampling point and the neighboring sampling points, whereby one of a plurality of the intra-frame YC separations including inter-field operations is performed. Therefore, while processing the moving image in the motion adaptive YC separating filter, an optimum YC separation is possible utilizing the correlation of the image, resulting in a motion adaptive YC separating filter which performs YC separation with less deterioration in the image.

[Embodiment 8]

Figure 43:
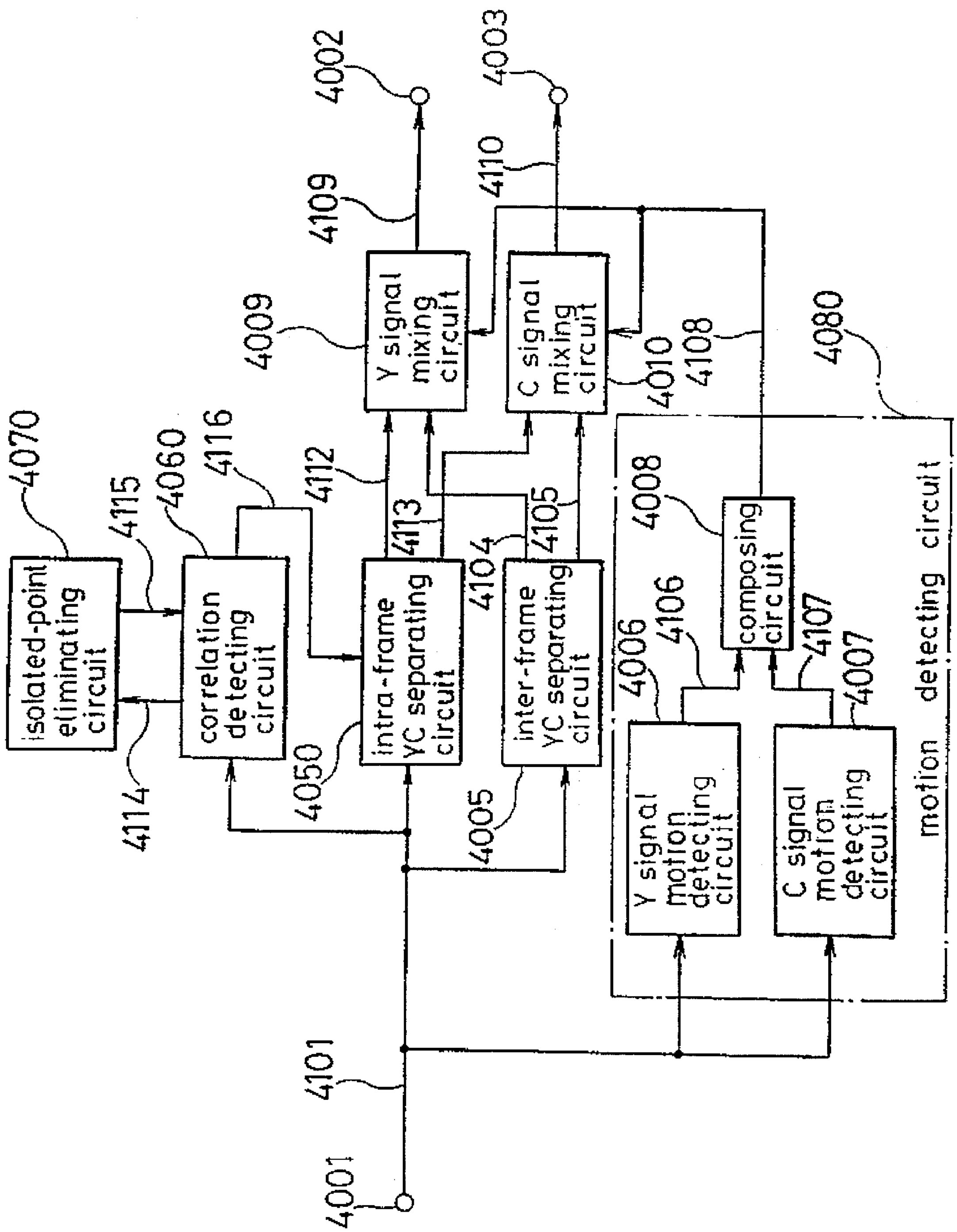
FIG. 43 is a block diagram showing a YC separating filter adaptive to a movement of an image in accordance with an embodiment of the present invention.

FIG. 43 is a block diagram showing a YC separating filter adaptive to a movement of an image in accordance with an eighth embodiment of the present invention. In FIG. 43, the intra-field YC separating circuit 1004 shown in FIG. 110 is replaced by an intra-frame YC separating circuit 4050, a correlation detecting circuit 4060, and an isolated point eliminating circuit 4070, and other structures are the same as those in FIG. 110.

In FIG. 43, V signal 4101 is input to first input terminals of an intra-frame YC separating circuit 4050 and a correlation detecting circuit 4060. A first output 4114 of the correlation detecting circuit 4060 is input to an input terminal of an isolated point eliminating circuit 4070. An output 4115 of the isolated point eliminating circuit 4070 is input to a second input terminal of the correlation detecting circuit 4060.

A second output 4116 of the correlation detecting circuit 4060 is input to a second input terminal of the intra-frame YC separating circuit 4050. An output of the intra-frame YC separating circuit 4050 is output as an intra-frame YC separated Y signal 4112 and an intra-frame YC separated C signal 4113.

Figure 44:
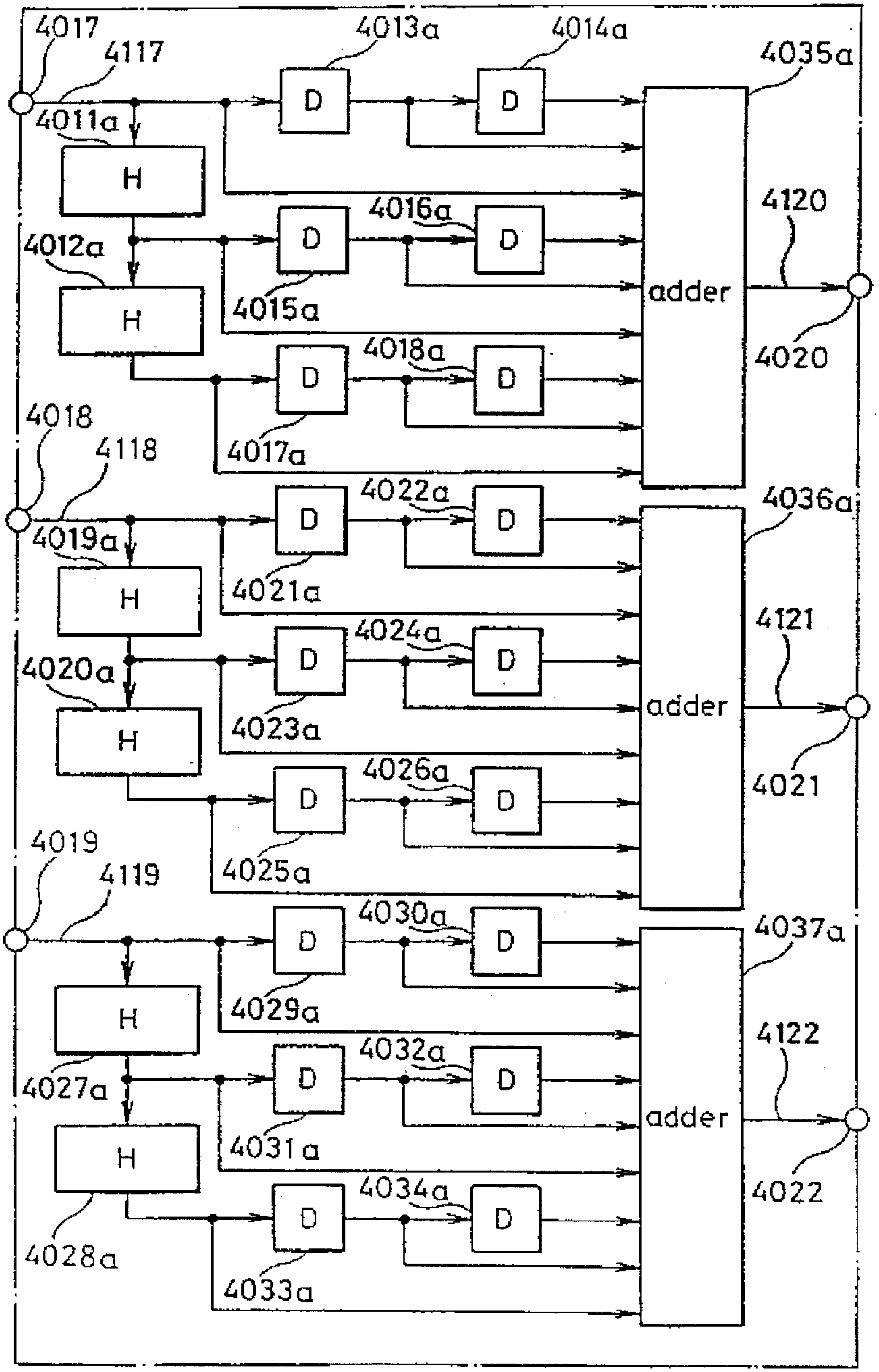
FIG. 44 is a block diagram showing a first example of an isolated point eliminating circuit shown in FIG. 43.

FIG. 44 is a block diagram showing a first example of the isolated point eliminating circuit 4070 shown in FIG. 43. In FIG. 44, a signal 4117 is input to an input terminal 4017. The signal 4117 is input to input terminals of a one-line delay circuit 4011*a* and a one-pixel delay circuit 4013*a* and a third input terminal of an adder 4035*a*. An output of the one-pixel delay circuit 4013*a* is input to an input terminal of a one-pixel delay circuit 4014*a* and a second input terminal of the adder 4035*a*. An output of the one-pixel delay circuit 4014*a* is input to a first input terminal of the adder 4035*a*.

An output of the one-line delay circuit 4011*a* is input to input terminals of a one-line delay circuit 4012*a* and a one-pixel delay circuit 4015*a* and a sixth input terminal of the adder 4035*a*. An output of the one-pixel delay circuit 4015*a* is input to an input terminal of a one-pixel delay circuit 4016*a* and a fifth input terminal of the adder 4035*a*. An output of the one-pixel delay circuit 4016*a* is input to a fourth input terminal of the adder 4035*a*.

An output of the one-line delay circuit 4012*a* is input to an input terminal of a one-pixel delay circuit 4017*a* and a ninth input terminal of the adder 4035*a*. An output of the one-pixel delay circuit 4017*a* is input to an input terminal of a one-pixel delay circuit 4018*a* and a eighth input terminal of the adder 4035*a*. An output of the one-pixel delay circuit 4018*a* is input to a seventh input terminal of the adder 4035*a*. An output 4120 of the adder 4035*a* is output from the output terminal 4020.

In addition, signal 4118 input to an input terminal 4018 is output from an output terminal 4021 as an output 4121 through the same process as described above.

Further, signal 4119 input to an input terminal 4019 is output from an output terminal 4022 as an output signal 4122 through the same process as described above.

Figure 47:
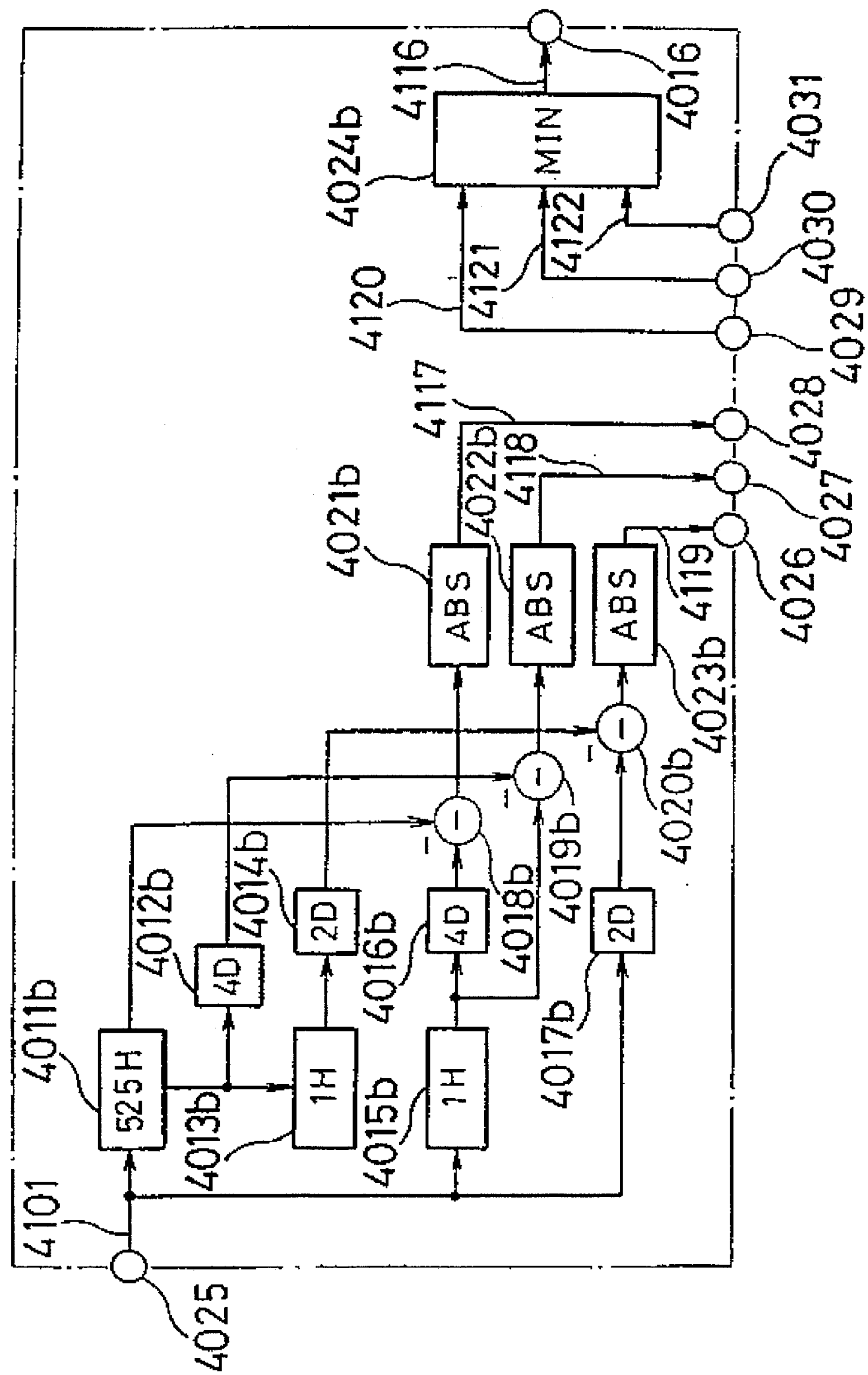
FIG. 47 is a block diagram showing a first example of a correlation detecting circuit shown in FIG. 43.

FIG. 47 is a block diagram showing a first example of the correlation detecting circuit 4060 shown in FIG. 43. In FIG. 47, an output 4117 of an absolute value circuit 4021*b* is output from an output terminal 4028, an output 4118 of an absolute value circuit 4022*b* is output from an output terminal 4027, and an output 4119 of an absolute value circuit 4023*b* is output from an output terminal 4026. These outputs are input to the isolated point eliminating circuit 4070, and outputs 4120, 4121 and 4122 of the isolated point eliminating circuit 4070 are input to input terminals 4029, 4030 and 4031. Other structures are the same as those of the correlation detecting circuit shown in FIG. 25.

Figure 50:
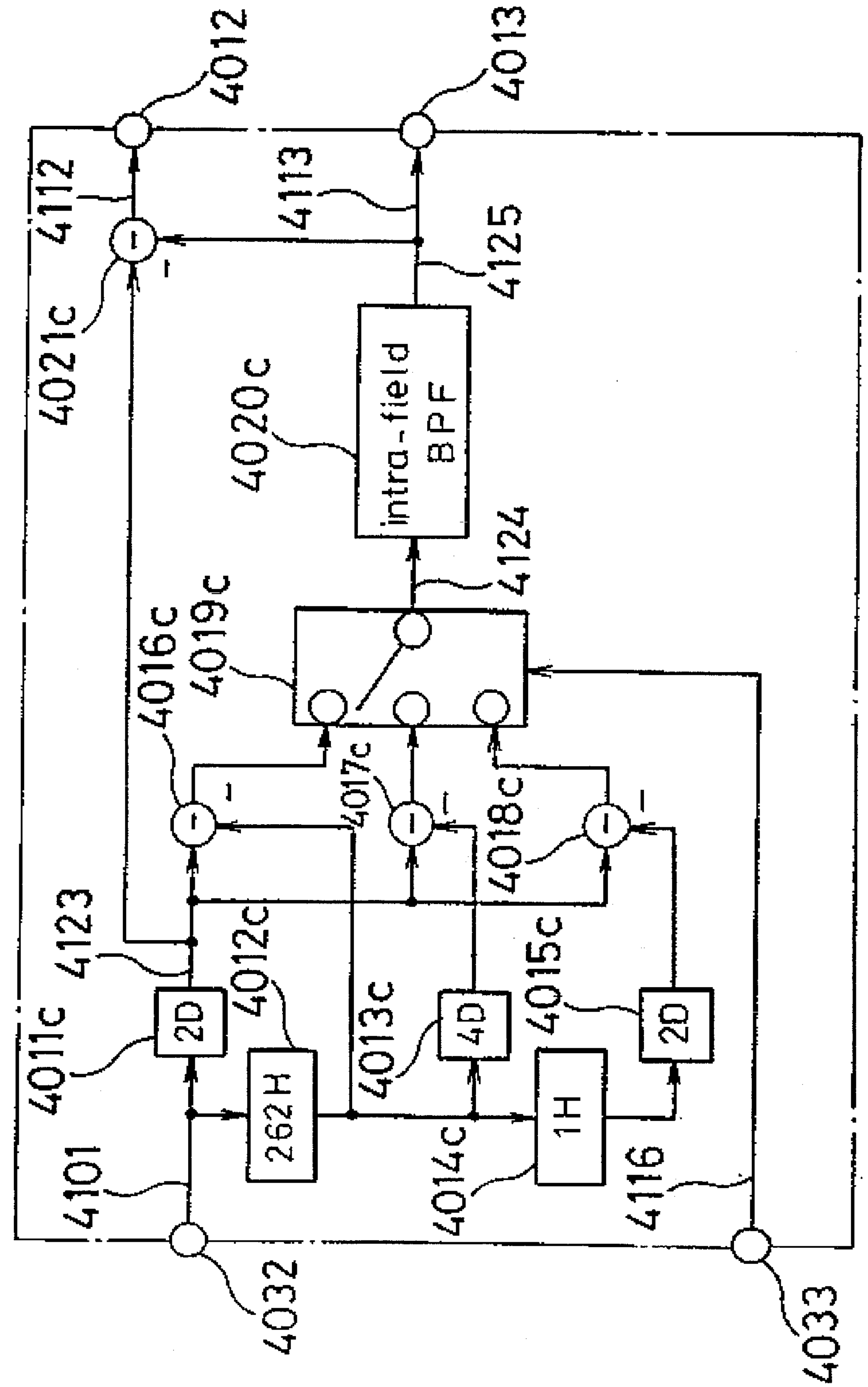
FIG. 50 is a block diagram showing a first example of an intra-frame YC separating circuit shown in FIG. 43.

FIG. 50 is a block diagram showing a first example of the intra-frame YC separating circuit 4050 shown in FIG. 43. This intra-frame YC separating circuit has the same structure and operates in the same way as that shown in FIG. 28.

Also in this embodiment, by adaptively switching the inter-field processes, no deterioration in resolution occurs when the image moves in some direction like shown in FIG. 108(*a*), whereby crosstalks between Y signals and C signals are reduced.

Figure 54:
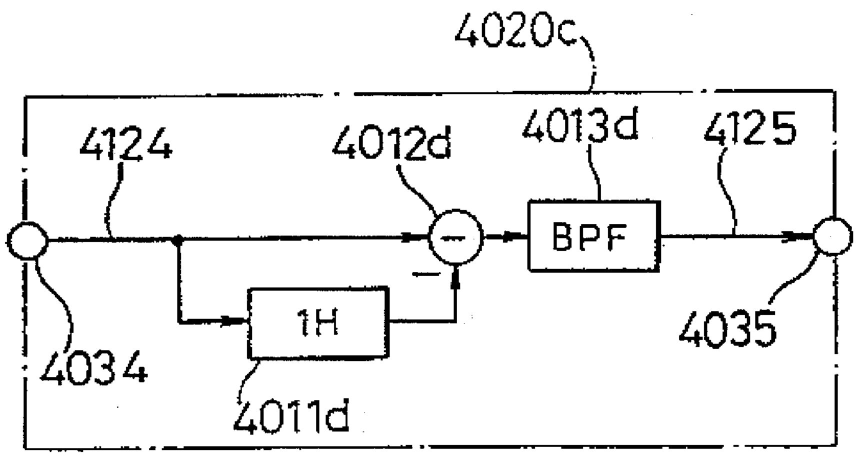
FIG. 54 is a block diagram showing an intra-field BPF in the intra-frame YC separating circuits shown in FIGS. 50 and 51.

FIG. 54 is a block diagram showing the intra-field BPF 4020*c* of FIG. 50 in detail. This intra-field BPF 4020*c* has the same structure as that of the intra-field BPF 3020*c* shown in FIG. 32.

Figure 57:
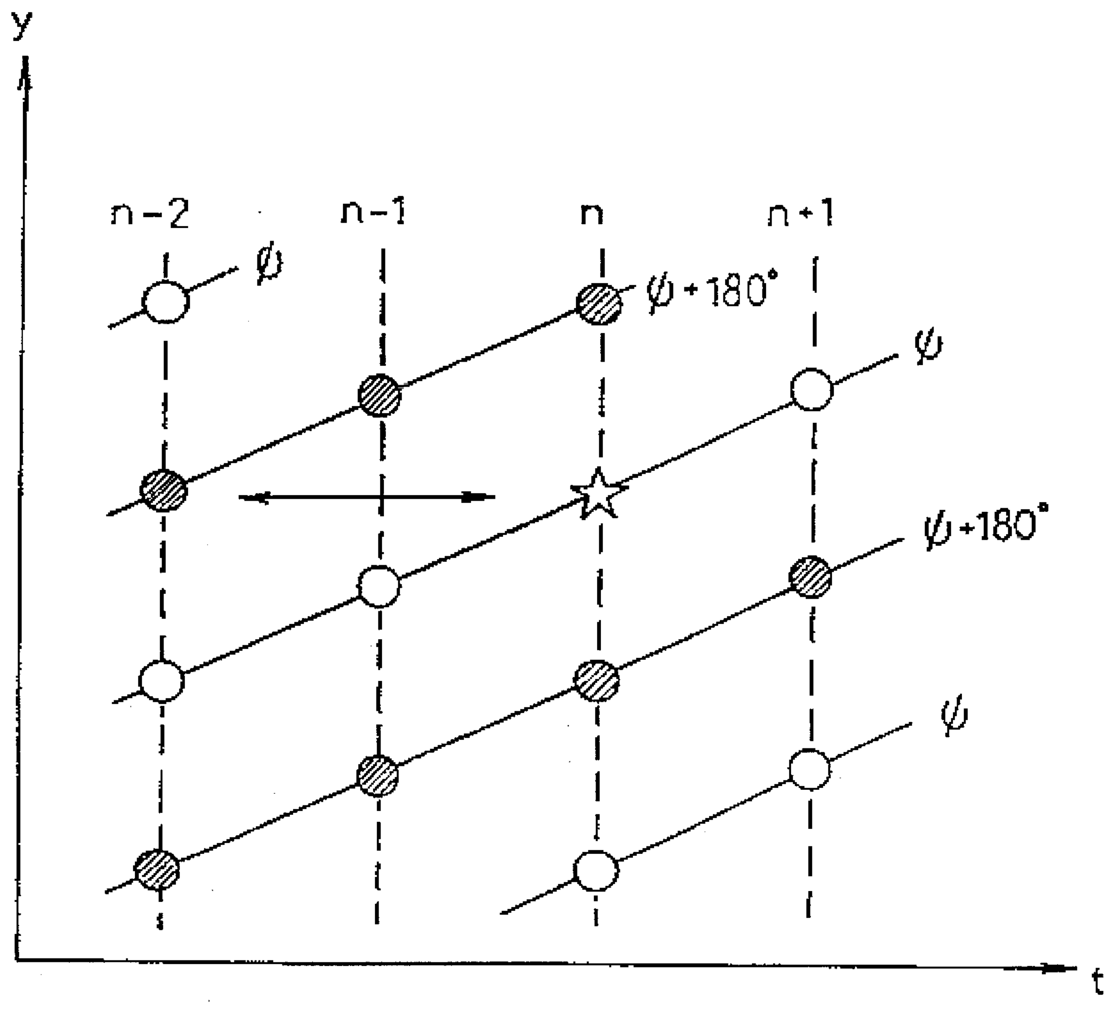
FIG. 57 is a plan view showing an arrangement of the V signal, which is digitized by a frequency four times the color sub-carrier frequency, in the three-dimensional time space by the t-axis and the y-axis.
Figure 58:
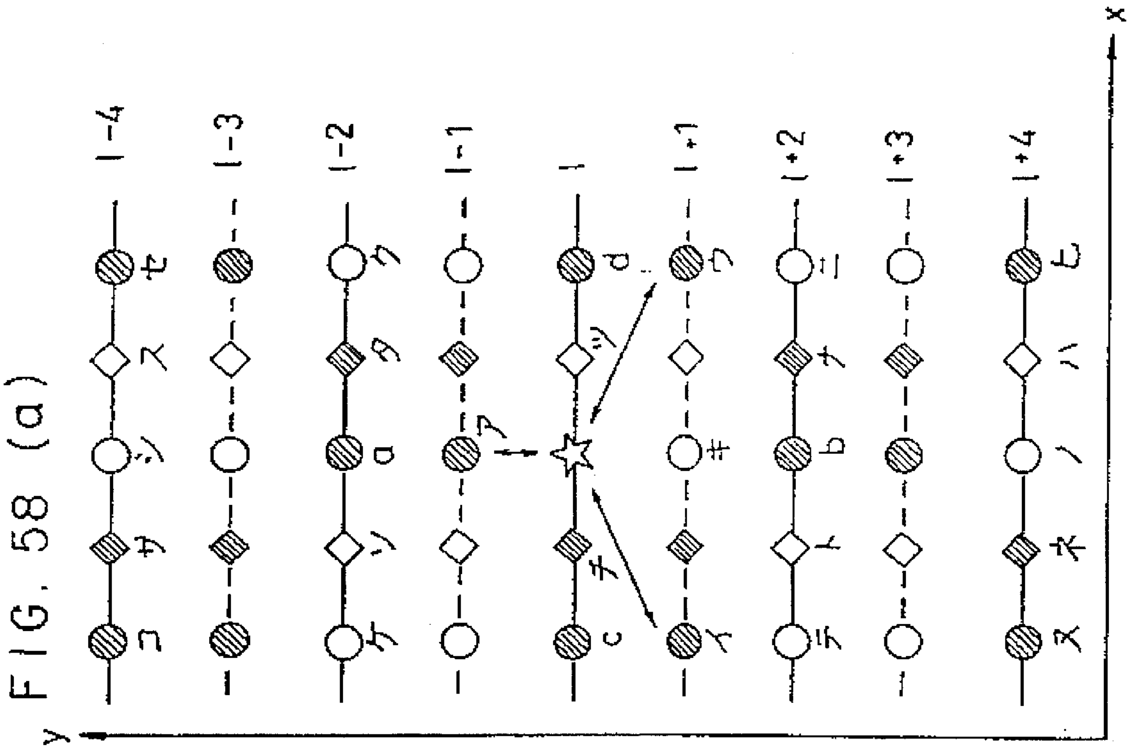
FIG. 58 is a plan view showing an arrangement of the V signal, which is digitized by a frequency four times the color sub-carrier frequency, in the three-dimensional time space by the x-axis and the y-axis.
Figure 58:
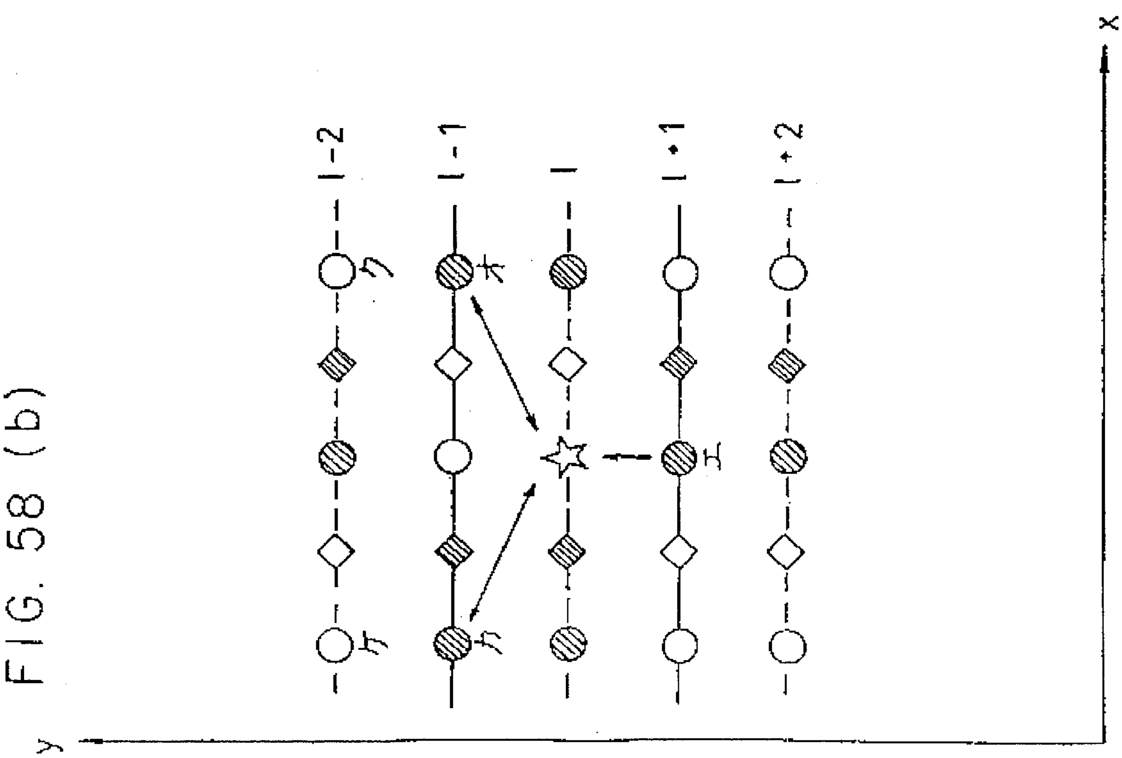

FIGS. 57 and 58 show three-dimensional time spaces like FIGS. 34 and 35.

Figure 59:
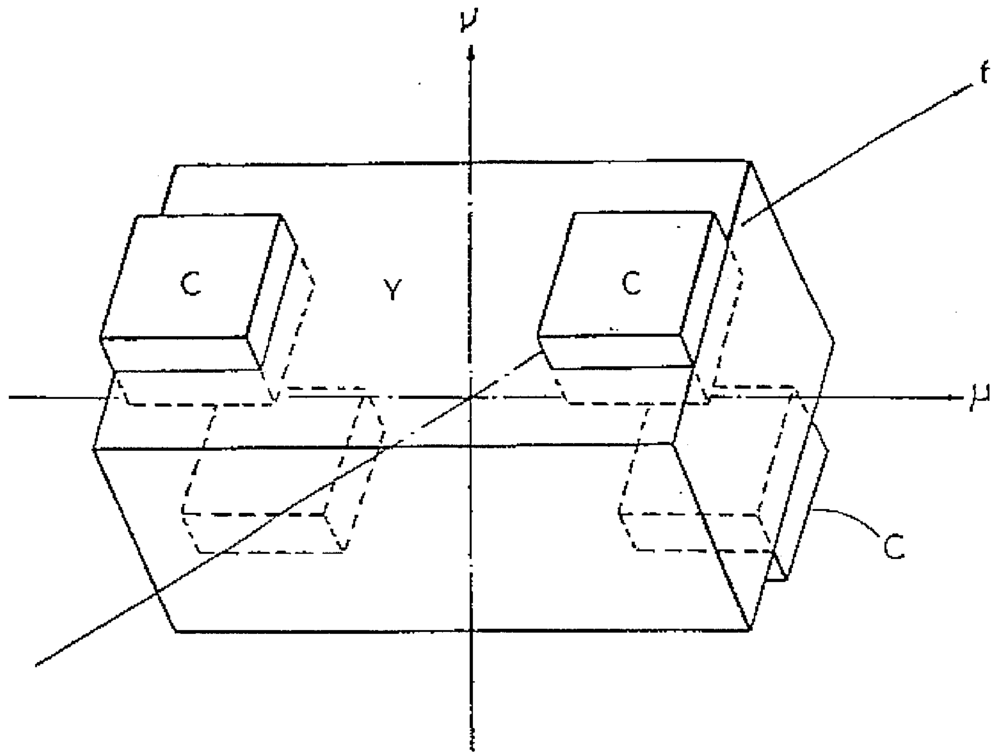
FIGS. 59(*a*) to 59(*c*) are a perspective view, a view from the minus side of the f-axis, and a view from the plus side of the μ-axis, of a spectral dispersion of V signals in the three-dimensional frequency space.
Figure 59:
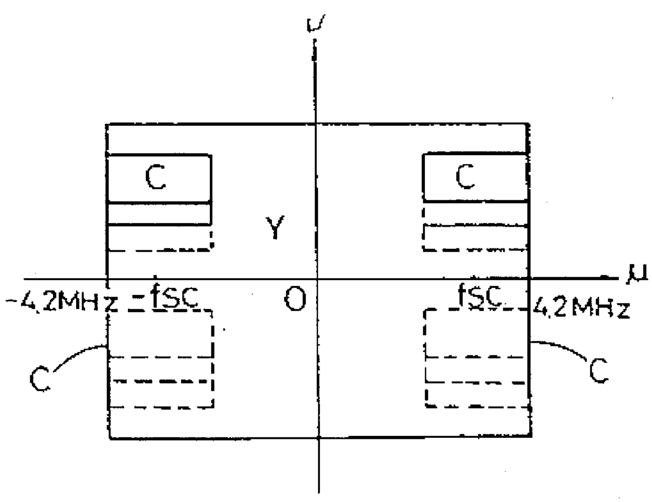
Figure 59:
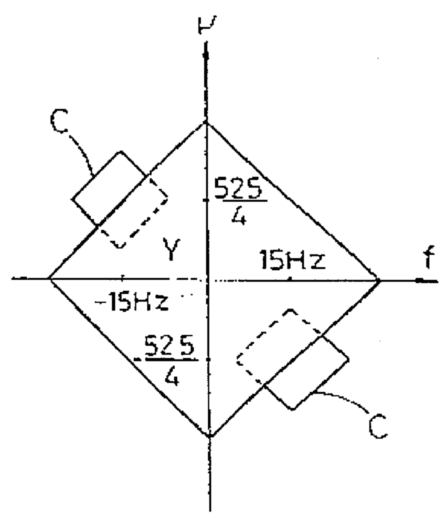
Figure 60:
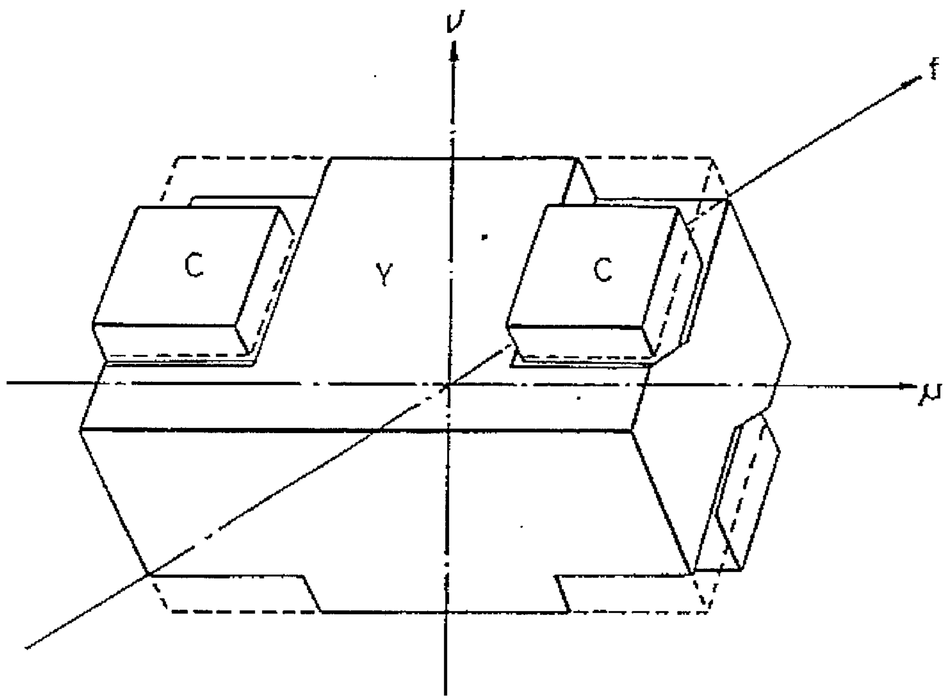
FIGS. 60(*a*) to 60(*c*) are a perspective view, a view from the minus side of the f-axis, and a view from the plus side of the μ-axis, of a spectral dispersion of Y signals and C signals obtained by an inter-field YC separation A1, in the three-dimensional frequency space.
Figure 60:
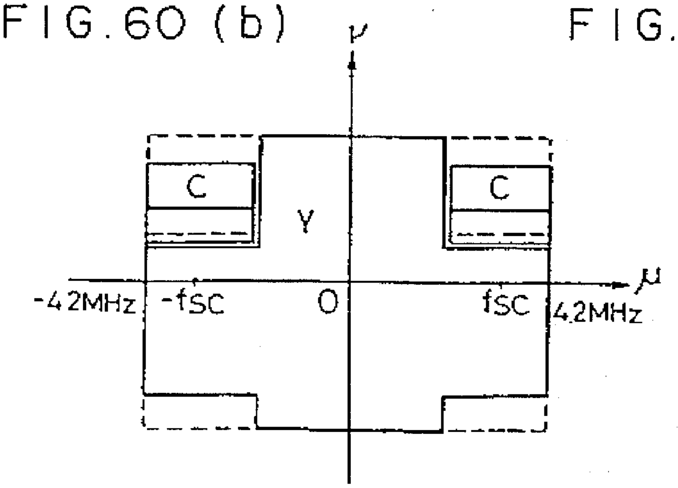
Figure 60:
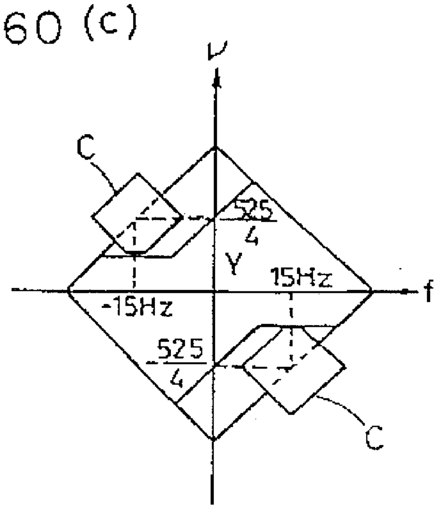

FIG. 59 shows a projection of the three-dimensional frequency space like FIG. 36. FIGS. 60(*a*) to 60(*c*) show three-dimensional frequency spaces in which Y signals and C signals obtained by the inter-field YC separation A1.

FIGS. 61(*a*) to 61(*c*) show frequency spaces in which Y signals and C signals obtained by the inter-field YC separation B1.

Figure 62A:
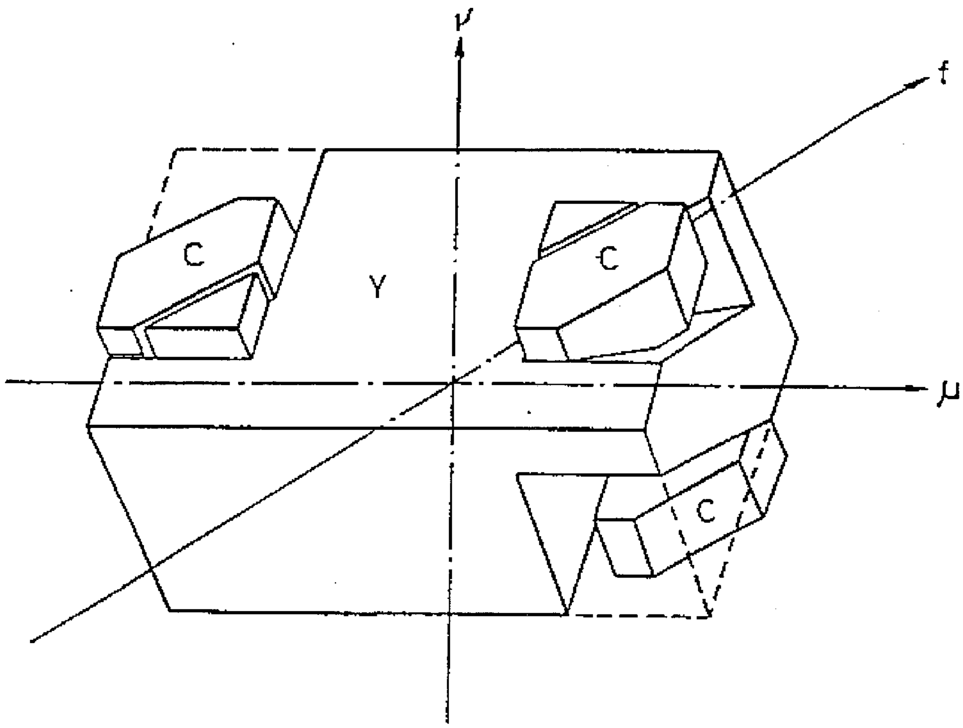
FIGS. 62(*a*) to 62(*c*) are a perspective view, a view from the minus side of the f-axis, and a view from the plus side of the μ-axis, of a spectral dispersion of Y signals and C signals obtained by an inter-field YC separation C1, in the three-dimensional frequency space.
Figure 62B:
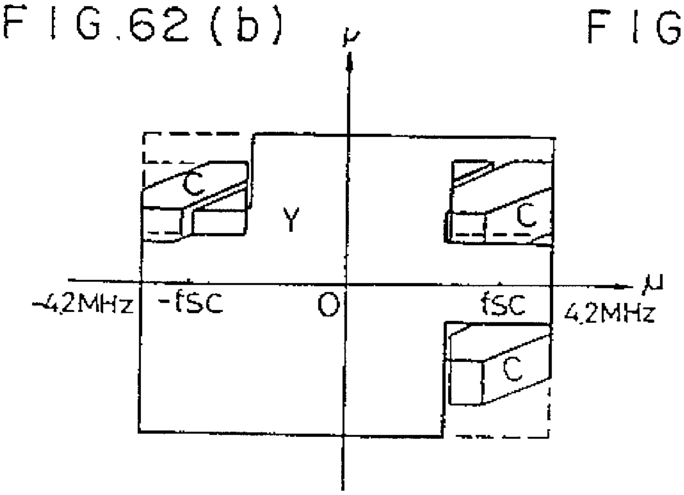
Figure 62C:
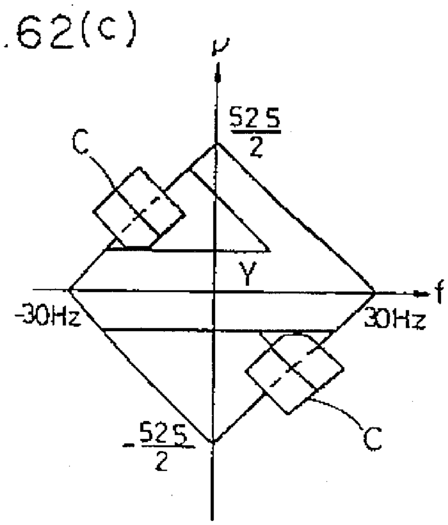

FIGS. 62(*a*) to 62(*c*) show frequency spaces in which Y signals and C signals obtained by the inter-field YC separation C1.

A description is given of operations of the intra-frame YC separating circuit 4050, the correlation detecting circuit 4060, and the isolated point eliminating circuit 4070 shown in FIG. 43. In this eighth embodiment of the present invention, when the movement detecting circuit 4080 judges that the image is a moving image, an optimum one is selected from the intra-frame YC separations including three kinds of inter-field operations and used in place of the intra-field YC separation, in accordance with the result of an addition of correlations of a particular sampling point and the neighboring sampling points.

In FIG. 43, V signal 4101 is input to the input terminal 4001 and a correlation of the image is detected in the correlation detecting circuit 4060. Further, correlations of the particular sampling point and the neighboring sampling points are added in the isolated point eliminating circuit 4070 and when the particular sampling point is an isolated point, the correlation of the particular sampling point is finally decided from the neighboring sampling points. The V signal 4101 is input to the intra-frame YC separating circuit 4050 and then an optimum one is selected from the three kinds of intra-frame YC separations including the inter-field operations in accordance with the decided correlation, by the correlation detecting circuit 4060 whereby an intra-frame YC separated Y signal 4112 and an intra-frame YC separated C signal 4113 are output.

A description is given of the operation of the intra-frame YC separating circuit 4050 shown in FIG. 43. In FIG. 50, V signal 4101 input to the input terminal 4032 is delayed by two pixels in the two-pixel delay circuit 4011*c* and by 262 lines in the 262-line delay circuit 4012*c*.

An output 4123 of the two-pixel delay circuit 4011*c* and an output of the 262-line delay circuit 4012*c* are subtracted by the subtracter 4016*c*, leaving an inter-field difference for the inter-field YC separation C1.

The output 4123 of the two-pixel delay circuit 4011*c* and an output, which is delayed by four pixels in the four-pixel delay circuit 4013*c*, are subtracted by the subtracter 4017*c*, leaving an inter-field difference for the inter-field YC separation B1.

The output 4123 of the two-pixel delay circuit 4011*c* and an output, which is delayed by one-line in the one-line delay circuit 4014*c* and by two-pixels in the two-pixel delay circuit 4015*c*, are subtracted by the subtracter 4018*c*, leaving an inter-field difference for the inter-field YC separation A1.

These three kinds of inter-field differences are selected in the signal selecting circuit 4019*c* by the selecting signal 4116 output from the correlation detecting circuit 4060.

When an output 4124 of the signal selecting circuit 4019*c* passes through the inter-field BPF 4020*c*, it is subjected to a two-dimensional band restriction, resulting in an intra-frame YC separated C signal 4113.

The intra-frame YC separated C signal 4113 is subtracted from the output 4123 of the two-pixel delay circuit 4011*c* by the subtracter 4021*c*, leaving an inter-frame YC separated Y signal 4112.

Figure 51:
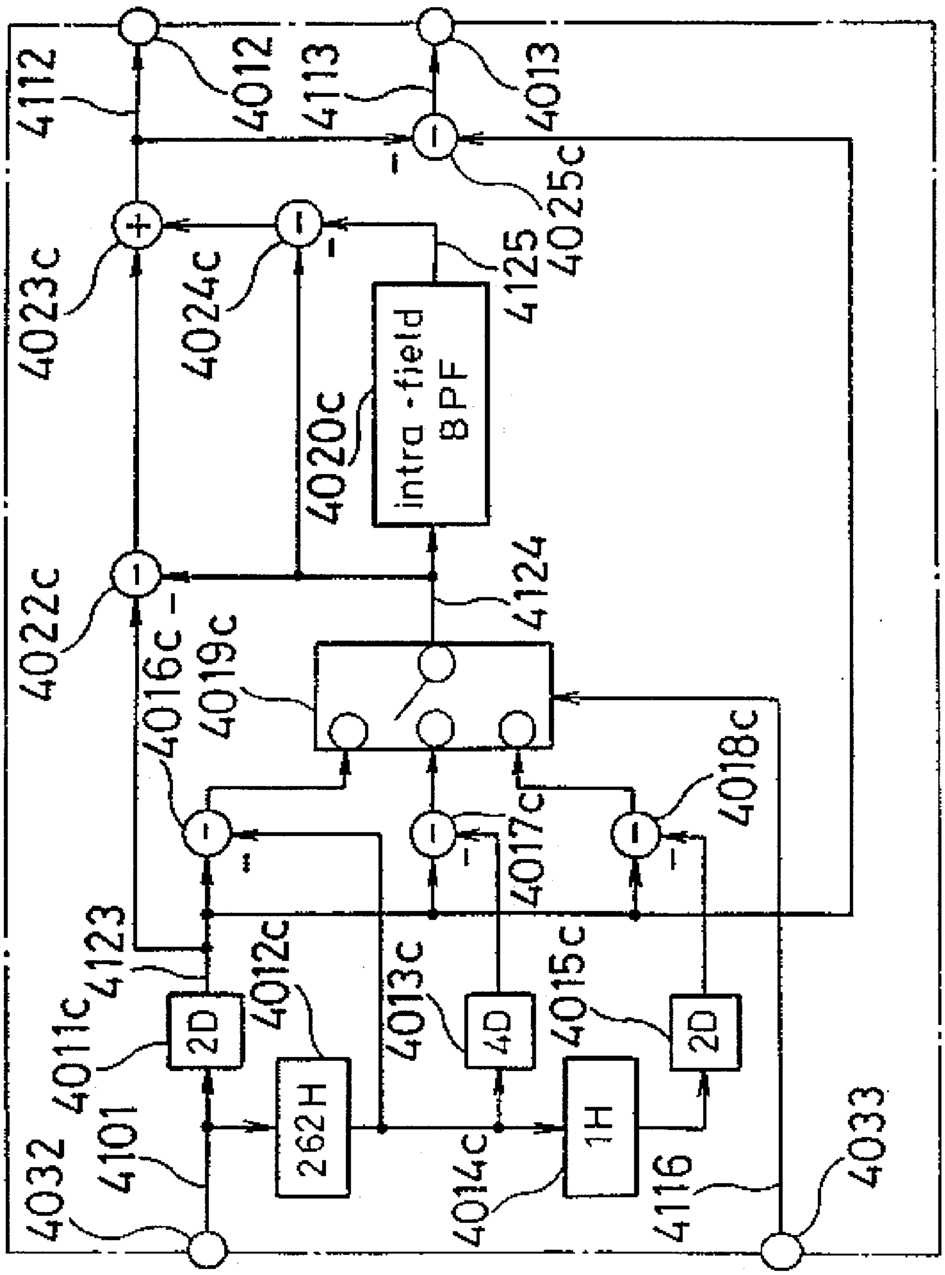
FIG. 51 is a block diagram showing a second example of the intra-frame YC separating circuit shown in FIG. 43.

FIG. 51 is a block diagram showing a second example of the intra-frame YC separating circuit 4050 shown in FIG. 43. In FIG. 51, the only difference from FIG. 50 resides in the method of the intra-field band restriction. The circuit of FIG. 51 has the same structure as that of the intra-frame YC separating circuit shown in FIG. 29.

Also in this embodiment, by adaptively switching the inter-field processes, no deterioration in resolution occurs when the image moves in some direction like shown in FIG. 108(*a*), whereby crosstalks between Y signals and C signals are reduced.

A description is given of the operation of the intra-field BPF 4020*e* shown in FIGS. 50 and 51. In FIG. 54, an output 4124 of the signal selecting circuit 4019*c* is input to the input terminal 4034. Then, only a vertical high-frequency component of the output 4124 is extracted by the one-line delay circuit 4011*d* and the subtracter 4012*d* and only a horizontal high-frequency component thereof is extracted by the BPF 4013*d*. Thus, the two-dimensional band restriction is carried out.

Figure 55:
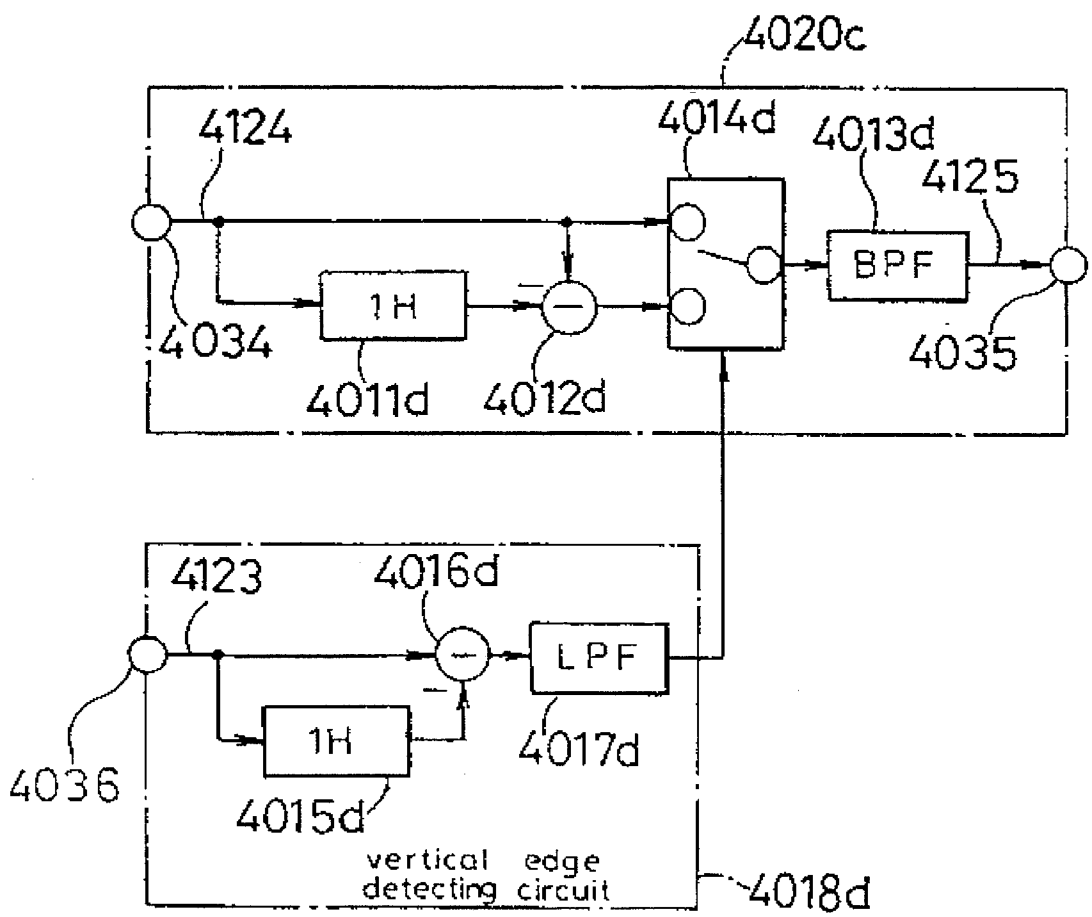
FIG. 55 is a block diagram showing another example of the intra-field BPF in the intra-frame YC separating circuits shown in FIGS. 50 and 51.

Alternatively, the intra-field BPF 4020*e* may have a structure shown in FIG. 55. The intra-field BPF shown in FIG. 55 has the same structure as the intra-field BPF 3020*c* shown in FIG. 32, While in FIGS. 54 and 55 the one-line delay circuit 4011*d* and the subtracter 4012*d* are used to extract only the vertical high-frequency component, the vertical high-frequency component can be obtained by an operation using a plurality of one-line delay circuits.

A description is given of third and fourth examples of the intra-frame YC separating circuit 4050 shown in FIG. 43.

Figure 63:
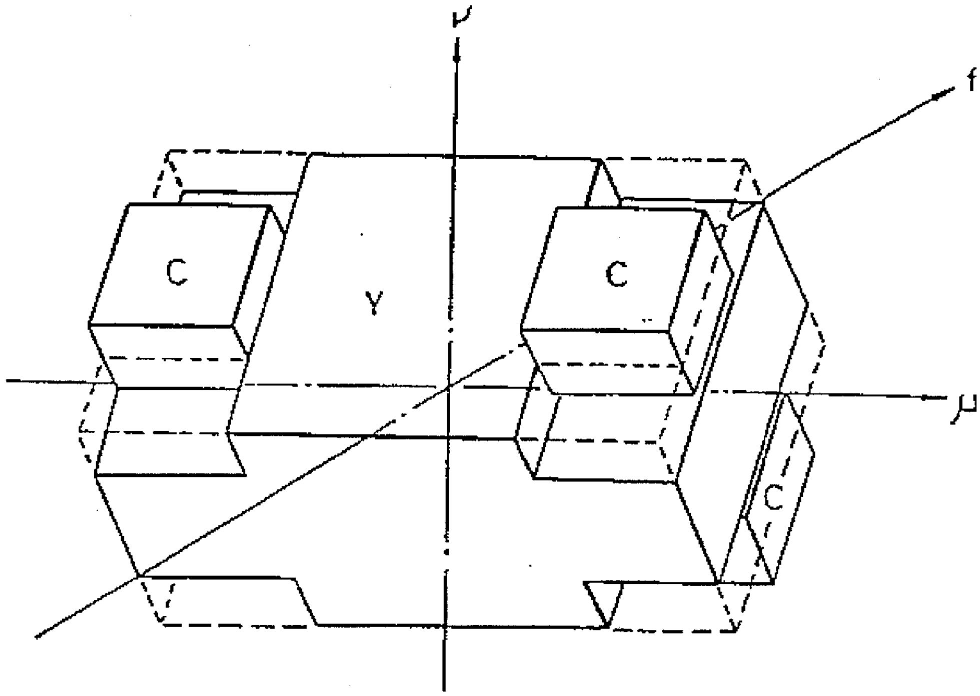
FIGS. 63(*a*) to 63(*c*) are a perspective view, a view from the minus side of the f-axis, and a view from the plus side of the μ-axis, of a spectral dispersion of Y signals and C signals obtained by an inter-field YC separation A2, in the three-dimensional frequency space.
Figure 63:
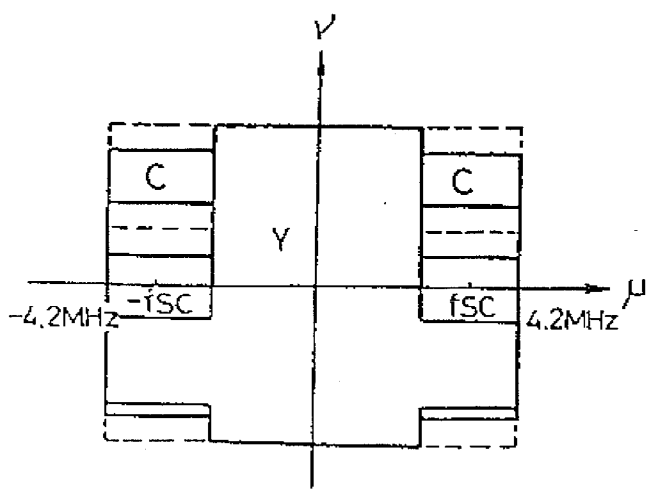
Figure 63:
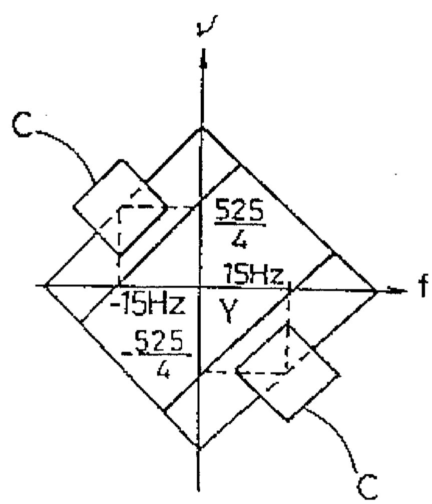

FIGS. 63(*a*) to 63(*c*) show three-dimensional frequency spaces like FIGS. 40(*a*) to 40(*c*), in which Y signals and C signals obtained by the inter-field YC separation A2 are present.

FIGS. 64(*a*) to 64(*c*) also show frequency spaces in which Y signals and C signals obtained by the inter-field YC separation 52 are present. In FIGS. 64(*a*) to 64(*c*), although it seems that a part of the C signals is included in the Y signals, the C signals are hardly included in the Y signals because the correlation between them is so strong.

Figure 65:
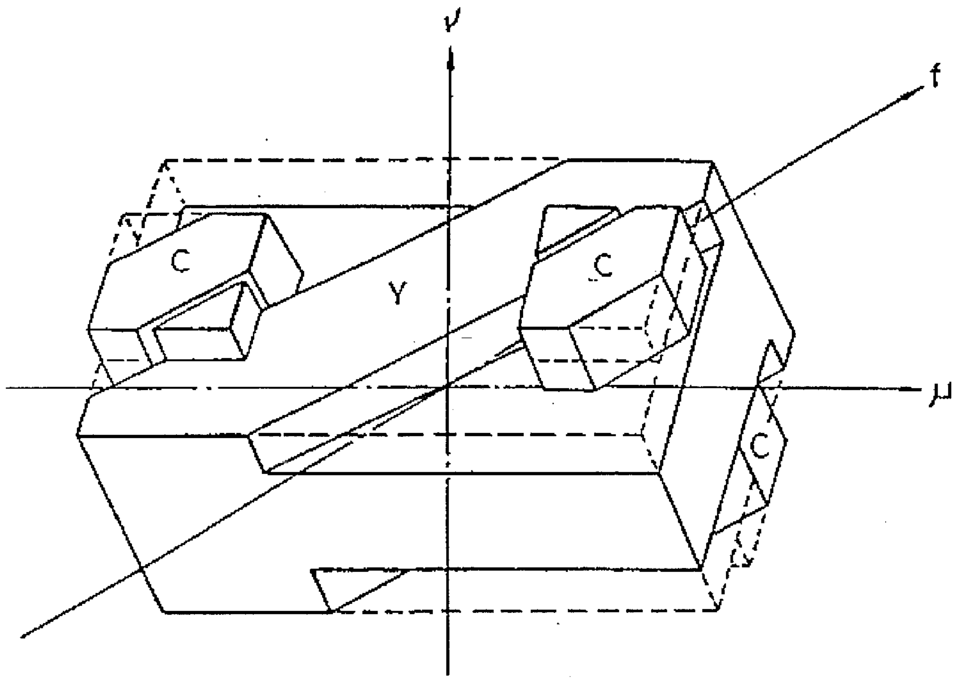
FIGS. 65(*a*) to 65(*c*) are a perspective view, a view from the minus side of the f-axis, and a view from the plus side of the μ-axis, of a spectral dispersion of Y signals and C signals obtained by an inter-field YC separation C2, in the three-dimensional frequency space.
Figure 65:
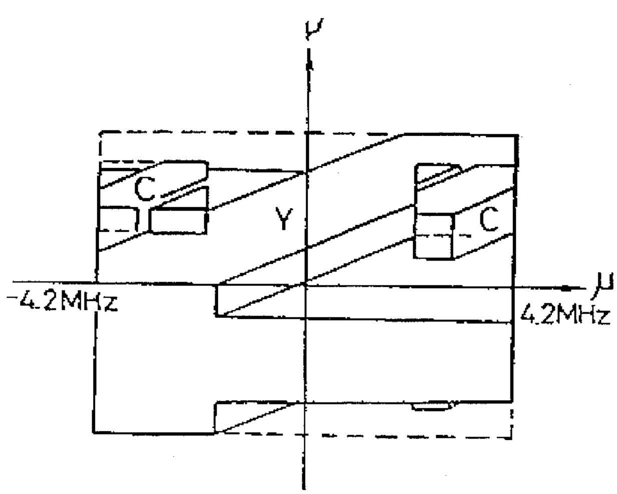
Figure 65:
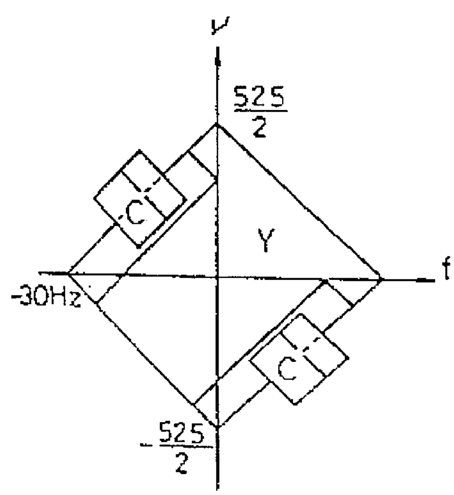

FIGS. 65(*a*) to 65(*c*) also show frequency spaces in which Y signals and C signals obtained by the inter-field YC separation C2 are present. In FIGS. 65(*a*) to 65(*c*), although it seems that a part of the C signals is included in the Y signals, the C signals are hardly included in the Y signals because the correlation between them is so strong.

Figure 52:
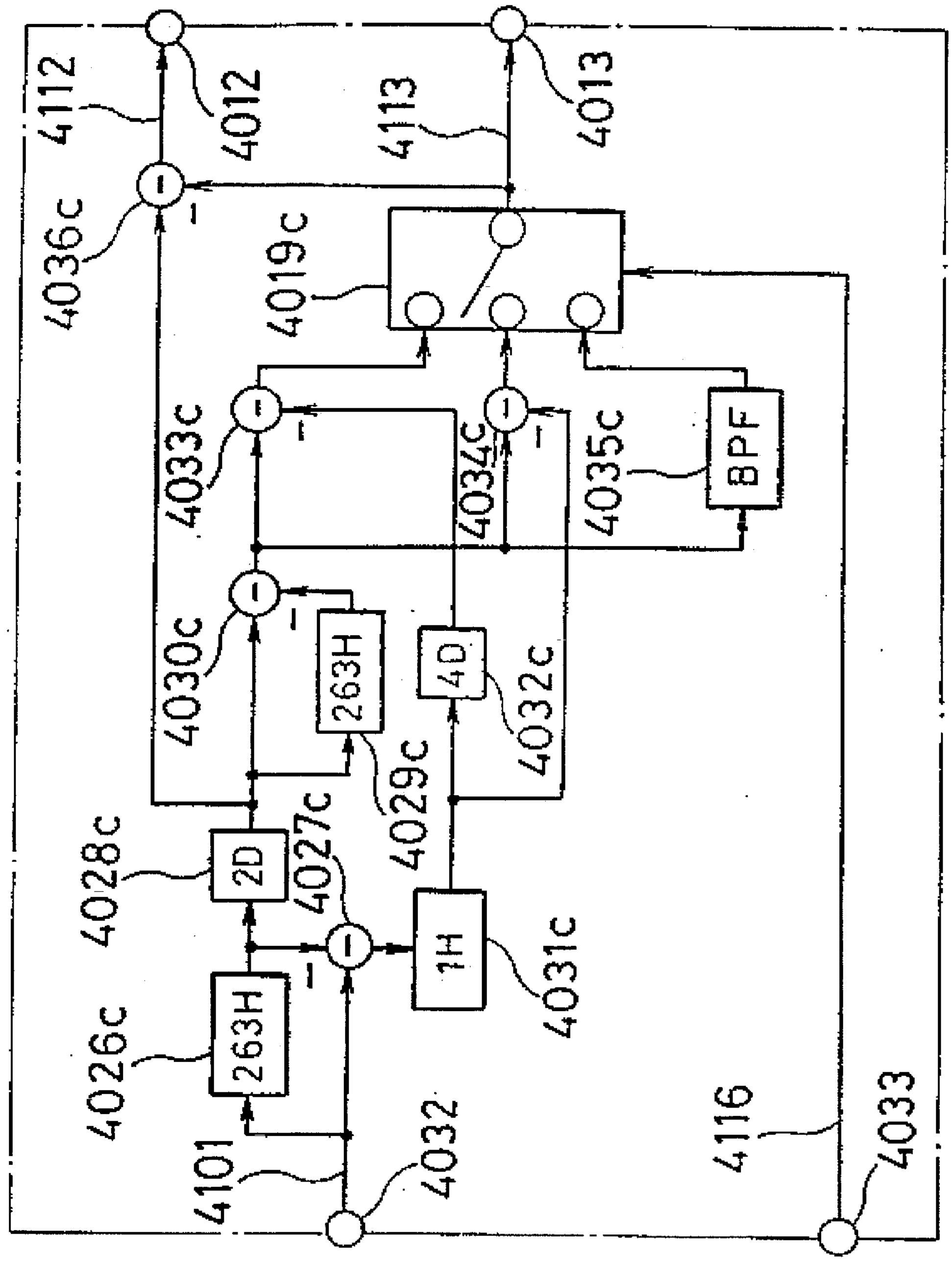
FIG. 52 is a block diagram showing a third example of the intra-frame YC separating circuit shown in FIG. 43.

FIG. 52 is a block diagram showing a third example of the intra-frame YC separating circuit 4050 shown in FIG. 43. In FIG. 52, above-described inter-field YC separations A2, B2, and C2 are used in place of the inter-field YC separations A1, B1, and C1 which are used in the embodiment of FIG. 50. The circuit of FIG. 52 has the same structure as the intra-frame YC separating circuit 3050 shown in FIG. 30.

Figure 53:
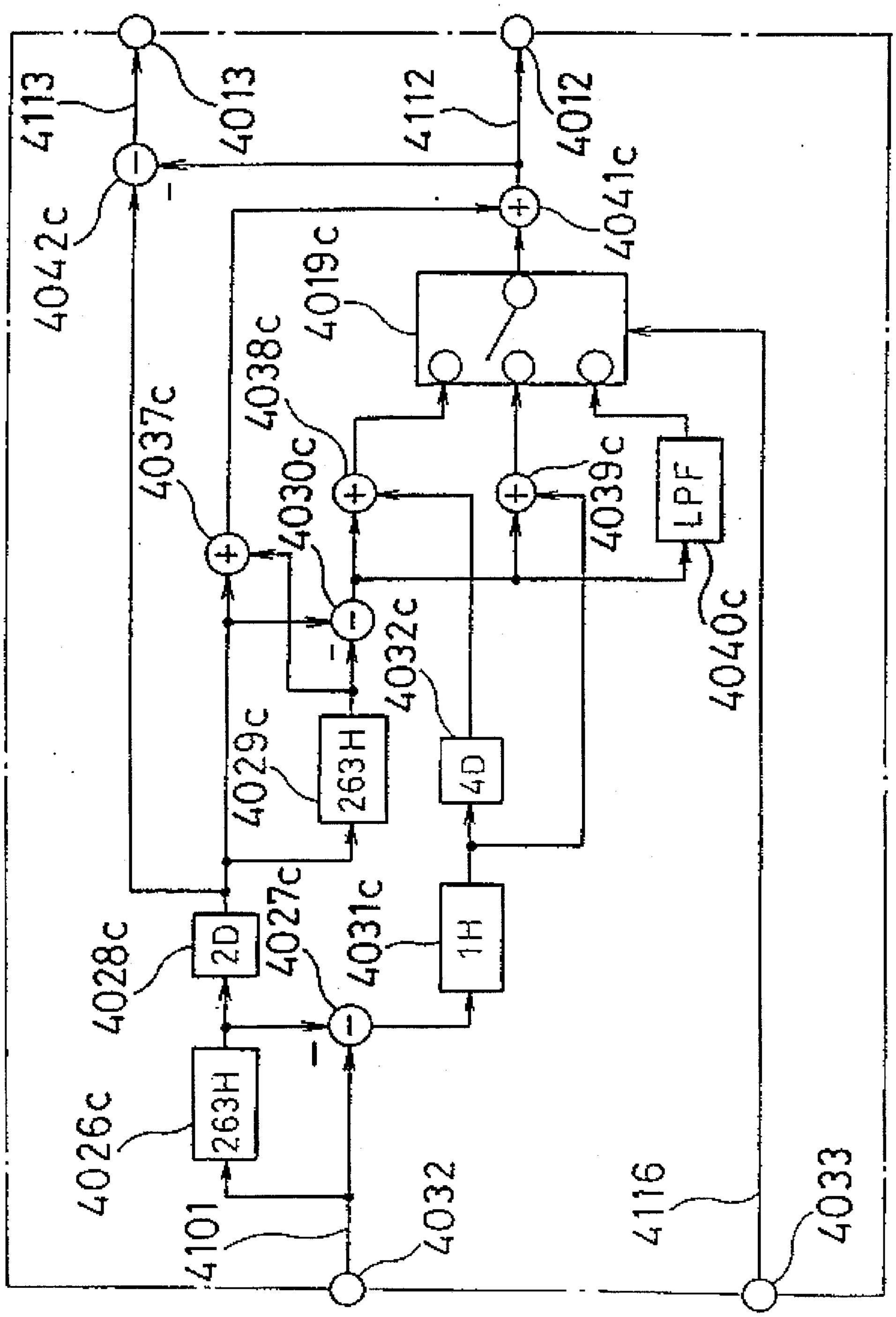
FIG. 53 is a block diagram showing a fourth example of the intra-frame YC separating circuit shown in FIG. 43.

FIG. 53 is a block diagram showing a fourth example of the intra-frame YC separating circuit 4050 shown in FIG. 43. In FIG. 53, above-described inter-field YC separations A2, 52, and C2 are used in place of the inter-field YC separations A1, B1, and C1 which are used in the embodiment of FIG. 50. In addition, differently from FIG. 52, the band restriction is applied not to the C signal but to the Y signal. The circuit of FIG. 53 has the same structure as the intra-frame YC separating circuit 3050 shown in FIG. 31.

Figure 56:
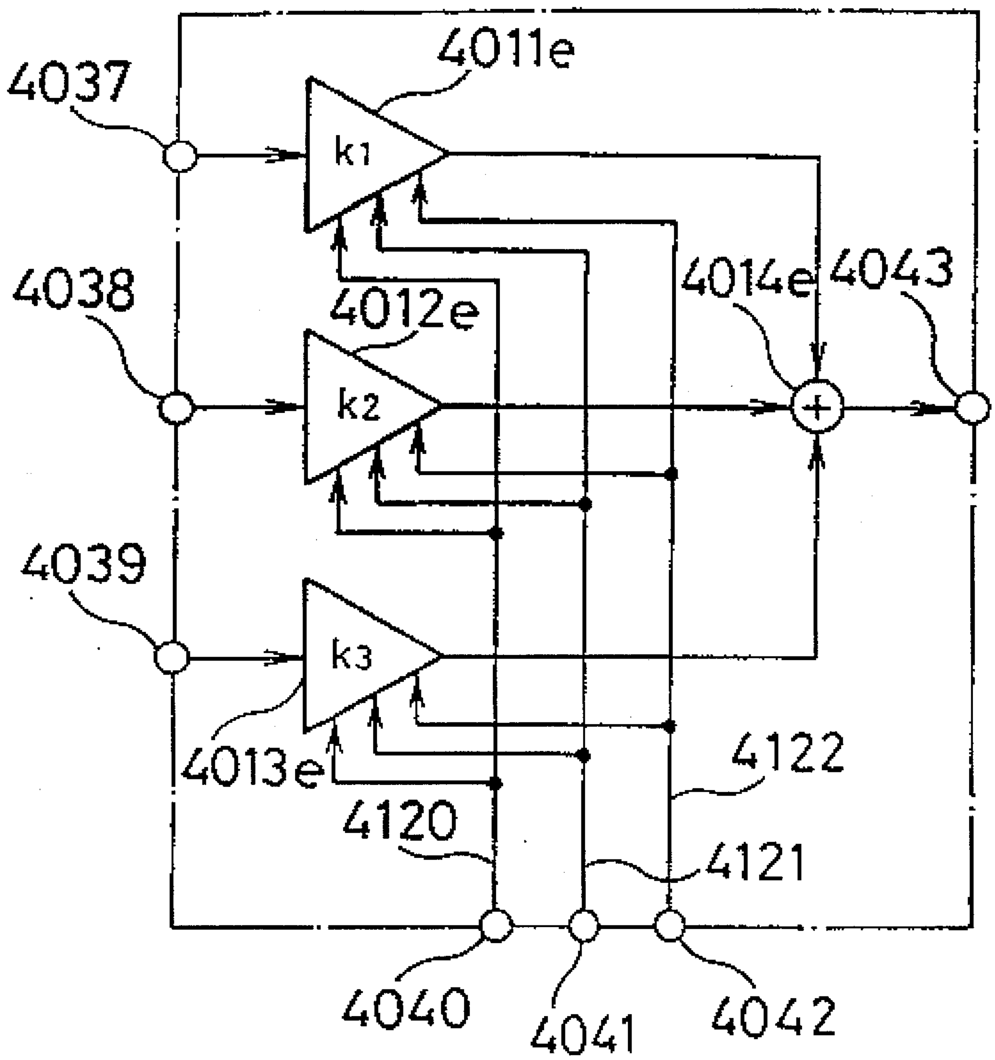
FIG. 56 is a block diagram showing another example of the signal selecting circuit in the intra-frame YC separating circuits shown in FIGS. 50 to 53.

A signal selecting circuit shown in FIG. 56 may be used instead of the signal selecting circuit 4019*e* shown in FIGS. 50 to 53. In FIG. 56, the result of the inter-field YC separation C1 or C2 is input to the input terminal 4037, the result of the inter-field YC separation B1 or B2 is input to the input terminal 4038, and the result of the inter-field YC separation A1 or A2 is input to the input terminal 4039.

In addition, a correlation 4120 in the direction connecting the particular sampling point (★) and the sampling point (●) shown in FIG. 58(*a*) is input to the input terminal 4040, a correlation 4121 in the direction connecting the particular sampling point (★) and the sampling point (●) is input to the input terminal 4041, and a correlation 4122 in the direction connecting the particular sampling point (★) and the sampling point (●) is input to the input terminal 4042.

A signal input to the input terminal 4037 is multiplied by a coefficient $k_1$ in a coefficient multiplier 4011*e*, a signal input to the input terminal 4038 is multiplied by a coefficient $k_2$ in a coefficient multiplier 4012*e*, and a signal input to the input terminal 4039 is multiplied by a coefficient $k_3$ in a coefficient multiplier 4013*e*. These signals are added by an adder 4014*e* and output from the output terminal 4043.

The coefficient $k_1$, $k_2$ and $k_3$ of the coefficients multipliers 4011*e*, 4012*e*, and 4013*e* are set in accordance with the intensity of the correlations 4120, 4121, and 4122, respectively, so as to satisfy $0 \leqq k_1, k_2, k_3 \leqq 1$ and $k_1+k_2+k_3=1$. Therefore, a result, in which the three kinds of inter-fields YC separations are mixed, is obtained by the circuit shown in FIG. 56.

The correlation detecting circuit 4060 shown in FIG. 47 detects-a correlation between the sampling points (●) and , a correlation between the sampling points (●) and , and a correlation between the sampling points (●) and , shown in FIGS. 58(*a*) and 58(*b*), in the same way as the correlation .detecting circuit 2050 shown in FIG. 25.

Isolated points of the correlation signals 4117, 4118, and 4119 are eliminated by the isolated point eliminating circuit 4070, and the signals are input to the minimum value selecting circuit 4024*b*.

The minimum value selecting circuit 4024*b* selects the minimum one from the three kinds of absolute value outputs (the correlation detecting amount is the maximum) and outputs a selecting signal 4116 from the output terminal 4016. This selecting signal 4116 controls the signal selecting circuit 4019*e* in the intra-frame YC separating circuit 4050.

Figure 48:
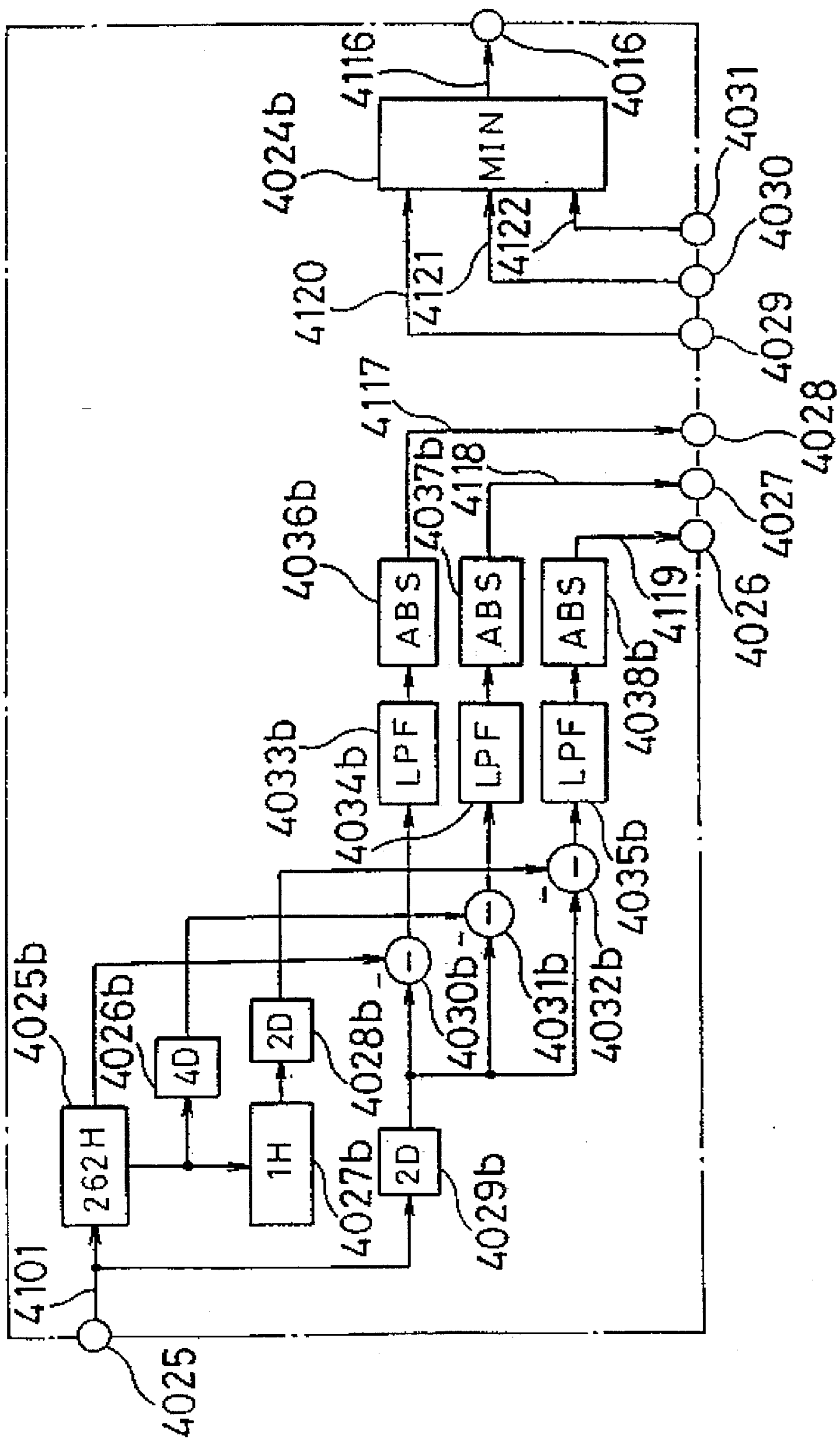
FIG. 48 is a block diagram showing a second example of the correlation detecting circuit shown in FIG. 43.

FIG. 48 is a block diagram showing a second example of the correlation detecting circuit 4060 shown in FIG. 43. In FIG. 48, a difference from the circuit shown in FIG. 47 resides in that a correlation is partially detected by an operation between a particular sampling point and a sampling point one-field before. A correlation detecting circuit shown in FIG. 48 partially detects the correlation by a horizontal low-frequency component of a difference between the particular sampling point and the sampling point one-field before which has an opposite phase of color sub-carrier wave to that of the particular sampling point.

The correlation detecting circuit shown in FIG. 48 detects a correlation between the particular sampling point (★) and the sampling point (●) a correlation between the particular sampling point (★) and the sampling point (●), and a correlation between the particular sampling point (★) and the sampling point (●) shown in FIG. 58(*a*), in the same way as the correlation detecting circuit shown in FIG. 26.

Figure 49:
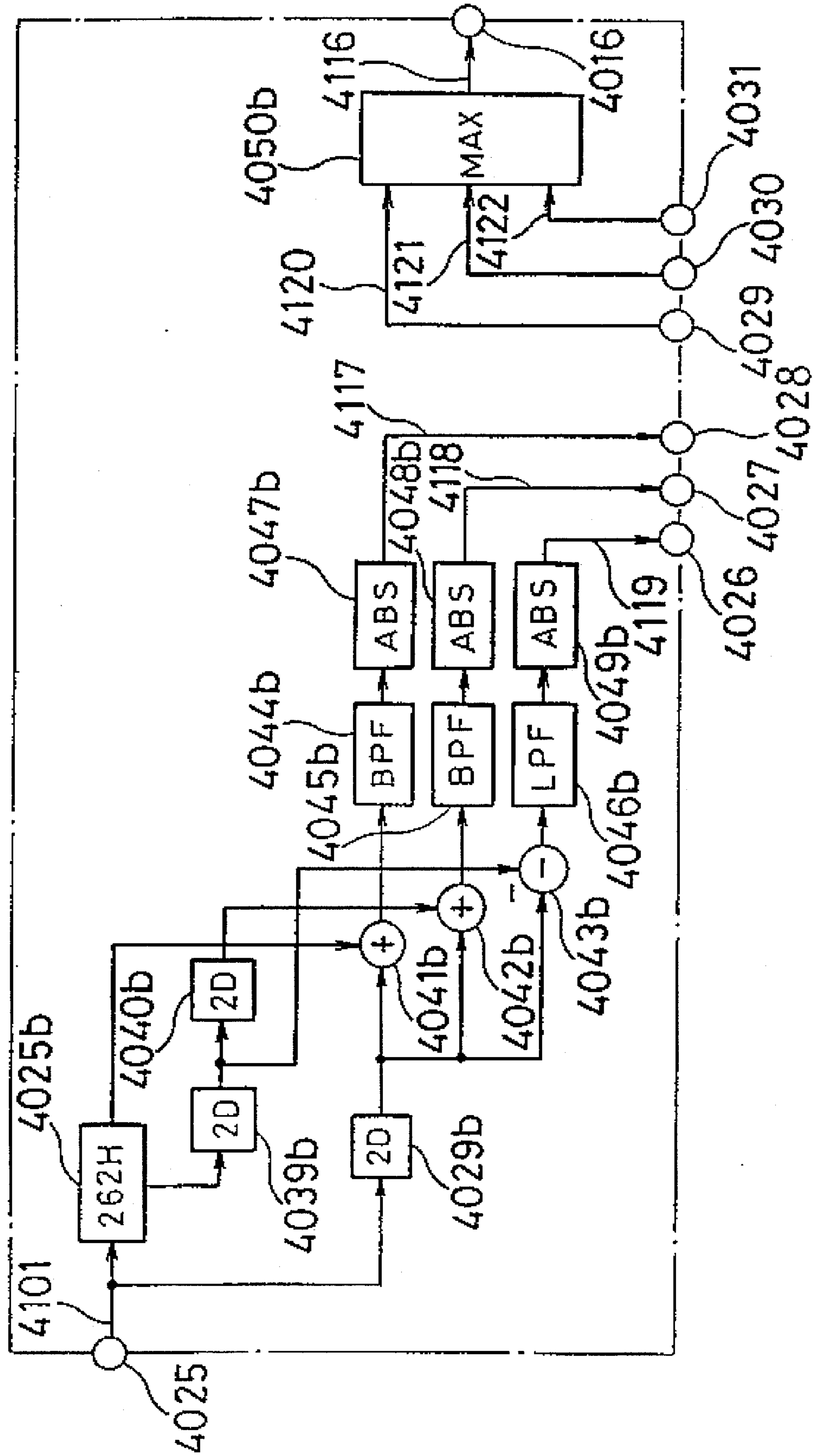
FIG. 49 is a block diagram showing a third example of the correlation detecting circuit shown in FIG. 43.

FIG. 49 is a block diagram showing a third example of the correlation detecting circuit 4060 shown in FIG. 43. In this second example, a difference from the circuit shown in FIG. 47 resides in that the correlation is partially detected by an operation between a particular sampling point and a sampling point one-field before. In addition, a difference from the circuit shown in FIG. 48 resides in that a direction, in which the spectrum of Y signal broadens in the three-dimensional frequency space, is detected.

The correlation detecting circuit shown in FIG. 49 detects a correlation between the particular sampling point (★) and the sampling point (●), a correlation between the particular sampling point (★) and the sampling point (●), and a correlation between the particular sampling point (★) and the sampling point (●) in the same way as the correlation detecting circuit 3060 shown in FIG. 27.

Isolated points of these correlation signals are eliminated by the isolated point eliminating circuit 4070, and the signals are input to the maximum value selecting circuit 4050*b*.

The isolated point eliminating circuit 4070 shown in FIG. 43 operates as follows. In FIG. 44, a correlation signal 4117, which detects a correlation in a direction connecting the particular sampling point (★) and the sampling point (●), is input to the input terminal 4017. A correlation signal 4118, which detects a correlation in a direction connecting the particular sampling point (★) and the sampling point (●), is input to the input terminal 4018. A correlation signal 4119, which detects a correlation in a direction connecting the particular sampling point (★) and the sampling point (●), is input to the input terminal 4019.

The correlation signal 4117 is delayed by one pixel in the one-pixel delay circuit 4013*a* and further delayed by one pixel in the one-pixel delay circuit 4014*a*. The absolute value output 4117, an output of the one-pixel delay circuit 4013*a*, and an output of the one-pixel delay circuit 4014*a* are input to the adder 4035*a* as correlations of the sampling points (♦), (●)b, and (◇) shown in FIG. 58(*a*) in the direction connecting the particular sampling point (★) and the sampling point (●), respectively.

On the other hand, the correlation signal 4117 is delayed by one line in the one-line delay circuit 4011*a*, by one pixel in the one-pixel delay circuit 4015*a*, and by one pixel in the one-pixel delay circuit 4016*a*. An output of the one-line delay circuit 4011*a*, an output of the one-pixel delay circuit 4015*a*, and an output of the one-pixel delay circuit 4016*a* are input to the adder 4035*a* as correlations of the sampling point (◇), the particular sampling point (★) and the sampling point (♦) shown in FIG. 58(*a*) in the direction connecting the particular sampling point (★), and the sampling point (●), respectively.

An output of the one-line delay circuit 4011*a* is delayed by one pixel in the one-line delay circuit 4012*a*, by one pixel in the one-pixel delay circuit 4017*a*, and by one-pixel by the one-pixel delay circuit 4018*a*. An output of the one-line delay circuit 4012*a*, an output of the one-pixel delay circuit 4017*a*, and an output of the one-pixel delay circuit 4018*a* are input to the adder 4035*a* as correlations of the sampling points (♦), (●)a, and (◇) shown in FIG. 58 (*a*) in the direction connecting the particular sampling point (★) and the sampling point (●), respectively.

The adder 4035*a* adds the input correlations, whereby a correlation in the direction connecting the particular sampling point (★) and the sampling point (●) is finally decided.

In addition, the correlation signal 4118 is delayed in the one-line delay circuits 4019*a* and 4020*a* and the one-pixel delay circuits 4021*a* to 4026*a*, like the correlation signal 4117. Then, correlations of the sampling points (♦), (●)b, (◇), (◇), the particular sampling point (★), the sampling points (♦), (♦), (●)a, and (◇) shown in FIG. 58 (*a*) are added to the correlation signal 4118 by the adder 4036*a*, whereby a correlation in the direction connecting the particular sampling point and the sampling point (●) are finally decided.

In addition, the correlation signal 4119 is delayed in the one-line delay circuits 4027*a* and 4028*a* and the one-pixel delay circuits 4029*a* to 4034*a*, like the correlation signal 4117. Then, correlations of the sampling points (♦), (●)b, (◇), (◇), the particular sampling point (★), the sampling points (♦), (♦), (●)a, and (◇) shown in FIG. 58(*a*) are added to the correlation signal 4119 by the adder 4037*a*, whereby a correlation in the direction connecting the particular sampling point and the sampling point (●) is finally decided.

An output 4120 of the adder 4035*a* is input to the input terminal 4029 of the correlation detecting circuit 4070, an output 4121 of the adder 4036*a* is input to the input terminal 4030 of the correlation detecting circuit 4070, and an output 4122 of the adder 4037*a* is input to the input terminal 4031 of the correlation detecting circuit 4070, and then selecting signals are output.

As described above, the isolated point eliminating circuit according to this embodiment detects correlation values in a plurality of directions between fields with respect to the particular sampling point and the neighboring sampling points from the output of the correlation detecting circuit and then adds and compares the correlation values, whereby the inter-field correlation at the particular sampling point is decided. When the particular sampling point is judged to be an isolated point, the isolated point is eliminated, and then a plurality of intra-frame processes including inter-field operations are adaptively switched by that result. Therefore, the detection of the correlation is possible after eliminating the isolated point.

In FIG. 44, the correlation is decided by nine sampling points, i.e., three pixels in the horizontal direction and three lines in the vertical direction in the same field with the particular sampling point as a center. However, the number of the sampling points may be increased in the horizontal and vertical directions.

Figure 45:
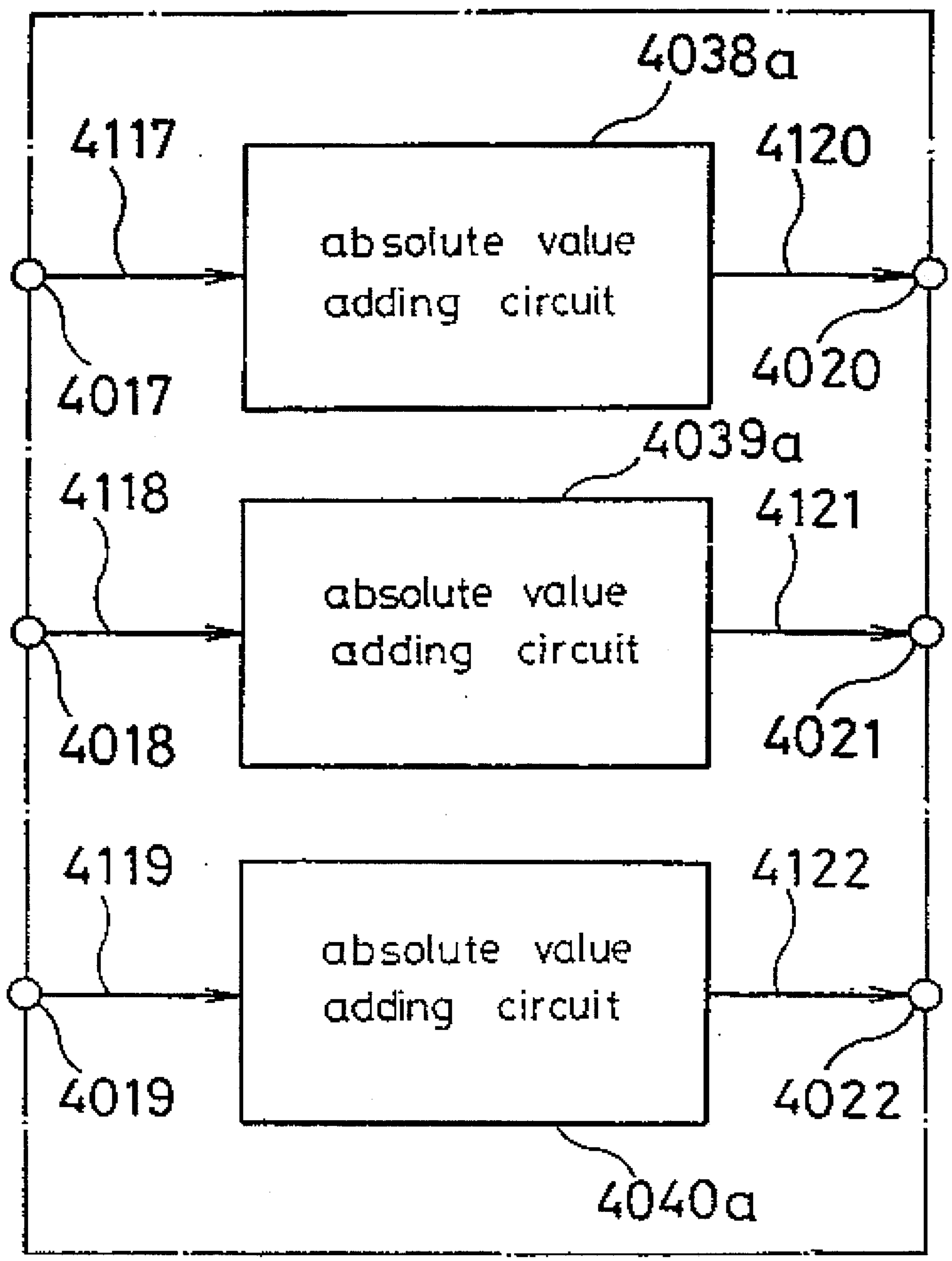
FIG. 45 is a block diagram showing a second example of the isolated point eliminating circuit shown in FIG. 43.

FIG. 45 is a diagram showing a second example of the isolated point eliminating circuit 4070 shown in FIG. 43. In FIG. 45, the only difference from FIG. 44 resides in that weights are applied to the signals of the neighboring sampling points according to the distance from the particular sampling point to each neighboring point.

In FIG. 45, the correlation signals 4117, 4118, and 4119 are added by the absolute value addition circuits 4038*a*, 4039*a*, and 4040*a*, whereby a correlation in the direction connecting the particular sampling point (★) and the sampling point (●), a correlation in the direction connecting the particular sampling point (★) and the sampling point (●), and a correlation in the direction connecting the particular sampling point (★) and the sampling point (●) are decided. An output of the absolute value addition circuit 4038*a* is output from the output terminal 4020, an output 4121 of the absolute value addition circuit 4039*a* is output from the output terminal 4021, and an output 4122 of the absolute value addition circuit 4040*a* is output from the output terminal 4022.

FIG. 46 is a block diagram showing the absolute value addition circuit 4038*a*, 4039*a*, or 4040*a*. An absolute value output 4123 input to the input terminal 4023 is delayed in the one-pixel delay circuits 4045*a*, 4046*a*, 4047*a*, and 4048*a* each by one pixel. The absolute value output 4123 and the outputs of the one-pixel delay circuits 4045*a*, 4046*a*, 4047*a*, and 4048*a* are multiplied by a coefficient α by the coefficient multipliers 4049*a*, 4068*a*, 4067*a*, 4066*a*, and 4065*a*, respectively, and then input to the adder 4090*a* as correlations of the sampling points (●), (◇), (○), (♦), and (●).

On the other hand, the absolute value output 4123 is delayed by one line in the one-line delay circuit 4041*a* and delayed in the one-pixel delay circuits 4049*a*, 4050*a*, 4051*a*, and 4052*a* each by one pixel. An output of the one-line delay circuit 4041*a* and an output of the one-pixel delay circuit 4052*a* are multiplied by the coefficient α by the coefficient multipliers 4074*a* and 4070*a*, respectively, and then input to the adder 4090*a* as correlations of the sampling points (○) and (○), respectively. An output of the one-pixel delay circuit 4049*a*, an output of the one-pixel delay circuit 4050*a*, and an output of the one-pixel delay circuit 4051*a* are multiplied by a coefficient β by the coefficient multipliers 4073*a*, 4072*a*, and 4071*a*, respectively, and then input to the adder 4090*a* as correlations of the sampling points (♦), (●)b, and (↑), respectively.

On the other hand, an output of the one-line delay circuit 4041*a* is delayed by one line in the one-line delay circuit 4042*a* and delayed in the one-pixel delay circuits 4057*a*, 4058*a*, 4059*a*, and 4060*a* each by one pixel. An output of the one-line delay circuit 4042*a* and an output of the one-pixel delay circuit 4056*a* are multiplied by the coefficient α by the coefficient multipliers 4079*a* and 4075*a*, respectively, and then input to the adder 4090*a* as correlations of the sampling points (●)d and (●)c, respectively. An output of the one-pixel delay circuit 4053*a*, an output of the one-pixel delay circuit 4054*a*, and an output of the one-pixel delay circuit 4055*a* are multiplied by the coefficient β by the coefficient multipliers 4078*a*, 4077*a*, and 4076*a*, respectively, and then input to the adder 4090*a* as correlations of the sampling point (◇), the particular sampling point (★), and the sampling point (♦), respectively.

On the other hand, an output of the one-line delay circuit 4042*a* is delayed by one line in the one-line delay circuit 4043*a* and delayed in the one-pixel delay circuits 4057*a*, 4058*a*, 4059*a*, and 4060*a* each by one pixel. An output of the one-line delay circuit 4043*a* and an output of the one-pixel delay circuit 4060*a* are multiplied by the coefficient α by the coefficient multipliers 4084*a* and 4080*a*, respectively, and then input to the adder 4090*a* as correlations of the sampling points (○) and (○), respectively. An output of the one-pixel delay circuit 4057*a*, an output of the one-pixel delay circuit 4058*a*, and an output of the one-pixel delay circuit 4059*a* are multiplied by the coefficient β by the coefficient multipliers 4083*a*, 4082*a*, and 4081*a*, respectively, and then input to the adder 4090*a* as correlations of the sampling points (♦), (●)a, and (◇), respectively.

On the other hand, an output of the one-line delay circuit 4043*a* is delayed by one line in the one-line delay circuit 4044*a* and delayed in the one-pixel delay circuits 4061*a*, 4062*a*, 4063*a*, and 4064*a* each by one pixel. An output of the one-line delay circuit 4044*a* and outputs of the one-pixel delay circuits 4061*a*, 4062*a*, 4063*a*, and 4064*a* are multiplied by the coefficient α by the coefficient multipliers 4089*a*, 4088*a*, 4087*a*, 4086*a*, and 4085*a*, respectively, and then input to the adder 4090*a* as correlations of the sampling points (●), (◇), (○), (♦), and (●) respectively.

The adder 4090*a* adds the input correlations, whereby correlations in the directions connecting the particular sampling point (★) and the sampling points (●), , and are finally decided.

The coefficients α and β of the coefficient multipliers 4065*a* to 4089*a* have the relation of α<β. That is, correlations of the sampling points which are close to the particular sampling point are counted with larger weights than the weights applied to the correlations of the sampling points which are far from the particular sampling point.

In this embodiment, the isolated point eliminating circuit detects correlation values in a plurality of directions between fields with respect to the particular sampling point and the neighboring sampling points from the output of the correlation detecting circuit and then adds and compares the correlation values to which weights are applied, whereby the inter-field correlation at the particular sampling point is decided. When the particular sampling point is judged to be an isolated point, the isolated point is eliminated, and then a plurality of intra-frame processes including inter-field operations are adaptively switched by that result. Therefore, the detection of the correlation is possible after eliminating the isolated point.

In FIGS. 45 and 46, the correlation is decided by twenty five sampling points, i.e., five pixels in the horizontal direction and five lines in the vertical direction in the same field with the particular sampling point as a center. However, the number of the sampling points may be increased in the horizontal and vertical directions.

As described above, according to the eighth embodiment of the present invention, when the movement detecting circuit detects a moving image, in the intra-frame YC separating circuit, correlations between frames or between fields are partially detected and the isolated point is eliminated by adding the correlations of the particular sampling point and the neighboring sampling points or adding those correlation to which weighing is applied, and then the three kinds of intra-frame YC separations including inter-field operations are performed by that result. Therefore, while processing the moving image in the motion adaptive YC separation filter, an optimum YC separation is possible utilizing the correlation of the image, resulting in a motion adaptive YC separating filter which performs YC separation with less deterioration in resolution.

[Embodiment 9]

FIG. 66 is a block diagram showing a YC separating filter adaptive to a movement of an image in accordance with a ninth embodiment of the present invention. In FIG. 66, the intra-field YC separating circuit 1004 shown in FIG. 110 is replaced by an intra-frame YC separating circuit 5050, a correlation detecting circuit 5060, and an isolated point eliminating circuit 5070, and other structures are the same as those shown in FIG. 110.

In FIG. 66, V signal 5101 is input to a first input terminal of an intra-frame YC separating circuit 5050 and a first input terminal of a correlation detecting circuit 5060. A first output 5114 of the correlation detecting circuit 5060 is input to an input terminal of an isolated point eliminating circuit 5070. A first output 5115 of the isolated point eliminating circuit 5070 is input to a second input terminal of the correlation detecting circuit 5060.

A second output 5116 of the correlation detecting circuit 5060 is input to a second input terminal of the isolated point eliminating circuit 5070. A second output 5117 of the isolated point eliminating circuit 5070 is input to a second input terminal of the intra-frame YC separating circuit 5050. An output of the intra-frame YC separating circuit 5050 is output as an intra-frame YC separated Y signal 5112 and an intra-frame YC separated C signal 5113.

FIG. 67 is a block diagram showing the isolated point eliminating circuit 5070 shown in FIG. 66. A signal 5118 input to an input terminal 5018 is applied to an absolute value addition circuit 5001*a*. A signal 5119 input to an input terminal 5019 is applied to an absolute value addition circuit 5002*a* having the same structure as the absolute value addition circuit 5001*a* while a signal 5120 input to an input terminal 5020 is applied to an absolute value addition circuit 5003*a* having the same structure as the absolute value addition circuit 5001*a*. An output 5151 of the absolute value addition circuit 5001*a* is output from an output terminal 5021, an output 5122 of the absolute value addition circuit 5002*a* is output from an output terminal 5022, and an output 5123 of the absolute value addition circuit 5003*a* is output from an output terminal 5023, and these outputs are input to the correlation detecting circuit 5060.

In addition, an output 5116 of the correlation detecting circuit 5060 is input to the input terminal 5016, This signal 5116 is input to a majority decision circuit 5004*a*. An output of the majority decision circuit 5004*a* is output from an output terminal 5017 as a selecting signal 5117.

Figure 68:
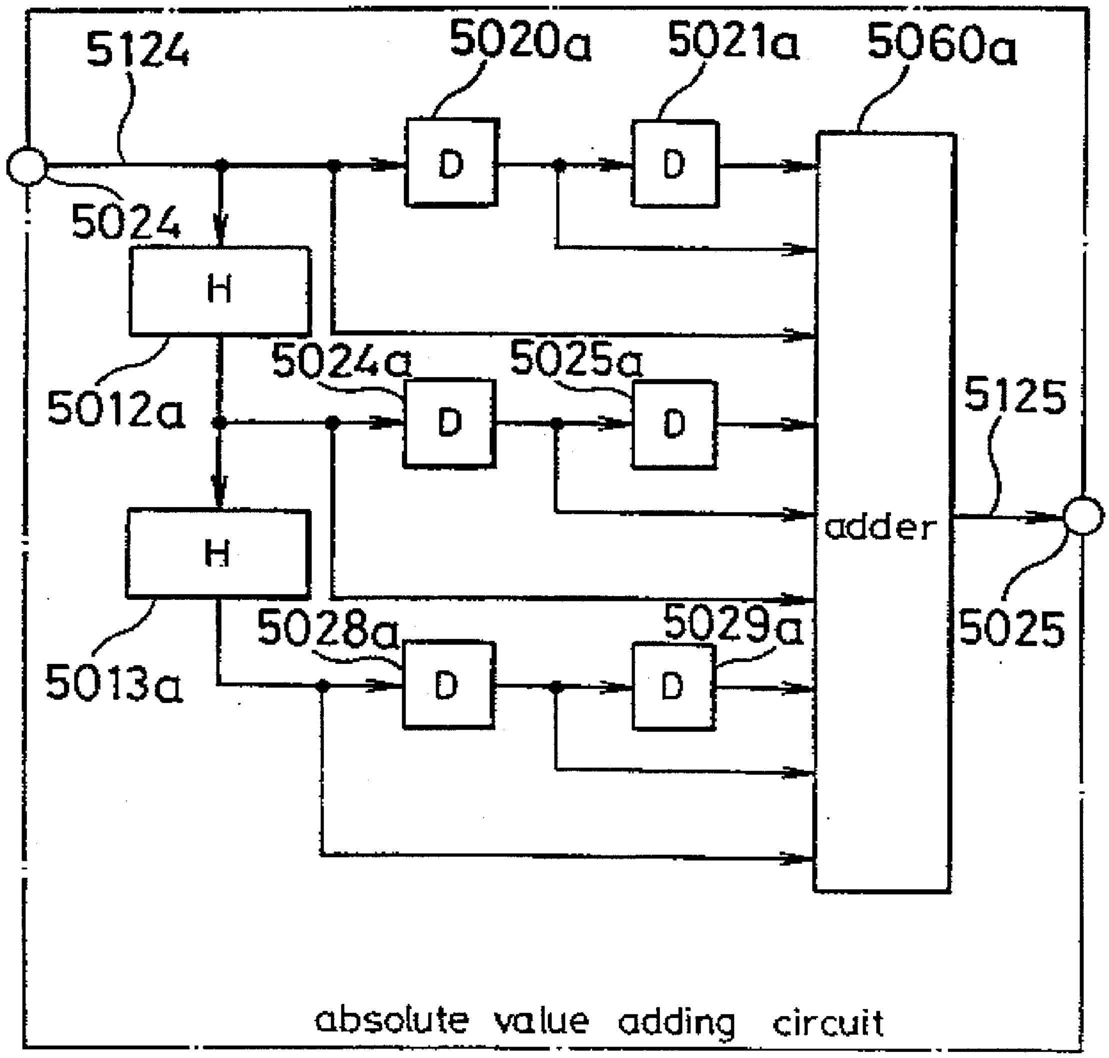
FIG. 68 is a block diagram showing an absolute value adding circuit according to a first example of the isolated point eliminating circuit shown in FIG. 67.

FIG. 68 is a block diagram showing the absolute value addition circuit 5001*a* in detail. This circuit has the same structure as one of the isolated point eliminating circuits 4070 shown in FIG. 44.

Figure 69:
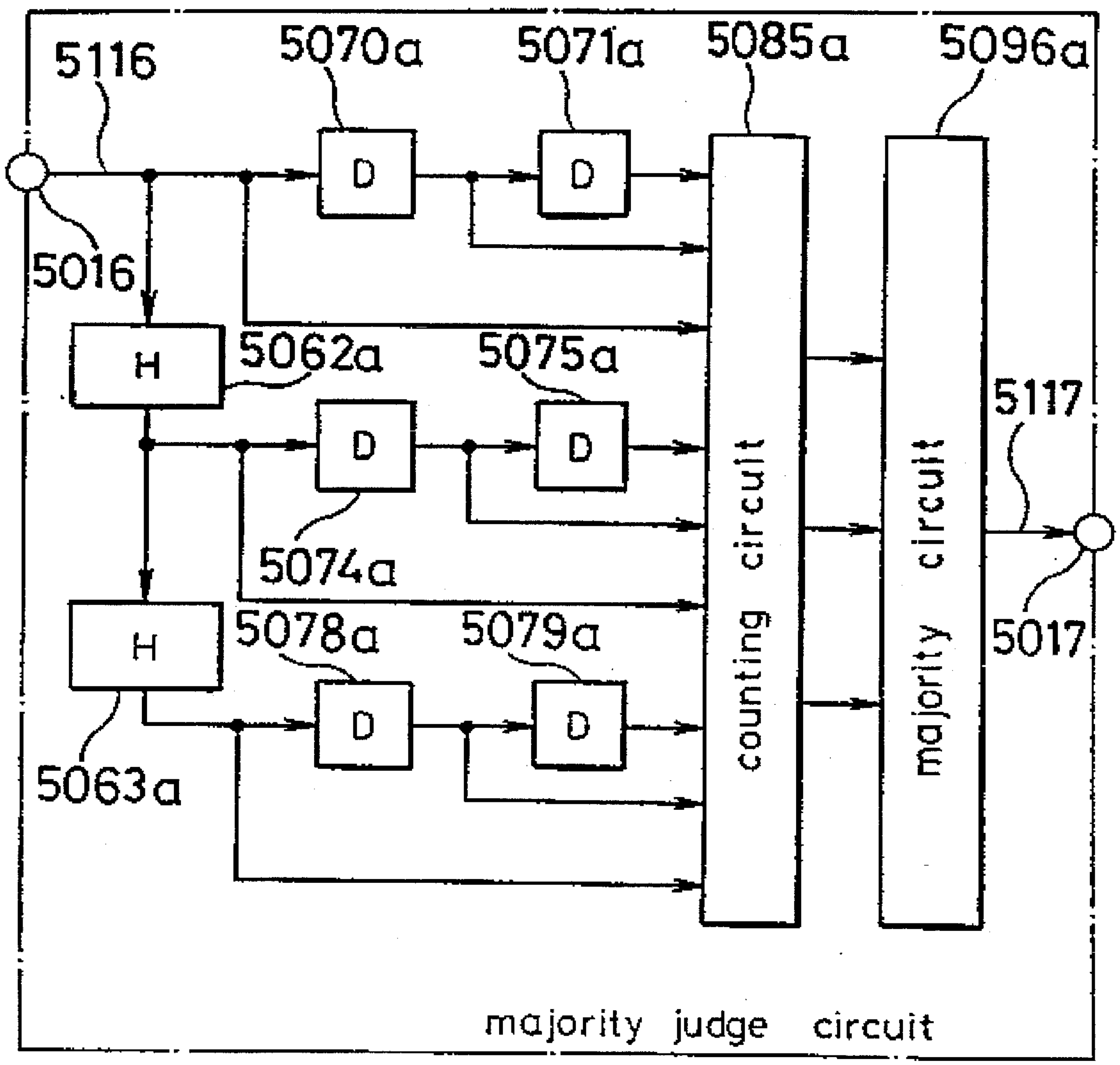
FIG. 69 is a block diagram showing a majority decision circuit according to the first example of the isolated point eliminating circuit shown in FIG. 67.

FIG. 69 is a block diagram showing the majority decision circuit 5004*a* shown in FIG. 67 in detail. This circuit has the same structure as the isolated eliminating circuit 3070 shown in FIG. 22.

Figure 72:
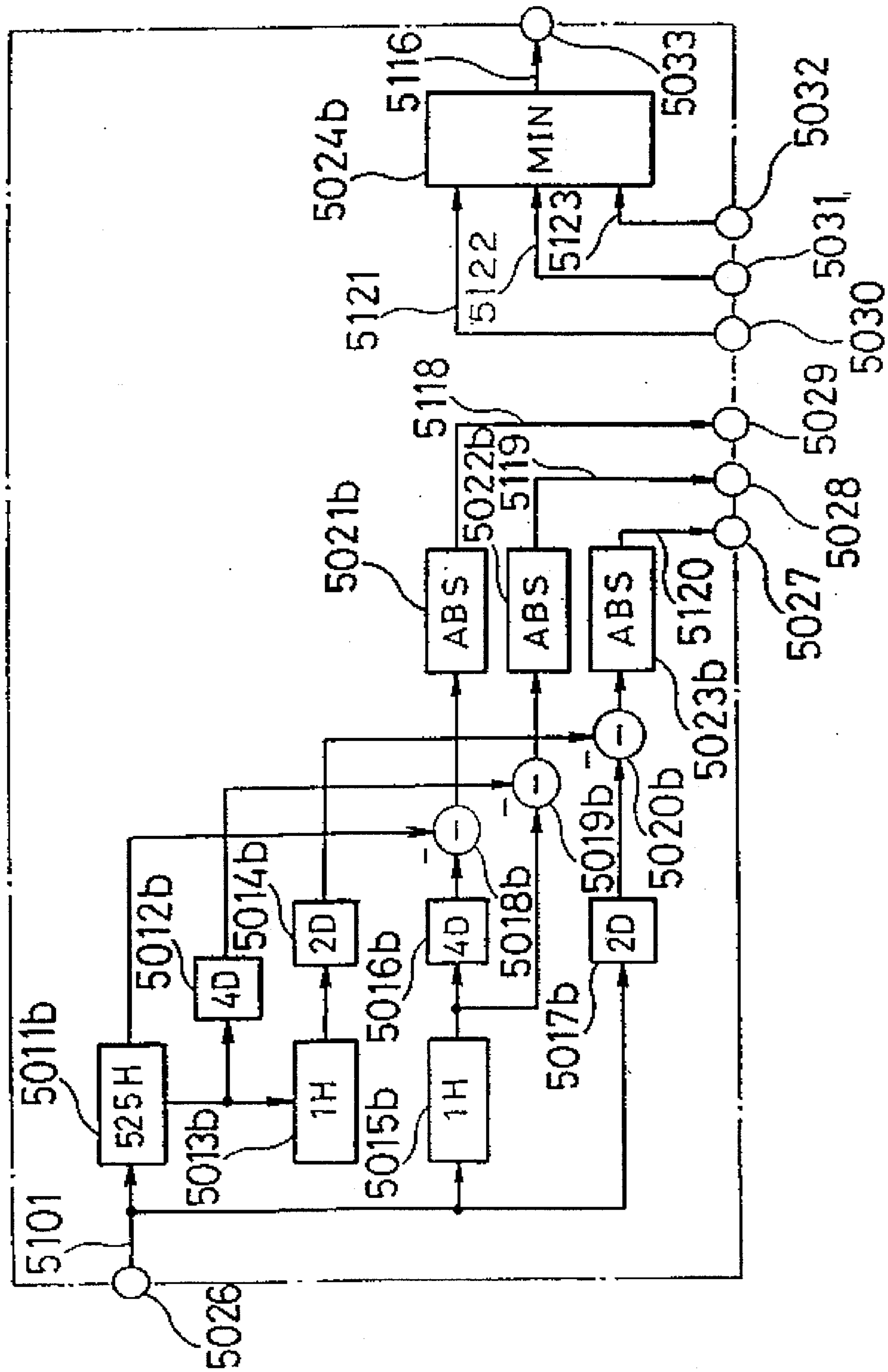
FIG. 72 is a block diagram showing a first example of a correlation detecting circuit shown in FIG. 66.

FIG. 72 is a block diagram showing a first example of the correlation detecting circuit 5060 shown in FIG. 66. This circuit has the same structure as the correlation detecting circuit shown in FIG. 47.

Figure 75:
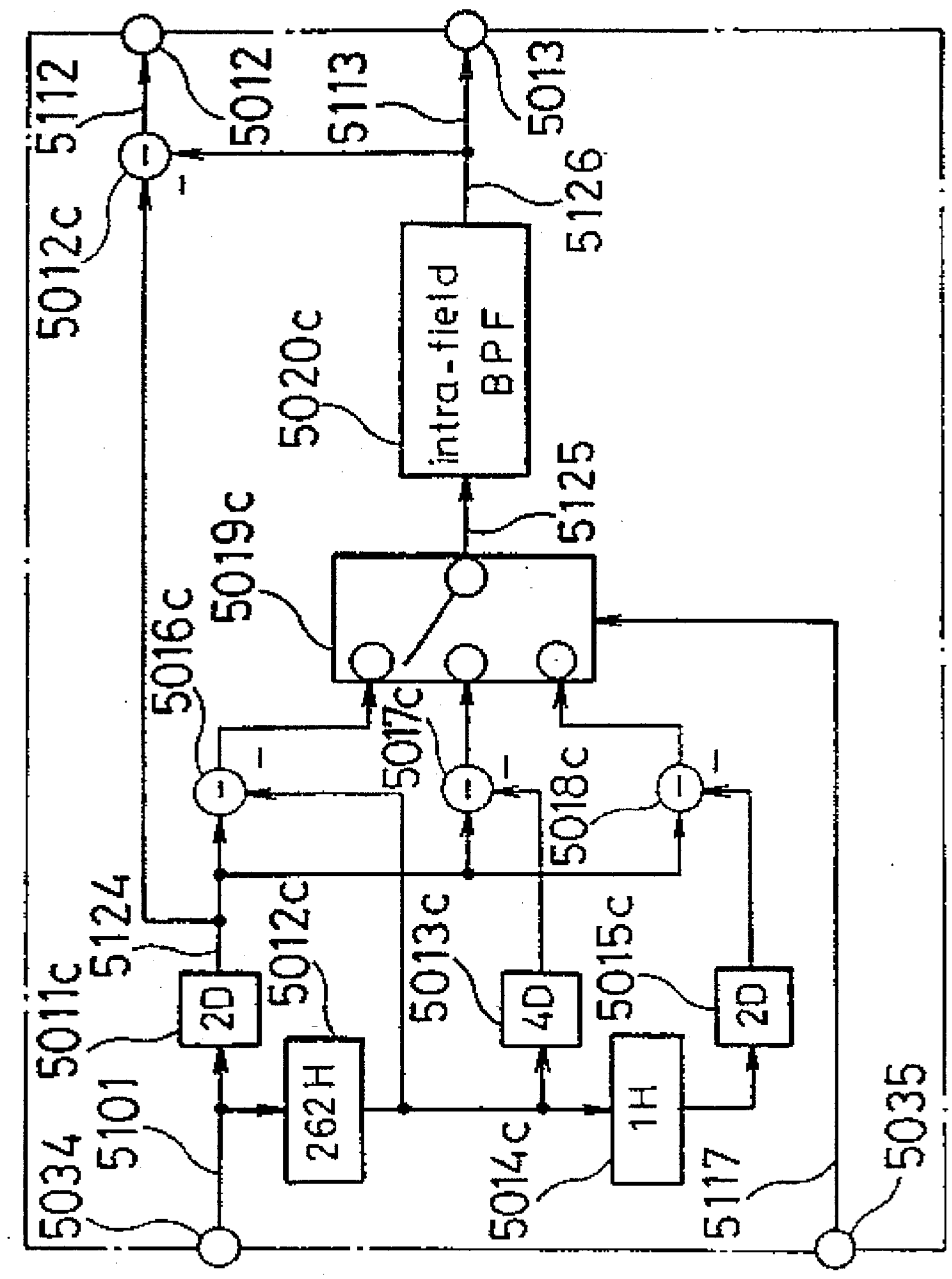
FIG. 75 is a block diagram showing a first example of an intra-frame YC separating circuit shown in FIG. 66.

FIG. 75 is a block diagram showing a first example of the intra-frame YC separating circuit 5050 shown in FIG. 66. This circuit has the same structure as the intra-frame YC separating circuit shown in FIG. 50.

Figure 79:
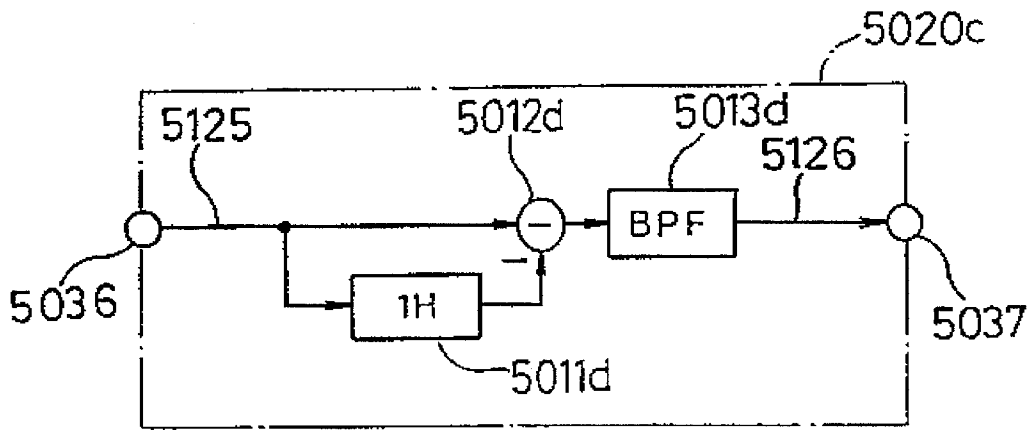
FIG. 79 is a block diagram showing an intra-field BPF in the intra-frame YC separating circuits shown in FIGS. 75 and 76.

FIG. 79 is a block diagram showing the intra-field BPF 5020*c* shown in FIG. 75. This circuit has the same structure as the intra-field BPF 4020*e* shown in FIG. 54.

A description is now given of the operation.

Figure 81:
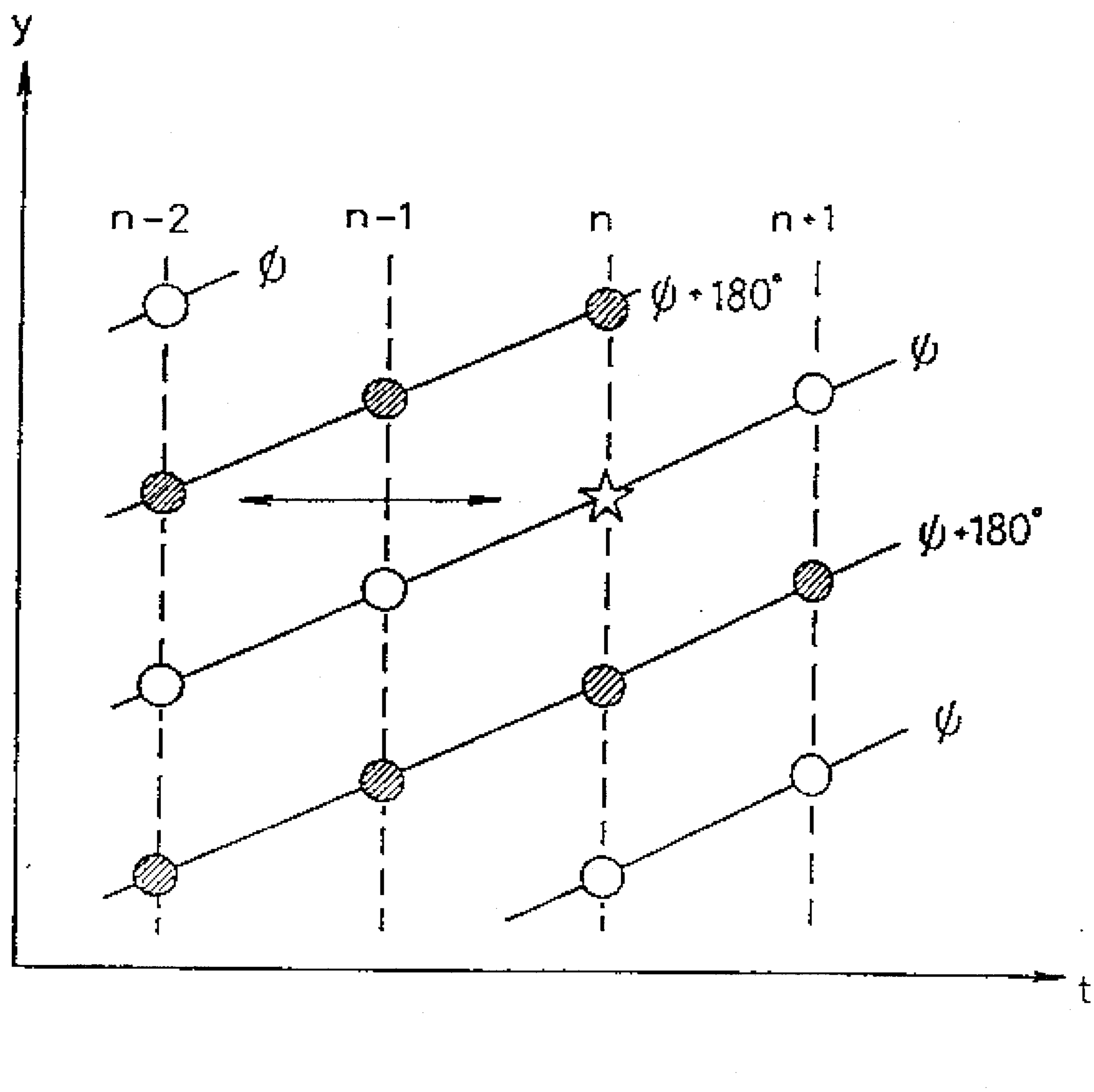
FIG. 81 is a plan view showing an arrangement of the V signal, which is digitized by a frequency four times the color sub-carrier wave frequency, in the three-dimensional time space by the t-axis and the y-axis.
Figure 82:
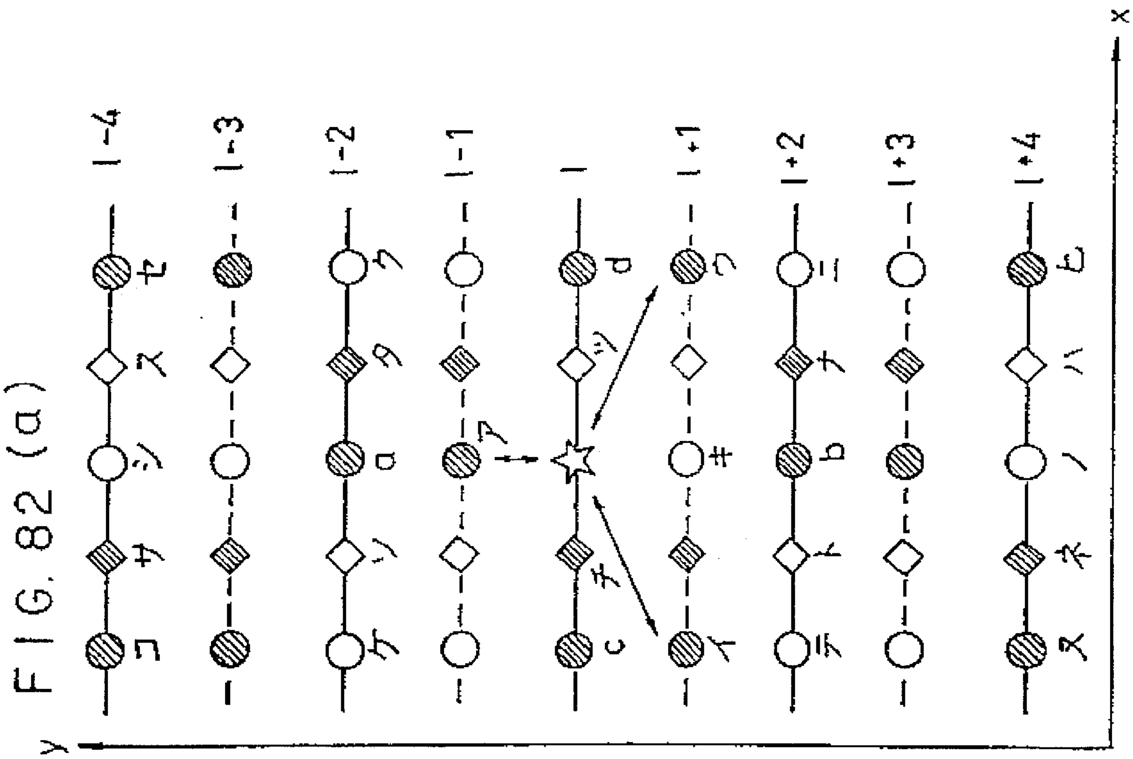
FIG. 82 is a plan view showing an arrangement of the V signal, which is digitized by a frequency four times the color sub-carrier wave frequency, in the three-dimensional time space by the x-axis and the y-axis.
Figure 82:
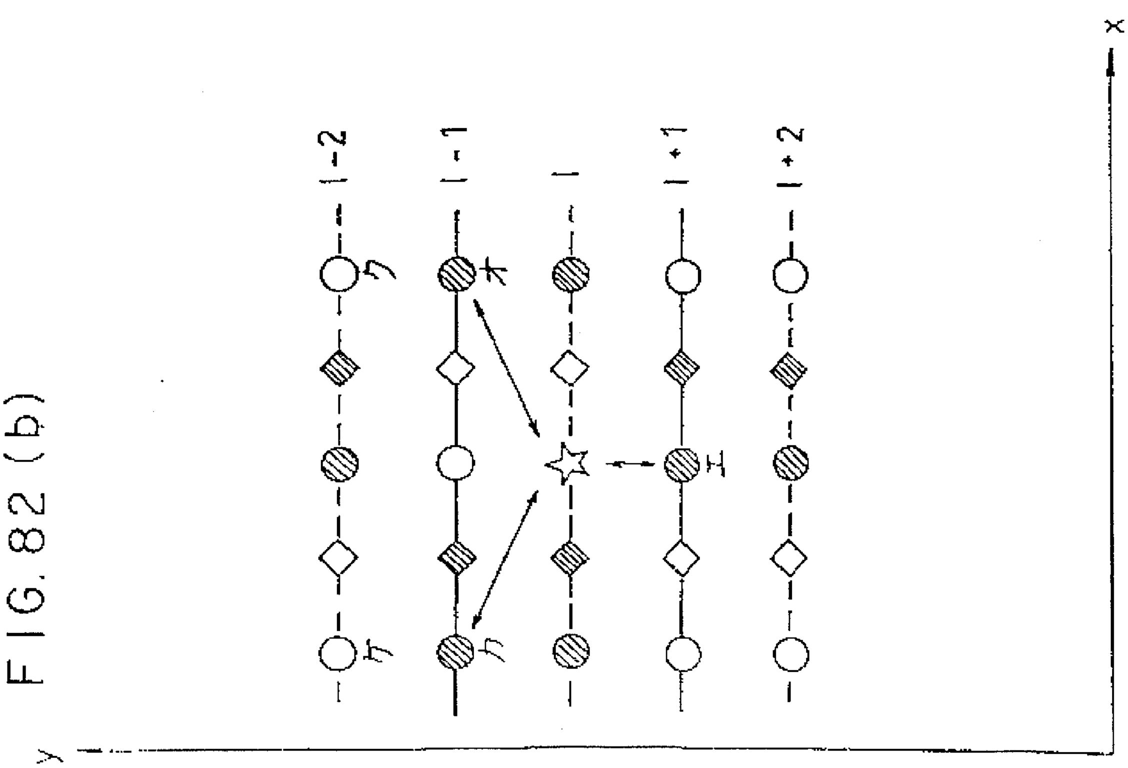

FIGS. 81 and 82 show three-dimensional time spaces like FIGS. 57 and 58.

Figure 83:
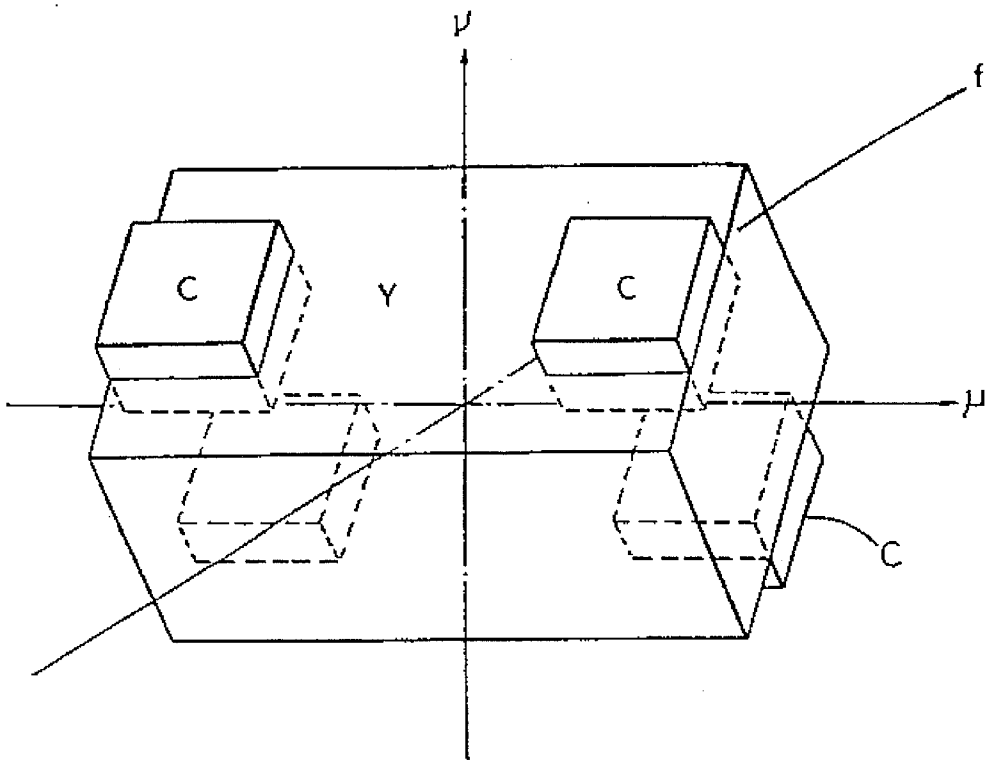
FIGS. 83(*a*) to 83(*c*) are a perspective view, a view from the minus side of the f-axis, and a view from the plus side of the μ-axis, of a spectral dispersion of V signals in the three-dimensional frequency space.
Figure 83:
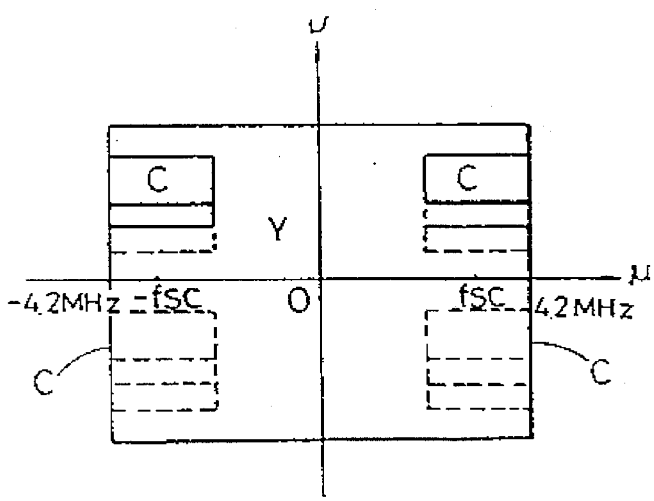
Figure 83:
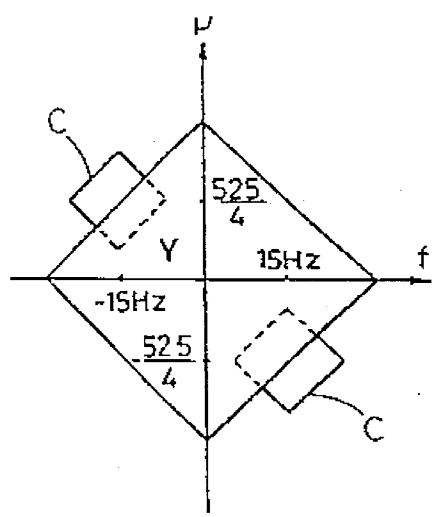

FIG. 83 shows a projection of the three-dimensional frequency space like FIG. 59.

First, a high-frequency component on the three-dimensional frequency space including C signals is taken out by a difference between a particular sampling point (★) and a sampling point (●) shown in FIG. 82(*a*). When the high-frequency component passes through an intra-field BPF 5020*c*, C signals are obtained. In addition, Y signals are obtained by subtracting the C signals from V signals. This is defined as an inter-field YC separation A1.

Figure 84:
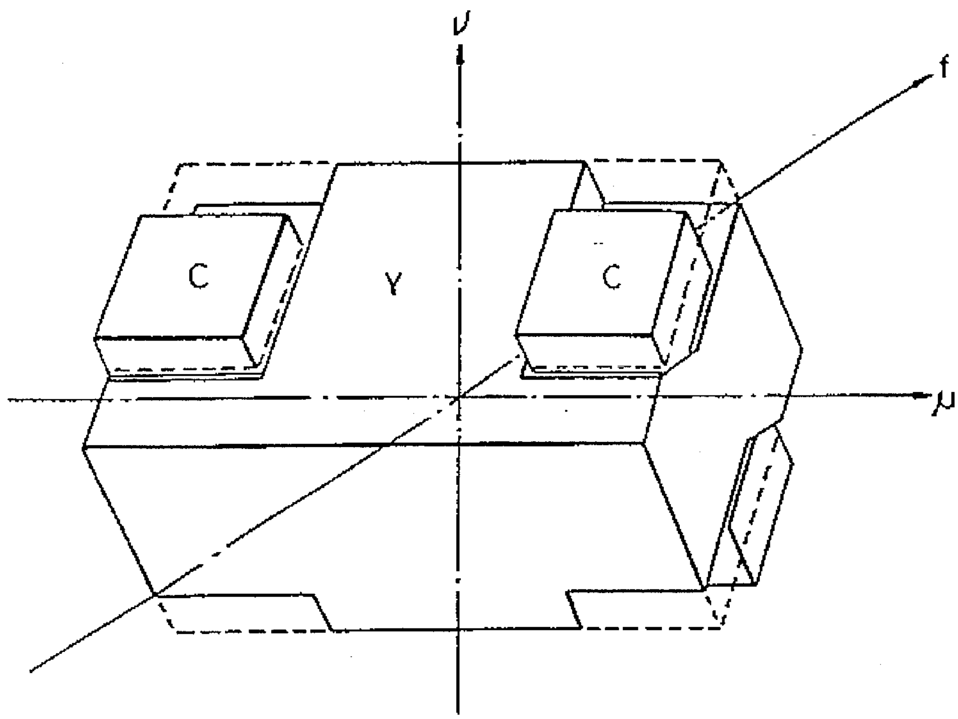
FIGS. 84(*a*) to 84(*c*) are a perspective view, a view from the minus side of the f-axis, and a view from the plus side of the μ-axis, of a spectral dispersion of Y signals and C signals obtained by an inter-field YC separation A1, in the three-dimensional frequency space.
Figure 84:
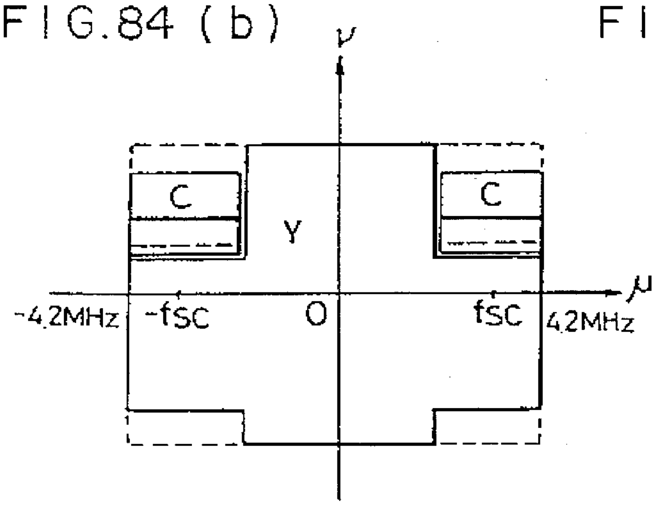
Figure 84C:
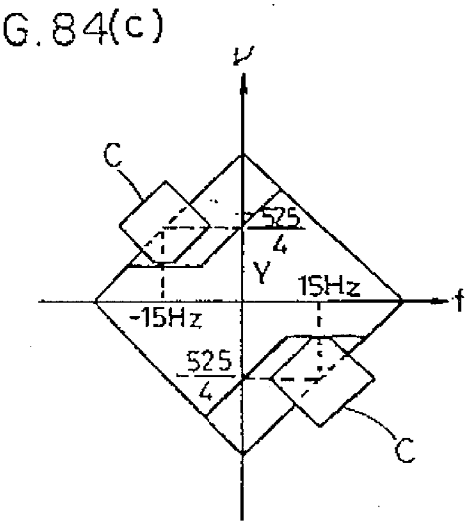

FIGS. 84(*a*) to 84(*c*) show the three-dimensional frequency spaces like FIGS. 83(*a*) to 83(*c*), in which Y signal and C signals obtained by the inter-field YC separation A1 are present.

Second, a high-frequency component on the three-dimensional frequency space including C signals is taken out by a difference between the particular sampling point (★) and a sampling point (●) shown in FIG. 82(*a*). When the high-frequency component passes through the intra-field BPF 5020*c*, C signals are obtained. In addition, Y signals are obtained by subtracting the C signals from V signals. This is defined as an inter-field YC separation B1.

FIGS. 85(*a*) to 85(*c*) also show the frequency spaces in which Y signal and C signals obtained by the inter-field YC separation B1 are present. Although it seems that a part of the C signals is included in the Y signals, the C signals are hardly included in the Y signals because the correlation between them is so strong, Third, a high-frequency component on the three-dimensional frequency space including C signals is taken out by a difference between the particular sampling point (★) and a sampling point (●) shown in FIG. 82(*a*). When the high-frequency component passes through the intra-field BPF, C signals are obtained. In addition, Y signals are obtained by subtracting the C signals from V signals. This is defined as an inter-field YC separation C1.

Figure 86:
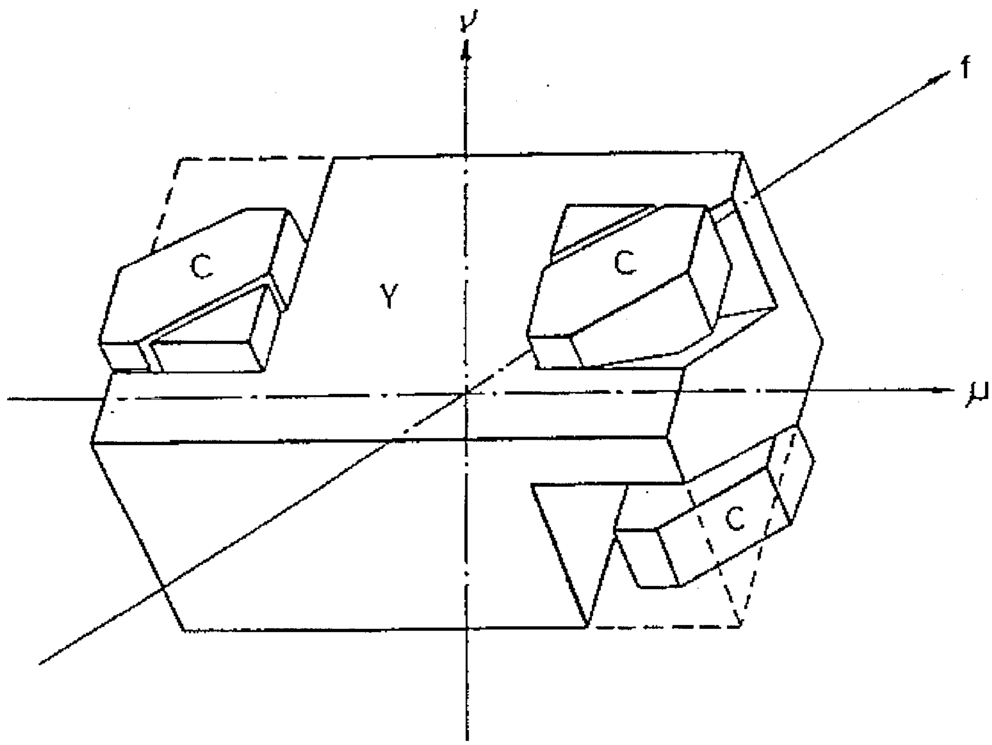
FIGS. 86(*a*) to 86(*c*) are a perspective view, a view from the minus side of the f-axis, and a view from the plus side of the μ-axis, of a spectral dispersion of Y signals and C signals obtained by an inter-field YC separation C1, in the three-dimensional frequency space.
Figure 86:
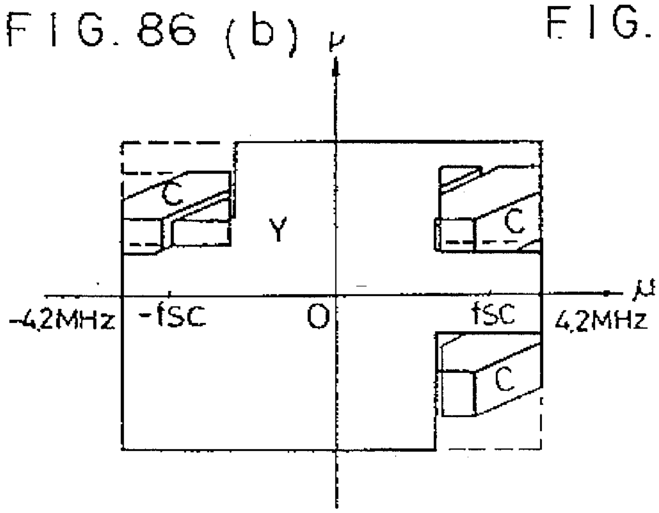
Figure 86:
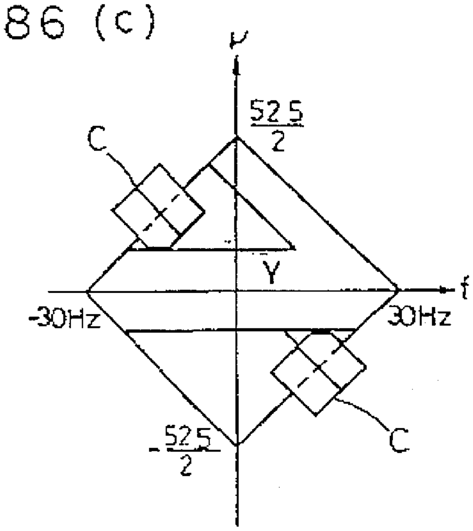

FIGS. 86(*a*) to 86(*c*) also show the frequency spaces in which Y signal and C signals obtained by the inter-field YC separation C1 are present. Although it seems that a part of the C signals is included in the Y signals, the C signals are hardly included in the Y signals because the correlation between them is so strong.

In order to adaptively control a switching of these three kinds of inter-field YC separations, the correlation of the image is detected by operations of sampling points in directions connecting the particular sampling point (★) and the sampling points (●), , and , and then an isolated point is eliminated from the correlation of the particular sampling point and the correlations of the neighboring sampling points to obtain a control signal.

The intra-frame YC separating circuit 5050, the correlation detecting circuit 5060, and the isolated point eliminating circuit 5070, shown in FIG. 66, operate as follows. In this embodiment, when the motion detecting circuit 5080 decides that the image is a moving image, an optimum one is selected from intra-frame YC separations including three kinds of inter-field operations by the most numerous correlation among correlations obtained by adding the correlations of the particular sampling point and the neighboring sampling points and used instead of the intra-field YC separation.

In FIG. 66, V signal 5101 is input to the input terminal 5001 and a correlation of image is detected in the correlation detecting circuit 5060. The result of the detection 5114 is input to the isolated point eliminating circuit 5070 and then a correlation of the particular sampling point and correlations of the neighboring sampling points are added or the correlation of the particular sampling point and the correlations of the neighboring sampling points, to which weights are applied, are added, whereby first isolated point elimination is performed. An output 511S of the isolated point eliminating circuit 5070 is again input to the correlation detecting circuit 5060 and then the sizes of the respective correlations are compared.

An output 5116 of the correlation detecting circuit 5060 is again input to the isolated point eliminating circuit 5070 and then the most numerous correlation is selected from the correlations of the particular sampling point and the neighboring sampling points, or the most numerous correlation is selected from the correlation of the particular sampling point and the neighboring sampling points, to which weights are applied, whereby a second isolated point elimination is performed. In this way, when the detection result of the particular sampling point is the isolated point, the correlation of the particular sampling point is decided from the neighboring sampling points, whereby a selecting signal 5117 is output.

On the other hand, the V signal 5101 is input to the intra-frame YC separating circuit 5050 and an optimum one is selected from the three kinds of intra-frame YC separations including inter-field operations by the selecting signal 5117 and then an intra-frame YC separated Y signal 5112 and an intra-frame YC separated C signal 5113 are output.

A description is given of the intra-frame YC separating circuit 5050 shown in FIG. 66. The circuit shown in FIG. 75 operates in the same way as the circuit shown in FIG. 50, so that a description thereof will be omitted.

Also in this embodiment, by adaptively switching the inter-field processes, no deterioration in resolution occurs when the image moves in some direction like shown in FIG. 108(*a*), whereby crosstalks between Y signals and C signals are reduced.

Figure 76:
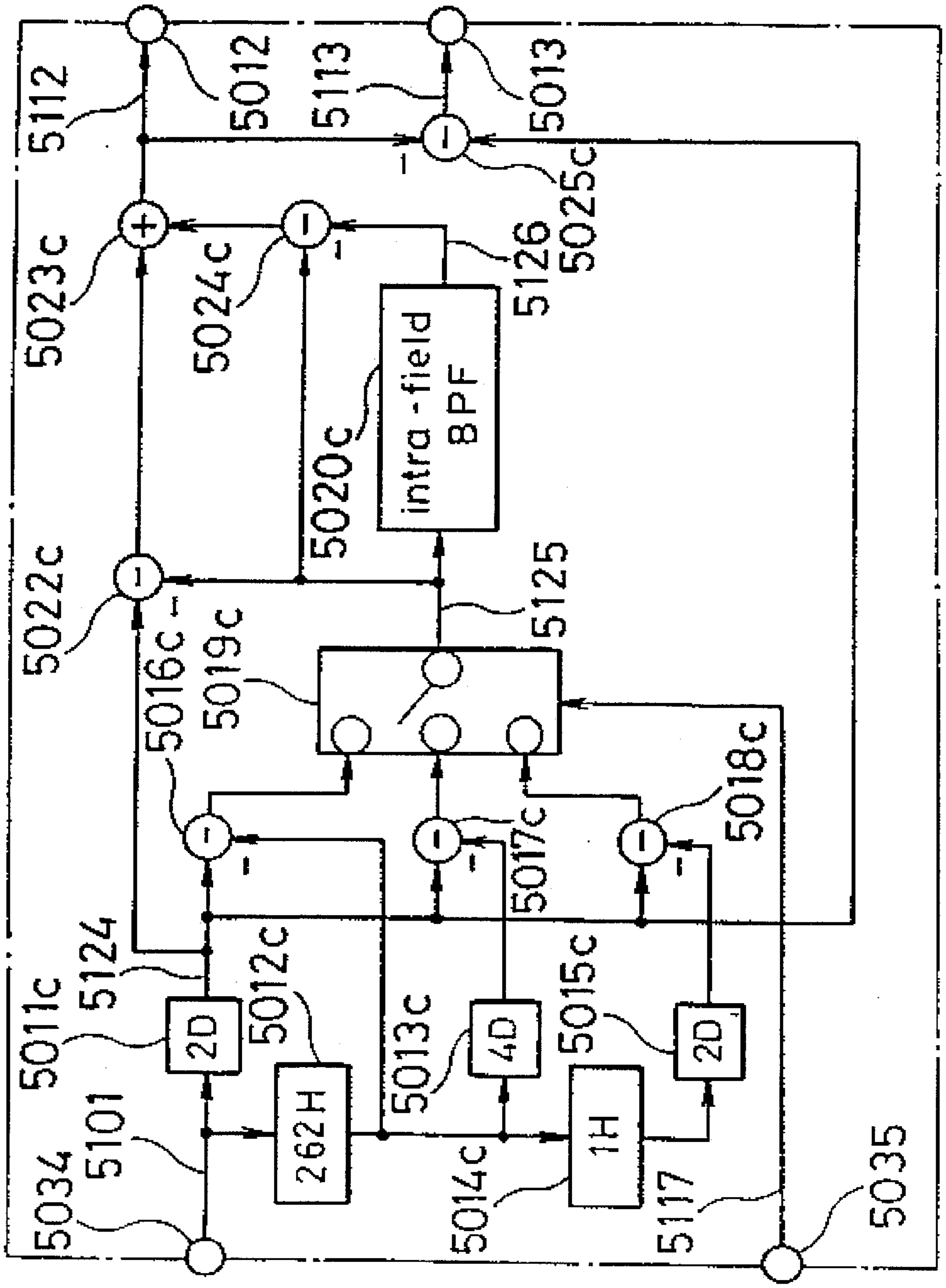
FIG. 76 is a block diagram showing a second example of the intra-frame YC separating circuit shown in FIG. 66.

FIG. 76 is a block diagram showing a second example of the intra-frame YC separating circuit 5050 shown in FIG. 66. In FIG. 76, the only difference from FIG. 75 resides in the method of intra-field band restriction, so that only the intra-field band restriction will be described hereinafter.

Since the circuit of FIG. 76 operates in the same way as the circuit of FIG. 51, a description thereof will be omitted.

Also in this embodiment, by adaptively switching the inter-field processes, no deterioration in resolution occurs when the image moves in some direction like shown in FIG. 108(*a*), whereby crosstalks between Y signals and C signals are reduced, The intra-field BPF 5020*e* shown in FIGS. 75 and 76 operates as follows. In FIG. 79, an output 5125 of the signal selecting circuit 5019*e* is input to the input terminal 5036. A vertical high-frequency component of the output 5125 is extracted while passing through the one-line delay circuit 5011*d* and the subtracter 5012*d* and a horizontal high-frequency component thereof is extracted while passing through the BPF 5013*d*, whereby two-dimensional band restriction is performed.

Figure 80:
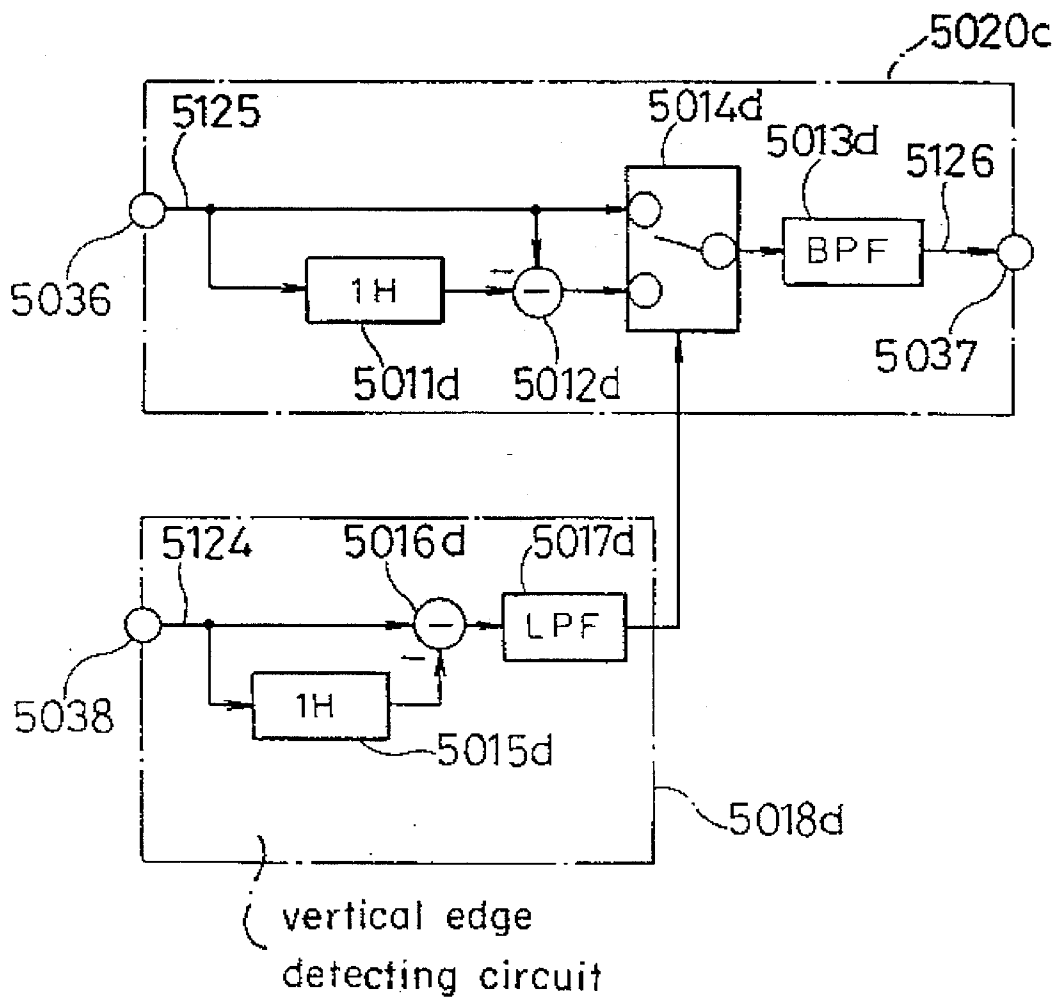
FIG. 80 is a block diagram showing another example of the intra-field BPF in the intra-frame YC separating circuits shown in FIGS. 75 and 76.

The intra-field BPF 5020*e* may have a structure shown in FIG. 80, which is the same as FIG. 55.

A description is given of third and fourth examples of the intra-frame YC separating circuit 5050 shown in FIG. 66.

First, a high-frequency component on the three-dimensional frequency space including C signals is taken out by a difference between a particular sampling point (★) and a sampling point (●) shown in FIG. 82(*a*). When the high-frequency component passes through an intra-field BPF 5020*c*, C signals are obtained. In addition, Y signals are obtained by subtracting the C signals from V signals. This is defined as an inter-field YC separation A2.

Figure 87:
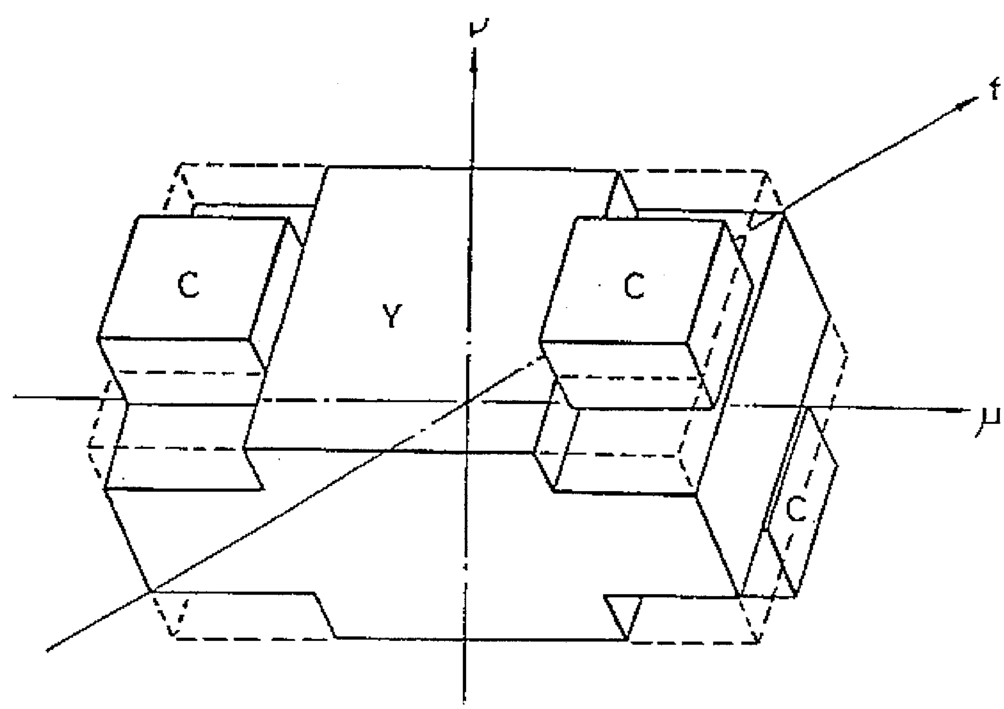
FIGS. 87(*a*) to 87(*c*) are a perspective view, a view from the minus side of the f-axis, and a view from the plus side of the μ-axis, of a spectral dispersion of Y signals and C signals obtained by an inter-field YC separation A2, in the three-dimensional frequency space.
Figure 87:
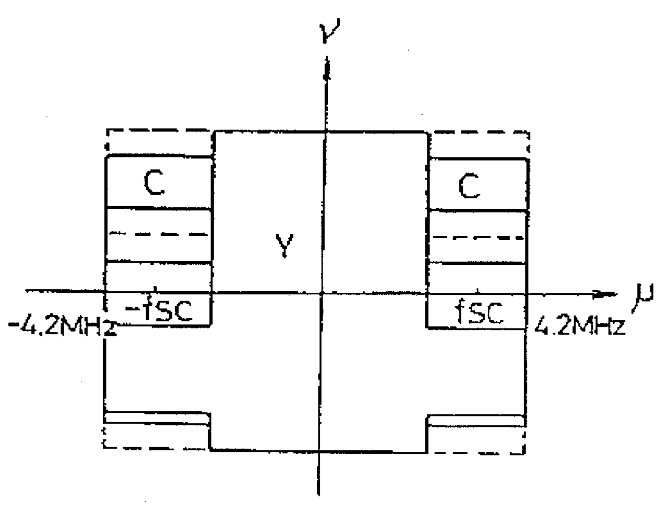
Figure 87:
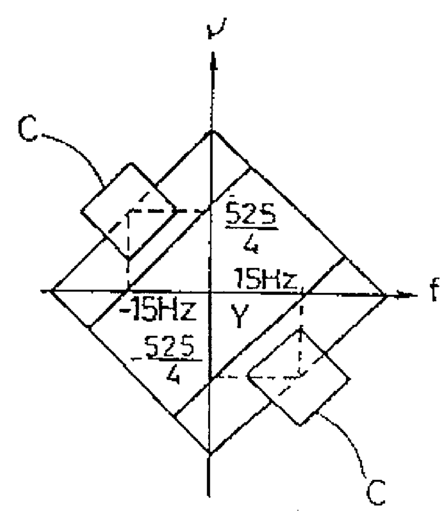

FIGS. 87(*a*) to 87(*c*) show the three-dimensional frequency spaces like FIGS. 83(*a*) to 83(*c*), in which Y signal and C signals obtained by the inter-field YC separation A2 are present.

Second, in FIGS. 82(*a*) and 82(*b*), a difference between the particular sampling point (★) and the sampling point (●) and a difference between the sampling points (●) and (○), which have the same positional relation as that of the particular sampling point (★) and the sampling point (●), are subtracted, leaving C signals. In addition, Y signals are obtained by subtracting the C signals from V signals. This is defined as an inter-field YC separation B2.

Figure 88A:
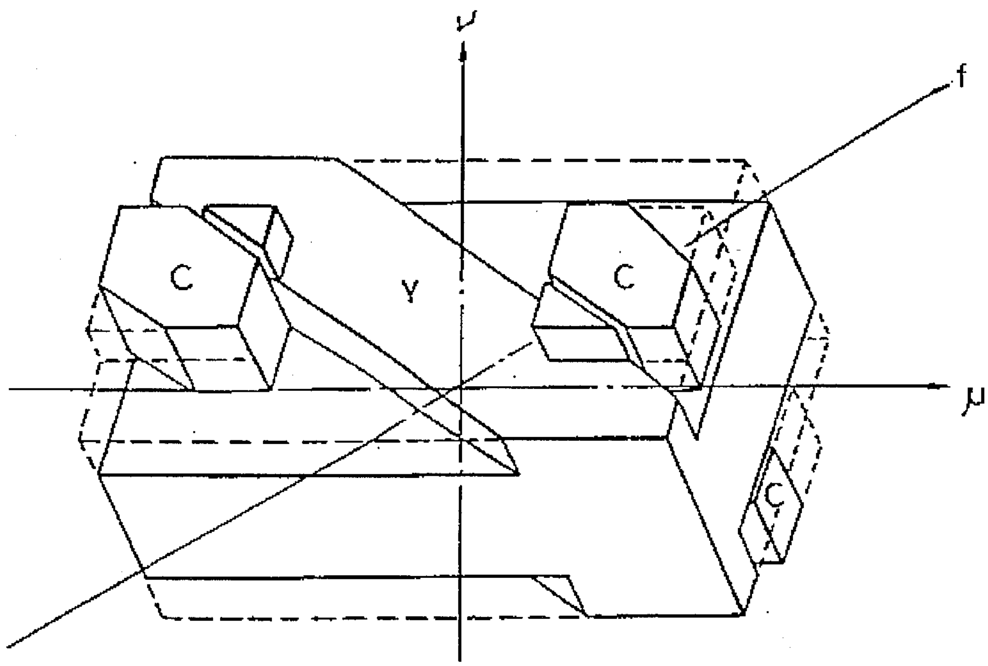
FIGS. 88(*a*) to 88(*c*) are a perspective view, a view from the minus side of the f-axis, and a view from the plus side of the μ-axis, of a spectral dispersion of Y signals and C signals obtained by an inter-field YC separation B2, in the three-dimensional frequency space.
Figure 88B:
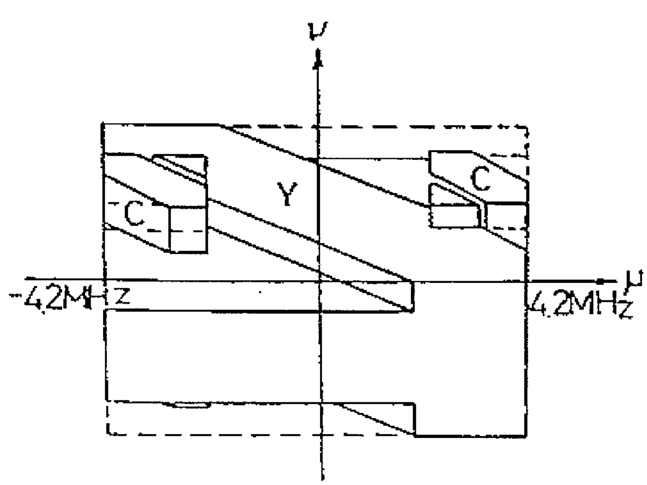
Figure 88C:
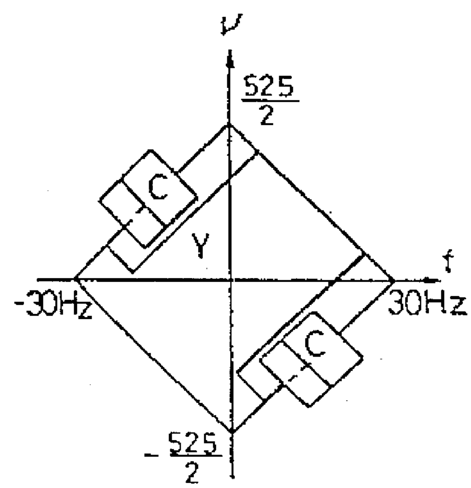

FIGS. 88(*a*) to 88(*c*) also show the frequency spaces in which Y signal and C signals obtained by the inter-field YC separation 82 are present. Although it seems that a part of the C signals is included in the Y signals, the C signals are hardly included in the Y signals because the correlation between them is so strong.

Third, in FIGS. 82(*a*) and 82(*b*), a difference between the particular sampling point (★) and the sampling point (●) and a difference between the sampling points (●) and (○), which have the same positional relation as that of the particular sampling point (★) and the sampling point (●), are subtracted, leaving C signals. In addition, Y signals are obtained by subtracting the C signals from V signals. This is defined as an inter-field YC separation C2.

Figure 89:
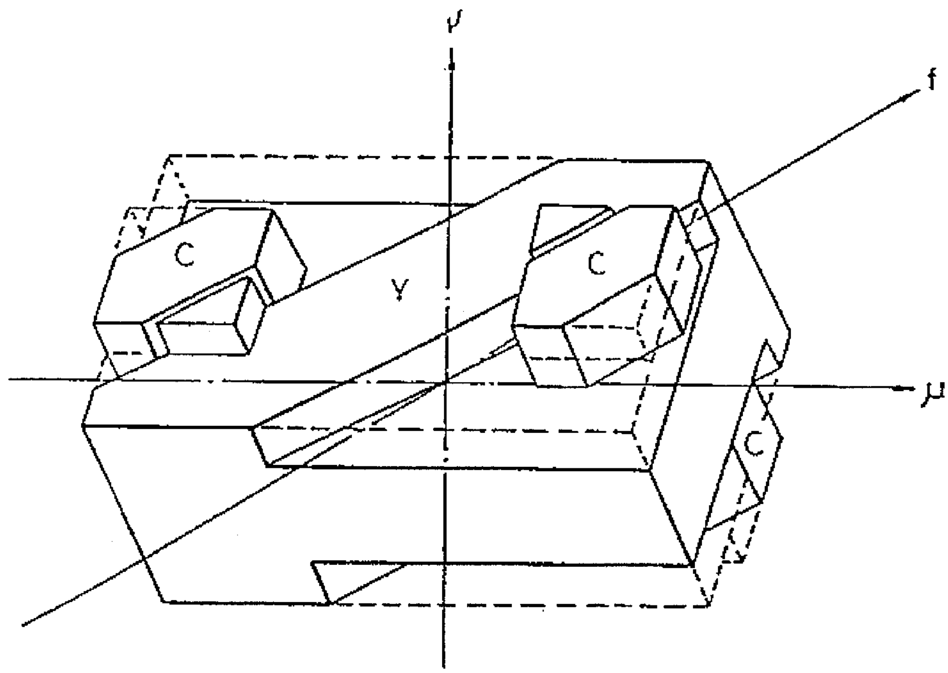
FIGS. 89(*a*) to 89(*c*) are a perspective view, a view from the minus side of the f-axis, and a view from the plus side of the μ-axis, of a spectral dispersion of Y signals and C signals obtained by an inter-field YC separation C2, in the three-dimensional frequency space.
Figure 89:
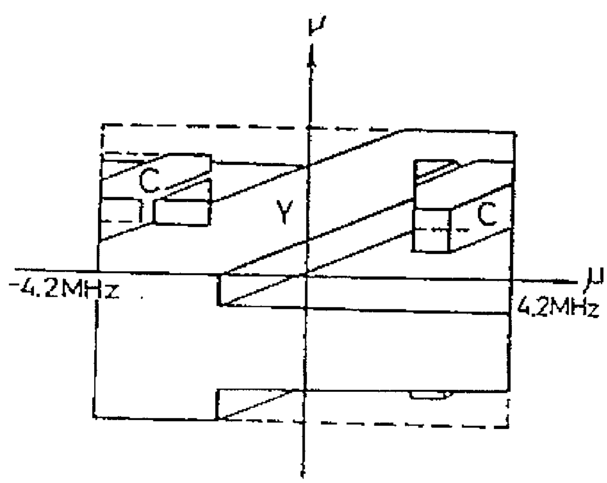
Figure 89:
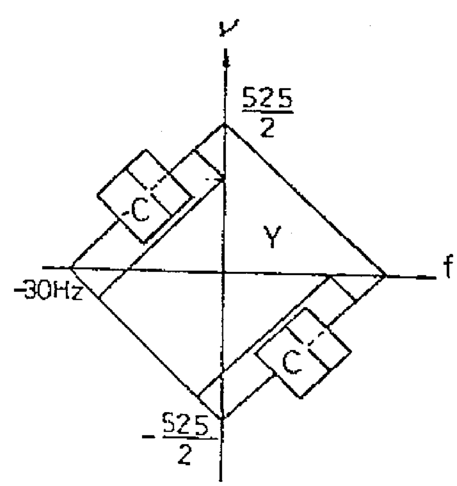

FIGS. 89(*a*) to 89(*c*) also show the frequency spaces in which Y signal and C signals obtained by the inter-field YC separation C2 are present. Although it seems that a part of the C signals is included in the Y signals, the C signals are hardly included in the Y signals because the correlation between them is so strong.

Figure 77:
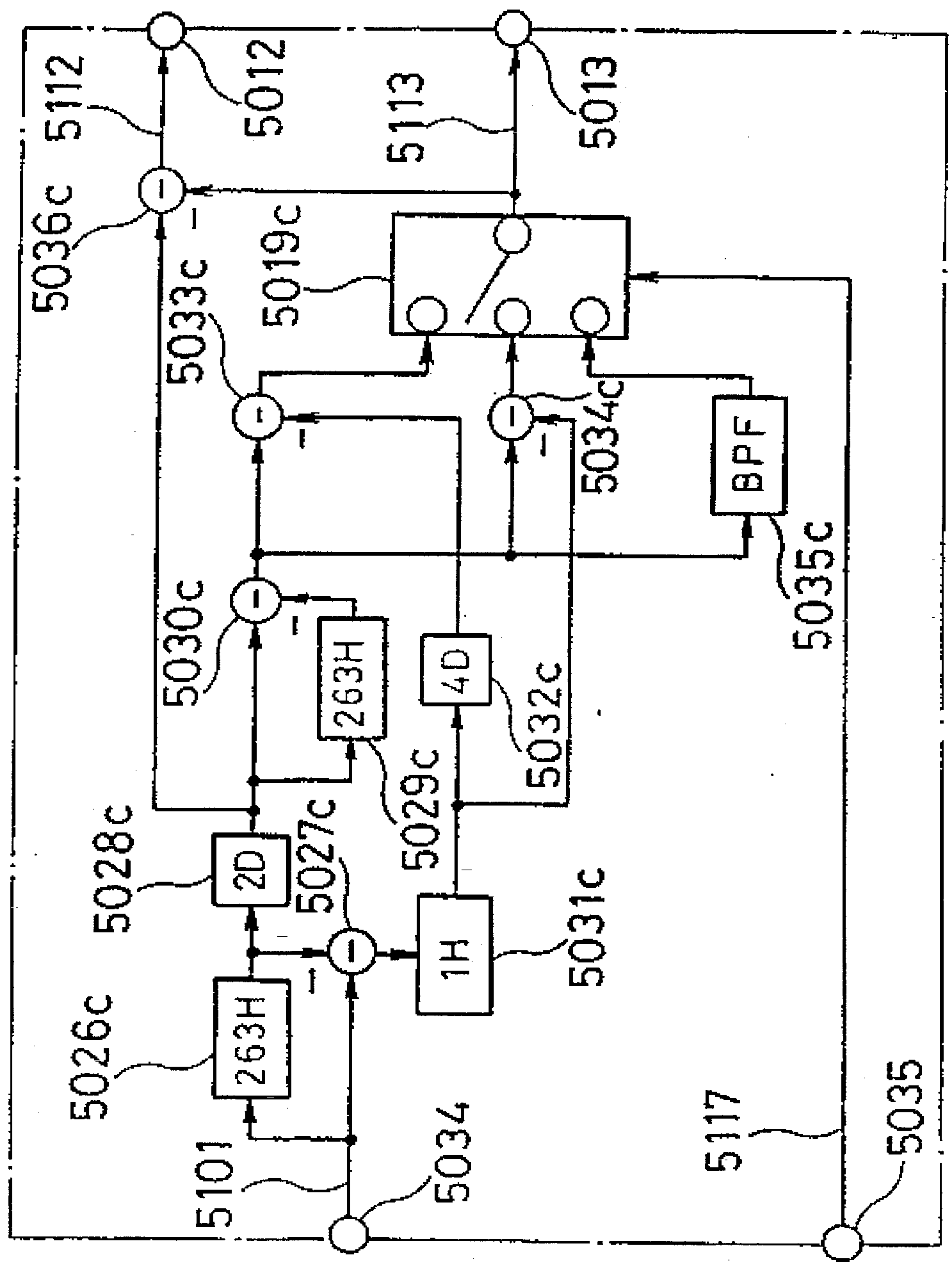
FIG. 77 is a block diagram showing a third example of the intra-frame YC separating circuit shown in FIG. 66.

FIG. 77 is a block diagram showing a third example of the intra-frame YC separating circuit 5050 shown in FIG. 66. In FIG. 77, above-described inter-field YC separations A2, B2, and C2 are used in place of the inter-field YC separations A1, B1, and C1 which are used in the embodiment of FIG. 75.

Figure 78:
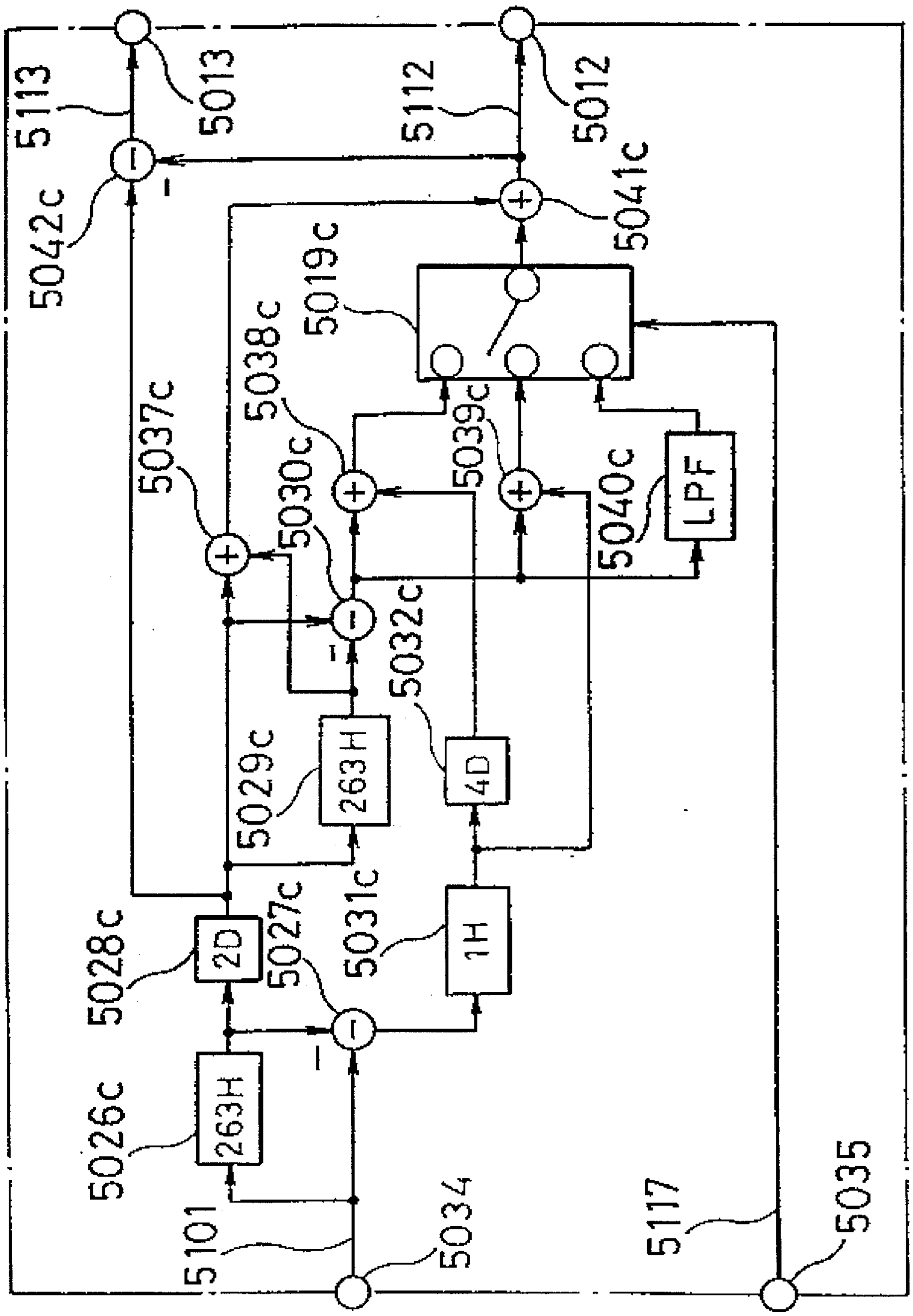
FIG. 78 is a block diagram showing a fourth example of the intra-frame YC separating circuit shown in FIG. 66.

FIG. 78 is a block diagram showing a fourth example of the intra-frame YC separating circuit 5050 shown in FIG. 66. In FIG. 78, above-described inter-field YC separations A2, B2, and C2 are used in place of the inter-field YC separations A1, B1, and C1 which are used in the embodiment of FIG. 75. In addition, a difference from the embodiment of FIG. 77 resides in that the band restriction is applied to the Y signal.

The circuit shown in FIG. 75 operates in the same way as the circuit shown in FIG. 53.

Since the correlation detecting circuit 5060 shown in FIG. 66 operates in the same way as the correlation detecting circuit shown in FIG. 47, a description thereof will be omitted.

Figure 73:
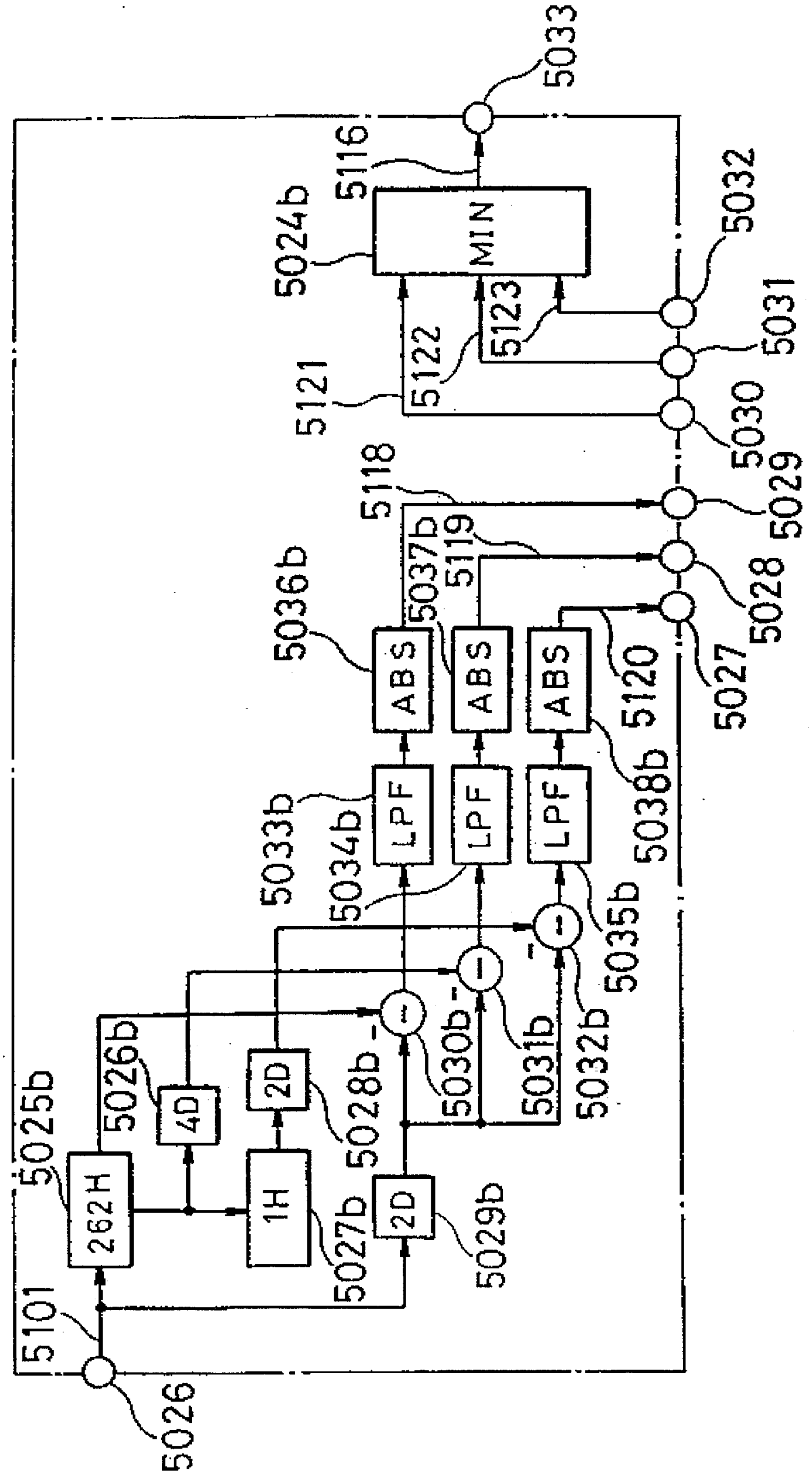
FIG. 73 is a block diagram showing a second example of the correlation detecting circuit shown in FIG. 66.
Figure 74:
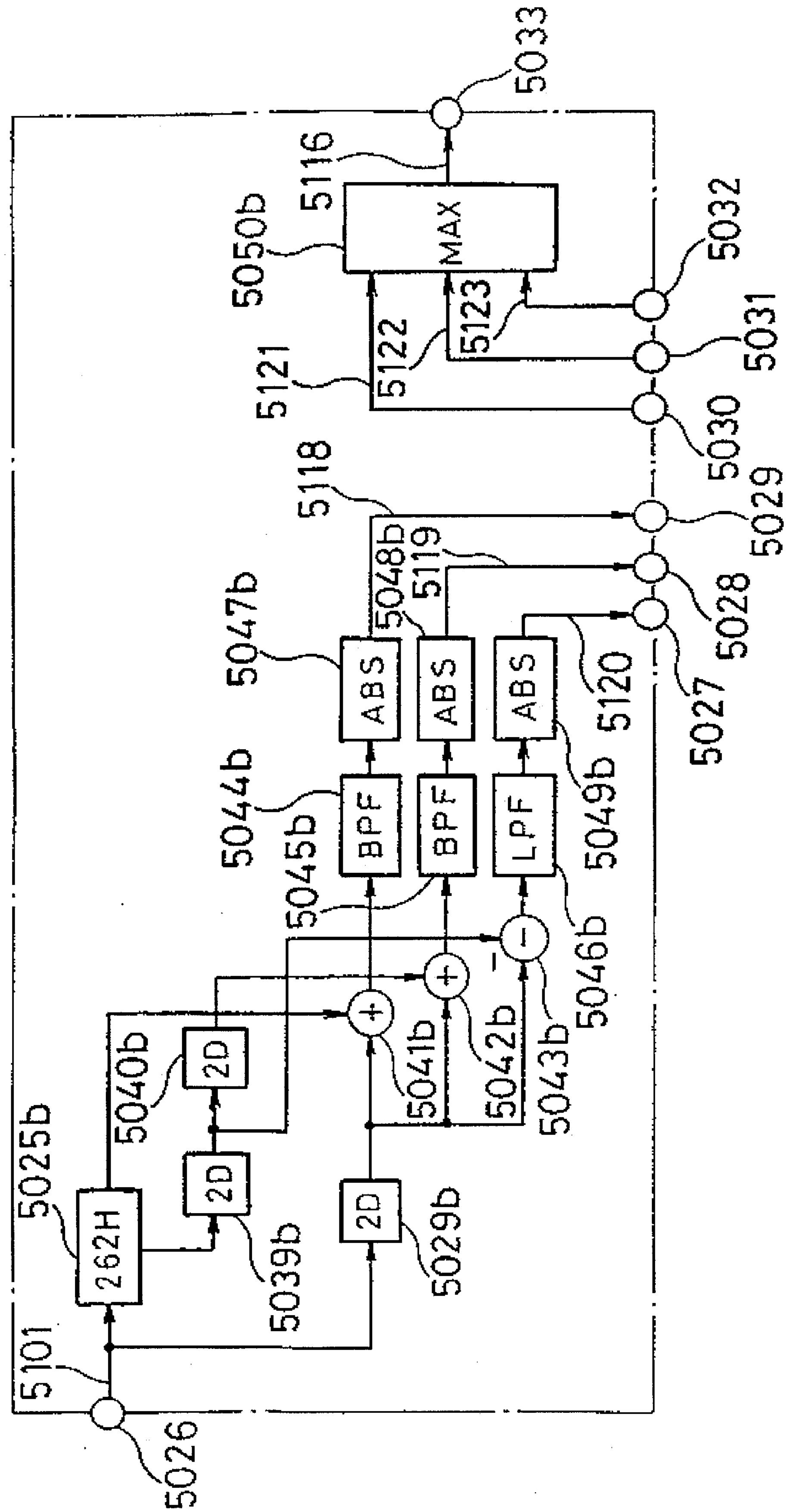
FIG. 74 is a block diagram showing a third example of the correlation detecting circuit shown in FIG. 66.

FIG. 73 is a block diagram showing a second example of the correlation detecting circuit 5060 shown in FIG. 66. In this second example, a difference from the circuit of FIG. 72 resides in that the correlation is partially detected by an operation between a particular sampling point and a sampling point one field before. The correlation detecting circuit shown in FIG. 73 partially detects the correlation by a horizontal low-frequency component of a difference between the particular sampling point and a sampling point one field before having an opposite phase of color subcarrier from the phase of the particular sampling point.

The correlation detecting circuit of FIG. 73 operates in the same way as the circuit of FIG. 48.

In the majority decision circuit shown in FIG. 69, the correlation signal 5116 input to the input terminal 5016 is delayed by one pixel in the one-pixel delay circuit 5070*a* and further delayed by one pixel in the one-pixel delay circuit 5071*a*. The correlation signal 5116, an output of the one-pixel delay circuit 5070*a*, and an output of the one-pixel delay circuit 5071*a* are input to the counting circuit 5085*a* as correlations of the sampling points (♦), (●)b, and (◇), respectively.

On the other hand, the correlation signal 5116 is delayed by one line in the one-line delay circuit 5062*a*, by one pixel in the one-pixel delay circuit 5074*a*, and by one pixel in the one-pixel delay circuit 5075*a*. An output of the one-line delay circuit 5062*a*, an output of the one-pixel delay circuit 5074*a*, and an output of the one-pixel delay circuit 5075*a* are input to the counting circuit 5085*a* as correlations of the sampling point (◇), the particular sampling point (★), and the sampling point (♦), respectively.

An output of the one-line delay circuit 5062*a* is delayed by one line in the one-line delay circuit 5063*a*, by one pixel in the one-pixel delay circuit 5078*a*, and by one pixel in the one-pixel delay circuit 5079*a*. An output of the one-line delay circuit 5063*a*, an output of the one-pixel delay circuit 5078*a*, and an output of the one-pixel delay circuit 5079*a* are input to the counting circuit 5085*a* as correlations of the sampling points (♦), (●)a, and (◇), respectively.

The counting circuit 5085*a* discriminates the input nine correlations from each other and counts the number of input signals having strong correlations in the direction connecting the particular sampling point (★) and the sampling point (●), the number of input signals having strong correlations in the direction connecting the particular sampling point (★) and the sampling point (●), and the number of input signals having strong correlations in the direction connecting the particular sampling point (★) and the sampling point (●). Then, these numbers are output from the first to third output terminals, respectively, and input to the majority circuit 5096*a*.

The majority circuit 5096*a* selects the largest number and finally decides the correlation of the particular sampling point (★).

More Specifically, referring to FIG. 82(*a*), when the number of sampling points, which have strong correlations in the direction connecting the particular sampling point (★) and the sampling point (●), is the largest among the particular sampling point (★) and the neighboring sampling points (◇), (●)a, (♦), (♦), (◇), (◇), (●)b, and (♦), the majority circuit 5096*a* outputs a selecting signal 5117 for selecting the inter-field YC separation A1 or A2 in the intra-frame YC separating circuit 5050. When the number of sampling points, which have strong correlations in the direction connecting the particular sampling point (★) and the sampling point (●), is the largest, the majority circuit 5096*a* outputs a selecting signal 5117 for selecting the inter-field YC separation B1 or B2 in the intra-frame YC separating circuit 5050. When the number of sampling points, which have strong correlations in the direction connecting the particular sampling point (★) and the sampling point (●), is the largest, the majority circuit 5096*a* outputs a selecting signal 5117 for selecting the inter-field YC separation C1 or C2 in the intra-frame YC separating circuit 5050.

According to the above embodiment, in the isolated point eliminating circuit, the correlation values in a plurality of directions between fields with respect to the particular sampling point and the neighboring sampling points are added and compared and then the most numerous direction is selected from the plurality of directions to decide the correlation between fields. When the particular sampling point is judged to be an isolated point, the isolated point is eliminated and a plurality of intra-frame processes including inter-field operations are adaptively switched in accordance to that result. Therefore, the detection of correlation is possible with eliminating the isolated point.

In FIGS. 68 and 69, the correlation is decided by nine sampling points, i.e., three pixels in the horizontal direction and three lines in the vertical direction in the same field with the particular sampling point as a center. However, the number of the sampling points may be increased in the horizontal and vertical directions.

Figure 70:
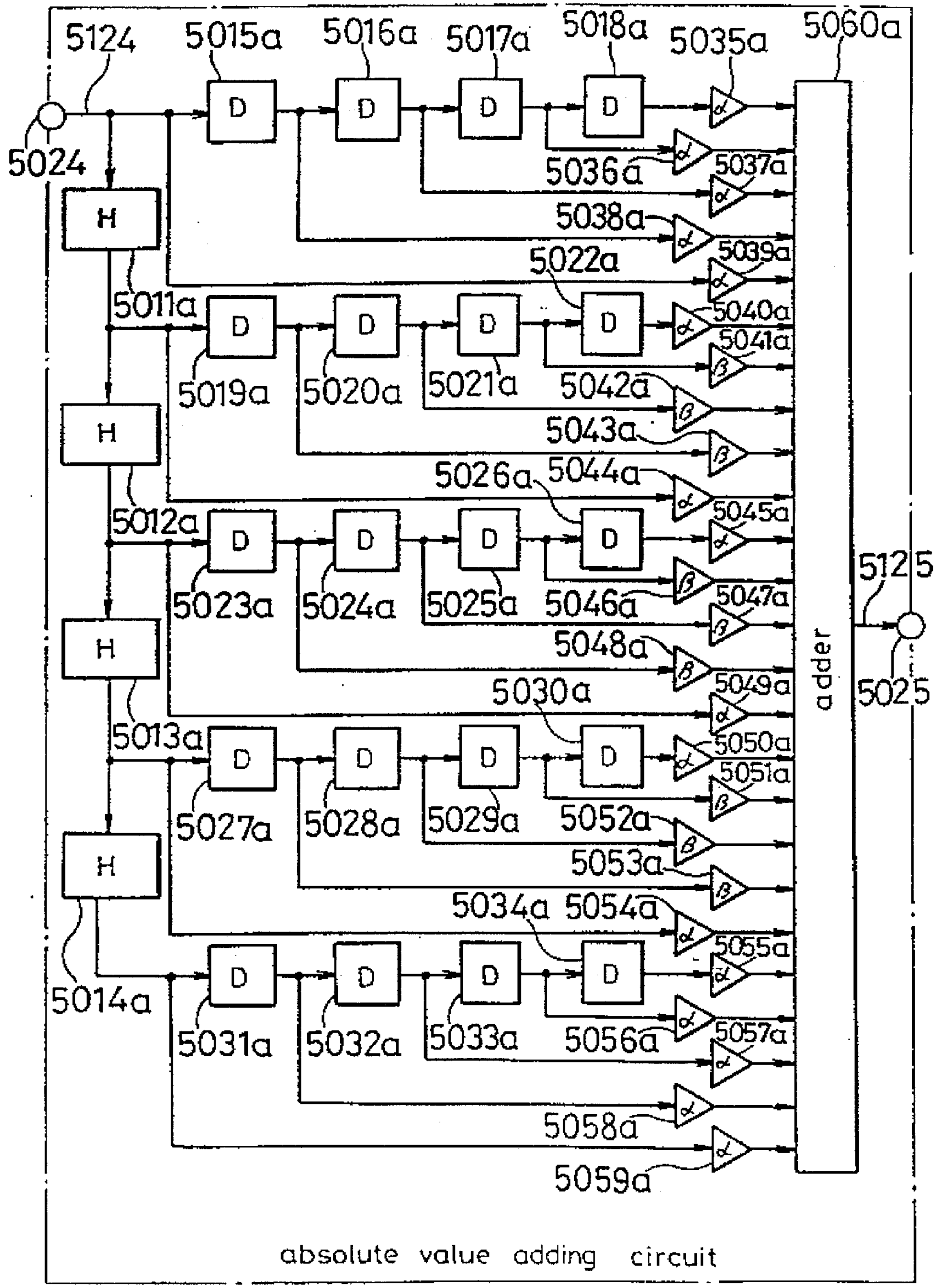
FIG. 70 is a block diagram showing an absolute value adding circuit according to a second example of the isolated point eliminating circuit shown in FIG. 67.
Figure 71:
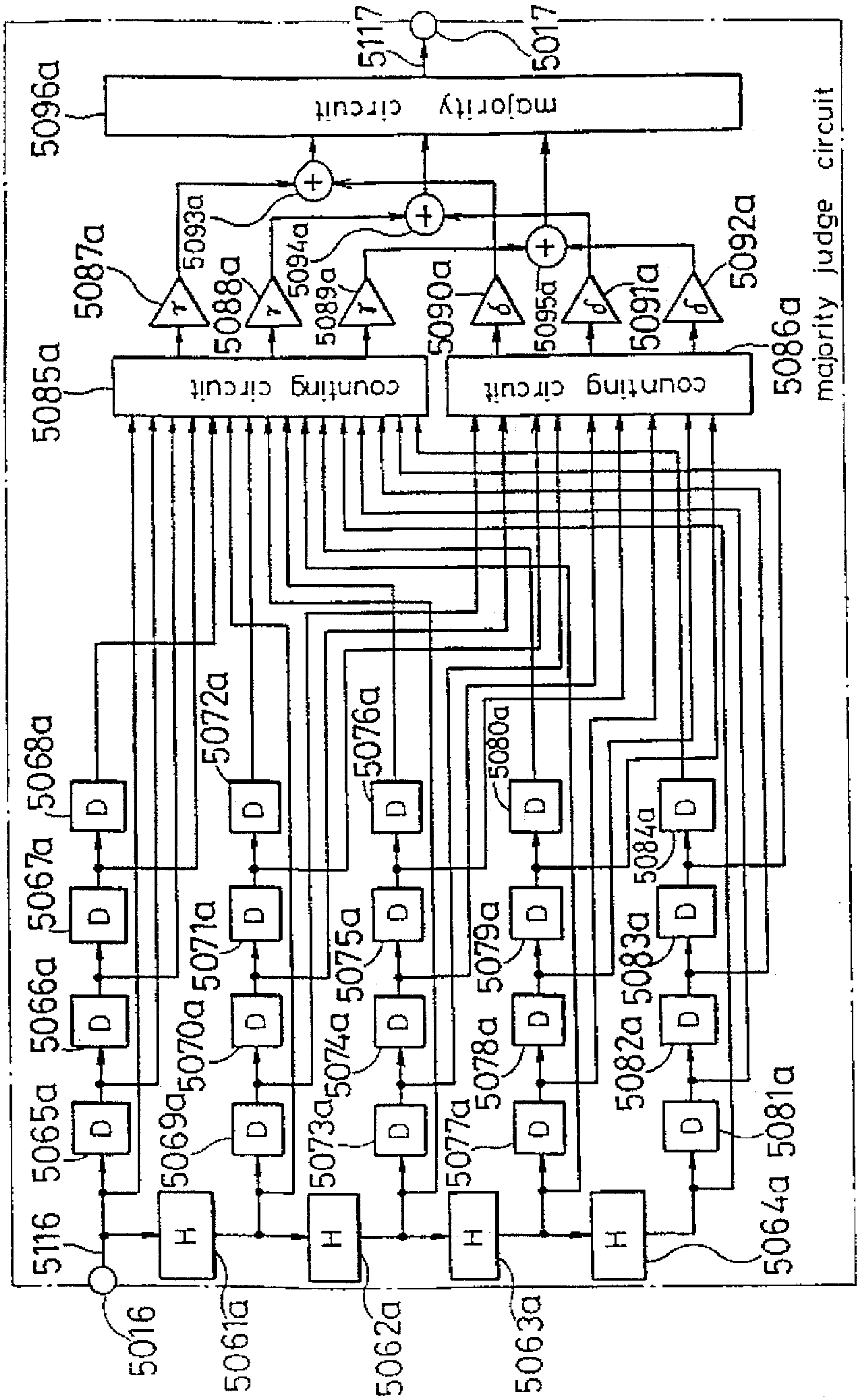
FIG. 71 is a block diagram showing a majority decision circuit according to the second example of the isolated point eliminating circuit shown in FIG. 67.

FIGS. 70 and 71 are block diagrams showing the absolute value circuits 5001*a*, 5002*a*, and 5003*a* and the majority decision circuit 5004*a* in accordance with the second example of the isolated point eliminating circuit 5070 shown in FIG. 67. In these figures, differently from FIGS. 68 and 69, when the first elimination of isolated point is performed by adding correlation values of the particular sampling point and the neighboring sampling points and when the second elimination of isolated point is performed by selecting the most numerous result from the obtained results, weight of signal is varied in the sampling points depending on the distance between the particular sampling point to the neighboring sampling points. The circuit of FIG. 70 has the same structure as the isolated point eliminating circuit of FIG. 46.

In the majority decision circuit shown in FIG. 71, the correlation signal 5116 is delayed in the one-pixel delay circuits 5065*a*, 5066*a*, 5067*a*, and 5068*a* each by one pixel. The correlation signal 5116 and outputs of the one-pixel delay circuits 5065*a*, 5066*a*, 5067*a* and 5068*a* are input to the counting circuit 5085*a* as correlations of the sampling points (●), (◇), (○), (◇), and (●) shown in FIG. 82(*a*), respectively.

On the other hand, the correlation signal 5116 is delayed by one line in the one-line delay circuit 5061*a* and each by one pixel in the one-pixel delay circuits 5069*a*, 5070*a*, 5071*a*, and 5072*a*. An output of the one-line delay circuit 5061*a* and an output of the one-pixel delay circuit 5072*a* are input to the counting circuit 5085*a* as correlations of the sampling points (○) and (○), respectively. Outputs of the one-pixel delay circuits 5069*a*, 5070*a* and 5071*a* are input to the counting circuit 5086*a* as correlations of the sampling points (♦), (●)b, and (◇).

In addition, an output of the one-line delay circuit 5061*a* is delayed by one line in the one-line delay circuit 5062*a* and delayed each by one pixel in the one-pixel delay circuits 5073*a*, 5074*a*, 5075*a*, and 5076*a*. An output of the one-line delay circuit 5062*a* and an output of the one-pixel delay circuit 5076*a* are input to the counting circuit 5085*a* as correlations of the sampling points (●)d and (●)c, respectively. Outputs of the one-pixel delay circuits 5073*a*, 5074*a* and 5075*a* are input to the counting circuit 5086*a* as correlations of the sampling point (◇), the particular sampling point (★), and the sampling point (♦).

In addition, an output of the one-line delay circuit 5062*a* is delayed by one line in the one-line delay circuit 5063*a* and delayed each by one pixel in the one-pixel delay circuits 5077*a*, 5078*a*, 5079*a*, and 5080*a*. An output of the one-line delay circuit 5063*a* and an output of the one-pixel delay circuit 5080*a* are input to the counting circuit 5085*a* as correlations of the sampling points (○) and (○), respectively. Outputs of the one-pixel delay circuits 5077*a*, 5078*a* and 5079*a* are input to the counting circuit 5086*a* as correlations of the sampling points (♦), (●)a, and (◇).

An output of the one-line delay circuit 5063*a* is delayed by one line in the one-line delay circuit 5064*a* and delayed each by one pixel in one-pixel delay circuits 5081*a*, 5082*a*, 5083*a*, and 5084*a*. An output of the one-line delay circuit 5064*a*, outputs of the one-pixel delay circuit 5081*a*, 5082*a*, 5083*a*, and 5084*a* are input to the counting circuit 5085*a* as correlations of the sampling points (●), (◇), (○), (♦), and (●).

The counting circuit 5085*a* (or 5086*a*) discriminates the input nine correlations from each other and counts the number of input signals having strong correlations in the direction connecting the particular sampling point (★) and the sampling point (●), the number of input signals having strong correlations in the direction connecting the particular sampling point (★) and the sampling point (●), and the number of input signals having strong correlations in the direction connecting the particular sampling point (★) and the sampling point (●). Then, these numbers are output from the first to third output terminals of the counting circuit, respectively.

The results obtained in the counting circuits 5085*a* are multiplied by a coefficient τ in coefficient multipliers 5087*a*, 5088*a*, and 5089*a* while the results obtained in the counting circuits 5086*a* are multiplied by a coefficient δ in coefficient multipliers 5090*a*, 5091*a*, and 5092*a*.

An output of the coefficient multiplier 5087*a* and an output of the coefficient multiplier 5090*a* are added by the adder 5093*a*, and the number of input signals having strong correlations in the direction connecting the particular sampling point (★) and the sampling point (●) is output The coefficients τ and δ in the coefficient multipliers 5087*a* and 5090*a* have a relation of $\tau<\delta$. More specifically, correlations of the sampling points (◇), (●)a, (♦), (♦), (◇), (◇), (●)b, and (♦), which are close to the particular sampling point (★) are counted with larger weighs than the weights applied to the correlations of the sampling points (●), (♦), (○), (◇), (●), (○), (○), (●)c, (●)d, (○), (○), (●), (♦), (○), (◇), and (●), which are far from the particular sampling point.

Similarly, an output of the coefficient multiplier 5088*a* and an output of the coefficient multiplier 5091*a* are added by the adder 5094*a*, and the number of input signals having strong correlations in the direction connecting the particular sampling point (★) and the sampling point (●) is output. An output of the coefficient multiplier 5089*a* and an output of the coefficient multiplier 5092*a* are added by the adder 5095*a*, and the number of input signals having strong correlations in the direction connecting the particular sampling point (★) and the sampling point (●) is output.

The majority circuit 5096*a* selects the largest number and finally decides the correlation of the particular sampling point (★).

According to the above embodiment, in the isolated point eliminating circuit, weights are applied to the correlation values in a plurality of directions between fields with respect to the particular sampling point and the neighboring sampling points and then these values are added and compared. Then, the most numerous direction is selected from the plurality of directions to decide the correlation between fields. When the particular sampling point is judged to be an isolated point, the isolated point is eliminated and a plurality of intra-frame processes including inter-field operations are adaptively switched in accordance to that result. Therefore, the detection of correlation is possible with eliminating the isolated point.

In FIGS. 70 and 71, the correlation is decided by twenty five sampling points, i.e., five pixels in the horizontal direction and five lines in the vertical direction in the same field with the particular sampling point as a center. However, the number of the sampling points may be increased in the horizontal and vertical directions.

As described above, according to the ninth embodiment of the present invention, when the motion detecting circuit detects a moving image, in the intra-frame YC separating circuit, correlations between frames or between fields are partially detected, and the detected results of the particular sampling point and the neighboring sampling point are added, and the most numerous result among the particular sampling point and the neighboring sampling points is selected, whereby the isolated point is eliminated. Or, the detected results, to which weights are applied, are added, and weights are applied to the results of the particular sampling point and the neighboring sampling points, and the most numerous result is selected, whereby the isolated point is eliminated. Then, the three kinds of intra-frame YC separations including inter-field operations are performed in accordance with the result. Therefore, while processing the moving image in the motion adaptive YC separation filter, an optimum YC separation is possible utilizing the correlation of the image, resulting in a motion adaptive YC separating filter which performs YC separation with less deterioration in resolution.

[Embodiment 10]

Figure 90:
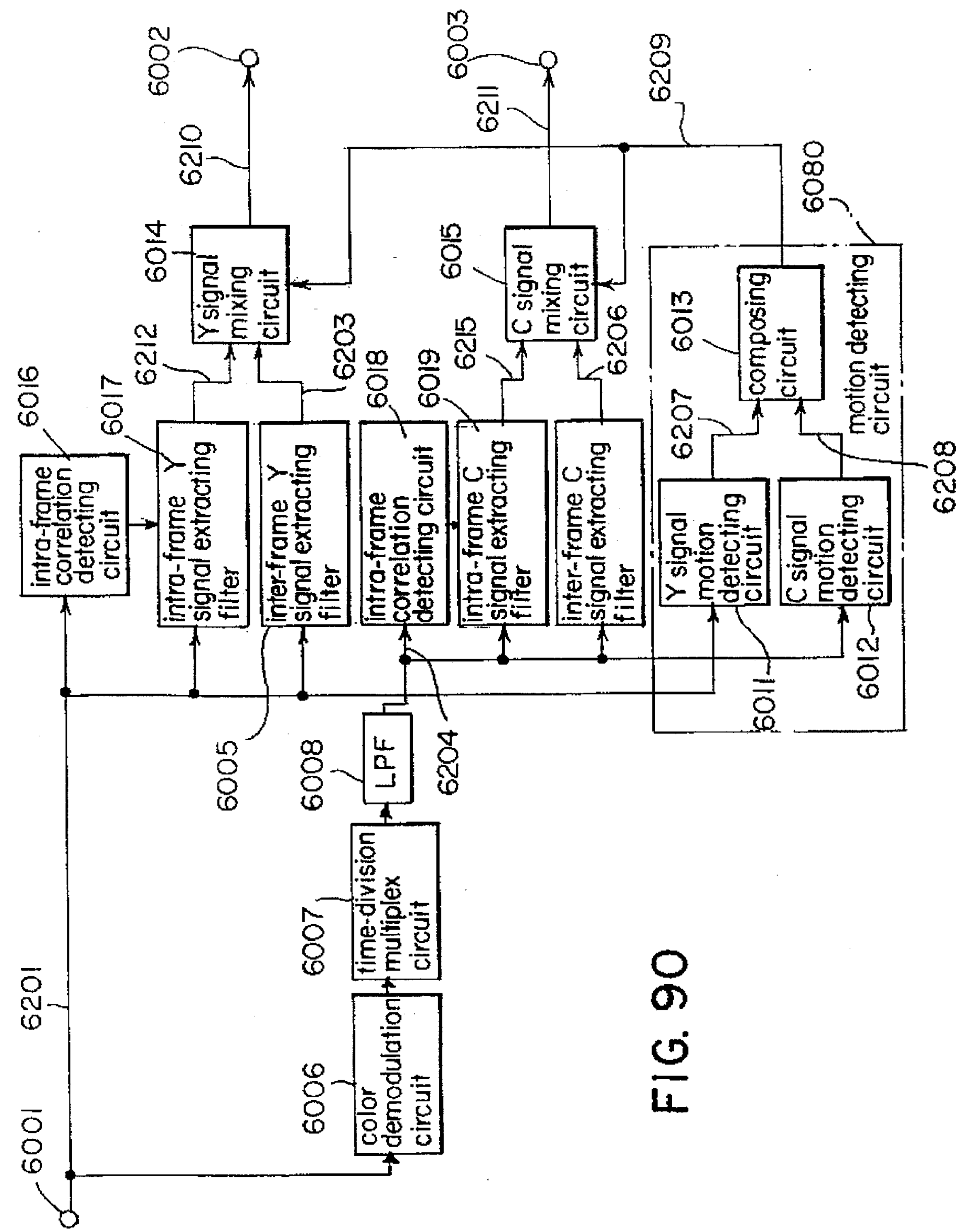
FIG. 90 is a block diagram showing an embodiment of the present invention.

FIG. 90 is a block diagram showing a YC separating filter adaptive to a movement of an image, in accordance with a tenth embodiment of the present invention. In FIG. 90, the intra-field Y signal extracting filter 1004 shown in FIG. 110 is replaced by an intra-frame correlation detecting circuit 6016, an intra-frame Y signal extracting filter 6017 and the intra-field C signal extracting filter 1009 shown in FIG. 110 is replaced by an intra-frame C signal extracting filter 6019, and other structures are the same as those shown in FIG. 110.

Figure 91:
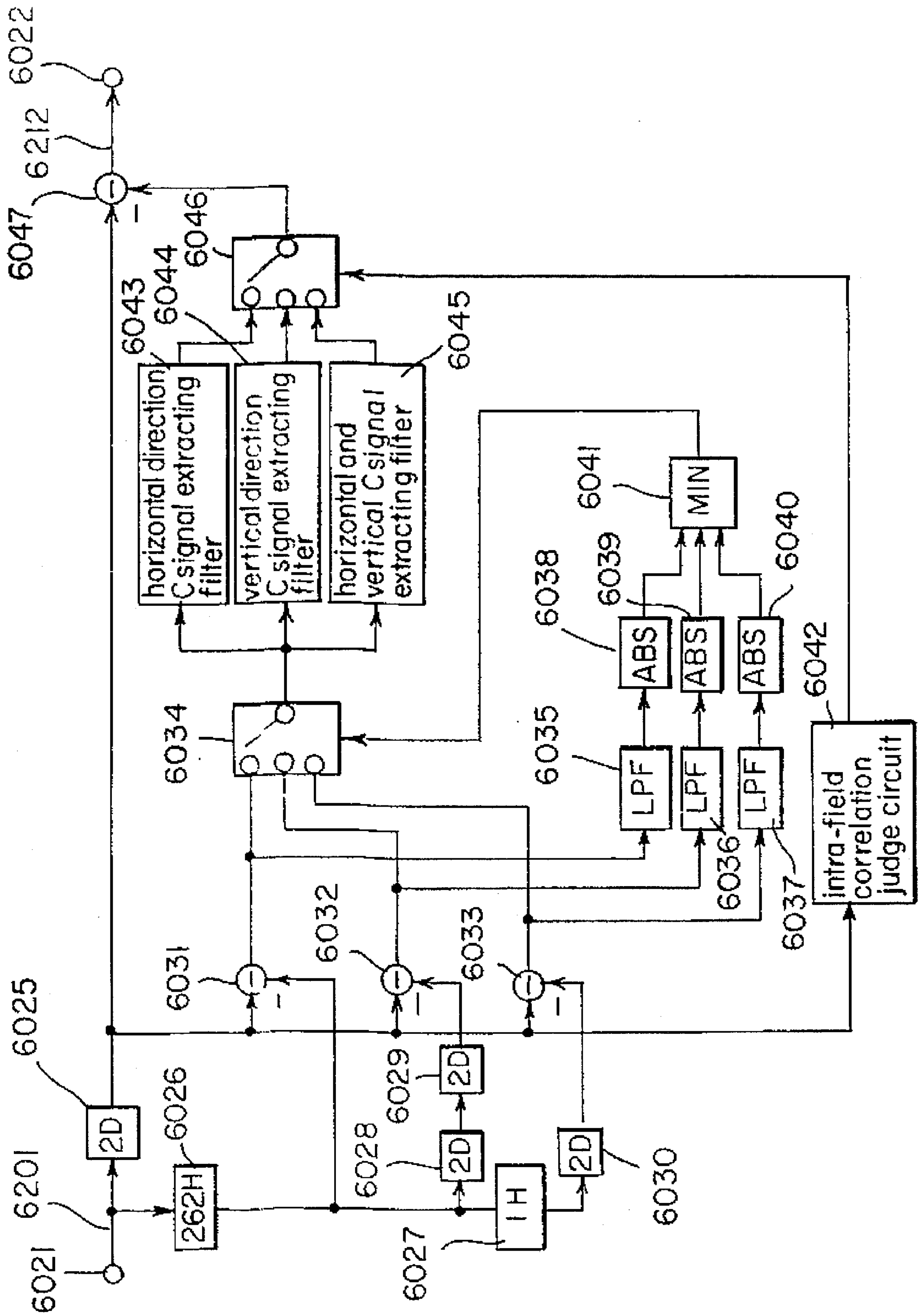
FIG. 91 is a block diagram showing first examples of an intra-frame correlation detecting circuit and an intra-frame Y signal extracting filter shown in FIG. 90.

FIG. 91 is a block diagram showing first examples of an intra-frame correlation detecting circuit 6016 and an intra-frame Y signal extracting filter 6017 shown in FIG. 90. This circuit has the same structure as the circuit shown in FIG. 2.

When x-axis is taken along a horizontal direction of a screen, y-axis is taken along a vertical direction of the screen, and t-axis (time axis) is taken along a direction perpendicular to a plane produced by the x-axis and the y-axis, a three-dimensional time space is constituted by the x, y, and t axes.

Figure 102:
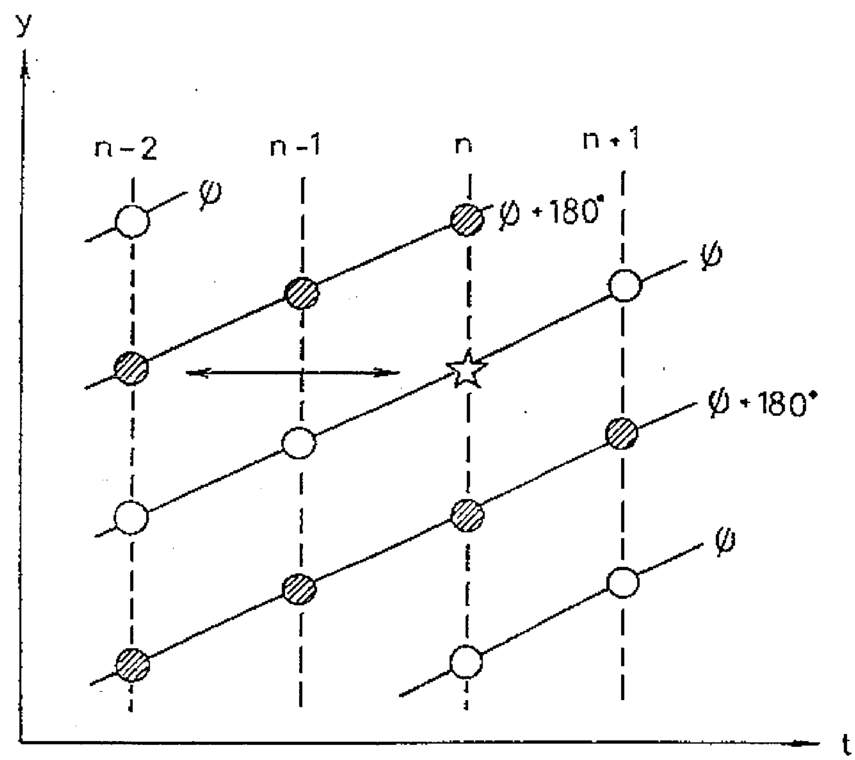
FIG. 102 is a plan view showing an arrangement of the V signal, which is digitized by a frequency four times the color sub-carrier frequency, in the three-dimensional time space by the t-axis and the y-axis.
Figure 103:
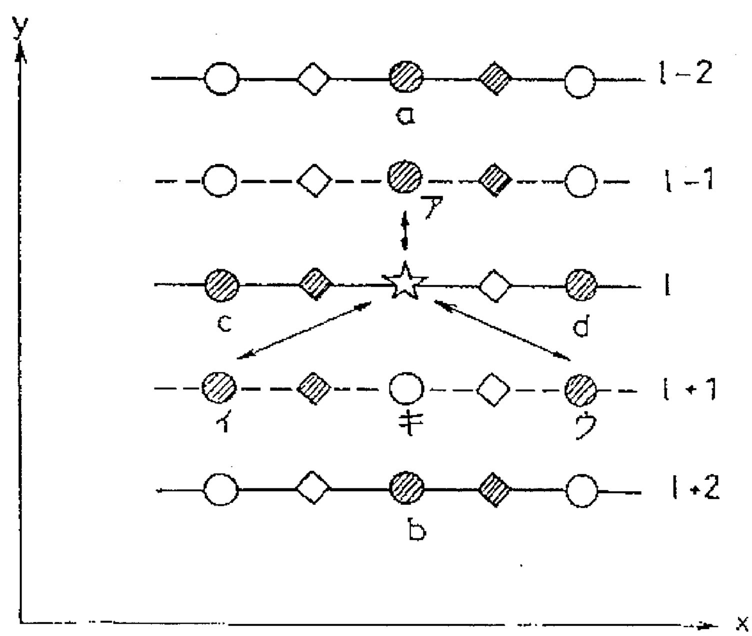
FIG. 103 is a plan view showing an arrangement of the same V signal by the x-axis and the y-axis.
Figure 104:
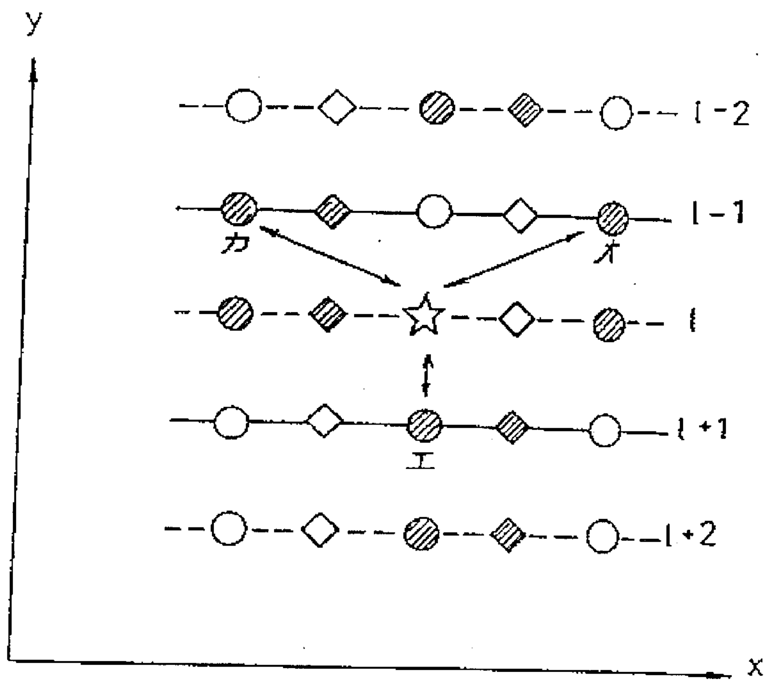
FIG. 104 is a plan view showing an arrangement of the same V signal by the x-axis and the y-axis.

FIGS. 102, 103, and 104 show the three-dimensional time space.

Figure 105:
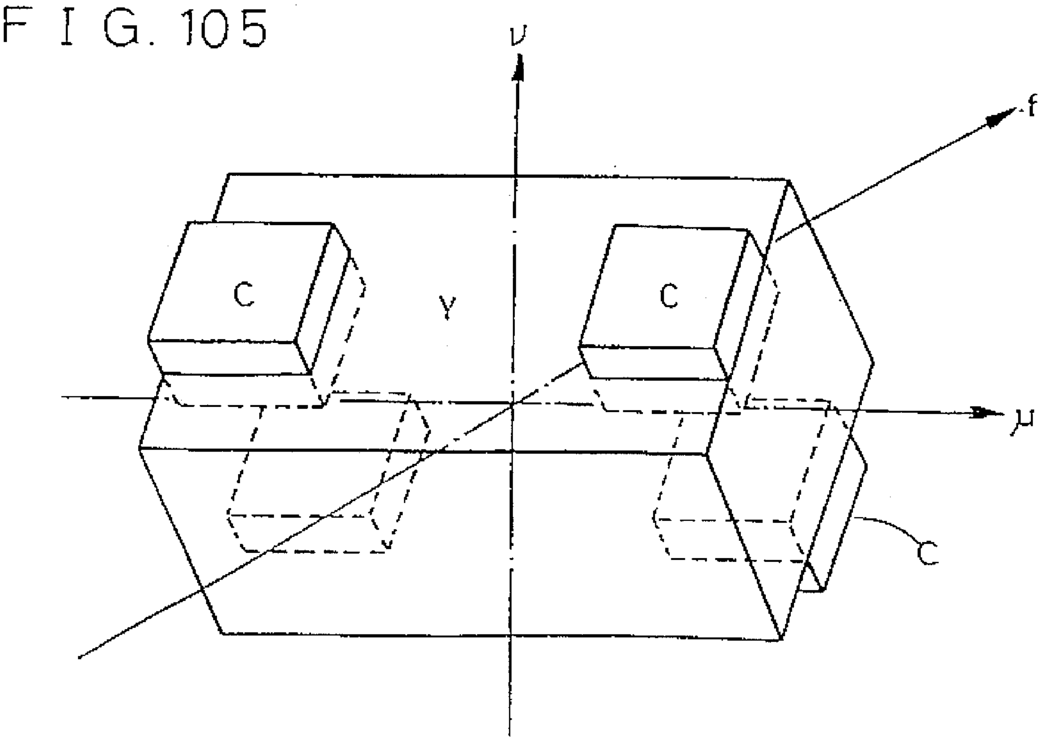
FIG. 105 is a perspective view showing a spectral dispersion of V signals in the three-dimensional frequency space.
Figure 106:
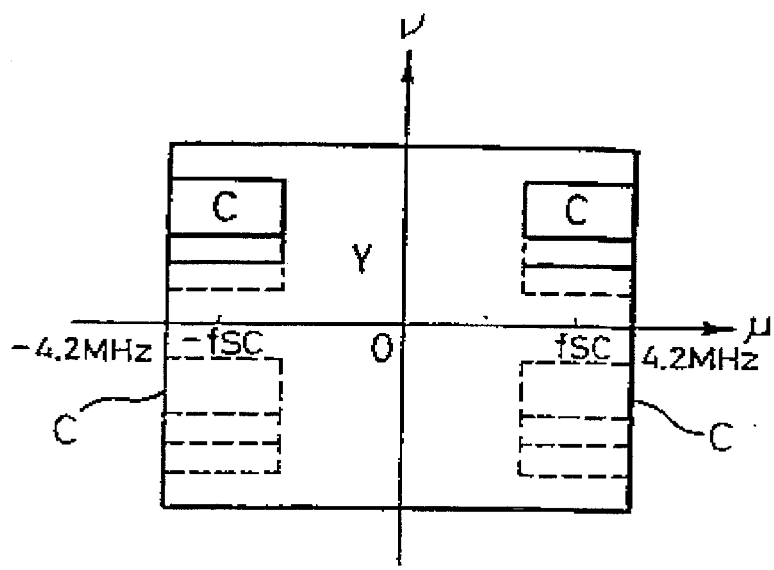
FIG. 106 is a diagram showing the spectral dispersion of FIG. 105 viewed from the minus side of the f-axis.
Figure 107:
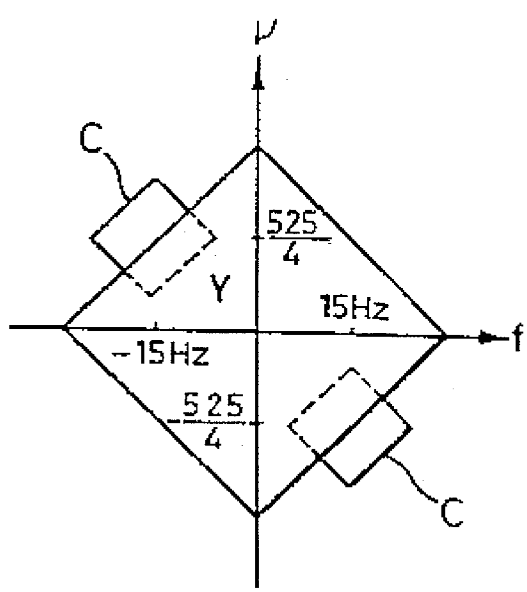
FIG. 107 is a diagram showing the spectral dispersion of FIG. 105 viewed from the plus side of the μ-axis.

FIGS. 105, 106, and 107 show projections of the three-dimensional frequency space.

The intra-frame correlation detecting circuit and the intra-frame Y signal extracting filter operate as follows. In this tenth embodiment, when the motion detecting circuit 6080 detects that the image is a moving image, an optimum one is selected from intra-frame Y signal extracting filters including three kinds of inter-field operations and three kinds of intra-field operations, in place of the intra-field Y signal extracting filter.

In this embodiment, a correlation between the particular sampling point (★) and a sampling point (●), a correlation between the particular sampling point (★) and a sampling point (●), and a correlation between the particular sampling point (★) and a sampling point (●), shown in FIG. 103, are detected.

The minimum value selecting circuit 6041 selects the minimum one from the above-described three kinds of absolute value outputs (the correlation detection amount is the maximum) and controls the signal selecting circuit 6034.

More specifically, the signal selecting circuit 6034 selects an output of the subtracter 6031 when an output of the absolute value circuit 6038 is the minimum, an output of the subtracter 6032 when an output of the absolute value circuit 6039 is the minimum, and an output of the subtracter 6033 when an output of the absolute value circuit 6040 is the minimum.

Here, correlations of image in the horizontal direction and the vertical direction are detected with respect to a particular sampling point. When the correlation is strong in the horizontal direction, an output of the horizontal direction C signal extracting filter 6043 is selected. When the correlation is strong in the vertical direction, an output of the vertical direction C signal extracting filter 6044 is selected. In other cases, an output of the horizontal and vertical direction C signal extracting filter 6045 is selected.

Correlations in the horizontal and vertical directions are detected in an intra-field correlation judge circuit 6042. The intra-field correlation judge circuit 6042 detects existences of correlations in the horizontal and vertical directions of the image by the intra-field process and controls the signal selecting circuit 6046 in accordance with the result of the detection. An output of the signal selecting circuit 6046 is subtracted by the V signal output from the two-pixel delay circuit 6025 by the subtracter 6047, leaving an intra-frame YC separated Y signal 6212.

According to the above-described embodiment, in the intra-frame Y signal extracting filter, when the motion detecting circuit detects a moving image, correlations in a plurality of directions between fields are partially detected by a horizontal low-frequency component of a difference between sampling points having opposite phases of color sub-carrier, and a plurality of intra-field processes are adaptively switched in accordance with the result of the detection. Further, correlations in the field are partially detected and a plurality of intra-field processes are adaptively switched in accordance with the result of the detection. Thus, the band of the C signal is restricted, whereby the intra-frame YC separated Y signal is output. Therefore, a direction to which the image moves is detected and an inter-field operation adaptive to that direction is possible.

Also in this embodiment, by adaptively switching the inter-field processes, no deterioration in resolution occurs when the image moves in some direction like shown in FIG. 108(*a*), whereby crosstalks between Y signals and C signals are reduced.

Figure 97:
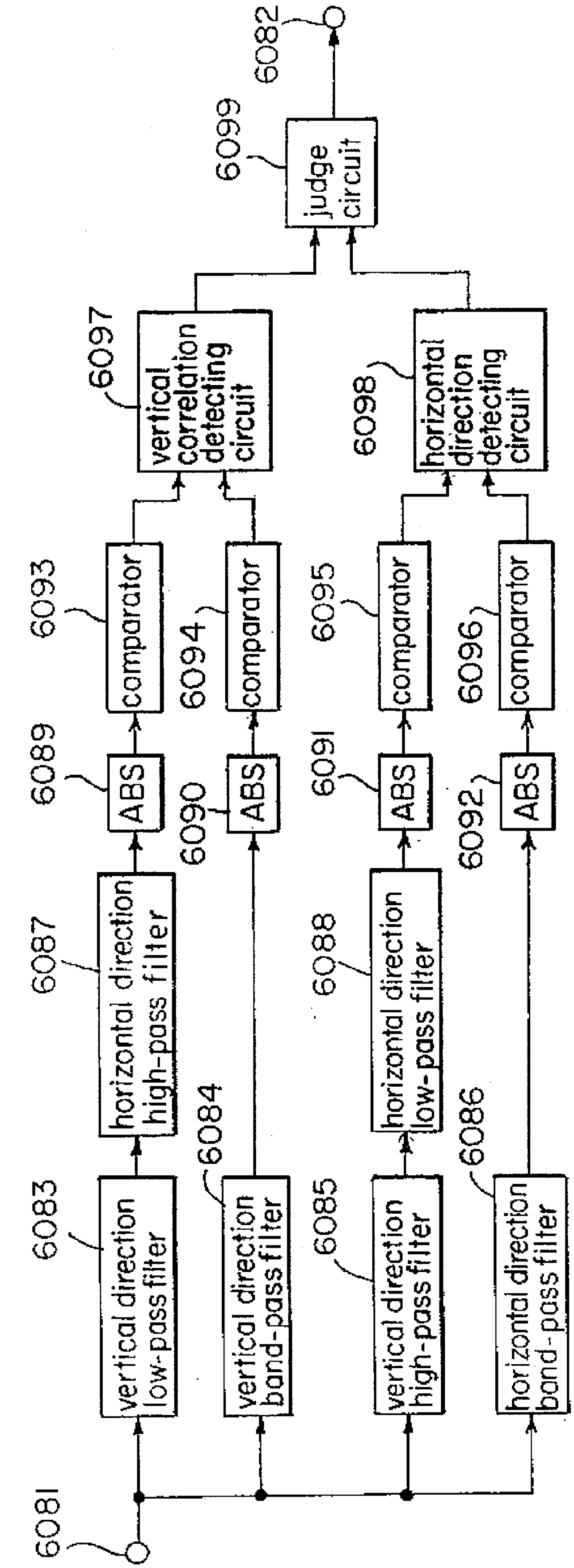
FIG. 97 is a block diagram showing a first example of an intra-field correlation judge circuit shown in FIGS. 91 to 96.

FIG. 97 is a block diagram showing an example of the intra-field correlation judge circuit 6042 shown in FIG. 91. This intra-field correlation judge circuits selects one of C signal outputs from the horizontal direction C signal extracting filter 6043, the vertical direction C signal extracting filter 6044, and the horizontal and vertical direction C signal extracting filter 6045. The structure and operation of this circuit is the same as those of the circuit shown in FIG. 6.

Figure 98:
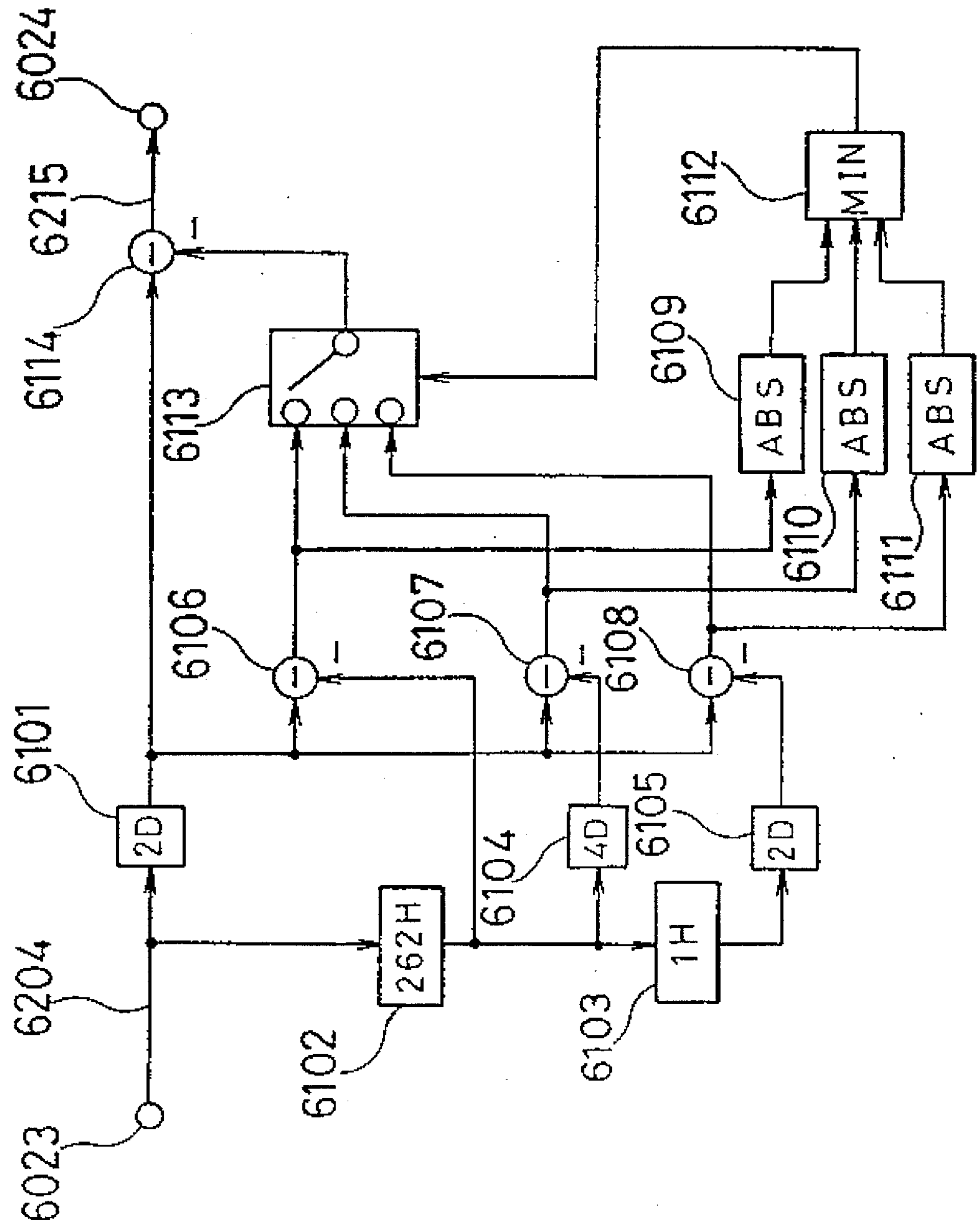
FIG. 98 is a block diagram showing first examples of an intra-frame correlation detecting circuit and an intra-frame C signal extracting filter shown in FIG. 90.

FIG. 98 is a block diagram showing a first example of the intra-frame correlation detecting circuit 6018 and the intra-frame C signal extracting filter 6019 shown in FIG. 90. In FIG. 98, a color difference signal 6204 is input to an input terminal 6023. Reference numerals 6101 and 6105 designate two-pixel delay circuits, numeral 6102 designates a 262-line delay circuit, numeral 6103 designates a one-line delay circuit, numeral 6104 designates a four-pixel delay circuit, numerals 6106, 6107, 6108, and 6114 designate subtracters, and numerals 6109, 6110, and 6111 designate absolute value circuits. A minimum value selecting circuit 6112 selects the minimum value from three input signals and outputs a control signal. A signal selecting circuit 6113 selects and outputs one of three input signals. An output of the signal selecting circuit 6113 is subtracted from an output of the two-pixel delay circuit 6101 by the subtracter 6114, leaving an intra-frame YC separated C signal 6215. The intra-frame YC separated C signal 6215 is output from an output terminal 6024.

The intra-frame correlation detecting circuit and the intra-frame C signal extracting filter shown in FIG. 90 operate as follows. In this embodiment, when the motion detecting circuit 6080 detects a moving image, an optimum one is selected from the intra-frame C signal extracting filters including three kinds of inter-field operations, in place of the intra-field C signal extracting filter.

In FIG. 98, the color difference signal 6204 input to the input terminal 6023 is delayed by two pixels in the two-pixel delay circuit 6101 and further delayed by 262 lines in the 262-line delay circuit 6102.

The color difference signal delayed by two pixels in the two-pixel delay circuit 6101 and an output of the 262-line delay circuit 6102 are subtracted by the subtracter 6106, leaving an inter-field difference for the inter-field C extraction C.

The color difference signal delayed by two pixels in the two-pixel delay circuit 6101 and an output of the four-line delay circuit 6104 are subtracted by the subtracter 6107, leaving an inter-field difference for the inter-field C extraction B.

The color difference signal delayed by two pixels in the two-pixel delay circuit 6101 and an output of the two-pixel delay circuit 6105 are subtracted by the subtracter 6108, leaving an inter-field difference for the inter-field C extraction A.

These three kinds of inter-field differences are input to the signal selecting circuit 6113 and selected by an output of the minimum value selecting circuit 6112.

A correlation detection for adaptively selecting these three kinds of inter-field C extractions is performed in accordance with the inter-field correlation detection like the embodiment of FIG. 91.

An absolute value of the inter-field difference output from the subtracter 6106 is obtained in the absolute value circuit 6109 and input to the minimum value selecting circuit 6112, whereby a correlation between the particular sampling point and the sampling point shown in FIG. 103 is detected.

An absolute value of the inter-field difference output from the subtracter 6107 is obtained in the absolute value circuit 6110 and input to the minimum value selecting circuit 6112, whereby a correlation between the particular sampling point and the sampling point shown in FIG. 103 is detected.

An absolute value of the inter-field difference output from the subtracter 6108 is obtained in the absolute value circuit 6111 and input to the minimum value selecting circuit 6112, whereby a correlation between the particular sampling point and the sampling point shown in FIG. 103 is detected.

The minimum value selecting circuit 6112 selects the minimum one from the three kinds of absolute values and controls the signal selecting circuit 6113. More specifically, the signal selecting circuit 6113 selects the output of the subtracter 6106 when the output of the absolute value circuit 6109 is the minimum, the output of the subtracter 6107 when the output of the absolute value circuit 6110 is the minimum, and the output of the subtracter 6108 when the output of the absolute value circuit 6111 is the minimum.

As described above, the YC separating filter in accordance with this embodiment is provided with the inter-frame Y signal extracting filter which performs a separation utilizing an inter-frame correlation and outputs an inter-frame YC separated Y signal when the motion detecting circuit detects a still image, the intra-frame Y signal extracting filter which detects an inter-field correlation or inter-frame and intra-field correlations and performs a separation utilizing the correlation and outputs an intra-frame YC separated Y signal when the movement detecting circuit detects a moving image, the Y signal mixing circuit which mixes the inter-frame YC separated Y signal and the intra-frame YC separated Y signal and outputs a motion adaptive YC separated Y signal on the basis of the output of the motion detecting circuit, the color demodulation circuit which color-demodulates from the composite television signal to the color difference signal, the inter-frame C signal extracting filter which performs a separation utilizing the inter-frame correlation and outputs the inter-frame YC separated C signal when the motion detecting circuit detects a still image, the intra-frame C signal extracting filter which detects a correlation between frames or between fields and performs a separation utilizing the correlation and outputs the intra-frame YC separated C signal when the motion detecting circuit detects a moving image, and the C signal mixing circuit which mixes the inter-frame YC separated C signal and the intra-frame YC separated C signal and outputs a motion adaptive YC separated C signal on the basis of the output of the motion detecting circuit. In this way, the filter corresponding to the Y signal is separated from the filter corresponding to the C signal are separated. Therefore, even when the direction of the correlation of the image is different between the Y signal and the C signal, the respective signals are independently processed.

In this embodiment, while the Y signal and the C signal are processed separately, a correlation is also detected in the field, so that it is possible to select a filter according to the image in the field utilizing the correlation of the image.

In this embodiment, while the Y signal and the C signal are processed separately, in the intra-frame C signal extracting filter, when the motion detecting circuit detects a moving image, correlations in a plurality of directions between fields are partially detected by the horizontal low-frequency component of the difference between sampling points having opposite phases of color sub-carrier between fields, and a plurality of intra-field processes are adaptively switched in accordance with the result of the detection, whereby the band of the color difference signal is restricted and the intra-frame YC separated C signal is output. Therefore, a direction in which the image moves is detected and an inter-field operation adaptive to that direction is possible.

In FIG. 90, although the processing adaptive to the movement of the color difference signal constituted by the intra-frame correlation detecting circuit 6018, the intra-frame C signal extracting filter 6019, the inter-frame C signal extracting filter 6010, and the color signal mixing circuit 6015 is performed with the time-divided and multiplexed two kinds of color difference signals 6204 as input signals, the two kinds of color difference signals may be separately processed to be adaptive to the movement of the image by providing the same structure as above.

[Embodiment 11]

While in the above-described tenth embodiment the three kinds of inter-field Y signal extracting filters are adaptively switched, in this embodiment an intra-field Y signal extracting filter 6017 is added to the inter-field Y signal extracting filters and an optimum one is selected from the four filters.

Figure 92:
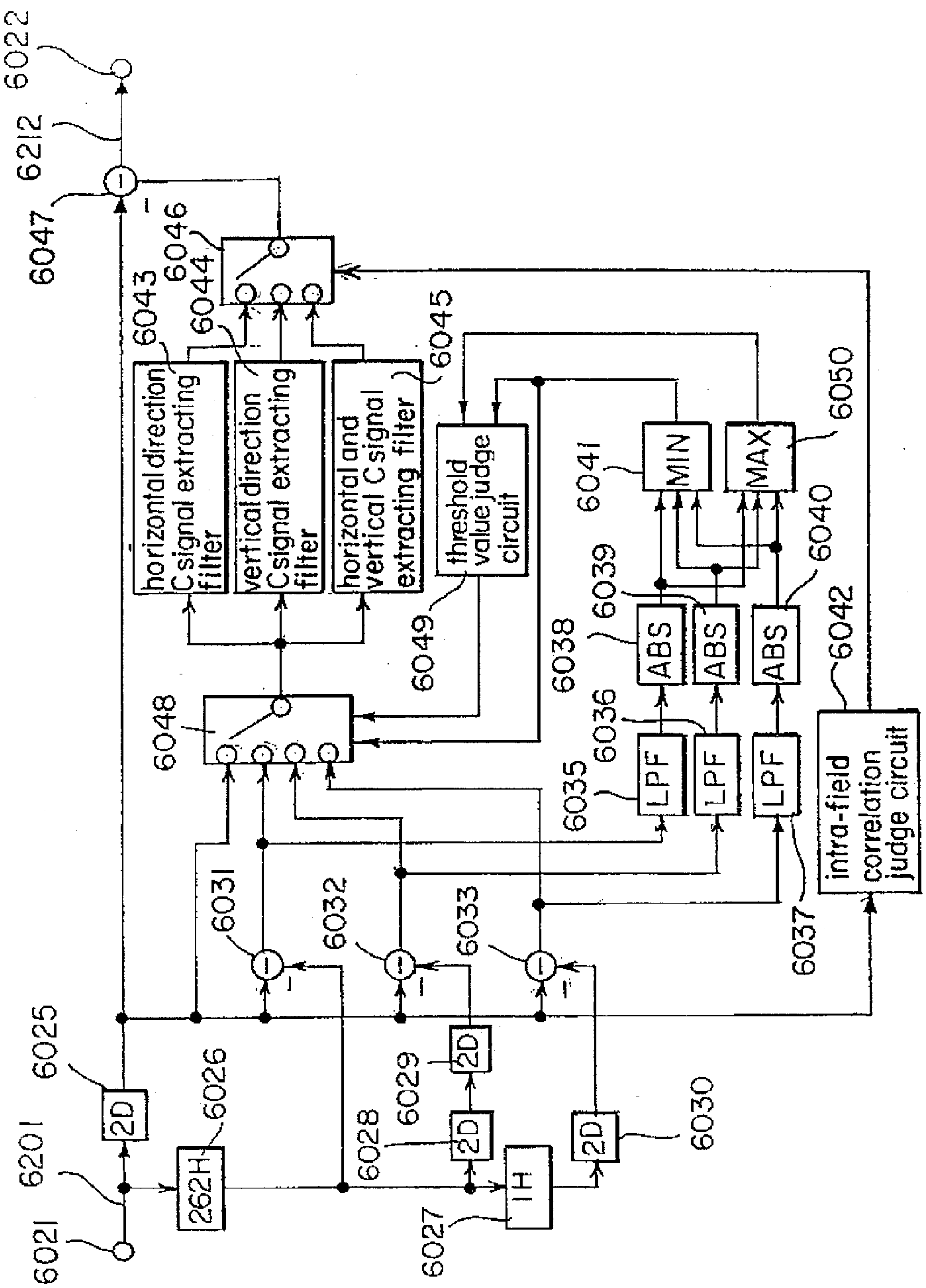
FIG. 92 is a block diagram showing second examples of the intra-frame correlation detecting circuit and the intra-frame Y signal extracting filter shown in FIG. 90.

FIG. 92 is a block diagram showing a second example of the intra-frame correlation detecting circuit 6016 and the intra-frame Y signal extracting filter 6017 shown in FIG. 90. In FIG. 92, the same reference numerals as in FIG. 91 designate the same parts. Reference numeral 6048 designates a signal selecting circuit which selects one of the four inputs. Reference numeral 6049 designates a threshold value judge circuit which judges whether the two inputs exceed a threshold value or not, and outputs a control signal. Reference numeral 6050 designates a maximum value selecting circuit which selects the maximum value of the three inputs and outputs a control signal.

FIG. 92 is only different from FIG. 91 in the intra-frame correlation detecting circuit which adaptively controls the signal selecting circuit 6048. The signal selecting circuit 6048 of FIG. 92 has the same structure as the signal selecting circuit of FIG. 4.

Also in this eleventh embodiment, by adaptively switching the inter-field processes, no deterioration in resolution occurs when the image moves in some direction like shown in FIG. 108(*a*), whereby crosstalks between Y signals and C signals are reduced.

[Embodiment 12]

While in the above-described tenth embodiment the three kinds of inter-field C signal extracting filters are adaptively switched, in this embodiment an intra-field C signal extracting filter is added to the inter-field C signal extracting filters and an optimum one is selected from the four filters.

Figure 99:
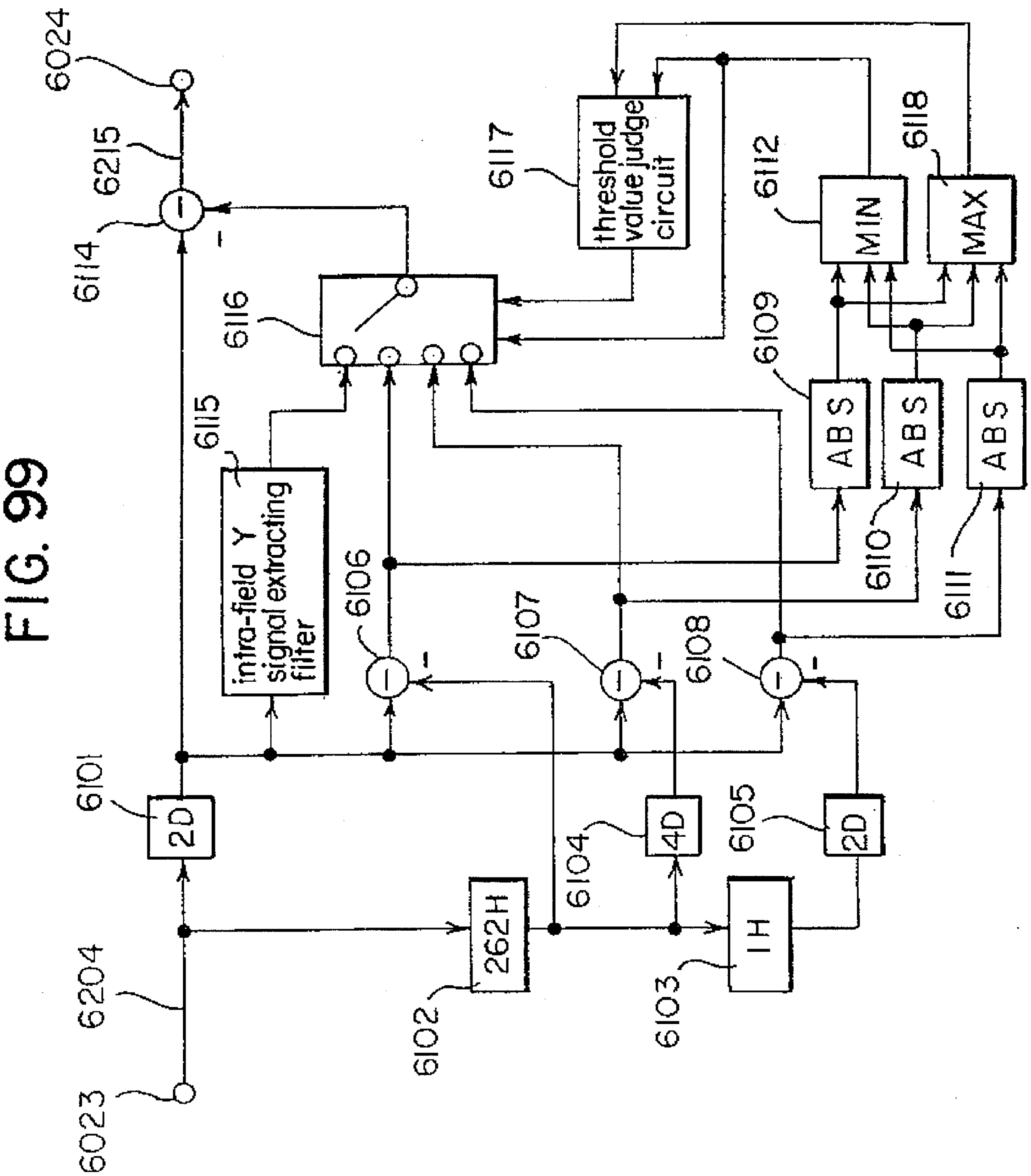
FIG. 99 is a block diagram showing second examples of the intra-frame correlation detecting circuit and the intra-frame C signal extracting filter shown in FIG. 90.

FIG. 99 is a block diagram showing a second example of the inter-frame correlation detecting circuit 6018 and the intra-frame C signal extracting filter 6019 shown in FIG. 90. In FIG. 99, the same reference numerals as in FIG. 98 designate the same parts. Reference numeral 6115 designates an intra-field Y signal extracting filter which extracts a Y signal by an operation in a field. Reference numeral 6116 designates a signal selecting circuit which selects one of the four inputs. Reference numeral 6117 designates a threshold value judge circuit which judges whether the two inputs exceed a threshold value or not, and outputs a control signal. Reference numeral 6118 designates a maximum value selecting circuit which selects the maximum value of the three inputs and outputs a control signal.

In FIG. 99, an only difference from FIG. 98 resides in the intra-frame correlation detecting circuit which adaptively controls the signal selecting circuit 6116. A description is given of the intra-frame correlation detecting circuit.

An output of the two-pixel delay circuit 6101 is input to the first input terminals of the subtracters 6106, 6107, and 6108 and the intra-field Y signal extracting filter. An output of the intra-field Y signal extracting filter 6115 is input to the signal selecting circuit 6116.

An output of the absolute value circuit 6109 is input to the minimum value selecting circuit 6112 and the maximum value selecting circuit 6118. An output of the absolute value circuit 6110 is input to the minimum value selecting circuit 6112 and the maximum value selecting circuit 6118. An output of the absolute value circuit 6111 is input to the minimum value selecting circuit 6112 and the maximum value selecting circuit 6118.

The signal selecting circuit 6116 is controlled by the threshold value judge circuit 6117 and the minimum value selecting circuit 6112 in the same way as the signal selecting circuit 6048 shown in FIG. 92.

An output of the signal selecting circuit 6116 is output from the terminal 6024 as an intra-frame YC separated C signal 6215.

According to the twelfth embodiment of the present invention, while the Y signal and the C signal are separately processed, in the intra-frame C signal extracting filter, when the motion detecting circuit detects a moving image, correlations in a plurality of directions between fields are partially detected by the horizontal low-frequency component of the difference between sampling points having opposite phases of color sub-carrier between fields. When it is judged that a correlation is present in some direction, the intra-frame C signal extracting filter outputs the intra-frame YC separated C signal by adaptively selecting one of a plurality of the inter-field operations. When it is judged that no correlation is present, the intra-frame C signal extracting filter outputs the intra-frame YC separated C signal by performing a restriction of the band of the color difference signal by the intra-field process. Therefore, when there is no movement of the image, a deterioration in the quality of the image caused by the inter-field operation is avoided.

Also in this twelfth embodiment, by adaptively switching the inter-field processes, no deterioration in resolution occurs when the image moves in some direction like shown in FIG. 108(*a*), whereby crosstalks between Y signals and C signals are reduced.

[Embodiment 13]

Figure 93:
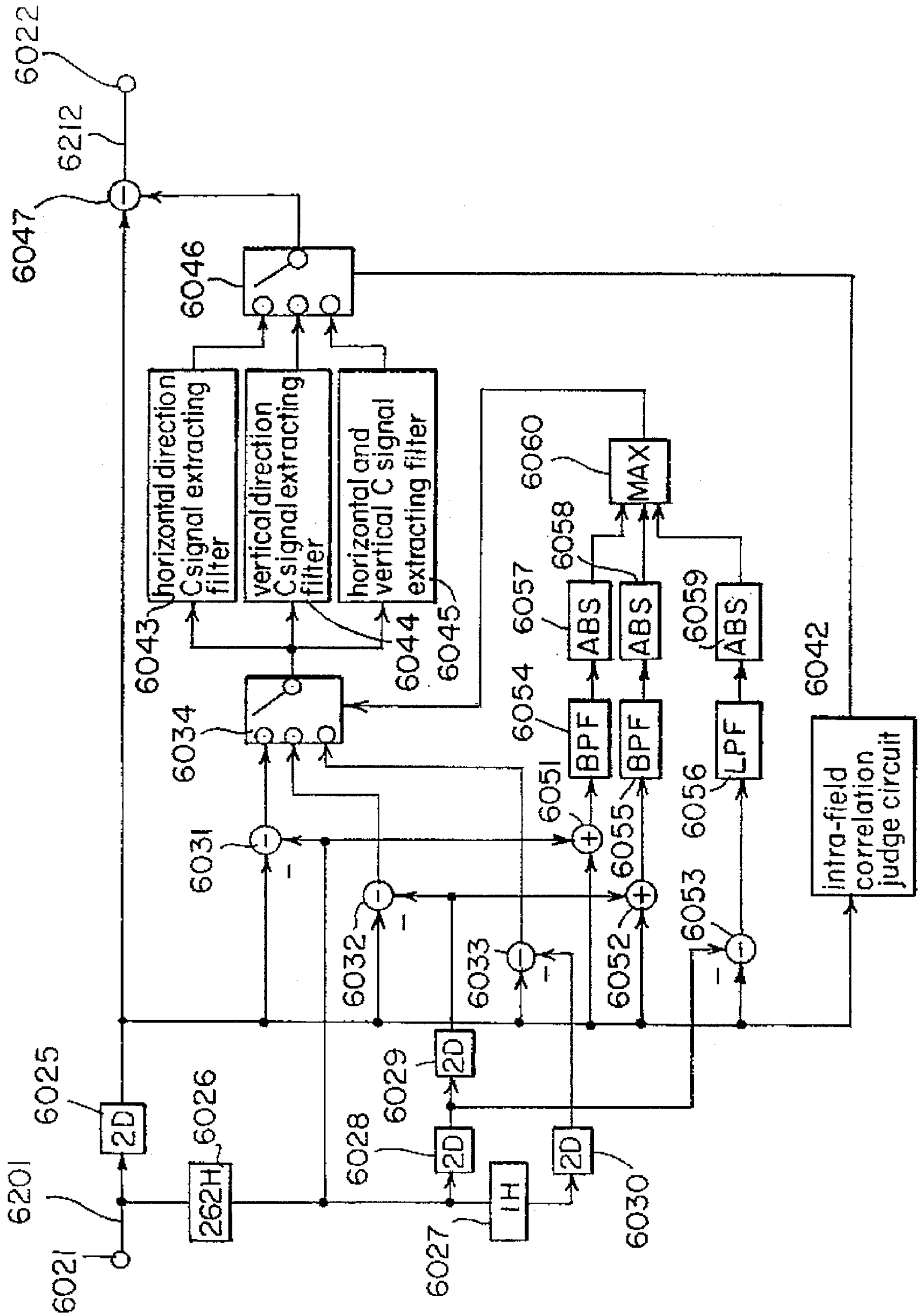
FIG. 93 is a block diagram showing third examples of the intra-frame correlation detecting circuit and the intra-frame Y signal extracting filter shown in FIG. 90.

FIG. 93 is a block diagram showing a third example of the intra-frame correlation detecting circuit 6016 and the intra-frame Y signal extracting filter 6017 shown in FIG. 90.

In FIG. 93, a difference from FIG. 91 resides in the method for detecting the inter-field correlation. In this embodiment, in order to detect a correlation of V signal, a method for detecting a direction in which the spectrum of Y signal extends in the three-dimensional frequency space is employed. In this method, a correlation between fields is detected utilizing a horizontal low-frequency component of a difference between sampling points having the same phases of the color sub-carrier and a horizontal high-frequency component of a sum of sampling points having opposite phases of the color sub-carrier, between fields in an n field and an n−1 field.

According to the thirteenth embodiment of the present invention, while the Y signal and the C signal are separately processed, when the motion detecting circuit detects a moving image, correlations in a plurality of directions between fields are partially detected by the horizontal low-frequency component of the difference between the sampling points having the same phases of color sub-carrier wave between fields and the horizontal high-frequency component of the sum of the sampling points having opposite phases of color sub-carrier between fields, and a plurality of intra-field processes are adaptively switched in accordance with the result of the detection. Further, the correlation in the field is partially detected and a plurality of intra-field processes are adaptively switched in accordance with the result of the detection, Thus, the intra-frame Y signal extracting filter extracts an intra-frame YC separated Y signal. Therefore, a direction in which the image moves is detected and an inter-field operation adaptive to that direction is possible.

Also in this thirteenth embodiment, by adaptively switching the inter-field processes, no deterioration in resolution occurs when the image moves in some direction like shown in FIG. 108(*a*), whereby crosstalks between Y signals and C signals are reduced.

[Embodiment 14]

While in the above-described thirteenth embodiment the three kinds of inter-field Y signal extracting filters are adaptively switched in the intra-frame Y signal extracting filter 6017, in this embodiment an intra-field Y signal extracting filter is added to the inter-field Y signal extracting filters and an optimum one is selected from the four filters.

Figure 94:
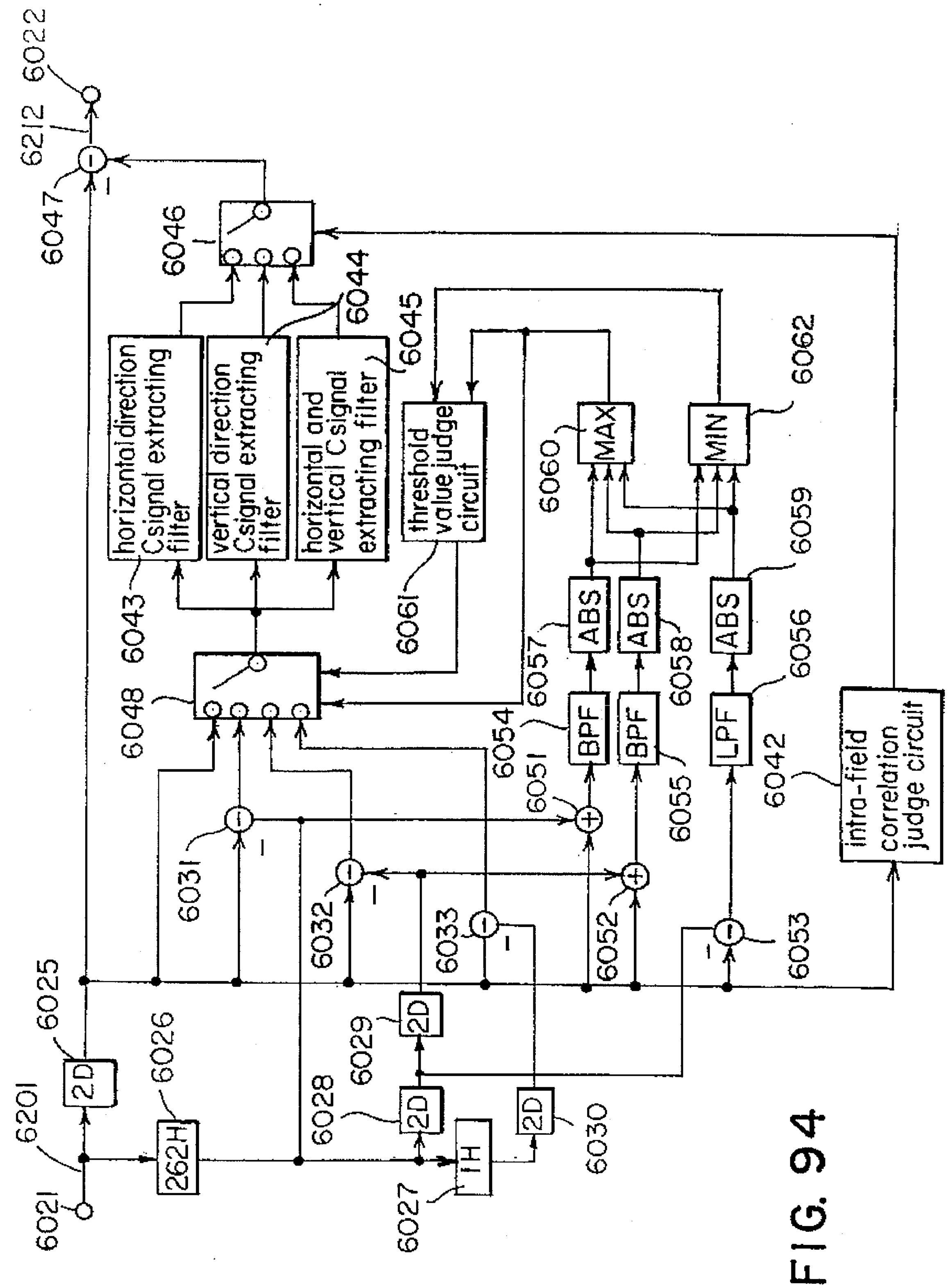
FIG. 94 is a block diagram showing fourth examples of the intra-frame correlation detecting circuit and the intra-frame Y signal extracting filter shown in FIG. 90.

FIG. 94 is a block diagram showing a fourteenth embodiment of the intra-frame correlation detecting circuit 6016 and the intra-frame Y signal extracting filter 6017 shown in FIG. 90. In FIG. 94, the same reference numerals as in FIGS. 91, 92 and 93 designate the same parts. Reference numeral 6061 is a threshold value judge circuit which judges whether the two inputs exceed a threshold value or not, and outputs a control signal. Reference numeral 6062 designates a minimum value selecting circuit which selects the minimum value of the three inputs and then outputs a control signal.

In FIG. 94, a difference from FIG. 93 resides in the intra-frame correlation detecting circuit which adaptively controls the signal selecting circuit 6048. The circuit shown in FIG. 94 is identical to the circuit shown in FIG. 5.

Also in this fourteenth embodiment, by adaptively switching the inter-field processes, no deterioration in resolution occurs when the image moves in some direction like shown in FIG. 108(*a*), whereby crosstalks between Y signals and C signals are reduced.

[Embodiment 15]

Figure 95:
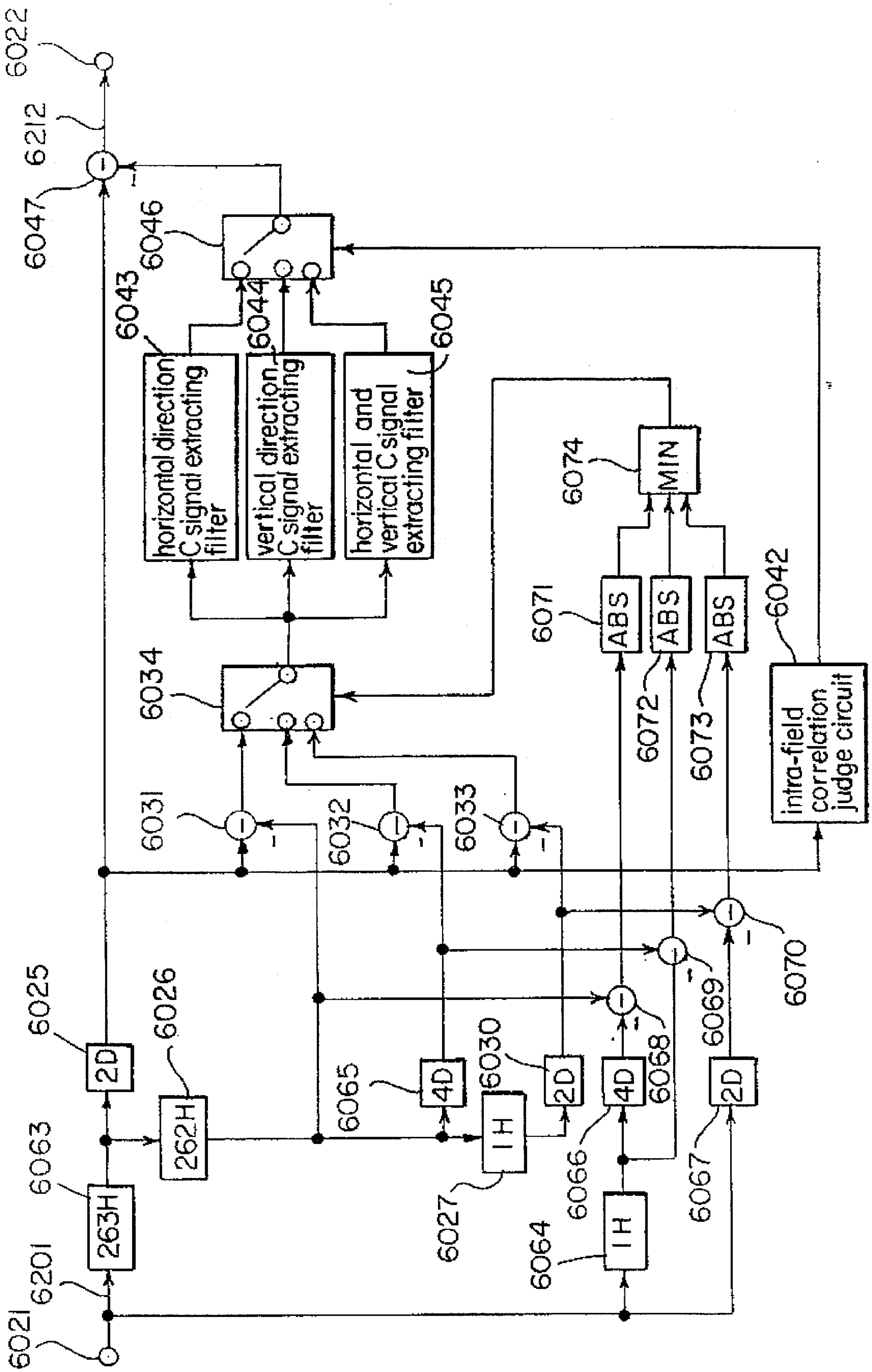
FIG. 95 is a block diagram showing fifth examples of the intra-frame correlation detecting circuit and the intra-frame Y signal extracting filter shown in FIG. 90.

FIG. 95 is a block diagram showing a fifth example of the intra-frame correlation detecting circuit 6016 and the intra-frame Y signal extracting filter 6017 shown in FIG. 90. The same reference numerals as in FIG. 91 designate the same parts and this circuit is identical to the circuit shown in FIG. 13.

FIG. 95 is different from FIG. 91 only in the correlation detecting method for adaptively controlling the three-kinds of inter-field processes. In this embodiment, in order to detect the correlation of the V signal, a correlation between frames are detected utilizing a difference between sampling points having the same phases of the color sub-carrier wave between frames in the n+1 field and the n−1 field.

According to the fifteenth embodiment of the present invention, while the Y signal and the C signal are processed separately, in the intra-frame Y signal extracting filter, when the motion detecting circuit detects a moving image, correlations in a plurality of directions between frames are partially detected by the difference between sampling points having the same phases of color sub-carrier and a plurality of inter-field processes are adaptively switched in accordance with the result of the detection. Further, the correlation in the field is partially detected and a plurality of intra-field processes are adaptively switched in accordance with the result of the detection. Thus, the intra-frame Y signal extracting filter extracts an intra-frame YC separated Y signal. Therefore, a direction in which the image moves is detected and an inter-field operation adaptive to that direction is possible.

Also in this fifteenth embodiment, by adaptively switching the inter-field processes, no deterioration in resolution occurs when the image moves in some direction like shown in FIG. 108(*a*), whereby crosstalks between Y signals and C signals are reduced.

[Embodiment 16]

FIG. 100 is a block diagram showing a third example of the intra-frame correlation detecting circuit 6018 and the intra-frame C signal extracting filter 6019 shown in FIG. 90. In FIG. 100, the same reference numerals as in FIG. 98 designate the same parts. Reference numeral 6119 designates a 263-line delay circuit which delays an input signal by a time corresponding to 263 lines. Reference numerals 6120, 6124, and 6130 designate two-pixel delay circuits which delay input signals by a time corresponding to two pixels. Reference numeral 6121 designates a 262-line delay circuit which delays an input signal by a time corresponding to 262 lines. Reference numerals 6122 and 6129 designate four-pixel delay circuits which delay input signals each by a time corresponding to 4 pixels. Reference numerals 6123 and 6128 designate one-line delay circuit which delay input signals each by a time corresponding to one line. Reference numerals 6125, 6126, and 6127 designate adders, numerals 6131, 6132, and 6133 designate subtracters, and numerals 6134, 6135, and 6136 designate absolute circuits. Reference numeral 6137 designates a minimum value selecting circuit which selects the minimum value of three input signals and outputs a control signal. Reference numeral 6138 designates a signal selecting circuit which selects and outputs one of three inputs.

In FIG. 100, a difference from FIG. 98 resides in the correlation detecting method for adaptively controlling the inter-field process. In this embodiment, in order to detect the correlation of the V signal, the correlation between frame is detected utilizing a horizontal low-frequency component of a difference between sampling points having the same phases of color sub-carrier between frames in the n+1 field and the n−1 field. Only the intra-frame correlation detecting circuit will be described, which is different from that of FIG. 98.

In FIG. 100, a color difference signal 6204 input to an input terminal 6023 is delayed by 263 lines in the 263-line delay circuit 6119, by 2 pixels in the two-pixel delay circuit 6120, and by 262 lines in the 262-line delay circuit 6121.

The color difference signal delayed by two pixels in the two-pixel delay circuit 6120 and an output of the 262-line delay circuit 6121 are added by the adder 6125, resulting in an inter-field sum by an inter-field C extraction C.

The color difference signal delayed by two pixels in the two-pixel delay circuit 6120 and an output of the four-pixel delay circuit 6012 are added by the adder 6126, resulting in an inter-field sum by an inter-field C extraction B.

The color difference signal delayed by two pixels in the two-pixel delay circuit 6120 and an output of the two-pixel delay circuit 6124 are added by the adder 6127, resulting in an inter-field sum by an inter-field C extraction A.

The three kinds of inter-field sums are input to the signal selecting circuit 6138 and then selected by an output of the minimum value selecting circuit 6137, which will be described later.

The correlation detection for adaptively switching the three kinds of the inter-field C extractions A to C is performed in accordance with the correlation detection between fields like the embodiment of FIG. 95.

In FIG. 100, the color difference signal 6204 input to the input terminal 6023 is input to the 263-line delay circuit 6119 and the input terminals of the one-line delay circuit 6128 and the two-pixel delay circuit 6130. An output of the 263-line delay circuit 6119 is used for constituting the three kinds of inter-field C extracting filters.

An output of the 262-line delay circuit 6121 and an output of the four-pixel delay circuit 6129 are subtracted by the subtracter 6131 and its absolute value is obtained in the absolute value circuit 6134 and the absolute value is input to the minimum value selecting circuit 6137, wherein a correlation between the sampling points and in FIGS. 103 and 104 is detected.

An output of the four-pixel delay circuit 6122 and an output of the one-line delay circuit 6128 are subtracted by the subtracter 6132 and an absolute value is obtained in the absolute value circuit 6135 and the absolute value is input to the minimum value selecting circuit 6137, wherein a correlation between sampling points and in FIG. 103 and 104 are detected.

An output of the two-pixel delay circuit 6124 and an output of the two-pixel delay circuit 6130 are subtracted by the subtracter 6133 and its absolute value is obtained in the absolute value circuit 6136 and the absolute value is input to the minimum value selecting circuit 6137, wherein a correlation between sampling points and shown in FIGS. 103 and 104 is detected.

The minimum value selecting circuit 6137 selects the minimum one from the three kinds of absolute values, i.e., an absolute value in which a correlation between sampling points in three directions apart by one frame with the particular-sampling point in the center is the maximum, and then controls the signal selecting circuit 6138. The signal selecting circuit 6138 selects an output of the adder 6125 when the output of the absolute value circuit 6134 is the minimum, an output of the adder 6126 when the output of the absolute value circuit 6133 is the minimum, and an output of the adder 6127 when the output of the absolute value circuit 6136 is the minimum.

An output of the signal selecting circuit 6138 is output from the terminal 6024 as an intra-frame YC separated C signal 6215.

According to the sixteenth embodiment of the present invention, while the Y signal and the C signal are processed separately, in the intra-frame C signal extracting filter, when the motion detecting circuit detects a moving image, correlations in a plurality of directions between frames are partially detected by the horizontal low-frequency component of the difference between sampling points having the same phases of color sub-carrier between frames. Then, a process for restricting the band of the color difference signal is performed by the intra-frame process for adaptive switching a plurality of inter-field operations in accordance with the result of the detection. Thus, the intra-frame C signal extracting filter outputs an intra-frame YC separated C signal. Therefore, a direction in which the image moves is detected and an inter-field operation adaptive to that direction is possible.

[Embodiment 17]

While in the above-described fifteenth embodiment the three kinds of inter-field Y signal extracting filters are adaptively switched in the intra-frame Y signal extracting filter 6017, in this embodiment an intra-field Y signal extracting filter is added to the inter-field Y signal extracting filters and an optimum one is selected from the four filters.

Figure 96:
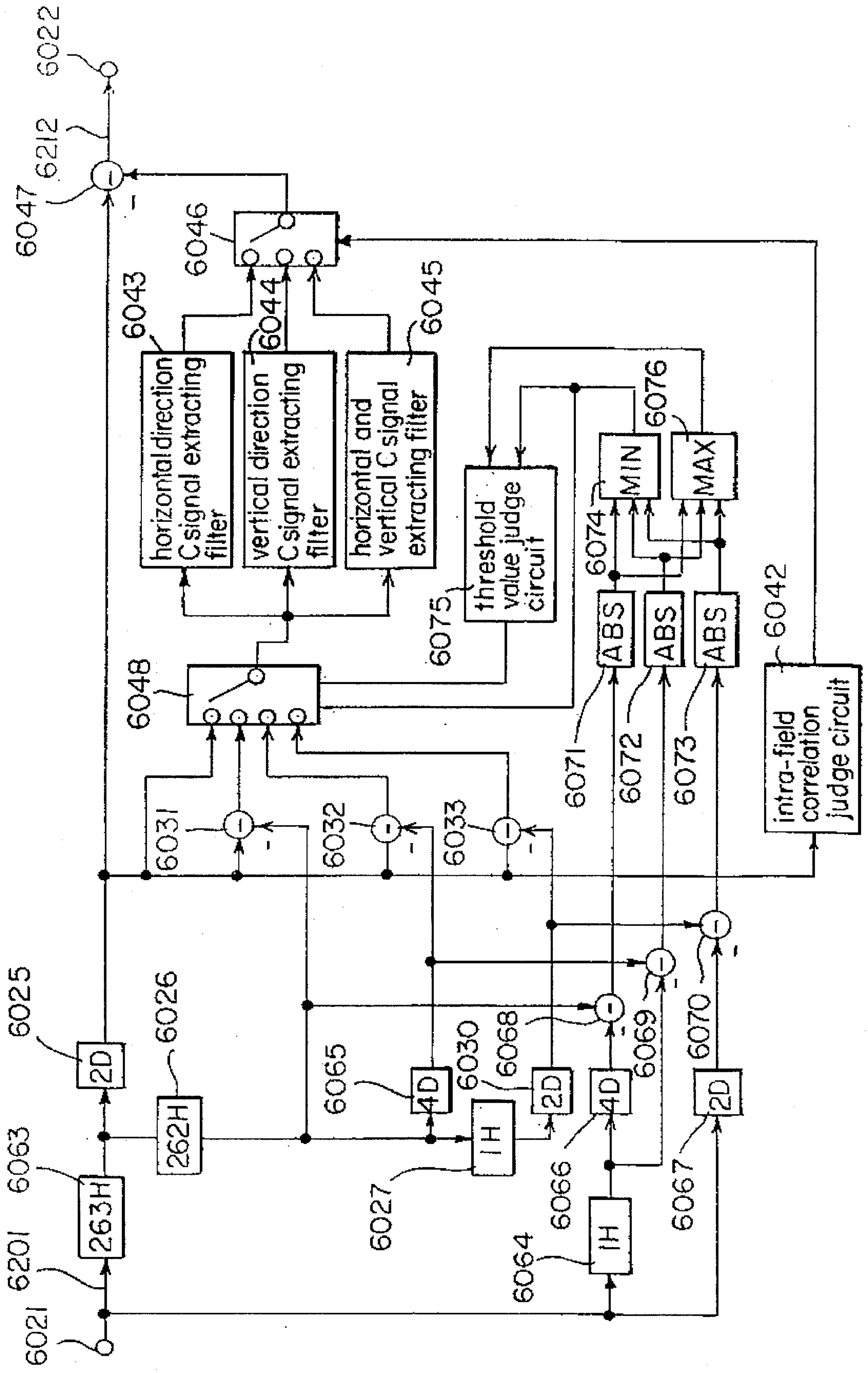
FIG. 96 is a block diagram showing sixth examples of the intra-frame correlation detecting circuit and the intra-frame Y signal extracting filter shown in FIG. 90.

FIG. 96 is a block diagram showing a sixth example of the intra-frame correlation detecting circuit 6016 and the intra-frame Y signal extracting filter 6017 shown in FIG. 90. Structure and operation of the circuit shown in FIG. 96 are identical to those of the circuit shown in FIG. 14.

[Embodiment 18]

While in the above-described sixteenth embodiment the three kinds of inter-field C signal extracting filters are adaptively switched in the intra-frame C signal extracting filter, in this embodiment an intra-field C signal extracting filter is added to the inter-field C signal extracting filters and an optimum one is selected from the four filters.

Figure 101:
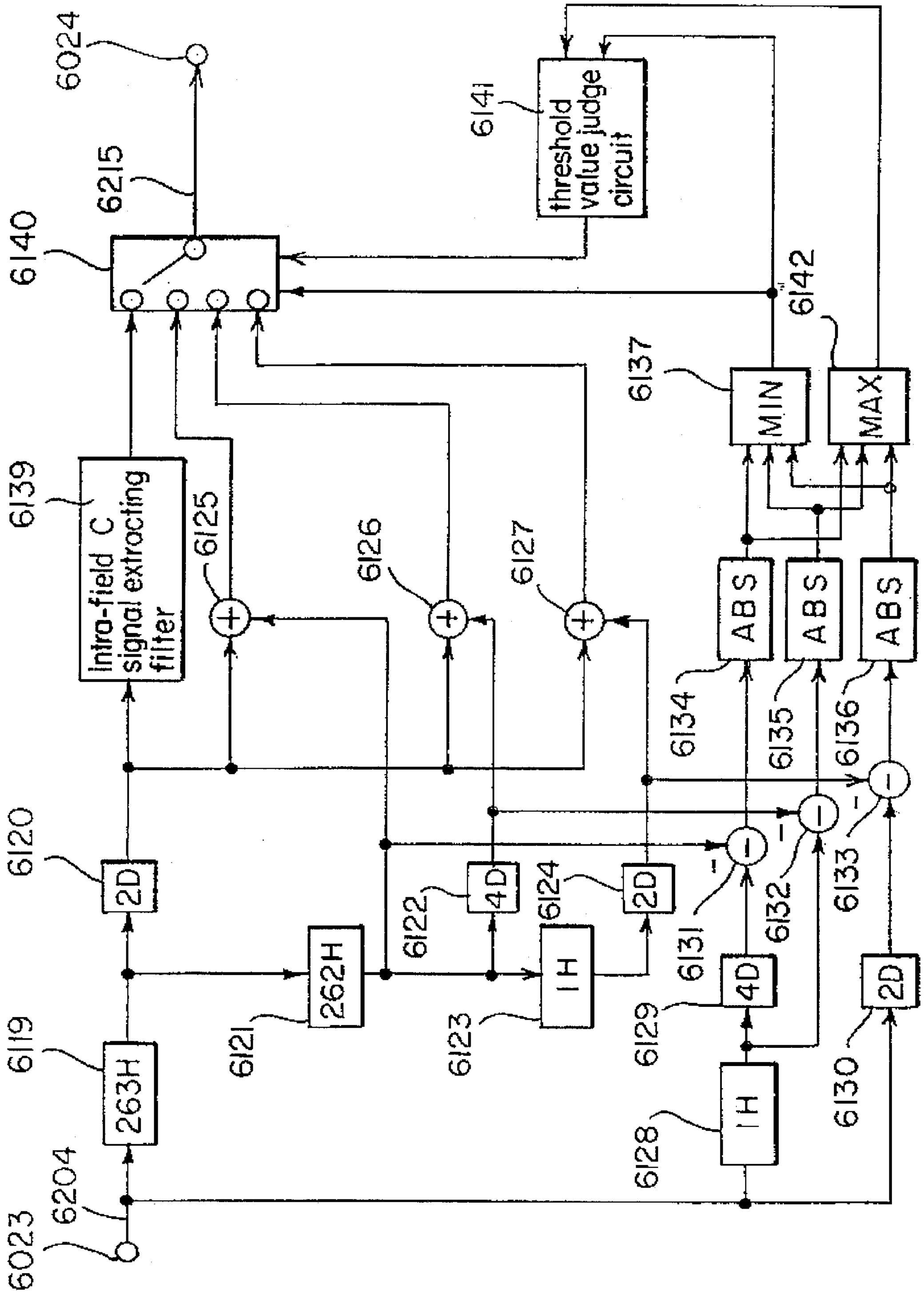
FIG. 101 is a block diagram showing fourth examples of the intra-frame correlation detecting circuit and the intra-frame C signal extracting filter shown in FIG. 90.

FIG. 101 is a block diagram showing a fourth example of the intra-frame correlation detecting circuit 6018 and the intra-frame C signal extracting filter 6019 shown in FIG. 90. In FIG. 101, the same reference numerals as in FIG. 100 designate the same parts. Reference numeral 6139 designates an intra-field C signal extracting filter which extracts and outputs C signal by an intra-field operation. Reference numeral 6140 designates a signal selecting circuit which selects and outputs one of four inputs. Reference numeral 6141 designates a threshold value judge circuit which judges whether the two inputs exceed a threshold value or not and then outputs a control signal. Reference numeral 6142 designates a maximum value selecting circuit which selects the maximum value of the three inputs and then outputs a control signal.

An output of the two-pixel delay circuit 6120 is input to the input terminals of the adders 6125, 6126, and 6127 and the intra-field C signal extracting filter 6139. An output of the intra-field C signal extracting filter 6139 is input to the signal selecting circuit 6140.

An output of the absolute value circuit 6134 is input to the minimum value selecting circuit 6137 and the maximum value selecting circuit 6142. An output of the absolute value circuit 6135 is input to the minimum value selecting circuit 6137 and the maximum value selecting circuit 6142. An output of the absolute value circuit 6136 is input to the minimum value selecting circuit 6137 and the maximum value selecting circuit 6142.

The signal selecting circuit 6140 is controlled by the threshold value judge circuit 6141 and the minimum value selecting circuit 6137 in the same way as the signal selecting circuit 6116 shown in FIG. 99.

An output of the signal selecting circuit 6140 is output from the output terminal 6024 as an intra-frame YC separated C signal 6215.

According to the eighteenth embodiment of the present invention, while the Y signal and the C signal are separately processed, in the intra-frame C signal extracting filter, when the motion detecting circuit detects a moving image, correlations in a plurality of directions between frames are partially detected by the difference between sampling points having the same phases of color sub-carrier wave between frames. When it is judged that a correlation is present in some direction, the intra-frame C signal extracting filter outputs the intra-frame YC separated C signal by adaptively selecting one of a plurality of the inter-field operations. When it is judged that no correlation is present, the intra-frame C signal extracting filter outputs the intra-frame YC separated C signal by performing a restriction of the band of the color difference signal by the intra-field process. Therefore, when there is no movement of the image, a deterioration in the quality of the image caused by the inter-field operation is avoided.

As described above, according to the tenth to eighteenth embodiment of the present invention, when an image is detected by the motion detecting circuit, in the intra-frame Y signal extracting filter, correlations are partially detected between fields or between frames and a plurality of inter-field operations are adaptively selected in accordance with the result of the detection. Further, correlations in the field are partially detected and a plurality of inter-field operations are adaptively selected by the result of the detection. Thereby, the Y signal is extracted. In addition, in the intra-frame C signal extracting filter, correlations between fields or between frames are partially detected and a plurality of inter-field operations including the intra-field operation are adaptively switched, whereby Y signal or C signal is extracted. Therefore, while a moving image is processed in the YC separating filter adaptive to the movement of the image, an optimum YC separation utilizing the correlation of the image is possible, resulting in a YC separating filter which performs a YC separation with less deterioration in resolution.

We claim:

1. A luminance and chrominance signal separating filter for separating the luminance (Y) and chrominance (C) component signals from a composite color television signal defining sequential television frames adaptive to movement of an image defined by the composite color television filter, the C signals being frequency multiplexed with a high frequency region of the Y signals, comprising:

a first Y-C separating circuit separating the C signals from the composite signal to develop a separated C signal;

a two dimensional adaptive filter operatively connected to the first Y-C separating circuit and receiving the separated C signal for filtering only in a selected one or more of at least two dimensions in dependence on the level of correlation of the separated C signal in said dimensions to produce a filtered C signal, said two dimensional adaptive filter including, at least two dimensional filters, each providing directional filtering in a different set of one or more directions, of said separated C signal, and a correlation detector for determining the degree of image correlation in each of the directions employed by said at least two dimensional filters and selecting only the one of said dimensional filters which provides a higher correlation in at least one of said directions; and a brightness extraction circuit using the filtered C signal and the composite color television signal to produce said Y signals, thereby developing both a Y signal and a C signal from said composite color television signal.

2. The filter of claim 1 wherein said first Y-C separating circuit separates the composite signal in a first field by using signals from a second field.

3. A luminance and chrominance signal separating filter for separating the luminance (Y) and chrominance (C) component signals from a composite color television signal defining sequential television frames adaptive to movement of an image defined by the composite color television filter, the C signals being frequency multiplexed with a high frequency region of the Y signals, comprising:

a first Y-C separating circuit separating the C signals from the composite signal to develop a separated C signal, wherein said first Y-C separating circuit separates the composite signal in a first field by using signals from a second field, and includes, an inter-field correlation detector monitoring the degree of correlation between at least two nearby field pixels, spatially located nearby each selected first field pixel in differing directions and from a different image field, and each selected first field pixel to determine a direction of maximum correlation, and inter-field processor means for combining each said selected first field pixel with an associated selected second field pixel in said direction of maximum correlation to develop the separated C signal associated with each selected first field pixel;

a two dimensional adaptive filter operatively connected to the first Y-C separating circuit and receiving the separated C signal for filtering only in a selected one or more of at least two dimensions in dependence on the level of correlation of the separated C signal in said dimensions to produce a filtered C signal; and a brightness extraction circuit using the filtered C signal and the composite color television signal to produce said Y signals, thereby developing both a Y signal and a C signal from said composite color television signal.

4. The filter of claim 1, wherein said correlation detector is an intra-field correlation detector and monitors the degree of correlation between the selected first field pixel and adjacent pixels in the same field and extending in at least two dimensions to determine the degree of correlation in each of said dimensions.

5. The filter of claim 4, wherein said intra-field correlation detector further includes, vertical direction non-correlation energy detecting means for excluding a d.c. component in the vertical direction and a frequency component corresponding to a color sub-carrier component from a frequency component of a particular sampling point and finding an absolute value of the remaining frequency component to detect a vertical direction non-correlation energy;

horizontal direction high frequency Y signal energy detecting means for extracting a frequency component, which is a low frequency component in the vertical direction and corresponds to a half of a color sub-carrier frequency in the horizontal direction, from the frequency component of the selected first field pixel and finding an absolute value of the extracted component to detect a horizontal direction high frequency Y signal energy;

vertical correlation detecting means for comparing said vertical direction non-correlation energy with a first set value and comparing said horizontal direction high frequency Y signal energy with a second set value, and deciding that a correlation is present in the vertical direction when said vertical direction non-correlation energy is smaller than said first set value and said horizontal direction high frequency Y signal energy is larger than said second set value;

horizontal direction non-correlation energy detecting means for excluding a d.c. component in the horizontal direction and a frequency component corresponding to a color sub-carrier component from a frequency component of the selected first field pixel and finding an absolute value of the remaining frequency component to detect a horizontal direction non-correlation energy;

vertical direction high frequency Y signal energy detecting means for extracting a frequency component, which is a low frequency component in the horizontal direction and corresponds to a half of a color sub-carrier frequency in the vertical direction, from the frequency component of the selected first field pixel and finding an absolute value of the extracted components to detect a vertical direction high frequency Y signal energy;

horizontal correlation detecting means for comparing said horizontal direction non-correlation energy with a third set value and comparing said vertical direction high frequency Y signal energy with a fourth set value, and deciding that a correlation is present in the horizontal direction when said horizontal direction non-correlation energy is smaller than said third set value and said vertical direction high frequency Y signal energy is larger than said fourth set value; and means for sending a control signal for selecting an output from outputs of a plurality of filters, which perform intra-field processes, in accordance with the result of the detections.

6. The filter of claim 1 wherein said at least two dimensional filters include, a horizontal direction C signal extracting filter, a vertical direction C signal extracting filter, and said correlation detector determining the degree of correlation of said composite color television signal in a vertical and horizontal direction.

7. A luminance and chrominance signal separating filter for separating the luminance (Y) and chrominance (C) component signals from a composite color television signal defining sequential television frames adaptive to movement of an image defined by the composite color television filter, the C signals being frequency multiplexed with a high frequency region of the Y signals, comprising:

a first Y-C separating circuit separating the C signals from the composite signal to develop a separated C signal;

a two dimensional adaptive filter operatively connected to the first Y-C separating circuit and receiving the separated C signal for filtering only in a selected one or more of at least two dimensions in dependence on the level of correlation of the separated C signal in said dimensions to produce a filtered C signal, said two dimensional adaptive filter including, a horizontal direction C signal extracting filter, a vertical direction C signal extracting filter, and a correlation detector for determining the degree of image correlation in each of the directions employed by said at least dimensional filters and selecting only the one of said dimensional filters which provides a higher correlation in least one of said directions, said correlation detector determining the degree of correlation of said composite color television signal in a vertical and horizontal direction, said correlation detector selecting said horizontal direction C signal extracting filter if the degree of horizontal correlation in said composite color television signal exceeds a first selected level, said correlation detector selecting said vertical direction C signal extracting filter if the degree of vertical correlation in said composite color television signal exceeds a second selected level; and a brightness extraction circuit using the filtered C signal and the composite color television signal to produce said Y signals, thereby developing both a Y signal and a C signal from said composite color television signal.

8. The filter of claim 6 wherein said at least two dimensional filters further includes a horizontal and vertical C signal extracting filter.

9. A luminance and chrominance signal separating filter for separating the luminance (Y) and chrominance (C) component signals from a composite color television signal defining sequential television frames adaptive to movement of an image defined by the composite color television filter, the C signals being frequency multiplexed with a high frequency region of the Y signals, comprising:

a first Y-C separating circuit separating the C signals from the composite signal to develop a separated C signal;

a two dimensional adaptive filter operatively connected to the first Y-C separating circuit and receiving the separated C signal for filtering only in a selected one or more of at least two dimensions in dependence on the level of correlation of the separated C signal in said dimensions to produce a filtered C signal, said two dimensional adaptive filter including, a horizontal direction C signal extracting filter, a vertical direction C signal extracting filter, and a horizontal and vertical C signal extracting filter, a correlation detector for determining the degree of image correlation in each of the directions employed by said at least two dimensional filters and selecting only the one of said dimensional filters which provides a higher correlation in least one of said directions, said correlation detector determining the degree of correlation of said composite color television signal in a vertical and horizontal direction, said correlation detector selecting said horizontal direction C signal extracting filter if there is a high degree of horizontal correlation in said composite color television signal but a lower degree of vertical correlation in said composite color television signal, said correlation detector selecting said vertical direction C signal extracting filter if there is a high degree of vertical correlation in said composite color television signal but a lower degree of horizontal correlation in said composite color television signal, said correlation filter selecting said horizontal and vertical C signal extracting filter if there is a high degree of both horizontal and vertical correlation in said composite color television signal; and a brightness extraction circuit using the filtered C signal and the composite color television signal to produce said Y signals, thereby developing both a Y signal and a C signal from said composite color television signal.

10. The filter of claim 3 wherein said first and second fields are in the same frame.

11. The filter of claim 10 wherein said nearby field used in said inter-field correlation detector is in the same frame as said first field.

12. The filter of claim 10 wherein said second field used in said inter-field correlation detector is in a different frame than said first field.

13. A luminance and chrominance signal separating filter for separating the luminance (Y) and chrominance (C) component signals from a composite color television signal defining sequential television frames adaptive to movement of an image defined by the composite color television filter, the C signals being frequency multiplexed with a high frequency region of the Y signals, comprising:

a first Y-C separating circuit separating the C signals from the composite signal to develop a separated C signal;

a two dimensional adaptive filter operatively connected to the first Y-C separating circuit and receiving the separated C signal for filtering only in a selected one or more of at least two dimensions in dependence on the level of correlation of the separated C signal in said dimensions to produce a filtered C signal;

a brightness extraction circuit using the filtered C signal and the composite color television signal to produce said Y signals, thereby developing both a Y signal and a C signal from said composite color television signal an inter-frame Y-C separating circuit for separating the C signals from the composite signal by using the composite signals of a different frame to extract inter-frame Y and C signals; and mixing means for mixing said Y signal produced by said first Y-C separating circuit with said inter-frame Y signal produced by said inter-frame Y-C separating circuit to produce a Y output signal and for mixing said C signal produced by said first Y-C separating circuit with said inter-frame C signal produced by said inter-frame Y-C separating circuit to produce a C output signal.

14. The filter of claim 11 further comprising:

a motion detecting circuit detecting motion in the image represented by the composite color television signal; and said mixing means varying the proportion of said Y signal produced by said first Y-C separating circuit mixed with said inter-frame Y signal produced by said inter-frame Y-C separating circuit to produce the output Y signal and varying the proportion of said C signal produced by said first Y-C separating circuit mixed with said inter-frame C signal produced by said inter-frame Y-C separating circuit to produce the output C signal in response to the degree of motion sensed by said motion detecting circuit.

15. A method of separating luminance (Y) and chrominance (C) component signals from a composite color television signal defining sequential television frames adaptive to movement of an image represented thereby, the C signals being frequency multiplexed within a high frequency region of the Y signals, comprising:

a) separating the C signals from the composite signal in a first field by using the composite signals from a second field to develop a separated C signal;

b) judging the degree of correlation between a selected pixel and adjacent pixels in the same field and extending in at least two dimensions to determine the presence of one or more dimensions of higher correlation;

c) adaptively filtering the separated C signal in selected one or more of at least two dimensions as determined by said step b) of judging to produce a filtered C signal;

d) producing a Y signal from the filtered C signal and the composite color television signal; and e) producing a second separated C signal from said composite signal.

16. The method of claim 15 wherein said step e) includes, i) separating second C signals from the composite signal in a first field by using the composite signals from a second field to develop a second separated C signal;

ii) judging the degree of correlation between a selected pixel and adjacent pixels in the same frame and extending in at least two dimensions to determine a direction of higher correlation; and iii) filtering the second separated C signal in a dimension of the higher correlation determined by said step ii) of judging.

17. A method of separating chrominance (C) component signals from a composite color television signal defining sequential television frames adaptive to movement of an image represented thereby, the C signals being frequency multiplexed within a high frequency region of luminance (Y) signals, comprising:

a) separating the C signals from the composite signal in a first field by using the composite signals from a second field to develop a separated C signal;

b) judging the degree of correlation between a selected pixel and adjacent pixels in the same field and extending in at least two dimensions to determine the presence of one or more dimensions of higher correlation; and c) using an adaptive filter, responsive to said step b) of judging to adaptively filter the separated C signal only in a selected one ore more of at least two dimensions as determined by said step b) of judging to produce a filtered C signal.

18. The method of claim 17 wherein said step a) of separating adaptively separates the C signals from the composite signal and includes, i) determining which of at least two nearby field pixels, spatially located nearby each selected first field pixel and from a different image field, most closely correlate with said first field pixel to determine a direction of maximum correlation, ii) combining a selected first field pixel with an associated second field pixel in said direction of maximum correlation to develop the separated C signal associated with the selected first field pixel, and iii) repeating said steps i) and ii) for each said pixel in said composite color television signal.

19. The method of claim 17 wherein said step c) of using an adaptive filter includes, i) filtering the separated C signal in a first dimension, ii) filtering the separated C signal in a second dimension, iii) filtering the separated C signal in both said first and second directions, and iv) choosing one of said steps i)–iii) of filtering based on the determined direction of higher correlation as determined by said step b) of judging.

20. The method of claim 17 wherein said second field used in said step a) is in the same frame as said first field.

21. The method of claim 18 wherein said nearby field used in said step i) is in the same frame as said first field.

22. The method of claim 18 wherein said nearby field used in said step i) is in a different frame than said first field.

23. The method of claim 17 further comprising:

e) inter-frame separating the C signals from the composite signal by using the composite signals of a different frame to extract inter-frame C signals; and f) mixing said mixing said C signal produced by said step d)) with said inter-frame C signal produced by said step e) to produce a C output signal.

24. The method of claim 23 wherein said method of separating further comprises:

g) detecting motion in the image represented by the composite color television signal; and said step f) of mixing varying the proportion of said C signal produced by said step d)) mixed with said inter-frame C signal produced by said step e) to produce the C output signal in response to the degree of motion sensed by said step g) of detecting.

25. The method of claim 1 wherein said dimensional filters are selected from a group consisting of a horizontal filter, a vertical filter, and a horizontal/vertical filter.

26. The method of claim 17 wherein the dimension of higher correlation determined by said step b) of judging is selected from horizontal, vertical, or horizontal/vertical.

* * * * *